US012792291B2

(12) United States Patent
Chang et al.

(10) Patent No.: US 12,792,291 B2
(45) Date of Patent: Nov. 10, 2026

(54) METHODS AND USER INTERFACES FOR MANAGING SCREEN CONTENT SHARING

(71) Applicant: Apple Inc., Cupertino, CA (US)

(72) Inventors: Jae Woo Chang, Los Altos Hills, CA (US); Nicolas V. Scapel, London (GB); Raymond S. Sepulveda, Portland, OR (US); Chun Kin Minor Wong, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/040,719

(22) Filed: Jan. 29, 2025

(65) Prior Publication Data

US 2025/0348265 A1 Nov. 13, 2025

Related U.S. Application Data

(60) Provisional application No. 63/657,058, filed on Jun. 6, 2024, provisional application No. 63/646,695, filed on May 13, 2024.

(51) Int. Cl.
*G06F 3/04883* (2022.01)
*G06F 3/14* (2006.01)
*G06T 13/80* (2011.01)

(52) U.S. Cl.
CPC ........ *G06F 3/1454* (2013.01); *G06F 3/04883* (2013.01); *G06T 13/80* (2013.01)

(58) Field of Classification Search
CPC .... G06F 3/04883; G06F 3/1454; G06T 13/80
See application file for complete search history.

(56) References Cited

U.S. PATENT DOCUMENTS

| | | | | |
|---|---|---|---|---|
| 5,408,600 A | 4/1995 | Garfinkel et al. | | |
| 2014/0165011 A1* | 6/2014 | Goda | G06F 3/04815 | 715/853 |
| 2015/0106755 A1* | 4/2015 | Moore | G06F 3/0484 | 715/765 |
| 2016/0097651 A1* | 4/2016 | Jung | G06F 3/04883 | 701/428 |
| 2017/0083148 A1* | 3/2017 | Ahn | G06F 3/1446 | |
| 2017/0357324 A1* | 12/2017 | Chaudhri | H04N 23/63 | |
| 2019/0166330 A1 | 5/2019 | Ma et al. | | |
| 2021/0064143 A1* | 3/2021 | Stern | G06F 3/04886 | |
| 2022/0156029 A1* | 5/2022 | Lee | H04N 21/436 | |
| 2023/0152961 A1* | 5/2023 | Perea-OcHoa | G06F 3/04883 | 715/764 |
| 2024/0370129 A1 | 11/2024 | Chang et al. | | |

OTHER PUBLICATIONS

International Search Report and Written Opinion received for PCT Patent Application No. PCT/US2025/025592, mailed on Sep. 15, 2025, 21 pages.
Invitation to Pay Additional Fees and Partial International Search Report received for PCT Patent Application No. PCT/US2025/025592, mailed on Jul. 23, 2025, 14 pages.

* cited by examiner

*Primary Examiner* — Ryan A Lubit
(74) *Attorney, Agent, or Firm* — YHE Law LLP

(57) ABSTRACT

The present disclosure generally relates to screen content sharing. In some embodiments, user interfaces are provided for selecting screen content for sharing. In some embodiments, user interfaces are provided for requesting a computer system to share screen content. In some embodiments, user interfaces are provided for granting a request to share control of screen content. In some embodiments, user interfaces are provided for displaying representations of an input.

11 Claims, 72 Drawing Sheets

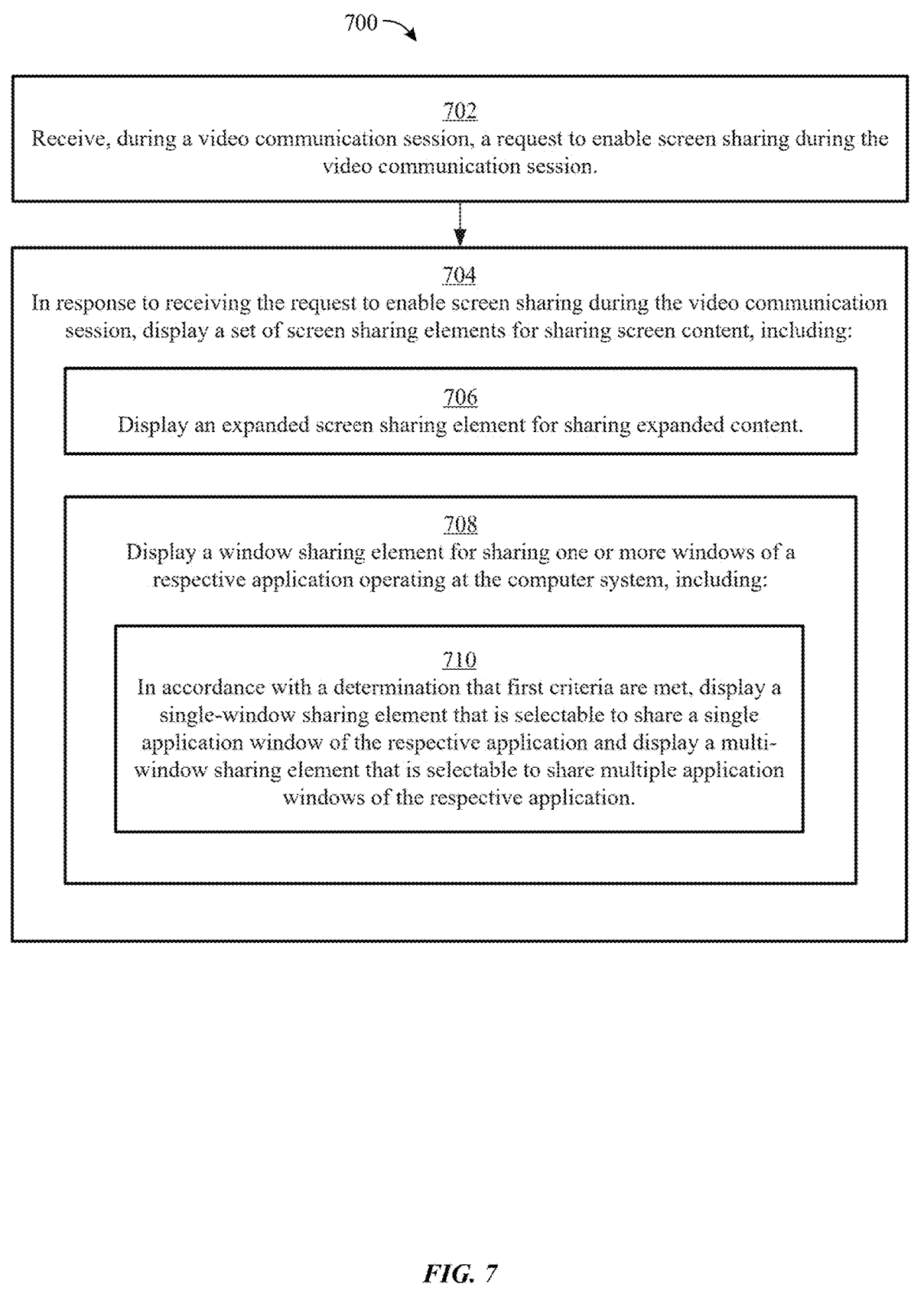

700

702
Receive, during a video communication session, a request to enable screen sharing during the video communication session.

704
In response to receiving the request to enable screen sharing during the video communication session, display a set of screen sharing elements for sharing screen content, including:

706
Display an expanded screen sharing element for sharing expanded content.

708
Display a window sharing element for sharing one or more windows of a respective application operating at the computer system, including:

710
In accordance with a determination that first criteria are met, display a single-window sharing element that is selectable to share a single application window of the respective application and display a multi-window sharing element that is selectable to share multiple application windows of the respective application.

*FIG. 7*

METHODS AND USER INTERFACES FOR MANAGING SCREEN CONTENT SHARING

CROSS-REFERENCE TO RELATED APPLICATIONS

This application claims priority to U.S. Provisional Application Ser. No. 63/646,695, entitled "METHODS AND USER INTERFACES FOR MANAGING SCREEN CONTENT SHARING," filed May 13, 2024; and U.S. Provisional Application Ser. No. 63/657,058 entitled "METHODS AND USER INTERFACES FOR MANAGING SCREEN CONTENT SHARING," filed Jun. 6, 2024, the entire contents of each of which are hereby incorporated by reference.

FIELD

The present disclosure relates generally to computer user interfaces, and more specifically to techniques for managing the sharing of screen content.

BACKGROUND

Content can be shared between computer systems such that a local computer system can display content that is provided by a remote computer system. User interfaces can be provided so that the remote content can be displayed and, in some embodiments, controlled at the local computer system.

BRIEF SUMMARY

Some techniques for managing the sharing of screen content using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing the sharing of screen content. Such methods and interfaces optionally complement or replace other methods for managing the sharing of screen content. Such methods and interfaces reduce the cognitive burden on a user and produce a more efficient human-machine interface. For battery-operated computing devices, such methods and interfaces conserve power, increase the time between battery charges, provide improved control schemes for displaying remote content, enhance security and user privacy, and reduce the computational workload of the computing devices.

Example methods are described herein. An example method includes, at a computer system that is in communication with one or more display generation components and one or more input devices: during a video communication session, receiving, via the one or more input devices, a request to enable screen sharing during the video communication session; and in response to receiving the request to enable screen sharing during the video communication session, displaying, via the one or more display generation components, a set of screen sharing elements for sharing screen content, including: displaying an expanded screen sharing element for sharing expanded content; and displaying a window sharing element for sharing one or more windows of a respective application operating at the computer system, including: in accordance with a determination that first criteria are met, displaying a single-window sharing element that is selectable to share a single application window of the respective application and displaying a multi-window sharing element that is selectable to share multiple application windows of the respective application.

An example method includes, at a computer system that is in communication with one or more display generation components and one or more input devices: displaying, via the one or more display generation components, a set of one or more sharing elements for sharing content between the computer system and an external computer system, wherein the set of one or more sharing elements for sharing content includes a sharing request element; receiving, via the one or more input devices, a set of one or more inputs; and in response to receiving the set of one or more inputs: in accordance with a determination that the set of one or more inputs includes a selection of the sharing request element, initiating a process for requesting the external computer system to share screen content in a shared-content session with the computer system.

An example method includes, at a computer system that is in communication with one or more display generation components and one or more input devices: while sharing screen content with an external computer system, receiving first data indicating a request from the external computer system to control the screen content at the computer system; receiving, via the one or more input devices, an input; and in response to receiving the input: in accordance with a determination that the input corresponds to an approval of the request from the external computer system to control the screen content at the computer system: transitioning the computer system to a first mode in which the computer system permits the external computer system to control the screen content at the computer system; and displaying, via the one or more display generation components, a visual effect associated with the screen content.

An example method includes, at a computer system that is in communication with one or more display generation components and one or more input devices: while displaying, via the one or more display generation components, a representation of screen content that is being shared from an external computer system while the computer system does not have control of the screen content that is being shared from the external computer system: detecting, via the one or more input devices, an input directed to the representation of the screen content; and in response to detecting the input directed to the representation of the screen content: displaying, via the one or more display generation components, a first visual representation of the input, wherein the first visual representation of the input is displayed over at least a portion of the representation of the screen content; and initiating a process for causing a second visual representation of the input to be displayed over the screen content at the external computer system.

Example non-transitory computer-readable storage media are described herein. An example non-transitory computer-readable storage medium stores one or more programs configured to be executed by one or more processors of a computer system that is in communication with one or more display generation components and one or more input devices, the one or more programs including instructions for: during a video communication session, receiving, via the one or more input devices, a request to enable screen sharing during the video communication session; and in response to receiving the request to enable screen sharing during the video communication session, displaying, via the one or more display generation components, a set of screen sharing elements for sharing screen content, including: displaying an expanded screen sharing element for sharing expanded content; and displaying a window sharing element for sharing one or more windows of a respective application operating at the computer system, including: in accordance with a determination that first criteria are met, displaying a single-window sharing element that is selectable to share a single application window of the respective application and displaying a multi-window sharing element that is selectable to share multiple application windows of the respective application.

An example non-transitory computer-readable storage medium stores one or more programs configured to be executed by one or more processors of a computer system that is in communication with one or more display generation components and one or more input devices, the one or more programs including instructions for: displaying, via the one or more display generation components, a set of one or more sharing elements for sharing content between the computer system and an external computer system, wherein the set of one or more sharing elements for sharing content includes a sharing request element; receiving, via the one or more input devices, a set of one or more inputs; and in response to receiving the set of one or more inputs: in accordance with a determination that the set of one or more inputs includes a selection of the sharing request element, initiating a process for requesting the external computer system to share screen content in a shared-content session with the computer system.

An example non-transitory computer-readable storage medium stores one or more programs configured to be executed by one or more processors of a computer system that is in communication with one or more display generation components and one or more input devices, the one or more programs including instructions for: while sharing screen content with an external computer system, receiving first data indicating a request from the external computer system to control the screen content at the computer system; receiving, via the one or more input devices, an input; and in response to receiving the input: in accordance with a determination that the input corresponds to an approval of the request from the external computer system to control the screen content at the computer system: transitioning the computer system to a first mode in which the computer system permits the external computer system to control the screen content at the computer system; and displaying, via the one or more display generation components, a visual effect associated with the screen content.

An example non-transitory computer-readable storage medium stores one or more programs configured to be executed by one or more processors of a computer system that is in communication with one or more display generation components and one or more input devices, the one or more programs including instructions for: while displaying, via the one or more display generation components, a representation of screen content that is being shared from an external computer system while the computer system does not have control of the screen content that is being shared from the external computer system: detecting, via the one or more input devices, an input directed to the representation of the screen content; and in response to detecting the input directed to the representation of the screen content: displaying, via the one or more display generation components, a first visual representation of the input, wherein the first visual representation of the input is displayed over at least a portion of the representation of the screen content; and initiating a process for causing a second visual representation of the input to be displayed over the screen content at the external computer system.

Example transitory computer-readable storage media are described herein. An example transitory computer-readable storage medium stores one or more programs configured to be executed by one or more processors of a computer system that is in communication with one or more display generation components and one or more input devices, the one or more programs including instructions for: during a video communication session, receiving, via the one or more input devices, a request to enable screen sharing during the video communication session; and in response to receiving the request to enable screen sharing during the video communication session, displaying, via the one or more display generation components, a set of screen sharing elements for sharing screen content, including: displaying an expanded screen sharing element for sharing expanded content; and displaying a window sharing element for sharing one or more windows of a respective application operating at the computer system, including: in accordance with a determination that first criteria are met, displaying a single-window sharing element that is selectable to share a single application window of the respective application and displaying a multi-window sharing element that is selectable to share multiple application windows of the respective application.

An example transitory computer-readable storage medium stores one or more programs configured to be executed by one or more processors of a computer system that is in communication with one or more display generation components and one or more input devices, the one or more programs including instructions for: displaying, via the one or more display generation components, a set of one or more sharing elements for sharing content between the computer system and an external computer system, wherein the set of one or more sharing elements for sharing content includes a sharing request element; receiving, via the one or more input devices, a set of one or more inputs; and in response to receiving the set of one or more inputs: in accordance with a determination that the set of one or more inputs includes a selection of the sharing request element, initiating a process for requesting the external computer system to share screen content in a shared-content session with the computer system.

An example transitory computer-readable storage medium stores one or more programs configured to be executed by one or more processors of a computer system that is in communication with one or more display generation components and one or more input devices, the one or more programs including instructions for: while sharing screen content with an external computer system, receiving first data indicating a request from the external computer system to control the screen content at the computer system; receiving, via the one or more input devices, an input; and in response to receiving the input: in accordance with a determination that the input corresponds to an approval of the request from the external computer system to control the screen content at the computer system: transitioning the computer system to a first mode in which the computer system permits the external computer system to control the screen content at the computer system; and displaying, via the one or more display generation components, a visual effect associated with the screen content.

An example transitory computer-readable storage medium stores one or more programs configured to be executed by one or more processors of a computer system that is in communication with one or more display generation components and one or more input devices, the one or more programs including instructions for: while displaying, via the one or more display generation components, a representation of screen content that is being shared from an external computer system while the computer system does not have control of the screen content that is being shared from the external computer system: detecting, via the one or more input devices, an input directed to the representation of the screen content; and in response to detecting the input directed to the representation of the screen content: displaying, via the one or more display generation components, a first visual representation of the input, wherein the first visual representation of the input is displayed over at least a portion of the representation of the screen content; and initiating a process for causing a second visual representation of the input to be displayed over the screen content at the external computer system.

Example computer systems are described herein. An example computer system is configured to communicate with one or more display generation components and one or more input devices and includes: one or more processors; and memory storing one or more programs configured to be executed by the one or more processors, the one or more programs including instructions for: during a video communication session, receiving, via the one or more input devices, a request to enable screen sharing during the video communication session; and in response to receiving the request to enable screen sharing during the video communication session, displaying, via the one or more display generation components, a set of screen sharing elements for sharing screen content, including: displaying an expanded screen sharing element for sharing expanded content; and displaying a window sharing element for sharing one or more windows of a respective application operating at the computer system, including: in accordance with a determination that first criteria are met, displaying a single-window sharing element that is selectable to share a single application window of the respective application and displaying a multi-window sharing element that is selectable to share multiple application windows of the respective application.

An example computer system is configured to communicate with one or more display generation components and one or more input devices and includes: one or more processors; and memory storing one or more programs configured to be executed by the one or more processors, the one or more programs including instructions for: displaying, via the one or more display generation components, a set of one or more sharing elements for sharing content between the computer system and an external computer system, wherein the set of one or more sharing elements for sharing content includes a sharing request element; receiving, via the one or more input devices, a set of one or more inputs; and in response to receiving the set of one or more inputs: in accordance with a determination that the set of one or more inputs includes a selection of the sharing request element, initiating a process for requesting the external computer system to share screen content in a shared-content session with the computer system.

An example computer system is configured to communicate with one or more display generation components and one or more input devices and includes: one or more processors; and memory storing one or more programs configured to be executed by the one or more processors, the one or more programs including instructions for: while sharing screen content with an external computer system, receiving first data indicating a request from the external computer system to control the screen content at the computer system; receiving, via the one or more input devices, an input; and in response to receiving the input: in accordance with a determination that the input corresponds to an approval of the request from the external computer system to control the screen content at the computer system: transitioning the computer system to a first mode in which the computer system permits the external computer system to control the screen content at the computer system; and displaying, via the one or more display generation components, a visual effect associated with the screen content.

An example computer system is configured to communicate with one or more display generation components and one or more input devices and includes: one or more processors; and memory storing one or more programs configured to be executed by the one or more processors, the one or more programs including instructions for: while displaying, via the one or more display generation components, a representation of screen content that is being shared from an external computer system while the computer system does not have control of the screen content that is being shared from the external computer system: detecting, via the one or more input devices, an input directed to the representation of the screen content; and in response to detecting the input directed to the representation of the screen content: displaying, via the one or more display generation components, a first visual representation of the input, wherein the first visual representation of the input is displayed over at least a portion of the representation of the screen content; and initiating a process for causing a second visual representation of the input to be displayed over the screen content at the external computer system.

An example computer system is configured to communicate with one or more display generation components and one or more input devices and includes: means for, during a video communication session, receiving, via the one or more input devices, a request to enable screen sharing during the video communication session; and means for, in response to receiving the request to enable screen sharing during the video communication session, displaying, via the one or more display generation components, a set of screen sharing elements for sharing screen content, including: displaying an expanded screen sharing element for sharing expanded content; and displaying a window sharing element for sharing one or more windows of a respective application operating at the computer system, including: in accordance with a determination that first criteria are met, displaying a single-window sharing element that is selectable to share a single application window of the respective application and displaying a multi-window sharing element that is selectable to share multiple application windows of the respective application.

An example computer system is configured to communicate with one or more display generation components and one or more input devices and includes: means for displaying, via the one or more display generation components, a set of one or more sharing elements for sharing content between the computer system and an external computer system, wherein the set of one or more sharing elements for sharing content includes a sharing request element; means for receiving, via the one or more input devices, a set of one or more inputs; and means for, in response to receiving the set of one or more inputs: in accordance with a determination that the set of one or more inputs includes a selection of the sharing request element, initiating a process for requesting the external computer system to share screen content in a shared-content session with the computer system.

An example computer system is configured to communicate with one or more display generation components and one or more input devices and includes: means for, while sharing screen content with an external computer system, receiving first data indicating a request from the external computer system to control the screen content at the computer system; means for receiving, via the one or more input devices, an input; and means for, in response to receiving the input: in accordance with a determination that the input corresponds to an approval of the request from the external computer system to control the screen content at the computer system: transitioning the computer system to a first mode in which the computer system permits the external computer system to control the screen content at the computer system; and displaying, via the one or more display generation components, a visual effect associated with the screen content.

An example computer system is configured to communicate with one or more display generation components and one or more input devices and includes: means for, while displaying, via the one or more display generation components, a representation of screen content that is being shared from an external computer system while the computer system does not have control of the screen content that is being shared from the external computer system: detecting, via the one or more input devices, an input directed to the representation of the screen content; and in response to detecting the input directed to the representation of the screen content: displaying, via the one or more display generation components, a first visual representation of the input, wherein the first visual representation of the input is displayed over at least a portion of the representation of the screen content; and initiating a process for causing a second visual representation of the input to be displayed over the screen content at the external computer system.

Example computer program products are described herein. An example computer program product includes one or more programs configured to be executed by one or more processors of a computer system that is in communication with one or more display generation components and one or more input devices, the one or more programs including instructions for: during a video communication session, receiving, via the one or more input devices, a request to enable screen sharing during the video communication session; and in response to receiving the request to enable screen sharing during the video communication session, displaying, via the one or more display generation components, a set of screen sharing elements for sharing screen content, including: displaying an expanded screen sharing element for sharing expanded content; and displaying a window sharing element for sharing one or more windows of a respective application operating at the computer system, including: in accordance with a determination that first criteria are met, displaying a single-window sharing element that is selectable to share a single application window of the respective application and displaying a multi-window sharing element that is selectable to share multiple application windows of the respective application.

An example computer program product includes one or more programs configured to be executed by one or more processors of a computer system that is in communication with one or more display generation components and one or more input devices, the one or more programs including instructions for: displaying, via the one or more display generation components, a set of one or more sharing elements for sharing content between the computer system and an external computer system, wherein the set of one or more sharing elements for sharing content includes a sharing request element; receiving, via the one or more input devices, a set of one or more inputs; and in response to receiving the set of one or more inputs: in accordance with a determination that the set of one or more inputs includes a selection of the sharing request element, initiating a process for requesting the external computer system to share screen content in a shared-content session with the computer system.

An example computer program product includes one or more programs configured to be executed by one or more processors of a computer system that is in communication with one or more display generation components and one or more input devices, the one or more programs including instructions for: while sharing screen content with an external computer system, receiving first data indicating a request from the external computer system to control the screen content at the computer system; receiving, via the one or more input devices, an input; and in response to receiving the input: in accordance with a determination that the input corresponds to an approval of the request from the external computer system to control the screen content at the computer system: transitioning the computer system to a first mode in which the computer system permits the external computer system to control the screen content at the computer system; and displaying, via the one or more display generation components, a visual effect associated with the screen content.

An example computer program product includes one or more programs configured to be executed by one or more processors of a computer system that is in communication with one or more display generation components and one or more input devices, the one or more programs including instructions for: while displaying, via the one or more display generation components, a representation of screen content that is being shared from an external computer system while the computer system does not have control of the screen content that is being shared from the external computer system: detecting, via the one or more input devices, an input directed to the representation of the screen content; and in response to detecting the input directed to the representation of the screen content: displaying, via the one or more display generation components, a first visual representation of the input, wherein the first visual representation of the input is displayed over at least a portion of the representation of the screen content; and initiating a process for causing a second visual representation of the input to be displayed over the screen content at the external computer system.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing the sharing of screen content, thereby increasing the effectiveness, efficiency, and user satisfaction with such devices. Such methods and interfaces may complement or replace other methods for managing the sharing of screen content.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 7 is a flow diagram illustrating a method for selecting screen content for sharing, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing the sharing of screen content. Such techniques can reduce the cognitive burden on a user who manages shared screen content, thereby enhancing productivity. Further, such techniques can reduce processor and battery power otherwise wasted on redundant user inputs.

Figure 9:
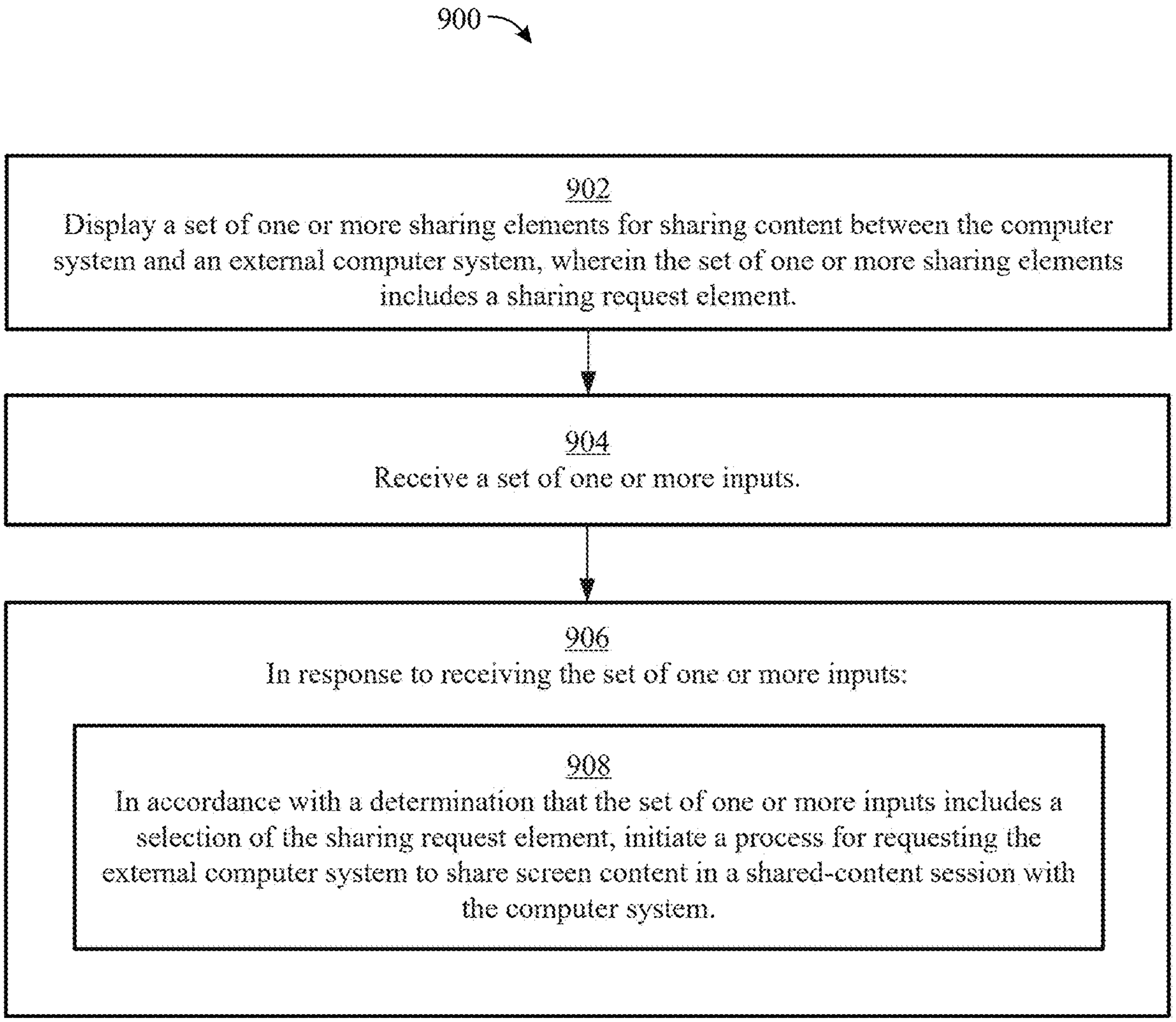
FIG. 9 is a flow diagram illustrating a method for requesting a computer system to share screen content, in accordance with some embodiments.
Figure 10A:
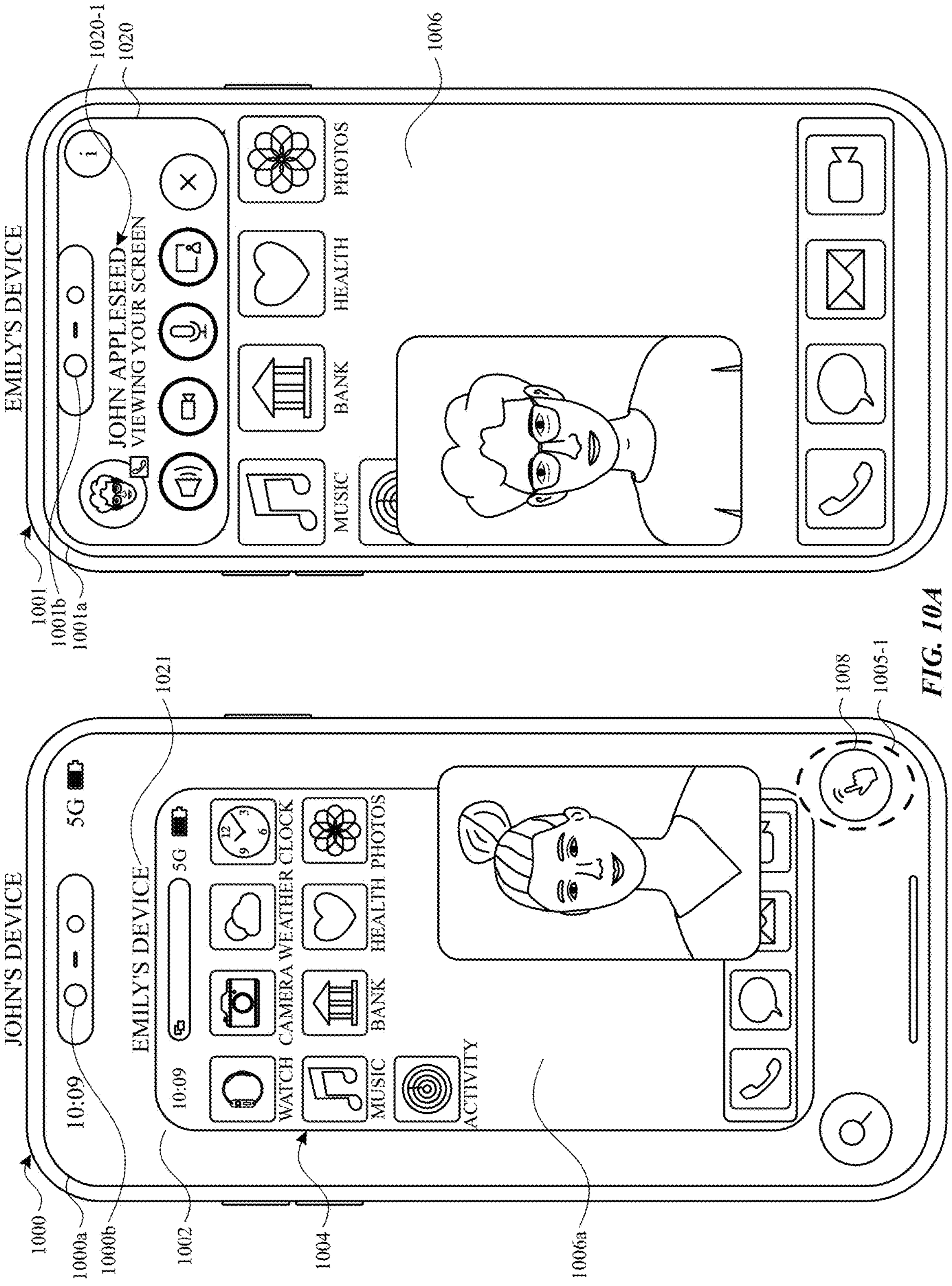
FIGS. 10A-10T illustrate exemplary user interfaces for granting a request to share control of screen content, in accordance with some embodiments.
Figure 10B:
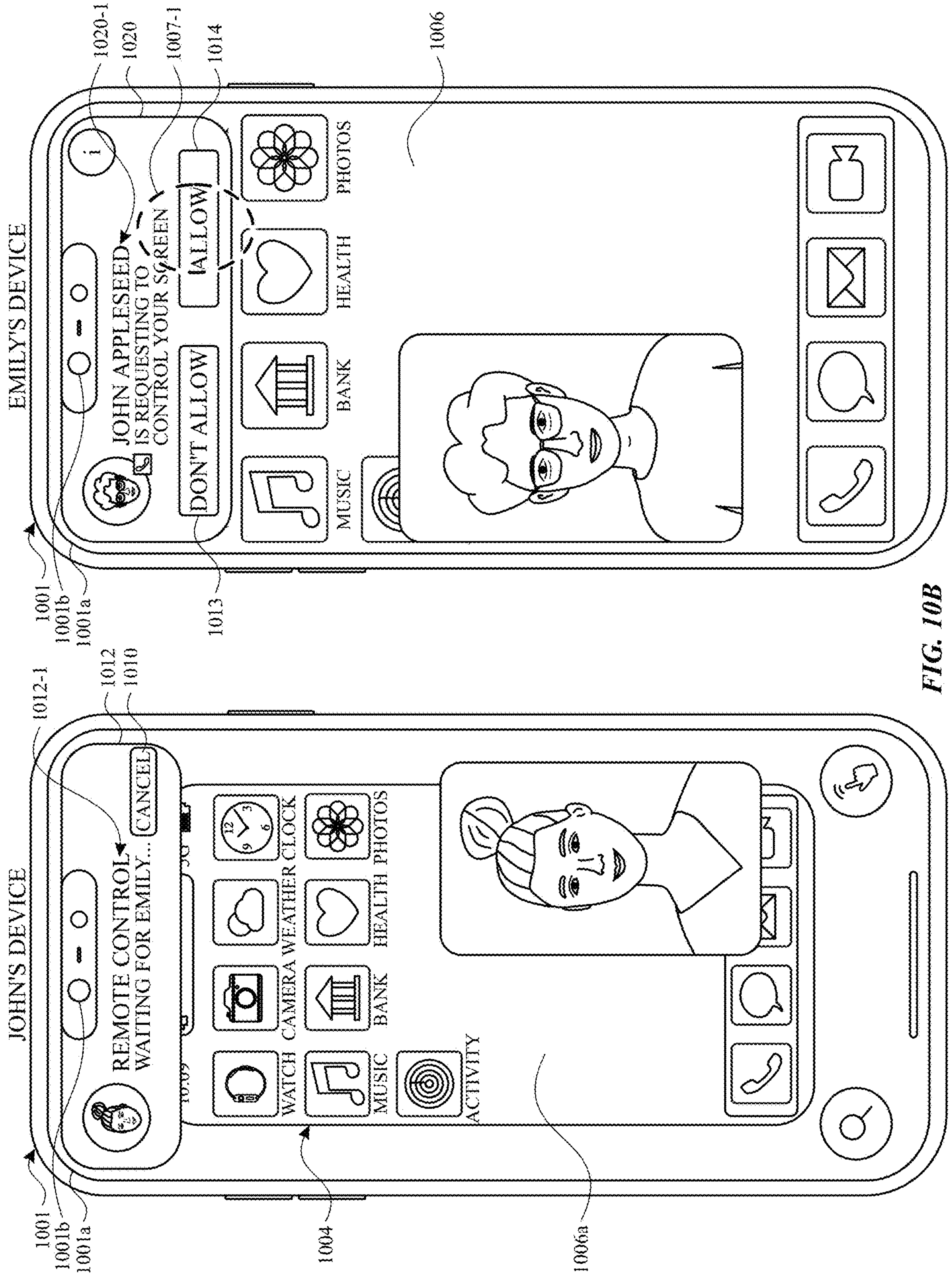
Figure 10T:
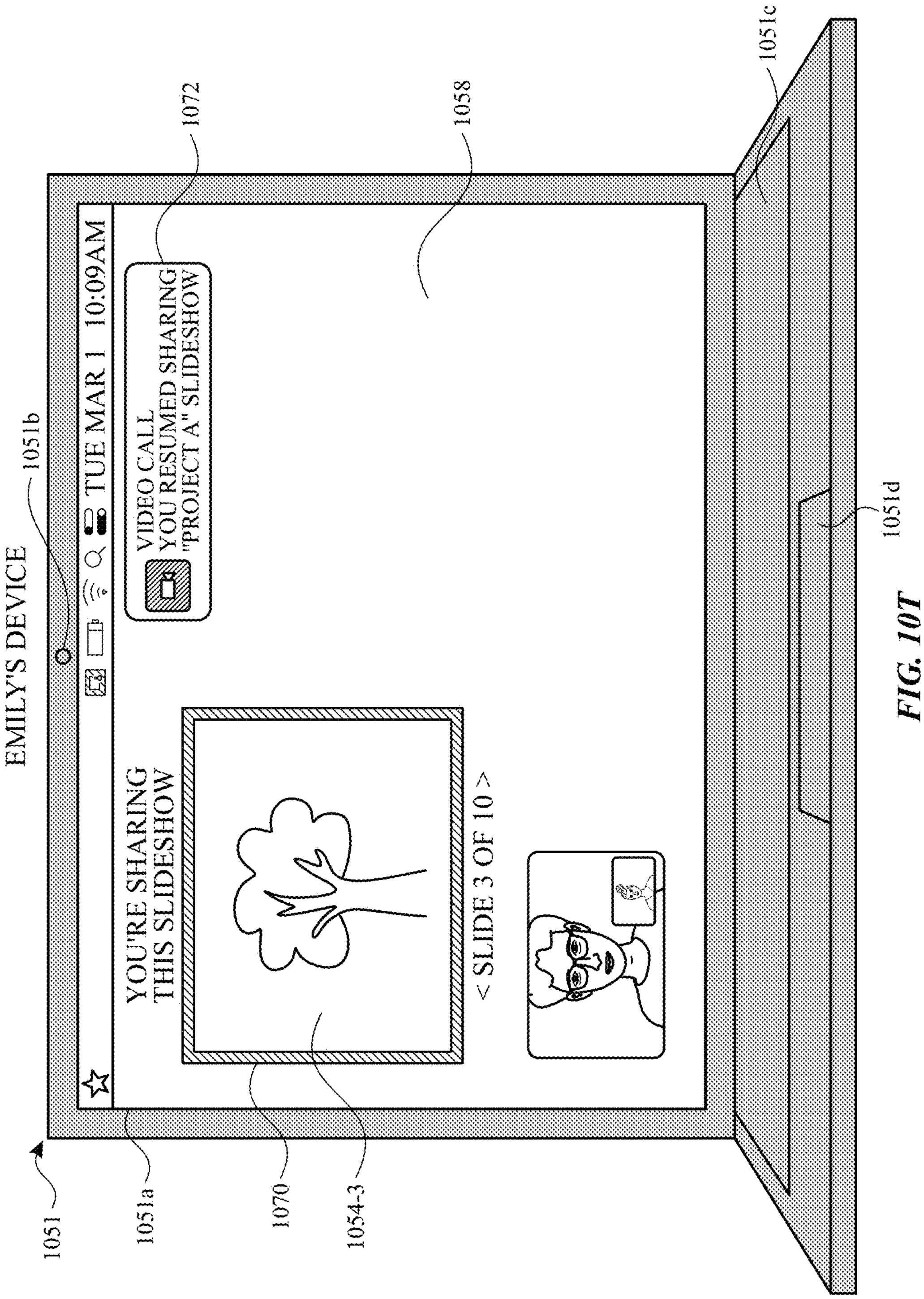
Figure 11:
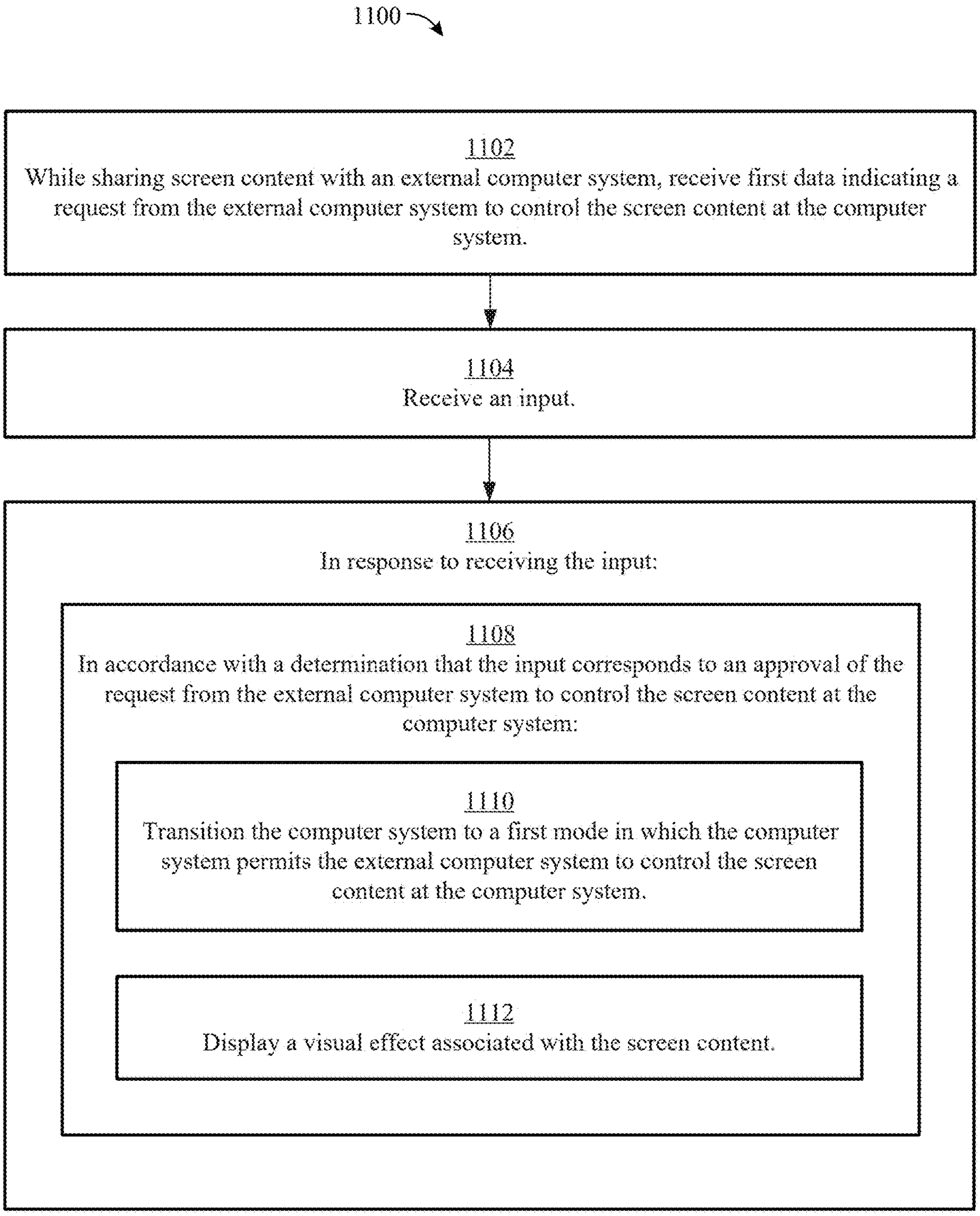
FIG. 11 is a flow diagram illustrating a method for granting a request to share control of screen content, in accordance with some embodiments.

Below, FIGS. 1A-1B, 2, 3A-3G, 4A-4B, and 5A-5C provide a description of exemplary devices for performing the techniques for managing the sharing of screen content. FIGS. 6A-6T illustrate exemplary user interfaces for selecting screen content for sharing, in accordance with some embodiments. FIG. 7 is a flow diagram illustrating a method for selecting screen content for sharing, in accordance with some embodiments. The user interfaces in FIGS. 6A-6T are used to illustrate the processes described below, including the processes in FIG. 7. FIGS. 8A-8M illustrate exemplary user interfaces for requesting a computer system to share screen content, in accordance with some embodiments. FIG. 9 is a flow diagram illustrating a method for requesting a computer system to share screen content, in accordance with some embodiments. The user interfaces in FIGS. 8A-8M are used to illustrate the processes described below, including the processes in FIG. 9. FIGS. 10A-10T illustrate exemplary user interfaces for granting a request to share control of screen content, in accordance with some embodiments. FIG. 11 is a flow diagram illustrating a method for granting a request to share control of screen content, in accordance with some embodiments. The user interfaces in FIGS. 10A-10T are used to illustrate the processes described below, including the processes in FIG. 11. FIGS. 12A-12F illustrate exemplary user interfaces for displaying representations of an input, in accordance with some embodiments. FIG. 13 is a flow diagram illustrating a method for displaying representations of an input, in accordance with some embodiments. The user interfaces in FIGS. 12A-12F are used to illustrate the processes described below, including the processes in FIG. 13.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, enhancing security and/or user privacy, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component (e.g., a display device such as a head-mounted display (HMD), a display, a projector, a touch-sensitive display, or other device or component that presents visual content to a user, for example on or in the display generation component itself or produced from the display generation component and visible elsewhere). The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
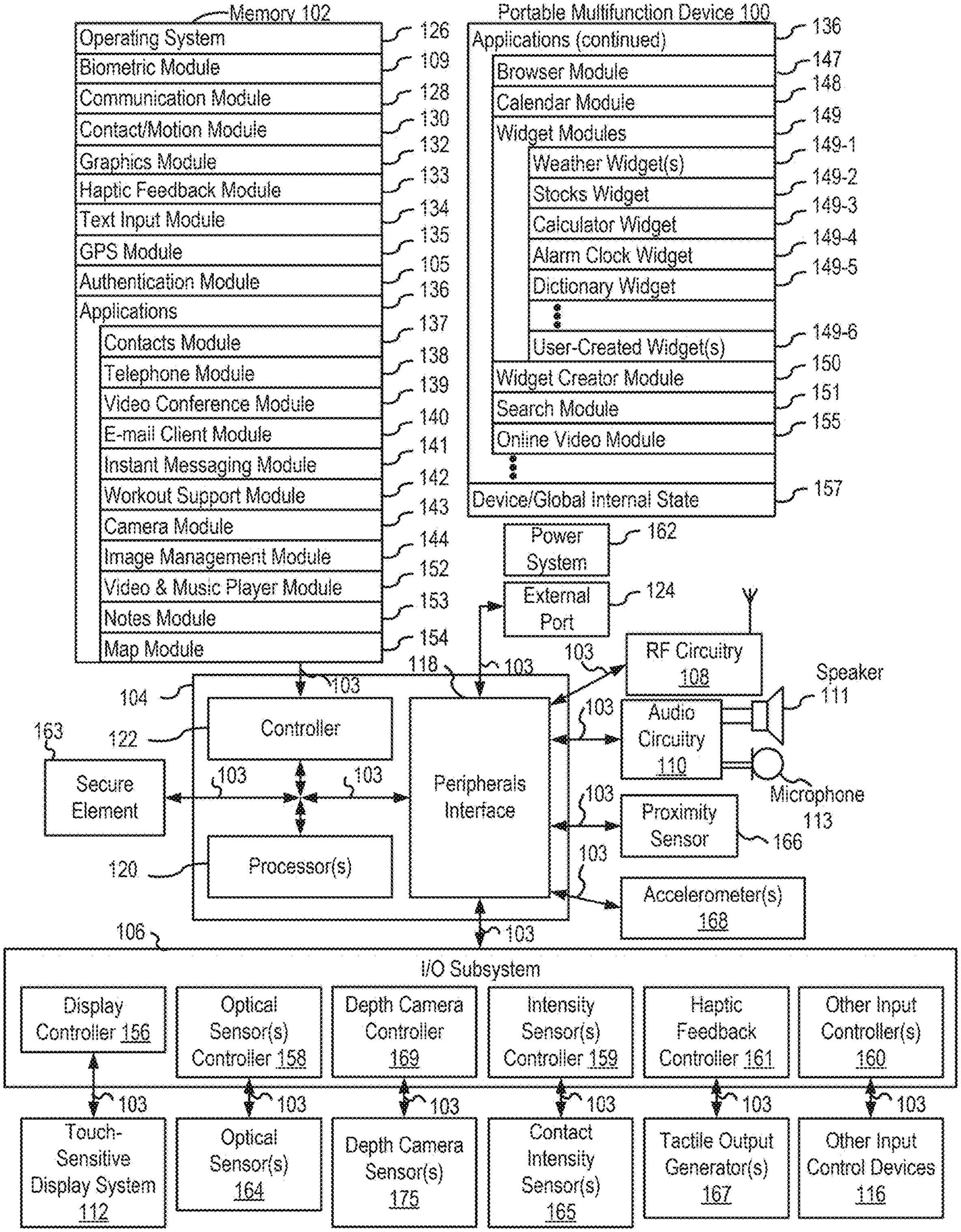
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display 112 in accordance with some embodiments. Touch-sensitive display 112 is sometimes called a "touch screen" or "touch screen display" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or an "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes secure element 163 for securely storing information. In some embodiments, secure element 163 is a hardware component (e.g., a secure microcontroller chip) configured to securely store data or an algorithm. In some embodiments, secure element 163 provides (e.g., releases) secure information (e.g., payment information (e.g., an account number and/or a transaction-specific dynamic security code), identification information (e.g., credentials of a state-approved digital identification), and/or authentication information (e.g., data generated using a cryptography engine and/or by performing asymmetric cryptography operations)). In some embodiments, secure element 163 provides (or releases) the secure information in response to device 100 receiving authorization, such as a user authentication (e.g., fingerprint authentication; passcode authentication; detecting double-press of a hardware button when device 100 is in an unlocked state, and optionally, while device 100 has been continuously on a user's wrist since device 100 was unlocked by providing authentication credentials to device 100, where the continuous presence of device 100 on the user's wrist is determined by periodically checking that the device is in contact with the user's skin). For example, device 100 detects a fingerprint at a fingerprint sensor (e.g., a fingerprint sensor integrated into a button) of device 100. Device 100 determines whether the detected fingerprint is consistent with an enrolled fingerprint. In accordance with a determination that the fingerprint is consistent with the enrolled fingerprint, secure element 163 provides (e.g., releases) the secure information. In accordance with a determination that the fingerprint is not consistent with the enrolled fingerprint, secure element 163 forgoes providing (e.g., releasing) the secure information.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three-dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3A:
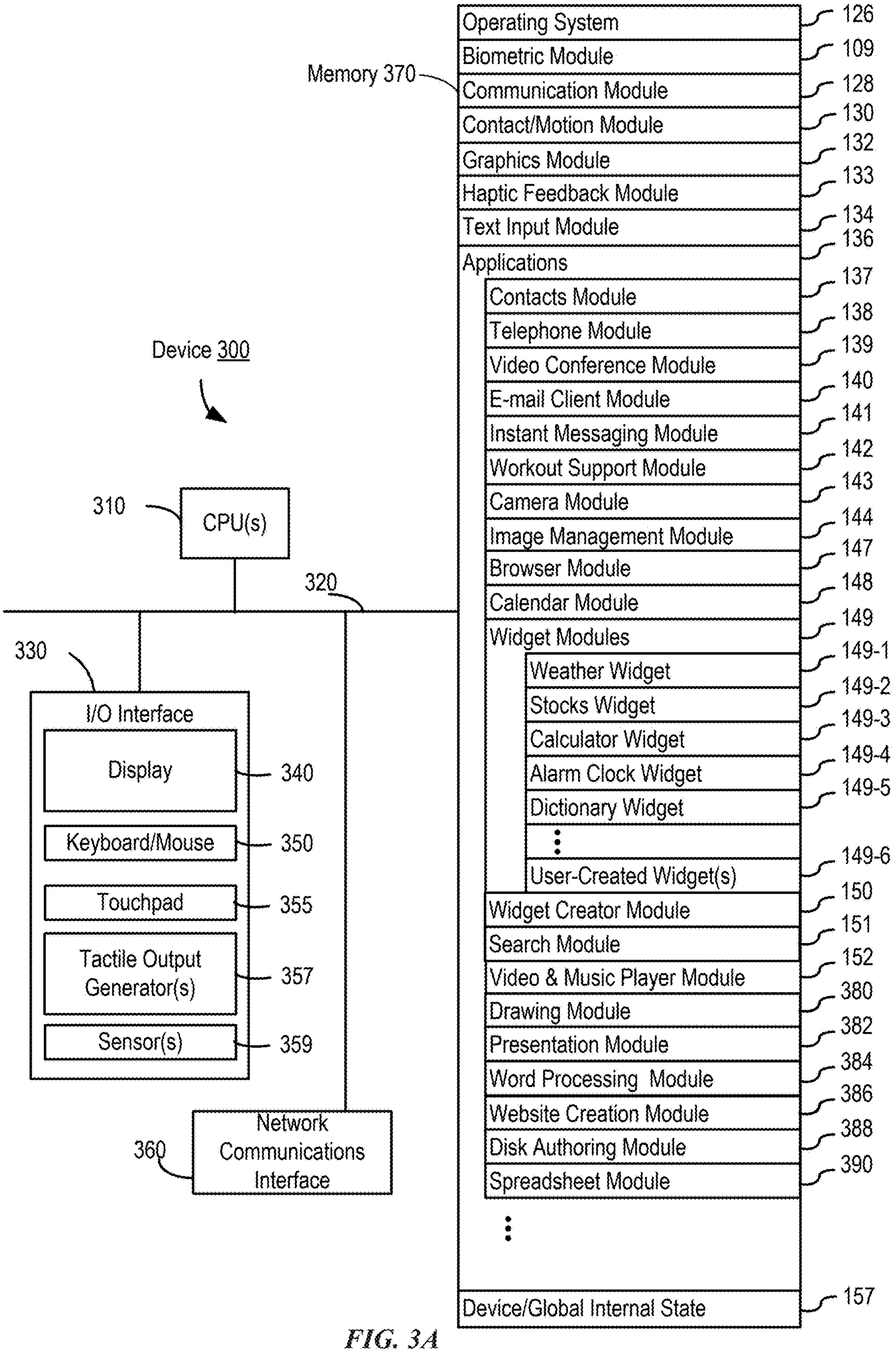
FIG. 3A is a block diagram of an exemplary multifunction device with a display and a touch-sensitive surface in accordance with some embodiments.

In some embodiments, the software components stored in memory 102 include operating system 126, biometric module 109, communication module (or set of instructions) 128, contact/motion module (or set of instructions) 130, graphics module (or set of instructions) 132, text input module (or set of instructions) 134, Global Positioning System (GPS) module (or set of instructions) 135, authentication module 105, and applications (or sets of instructions) 136. Furthermore, in some embodiments, memory 102 (FIG. 1A) or 370 (FIG. 3A) stores device/global internal state 157, as shown in FIGS. 1A and 3A. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE®, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Biometric module 109 optionally stores information about one or more enrolled biometric features (e.g., fingerprint feature information, facial recognition feature information, eye and/or iris feature information) for use to verify whether received biometric information matches the enrolled biometric features. In some embodiments, the information stored about the one or more enrolled biometric features includes data that enables the comparison between the stored information and received biometric information without including enough information to reproduce the enrolled biometric features. In some embodiments, biometric module 109 stores the information about the enrolled biometric features in association with a user account of device 100. In some embodiments, biometric module 109 compares the received biometric information to an enrolled biometric feature to determine whether the received biometric information matches the enrolled biometric feature.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Authentication module 105 determines whether a requested operation (e.g., requested by an application of applications 136) is authorized to be performed. In some embodiments, authentication module 105 receives for an operation to be perform that optionally requires authentication. Authentication module 105 determines whether the operation is authorized to be performed, such as based on a series of factors, including the lock status of device 100, the location of device 100, whether a security delay has elapsed, whether received biometric information matches enrolled biometric features, and/or other factors. Once authentication module 105 determines that the operation is authorized to be performed, authentication module 105 triggers performance of the operation.

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript® file. In some embodiments, a widget includes an XML (Extensible Markup Language) file and a JavaScript® file (e.g., Yahoo!® Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
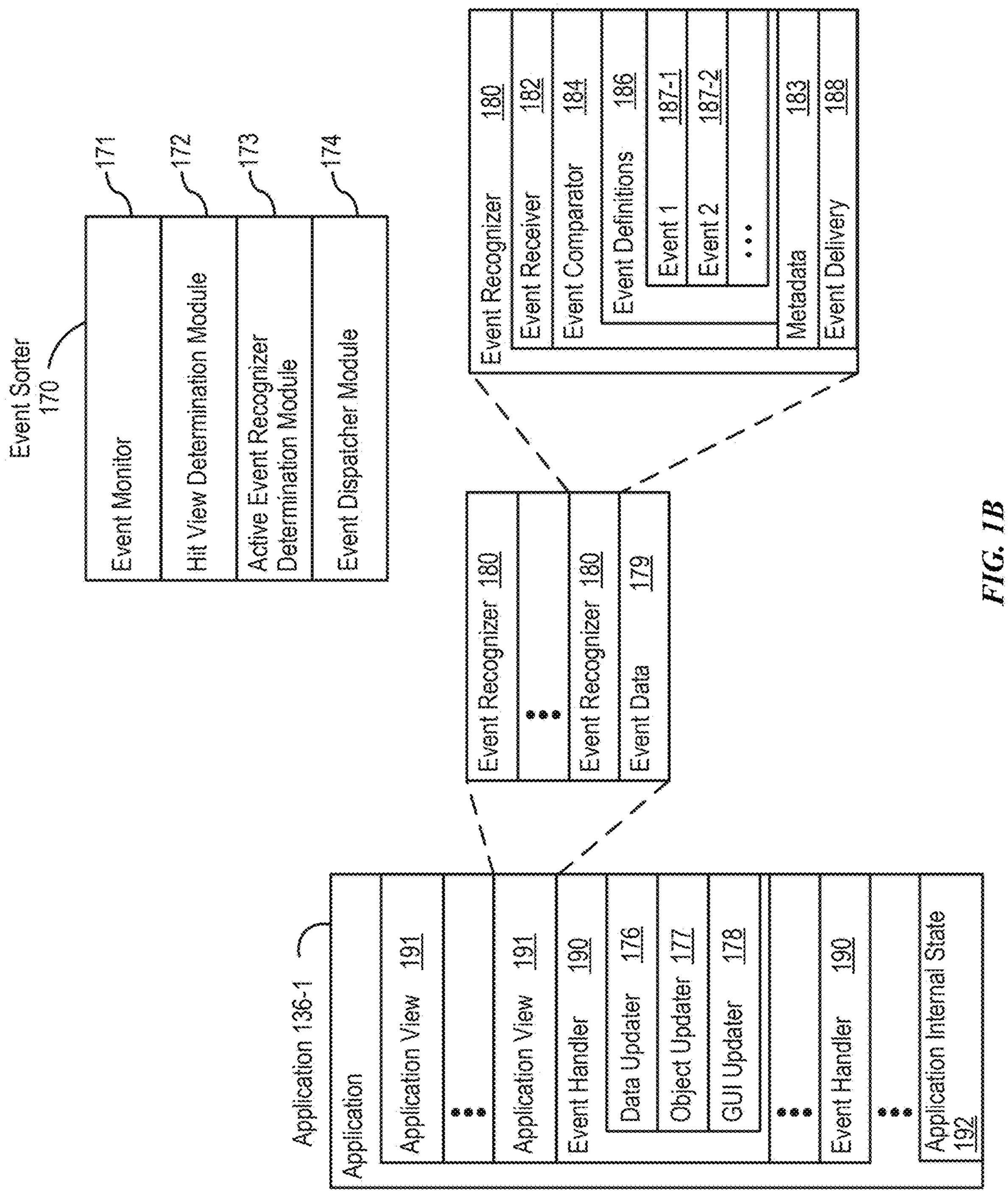
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3A) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
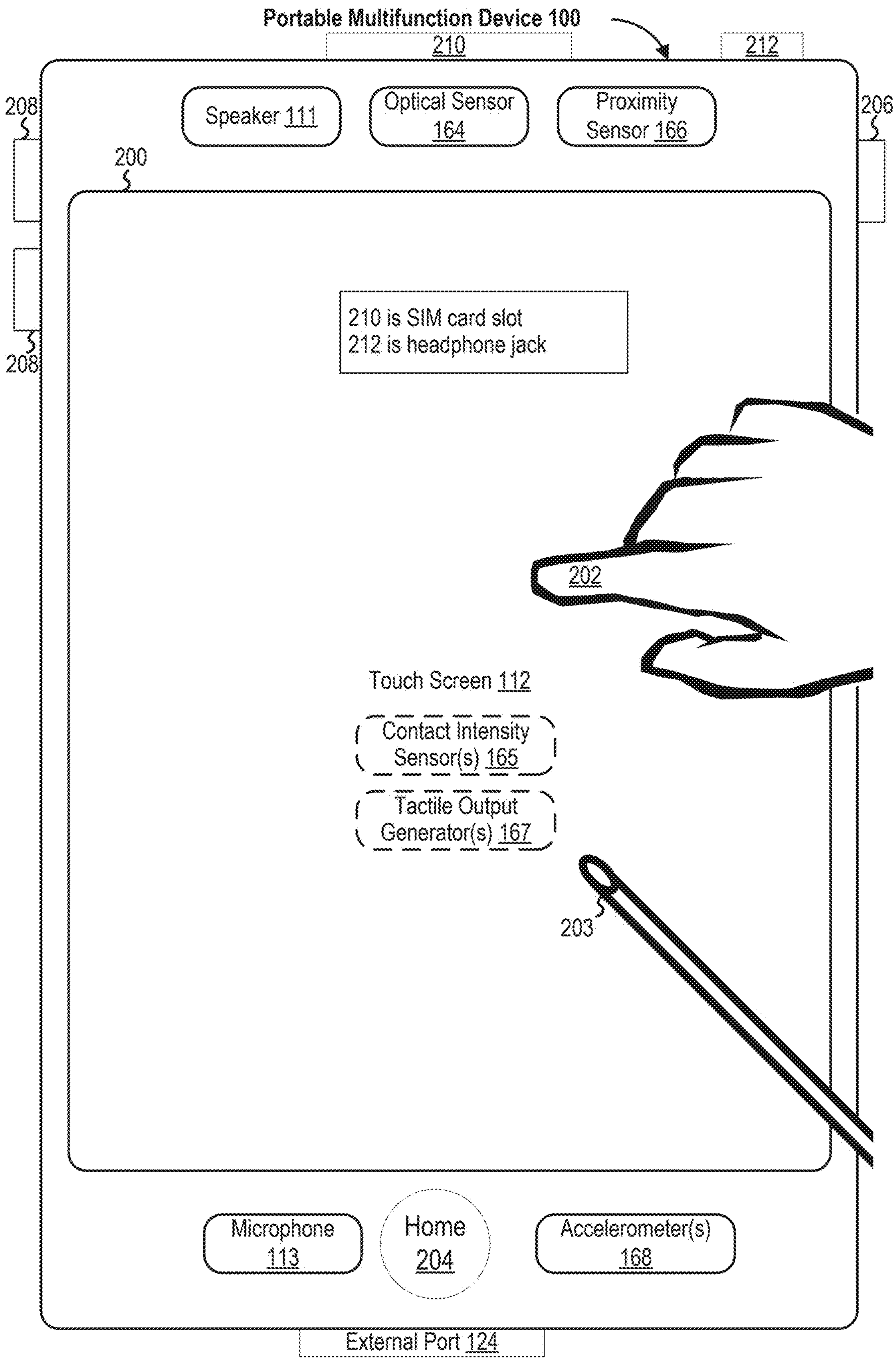
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
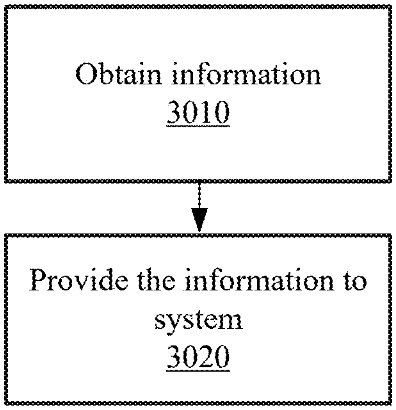
FIGS. 3B-3G illustrate the use of Application Programming Interfaces (APIs) to perform operations.
Figure 3C:
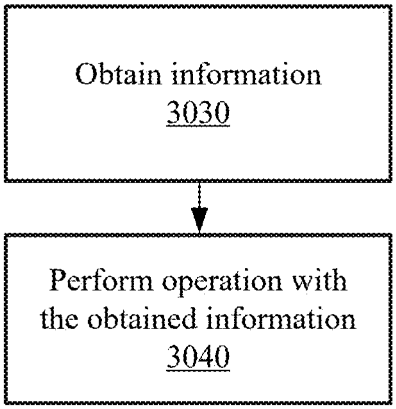

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
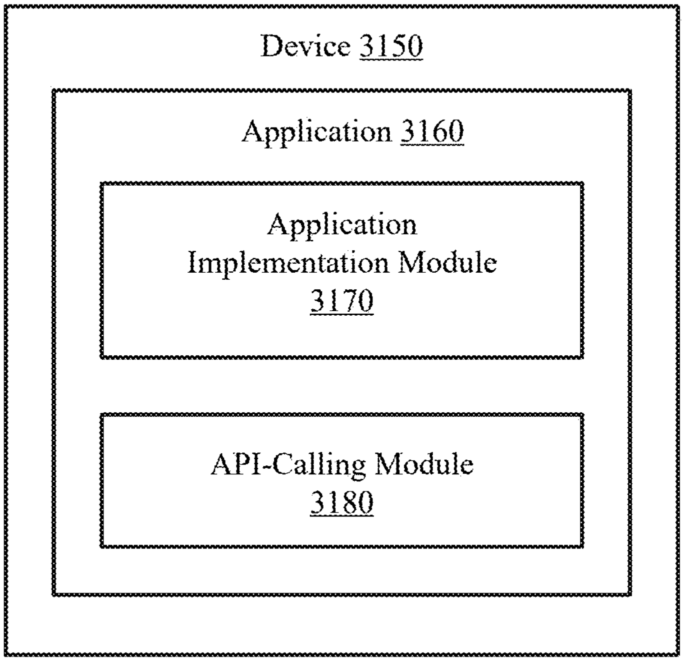
Figure 3E:
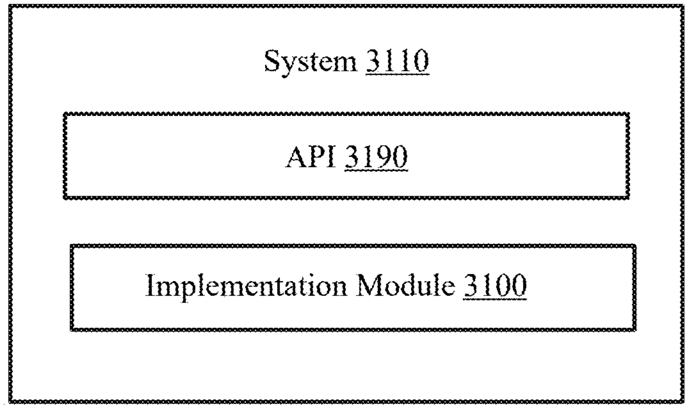
Figure 3F:
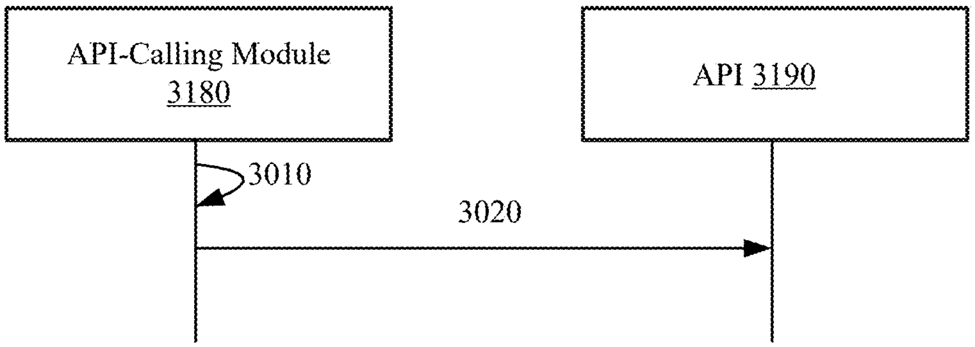

Referring to FIG. 3B and FIG. 3F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
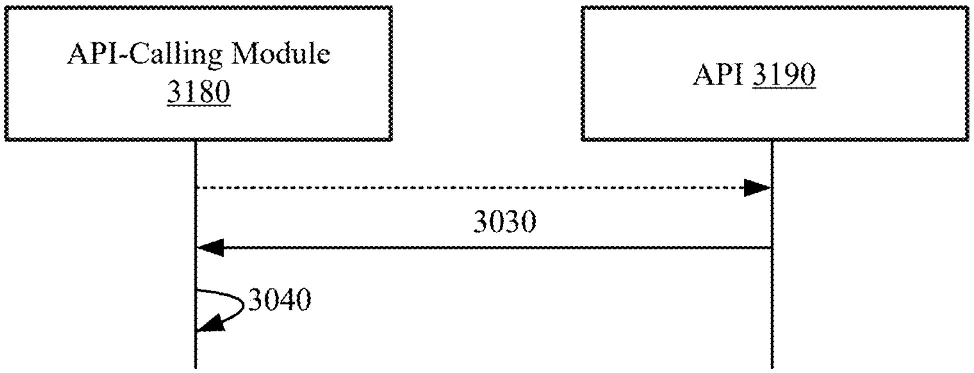

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform methods 700, 900, 1100, and/or 1300 (FIGS. 7, 9, 11 and/or 13) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed towards embodiments of user interfaces that are, optionally, implemented on, for example, portable multifunction device 100.

Figure 4A:
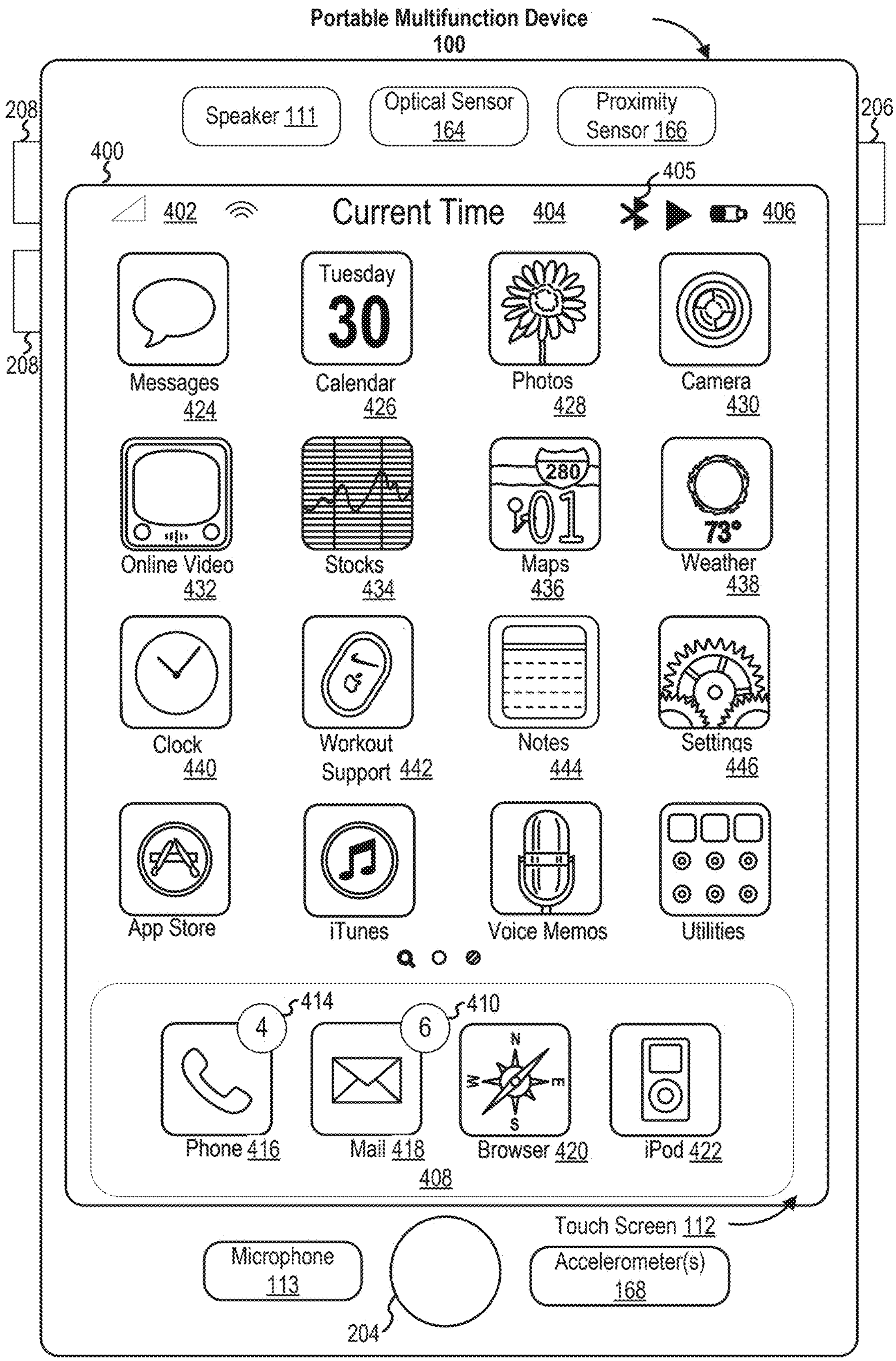
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
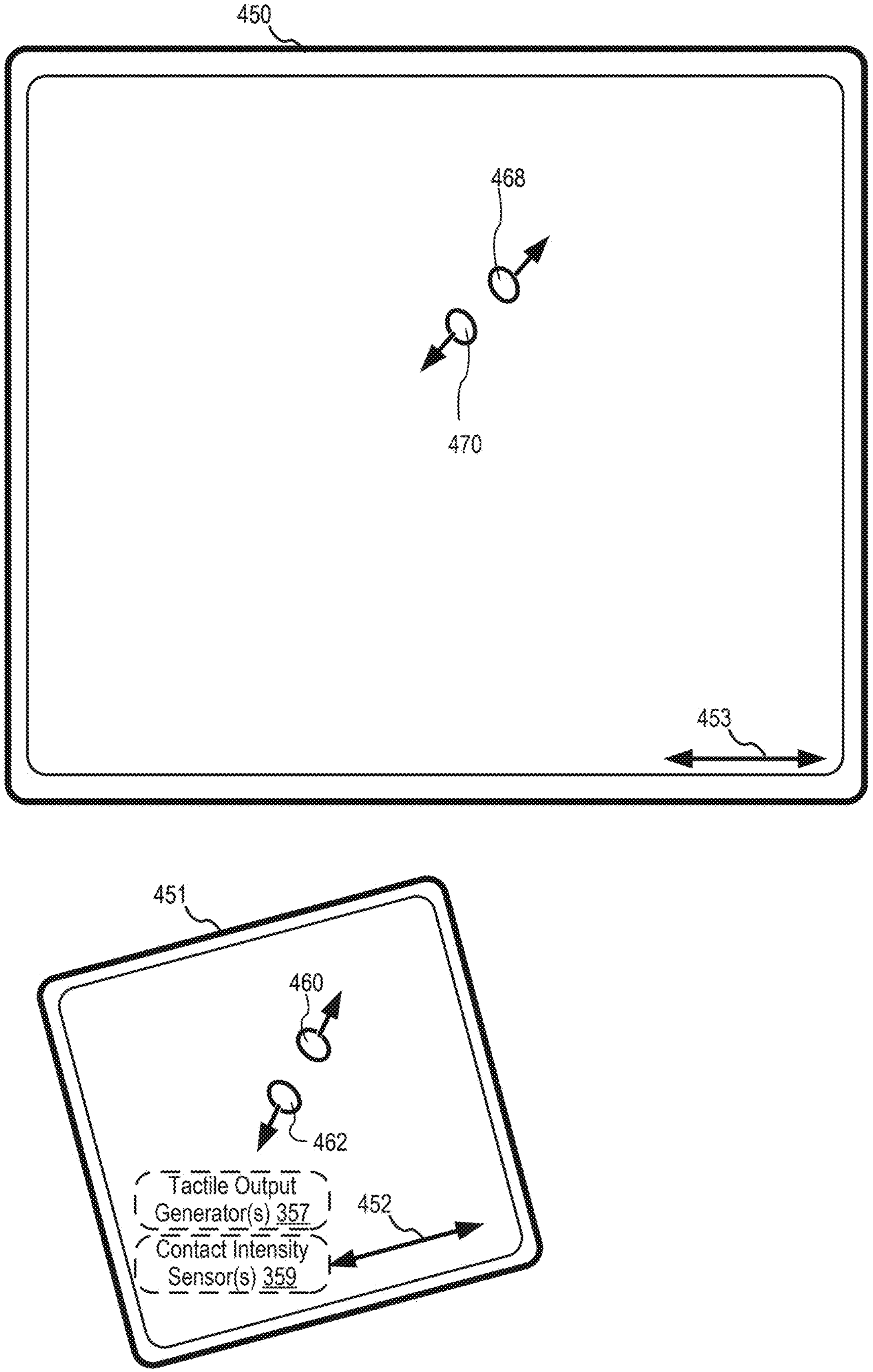
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., touch-sensitive surface 451 in FIG. 4B) are used by the device to manipulate the user interface on the display (e.g., display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
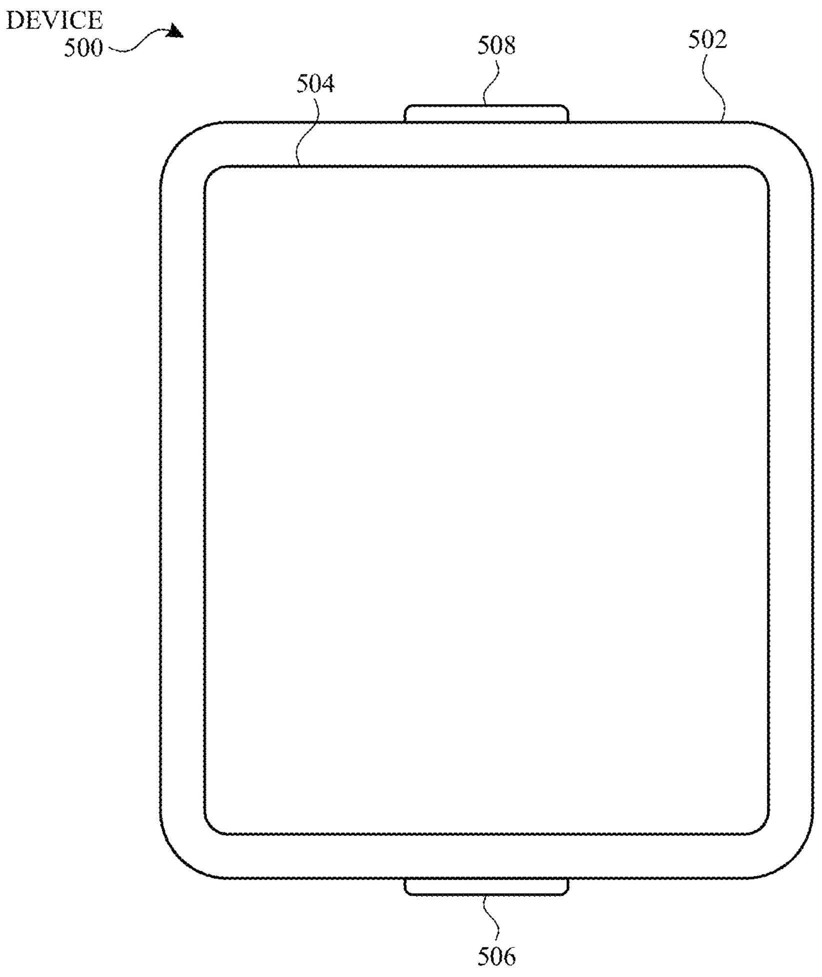
FIG. 5A illustrates a personal electronic device in accordance with some embodiments.
Figure 6A:
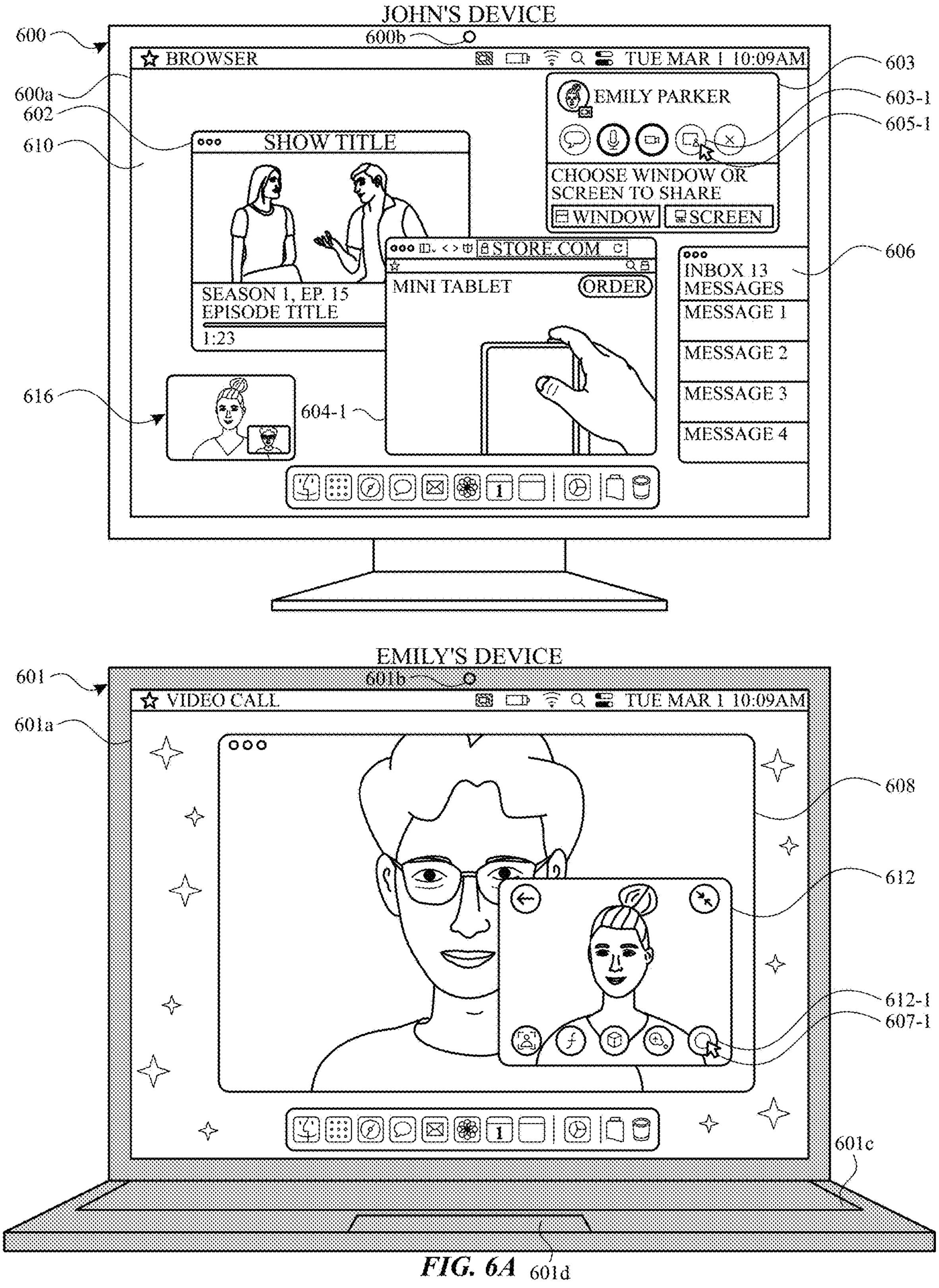
FIGS. 6A-6T illustrate exemplary user interfaces for selecting screen content for sharing, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
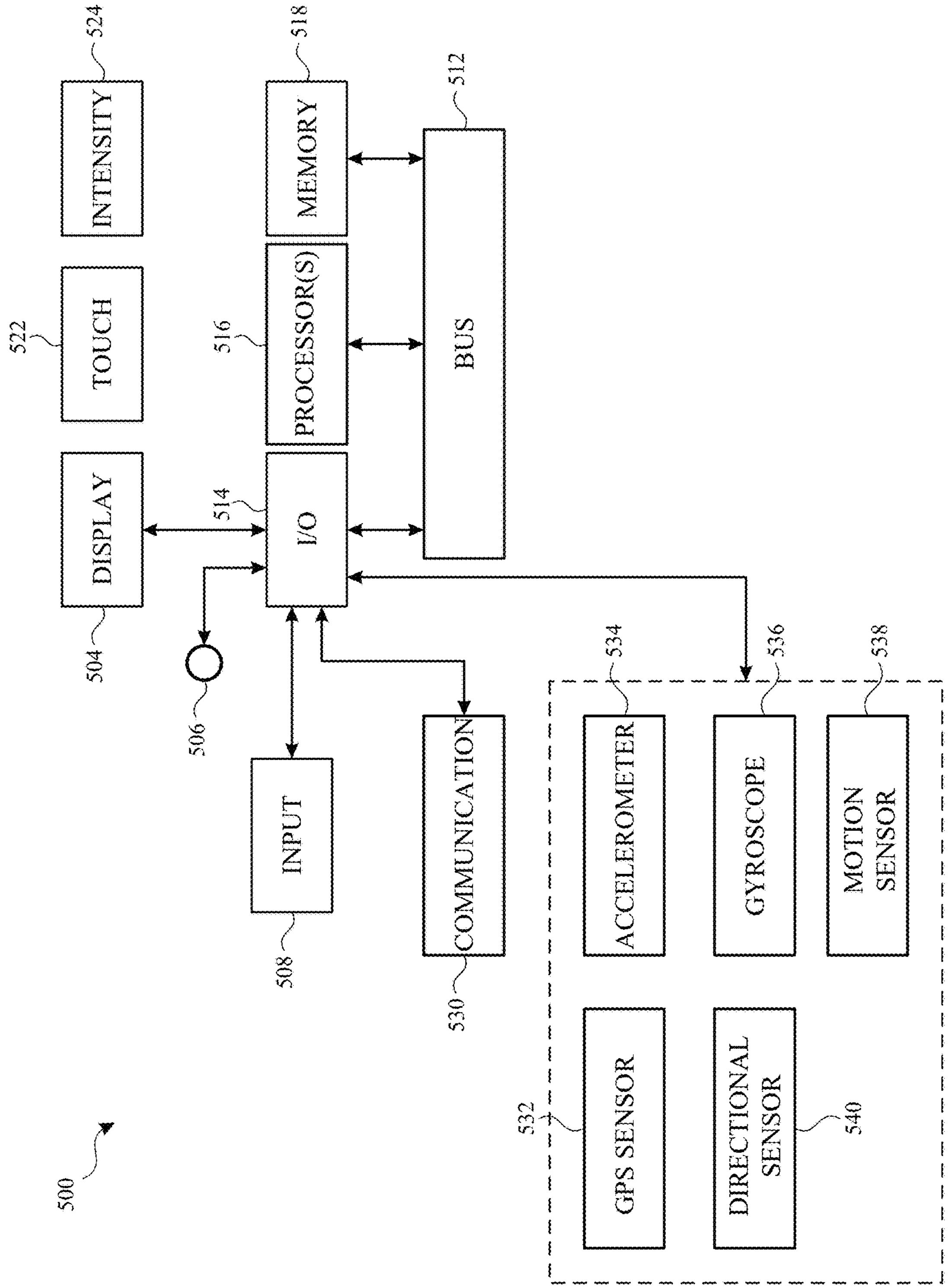
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3A. Device 500 has bus 512 that operatively couples I/O section 514 with one or more computer processors 516 and memory 518. I/O section 514 can be connected to display screen 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, and 1300 (FIGS. 7, 9, 11, and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray® technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3A, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
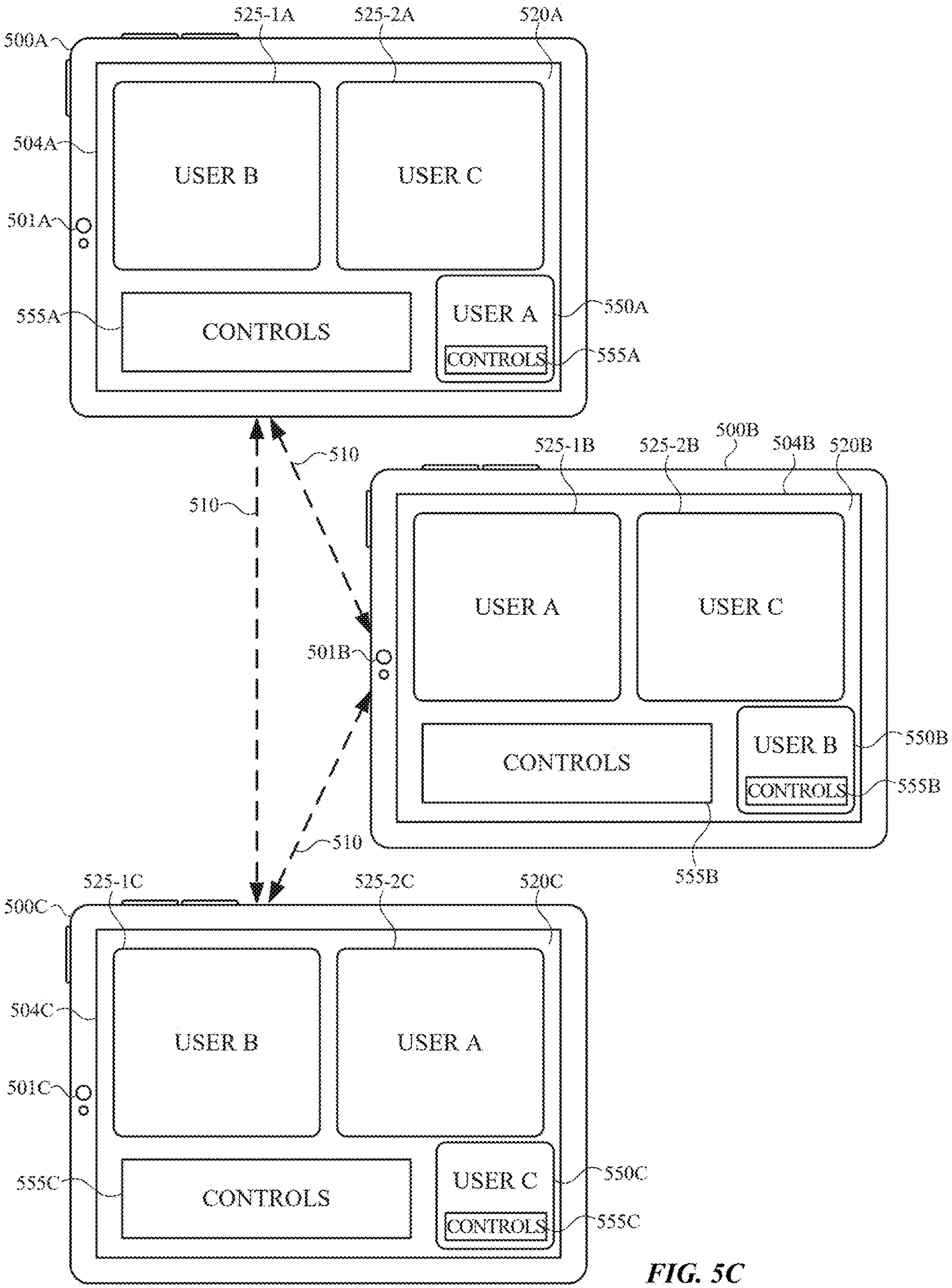
FIG. 5C illustrates an exemplary diagram of a communication session between electronic devices in accordance with some embodiments.

FIG. 5C depicts an exemplary diagram of a communication session between electronic devices 500A, 500B, and 500C. Devices 500A, 500B, and 500C are similar to electronic device 500, and each share with each other one or more data connections 510 such as an Internet connection, Wi-Fi connection, cellular connection, short-range communication connection, and/or any other such data connection or network so as to facilitate real time communication of audio and/or video data between the respective devices for a duration of time. In some embodiments, an exemplary communication session can include a shared-data session whereby data is communicated from one or more of the electronic devices to the other electronic devices to enable concurrent output of respective content at the electronic devices. In some embodiments, an exemplary communication session can include a video conference session whereby audio and/or video data is communicated between devices 500A, 500B, and 500C such that users of the respective devices can engage in real time communication using the electronic devices.

In FIG. 5C, device 500A represents an electronic device associated with User A. Device 500A is in communication (via data connections 510) with devices 500B and 500C, which are associated with User B and User C, respectively. Device 500A includes camera 501A, which is used to capture video data for the communication session, and display 504A (e.g., a touchscreen), which is used to display content associated with the communication session. Device 500A also includes other components, such as a microphone (e.g., 113) for recording audio for the communication session and a speaker (e.g., 111) for outputting audio for the communication session.

Device 500A displays, via display 504A, communication UI 520A, which is a user interface for facilitating a communication session (e.g., a video conference session) between device 500B and device 500C. Communication UI 520A includes video feed 525-1A and video feed 525-2A. Video feed 525-1A is a representation of video data captured at device 500B (e.g., using camera 501B) and communicated from device 500B to devices 500A and 500C during the communication session. Video feed 525-2A is a representation of video data captured at device 500C (e.g., using camera 501C) and communicated from device 500C to devices 500A and 500B during the communication session.

Communication UI 520A includes camera preview 550A, which is a representation of video data captured at device 500A via camera 501A. Camera preview 550A represents to User A the prospective video feed of User A that is displayed at respective devices 500B and 500C.

Communication UI 520A includes one or more controls 555A for controlling one or more aspects of the communication session. For example, controls 555A can include controls for muting audio for the communication session, changing a camera view for the communication session (e.g., changing which camera is used for capturing video for the communication session, adjusting a zoom value), terminating the communication session, applying visual effects to the camera view for the communication session, activating one or more modes associated with the communication session. In some embodiments, one or more controls 555A are optionally displayed in communication UI 520A. In some embodiments, one or more controls 555A are displayed separate from camera preview 550A. In some embodiments, one or more controls 555A are displayed overlaying at least a portion of camera preview 550A.

In FIG. 5C, device 500B represents an electronic device associated with User B, which is in communication (via data connections 510) with devices 500A and 500C. Device 500B includes camera 501B, which is used to capture video data for the communication session, and display 504B (e.g., a touchscreen), which is used to display content associated with the communication session. Device 500B also includes other components, such as a microphone (e.g., 113) for recording audio for the communication session and a speaker (e.g., 111) for outputting audio for the communication session.

Device 500B displays, via touchscreen 504B, communication UI 520B, which is similar to communication UI 520A of device 500A. Communication UI 520B includes video feed 525-1B and video feed 525-2B. Video feed 525-1B is a representation of video data captured at device 500A (e.g., using camera 501A) and communicated from device 500A to devices 500B and 500C during the communication session. Video feed 525-2B is a representation of video data captured at device 500C (e.g., using camera 501C) and communicated from device 500C to devices 500A and 500B during the communication session. Communication UI 520B also includes camera preview 550B, which is a representation of video data captured at device 500B via camera 501B, and one or more controls 555B for controlling one or more aspects of the communication session, similar to controls 555A. Camera preview 550B represents to User B the prospective video feed of User B that is displayed at respective devices 500A and 500C.

In FIG. 5C, device 500C represents an electronic device associated with User C, which is in communication (via data connections 510) with devices 500A and 500B. Device 500C includes camera 501C, which is used to capture video data for the communication session, and display 504C (e.g., a touchscreen), which is used to display content associated with the communication session. Device 500C also includes other components, such as a microphone (e.g., 113) for recording audio for the communication session and a speaker (e.g., 111) for outputting audio for the communication session.

Device 500C displays, via touchscreen 504C, communication UI 520C, which is similar to communication UI 520A of device 500A and communication UI 520B of device 500B. Communication UI 520C includes video feed 525-1C and video feed 525-2C. Video feed 525-1C is a representation of video data captured at device 500B (e.g., using camera 501B) and communicated from device 500B to devices 500A and 500C during the communication session. Video feed 525-2C is a representation of video data captured at device 500A (e.g., using camera 501A) and communicated from device 500A to devices 500B and 500C during the communication session. Communication UI 520C also includes camera preview 550C, which is a representation of video data captured at device 500C via camera 501C, and one or more controls 555C for controlling one or more aspects of the communication session, similar to controls 555A and 555B. Camera preview 550C represents to User C the prospective video feed of User C that is displayed at respective devices 500A and 500B.

While the diagram depicted in FIG. 5C represents a communication session between three electronic devices, the communication session can be established between two or more electronic devices, and the number of devices participating in the communication session can change as electronic devices join or leave the communication session. For example, if one of the electronic devices leaves the communication session, audio and video data from the device that stopped participating in the communication session is no longer represented on the participating devices. For example, if device 500B stops participating in the communication session, there is no data connection 510 between devices 500A and 500C, and no data connection 510 between devices 500C and 500B. Additionally, device 500A does not include video feed 525-1A and device 500C does not include video feed 525-1C. Similarly, if a device joins the communication session, a connection is established between the joining device and the existing devices, and the video and audio data is shared among all devices such that each device is capable of outputting data communicated from the other devices.

The embodiment depicted in FIG. 5C represents a diagram of a communication session between multiple electronic devices, including the example communication sessions depicted in FIGS. 6A-6T, 8A-8M, 10A-10T, and 12A-12F. In some embodiments, the communication sessions depicted in FIGS. 6A-6T, 8A-8M, 10A-10T, and 12A-12F include two or more electronic devices, even if other electronic devices participating in the communication session are not depicted in the figures.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Attention is now directed towards embodiments of user interfaces ("UI") and associated processes that are implemented on an electronic device, such as portable multifunction device 100, device 300, or device 500.

The present disclosure describes embodiments in which respective content can be concurrently output at devices participating in a shared-content session (e.g., a screen-sharing session during which screen content is shared with participating devices). In some embodiments, the respective content is screen content. For example, the content of a host device's displayed screen(s) is shared with one or more participants of the screen-sharing session such that the participant(s) can view, at their respective device or devices, the screen content of the host device (the sharing device, or, the device whose screen content is being shared), including changes to the displayed screen content, in real time. In some embodiments, the screen content is referred to as remote content because the content originates from a computer system (e.g., the host computer) that is remote from the computer system that is displaying the screen content. In some embodiments, each device of the participants outputs the content at a size and quality that is appropriate for the respective device and connectivity (e.g., data connection conditions such as data transmission and/or processing speeds) of the device, thereby providing a more customized, yet synchronized, playback or viewing experience at each of the participants' devices. In some embodiments, an application (or "app") is available (e.g., downloaded and/or installed) at a respective device to enable the device to participate in screen-sharing sessions. In some embodiments, devices participating in a shared-content session (e.g., a screen-sharing session) can communicate with each other to provide data that is relevant for the shared-content session. For example, a host device may transmit information to a participant device to indicate one or more inputs received at the host device. Similarly, a participant device may transmit information to the host device to indicate one or more inputs received at the participant device.

In some embodiments, the screen content is displayed in a window that is optionally overlaid on another user interface (e.g., a home screen and/or an application user interface) and can be moved and/or resized separately from the user interface over which it is displayed. In some embodiments, a window can be moved, resized, minimized, docked, undocked, and/or expanded in response to various inputs and/or gestures.

Unless specified otherwise, as discussed herein, the term "share," "sharing," or "shared" is used generally to refer to a situation in which content (e.g., screen content) is, or is capable of, being output (e.g., viewed and/or played) concurrently at devices that are participating in a screen-sharing session. In some embodiments, screen content is shared with participants of the screen-sharing session by transmitting, from a host device to participant devices of the screen-sharing session, image data representing content that is displayed on one or more display screens of the host device. In some embodiments, control rights can be granted to a participant device of the screen-sharing session, even if the participant device is not providing the screen content. For example, a participant device that is displaying the shared content can be given access to control the content at the host device such that the displayed screen content is modified in response to inputs provided using the participant device.

In some embodiments, a real-time communication session can be active for a screen-sharing session through one or more audio and/or video channels that, when active (e.g., open and/or available), enable real-time communication for one or more participants of the screen-sharing session. For example, when one or more audio channels are active during the screen-sharing session, a real-time communication session is considered to be enabled and participants of the screen-sharing session can speak to one another in real time (e.g., via an audio call and/or live audio feed) while the screen-sharing session is ongoing and, optionally, while content (e.g., screen content) is being shared via the screen-sharing session. As another example, when one or more video channels are active (e.g., via a video conferencing application that is local to respective devices), a real-time communication session is considered to be enabled and participants of the screen-sharing session can participate in a live video communication (e.g., video chat, video call, video conference, and/or live video feed) while the screen-sharing session is ongoing and, optionally, while content (e.g., screen content) is being shared via the screen-sharing session. In some embodiments, a real-time communication session can be audio only (e.g., an audio channel is active without a video channel), video only (e.g., a video channel is active without an audio channel), or both audio and video enabled (e.g., the audio channel and video channel are both active). In some embodiments, the audio or video channel can be active with the respective audio feed or video feed temporarily disabled or muted (e.g., the microphone providing the audio feed is muted and/or the camera providing the video feed is disabled). In some embodiments, a real-time communication session can be active (e.g., real-time communication is enabled) separate from a screen-sharing session (e.g., without an active screen-sharing session). In some embodiments, a screen-sharing session can be active separate from a real-time communication session (e.g., without real-time communication enabled). Various aspects of these embodiments, and further details of a screen-sharing session and real-time communication session, are discussed below with reference to the figures.

FIGS. 6A-6T illustrate exemplary user interfaces for selecting screen content for sharing, in accordance with some embodiments. The user interfaces in these figures are used to illustrate the processes described below, including the processes in FIG. 7.

FIGS. 6A-6T illustrate exemplary systems or devices for participating in screen-sharing sessions, in accordance with some embodiments. Specifically, these systems or devices include John's device 600 and Emily's device 601, which are shown concurrently in some figures to illustrate concurrent states of the respective devices, including the user interfaces and inputs at the respective devices. In the embodiments provided herein, John's device can be described as performing a set of functions (e.g., functions associated with the screen-sharing session or other functions described herein), and Emily's device can be described as performing a different set of functions (e.g., a different set of functions associated with the screen-sharing session or other functions described herein). These descriptions are not intended to limit the functions performed by the respective devices, but rather, are provided to illustrate various aspects of the embodiments described herein. Thus, unless specified otherwise, the functions that are described as being performed using John's device are similarly capable of being performed using Emily's device. Likewise, the functions that are described as being performed by Emily's device are similarly capable of being performed by John's device, unless specified otherwise.

FIG. 6A depicts John's device 600, which is a computer system that, in some embodiments, is comprised of display screen 600*a*, camera 600*b*, and other hardware such as processors, memory, and other components for operating John's device 600 such as a keyboard and mouse for providing input. It should be appreciated that John's device can be a different type of computer system such as a smartphone, tablet computer, smartwatch, laptop computer, or a head-mounted device. Furthermore, John's device can include other display components such as a projector or touchscreen display, and/or can include additional display components such as an additional display monitor (e.g., external display 660). John's device can also include other input components such as a touchscreen for detecting touch inputs, a microphone for detecting audio input, cameras and/or other sensors for detecting finger gestures, hand gestures, eye gaze, and/or other inputs. In some embodiments, John's device 600 includes one or more elements of devices 100, 300, and/or 500.

FIG. 6A also depicts Emily's device 601, which is a computer system that, in some embodiments, is comprised of display screen 601*a*, camera 601*b*, and other hardware such as processors, memory, and other components for operating Emily's device 601. In the embodiment depicted in FIG. 6A, Emily's device 601 is a laptop computer that includes keyboard 601*c* and trackpad 601*d* for providing input at Emily's device 601. It should be appreciated that Emily's device can be a different type of computer system such as a smartphone, tablet computer, smartwatch, desktop computer, or a head-mounted device. Furthermore, Emily's device can include other display components such as a projector or touchscreen display, and/or can include additional display components such as an additional display monitor. Emily's device can also include other input components such as a touchscreen for detecting touch inputs, a microphone for detecting audio input, cameras and/or other sensors for detecting finger gestures, hand gestures, eye gaze, and/or other inputs. In some embodiments, Emily's device 601 includes one or more elements of devices 100, 300, and/or 500.

As shown in FIG. 6A, John's device 600 and Emily's device 601 are participating in a shared-content session in which a video call is enabled between the two devices and content has not yet been selected for sharing between the two devices. John's device 600 displays, via display 600*a*, video feed 616 which includes the video feed provided by Emily's device 601 and a self-view video feed showing the video feed from John's device 600. John's device 600 displays desktop 610 including windows for various applications operating at John's device 600, namely, media window 602 corresponding to a media application, browser window 604-1 corresponding to a web browser application, and email window 606 corresponding to an email application. John's device 600 also displays menu 603, which is a menu for controlling aspects of the shared-content session. Menu 603 can be used to, for example, initiate or end the video call, disable or enable the audio and/or video feeds for the video call, send a text message to participants of the video call, initiate the sharing of content for the shared-content session, and terminate the shared-content session. In FIG. 6A, John's device 600 selects screen share option 603-1 via input 605-1 (e.g., a mouse input) to initiate the sharing of screen content with Emily's device 601, as described in greater detail below.

Figure 6B:
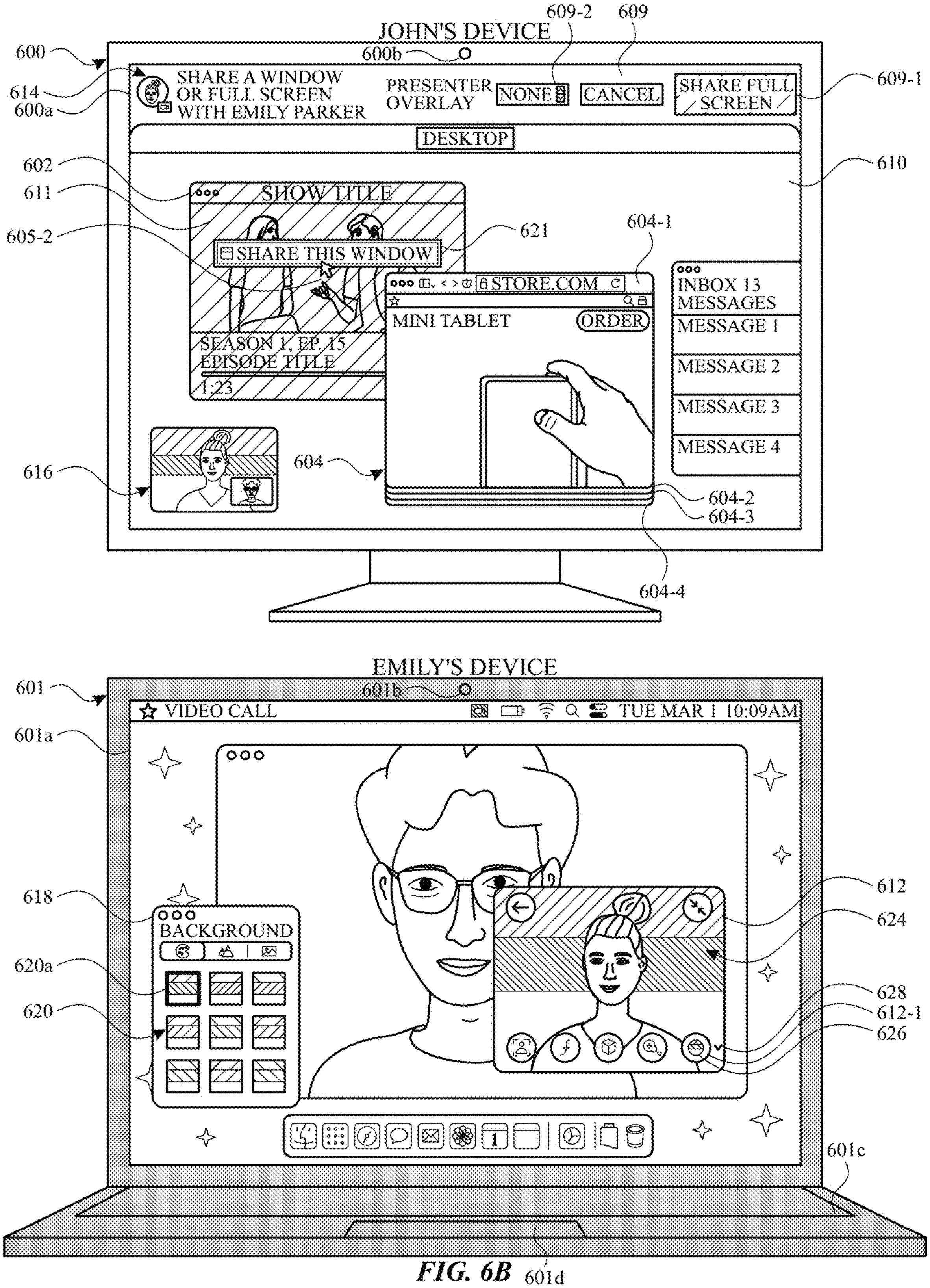
Figure 6C:
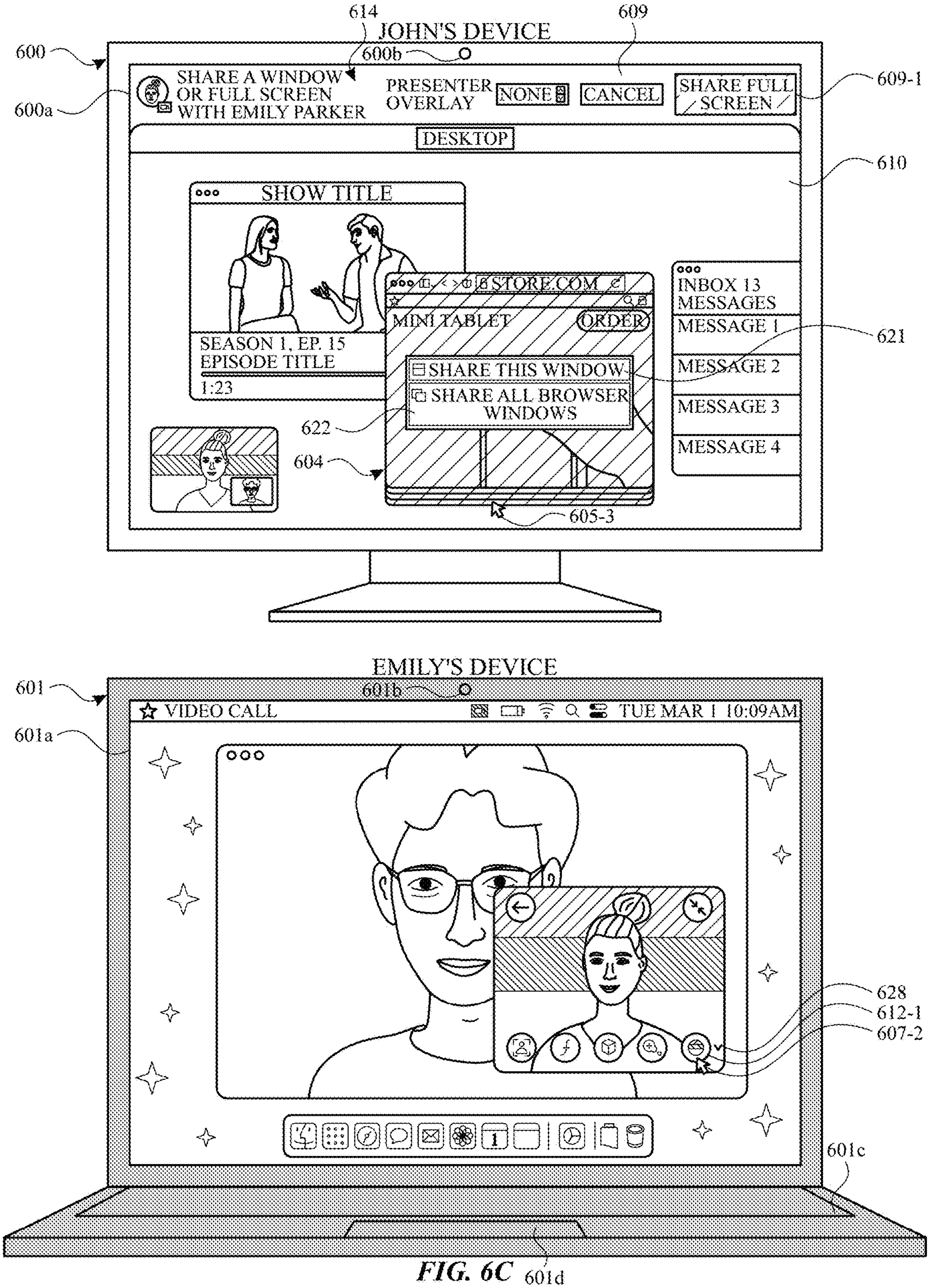
Figure 6D:
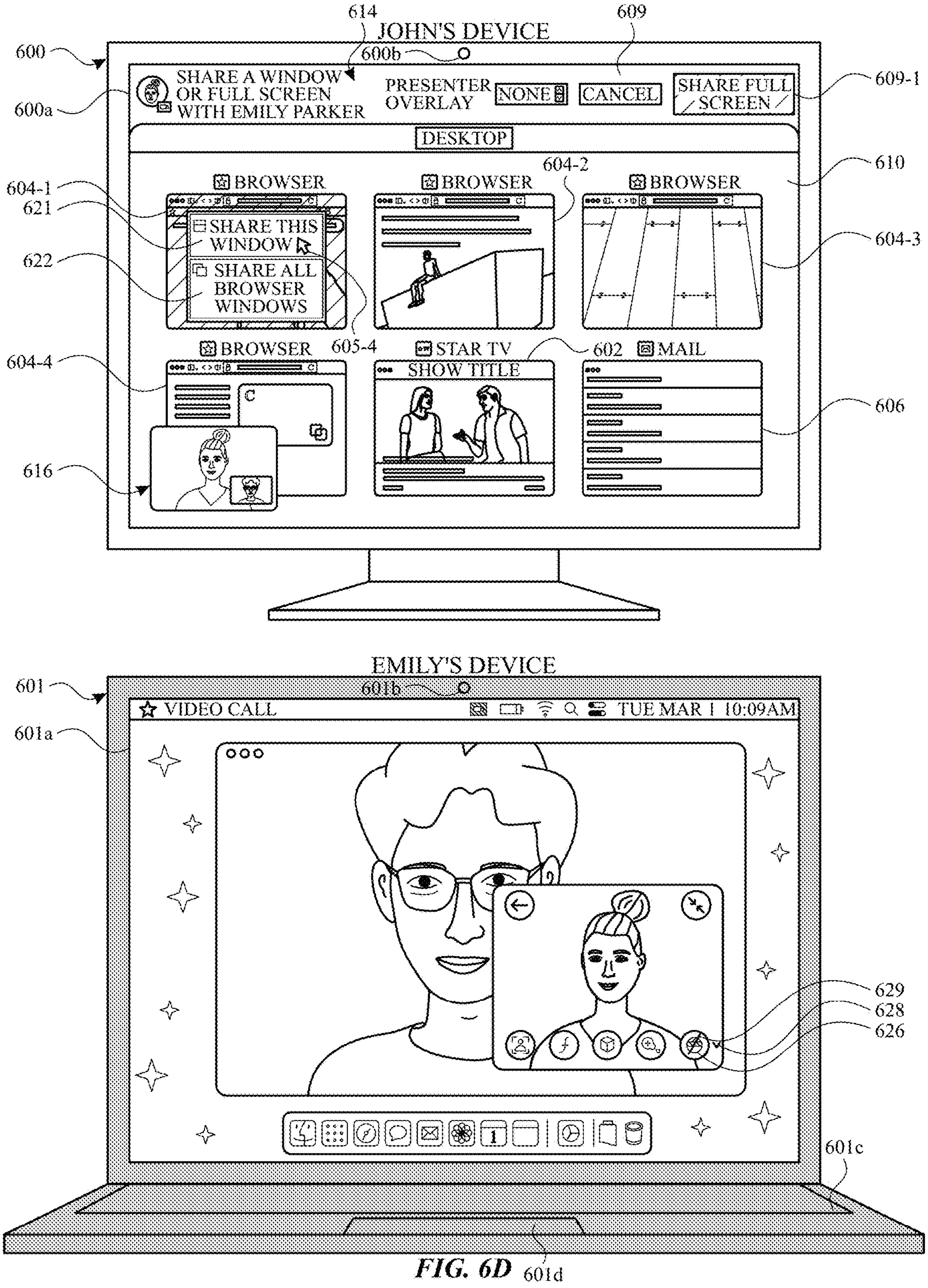

Emily's device 601 displays, via display 601*a*, video call interface 608, which includes a video feed from John's device and self-view 612, which is a representation of the video feed from Emily's device 601. Self-view 612 includes controls that can be selected to enable different visual effects for the video call. For example, in FIG. 6A, Emily's device 601 selects background control 612-1, via input 607-1 (e.g., a click or tap input using trackpad 601*d*) to enable a background effect for Emily's video feed. As shown in FIG. 6B, in response to input 607-1 Emily's device 601 applies background effect 624 to the background of Emily's video feed as shown in self-view 612 on Emily's device 601 and in video feed 616 on John's device 600. Additionally, Emily's device 601 updates the appearance of background control 612-1 to include preview 626, which provides a preview of the background effect that is applied to Emily's video feed, and displays background menu 618, which provides a menu of background options 620 that can be selected to apply a corresponding background effect to Emily's video feed. As shown in FIG. 6B, background option 620*a* is shown in a selected state, as indicated by the bolded border around background option 620*a*. In some embodiments, background option 620*a* is a default background option that is enabled in response to an initial selection of background control 612-1. In some embodiments, background option 620*a* is selected in response to an input on background option 620*a*. In some embodiments, background options 620 represent different background effects having various color gradients. The different background options provided in background menu 618 can be selected to apply a different background to the video feed of Emily's device 601. In some embodiments, background menu 618 includes tabs that can be selected to display other categories of background options such as photographs, wallpapers, and images. In some embodiments, Emily's device 601 displays background menu 618 (and enables a background effect) in response to an initial selection of background control 612-1 and, in response to subsequent selection of background control 612-1, enables or disables the most recently selected background effect without causing display of background menu 618. For example, referring to FIGS. 6C and 6D, Emily's device 601 detects input 607-2 in FIG. 6C selecting background control 612-1 while background effect 624 is enabled and, in response, disables the background effect as shown in FIG. 6D. In some embodiments, when the background effect is disabled, Emily's device 601 displays glyph 629 over preview 626 to indicate that the background (e.g., the background effect represented by preview 626) is disabled. Background control 612-1 can then be selected again to re-enable background effect 624 without displaying background menu 618. In some embodiments, after the initial selection of background control 612-1, Emily's device 601 displays glyph 628, which can be selected to display or hide background menu 618.

Referring again to FIG. 6B, in response to detecting selection of screen share option 603-1 (e.g., via input 605-1), John's device 600 initiates a process for sharing screen content with Emily's device 601 by displaying screen content selection interface 614. Screen content selection interface 614 provides John with options for selecting screen content to be shared with Emily's device 601. In the embodiment depicted in FIG. 6B, John's device 600 shrinks the displayed size of desktop 610 (and, optionally, the windows and other content displayed on desktop 610) and displays share menu 609, which is displayed as part of the screen content selection interface 614. Share menu 609 includes full-screen element 609-1, which is selectable to cause John's device 600 to share desktop 610 (and all content displayed on desktop 610) with Emily's device 601. In some embodiments, positioning a cursor over (e.g., hovering or moving over) full-screen element 609-1 causes John's device 600 to highlight desktop 610 and all content displayed on desktop 610 to indicate that the highlighted content will be shared with Emily's device 601 if full-screen element 609-1 is selected. Share menu 609 also includes a prompt instructing John to select the full screen or a window (or multiple windows) for sharing with Emily, a cancel option for canceling the screen sharing process, and presenter overlay menu 609-2, which can be selected to select an appearance or arrangement of John's video feed as displayed with shared screen content.

In some embodiments, if a respective application has multiple open application windows, the open windows are displayed in a stacked arrangement when displaying screen content selection interface 614. In this way, open application windows can be grouped together for each respective application. For example, in the embodiment depicted in FIG. 6B, multiple browser windows are open on John's device 600. Therefore, when displaying screen content selection interface 614, John's device 600 arranges the open windows in a stacked configuration. In FIG. 6B, the browser stack 604 includes browser windows 604-1, 604-2, 604-3, and 604-4 displayed in a stacked arrangement with browser window 604-1 displayed on top of the stack. In some embodiments, when the number of applications having open application windows is below a threshold number, all open application windows are moved into view on desktop 610 when screen content selection interface 614 is displayed so that the user can see all available windows that can be selected for sharing (e.g., as depicted in FIG. 6B). In some embodiments, when the number of applications having open application windows is above the threshold number, additional controls are displayed for accessing the open windows so that they can be selected for sharing (as discussed in greater detail with respect to FIGS. 6H-6J).

When screen content selection interface 614 is displayed, open application windows can be selected for sharing with Emily's device 601. In some embodiments, when a respective application has only one open application window, John's device 600 displays the application window with single-window element 621, which is selectable to share the single application window. For example, in FIG. 6B, John's device 600 detects input 605-2, which is a hover input caused by positioning John's cursor over media window 602. In response to the hover input, John's device 600 displays single-window element 621 with media window 602 and, in some embodiments, highlights media window 602 (as represented by hatching 611), indicating that media window 602 can be shared with Emily's device 601. In response to detecting a selection of single-window element 621 in FIG. 6B, John's device shares media window 602 with Emily's device 601 as screen content in the shared-content session (not shown). Accordingly, Emily's device 601 would then display a representation of media window 602, which is the window shared from John's device 600.

In some embodiments, when a respective application has more than one open application window, John's device 600 displays an option for sharing a single window from the application and an option for sharing multiple windows from the application. For example, in FIG. 6C, John's device 600 displays single-window element 621 and multi-window element 622. Single-window element 621 is selectable to share a single window of a respective application (e.g., the browser application in FIG. 6C), and multi-window element 622 which is selectable to share all or, in some embodiments, a subset of the open application windows for a respective application as screen content in the shared-content session. In the embodiment in FIG. 6C, when John's cursor is positioned over browser stack 604, John's device 600 displays single-window element 621 and multi-window element 622 over browser stack 604 and, in some embodiments, highlights browser stack 604 to indicate that all of the windows in the stack can be shared as screen content in the shared-content session. In FIG. 6C, single-window element 621 can be selected to share browser window 604-1 or, in some embodiments, to share a different, single window of the stack of browser windows. Multi-window element 622 is selectable to share all or, in some embodiments, a subset of the browser windows as screen content in the shared-content session. In response to detecting input 605-3, which is a selection of the browser stack 604, John's device 600 expands the stack of browser windows and arranges the open application windows in a matrix configuration, as shown in FIG. 6D. In some embodiments, the matrix configuration is the default arrangement of open application windows when screen content selection interface 614 is displayed. In some embodiments, the open application windows are displayed in the matrix configuration when at least a threshold number of application windows are displayed in a non-overlapping arrangement (e.g., an unstacked arrangement).

Figure 6E:
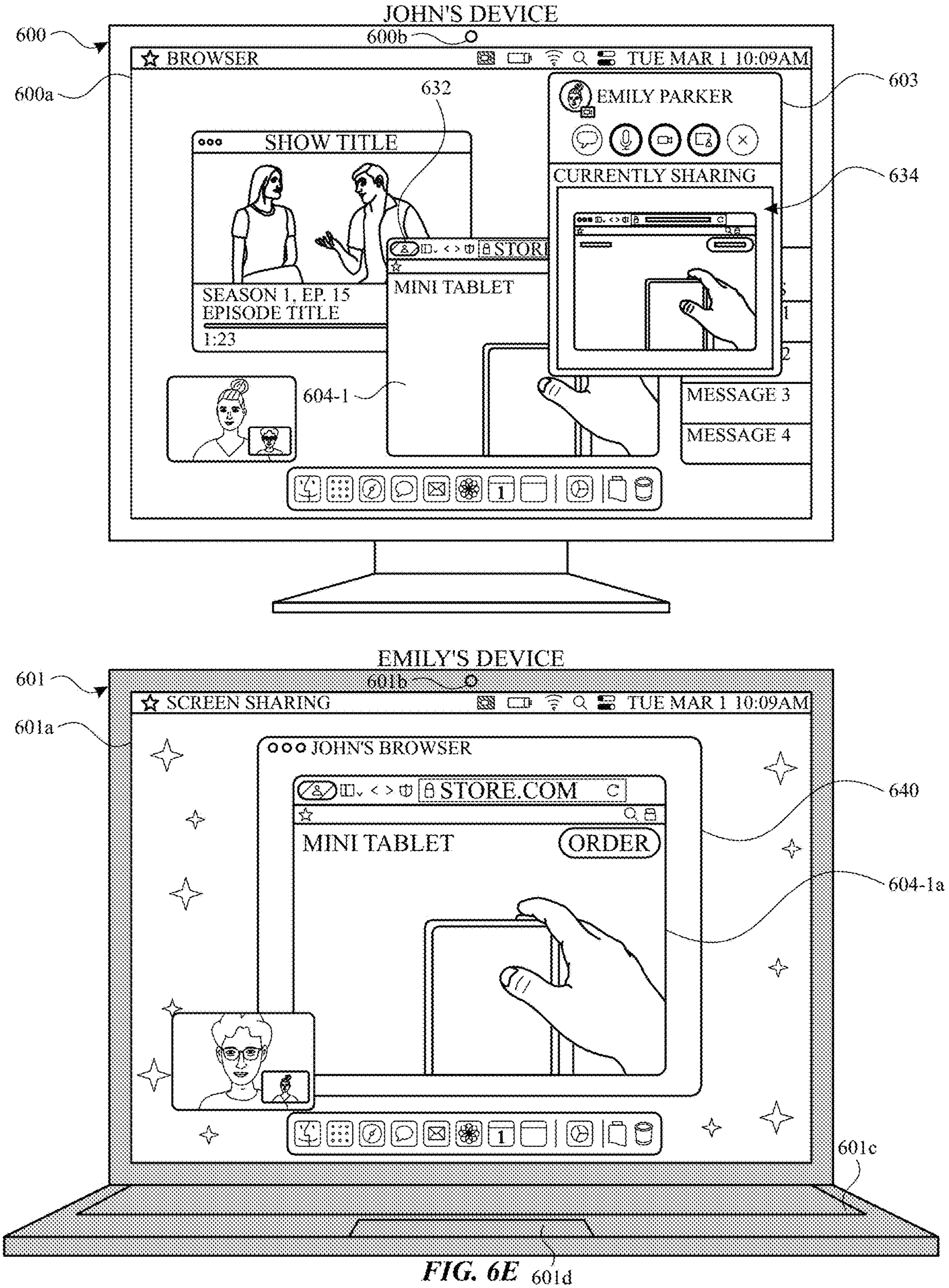

FIGS. 6D and 6E depict example user interfaces for an embodiment in which John's device 600 shares a single application window with Emily's device 601 in a shared-content session. As shown in FIG. 6D, John's cursor is positioned over browser window 604-1 and John's device 600 displays single-window element 621 and multi-window element 622 over browser window 604-1. When John's cursor is positioned over single-window element 621, browser window 604-1 is highlighted to indicate that selection of single-window element 621 will cause John's device 600 to share browser window 604-1 in the shared-content session. In response to detecting input 605-4 selecting single-window element 621, John's device 600 begins sharing browser window 604-1 with Emily's device 601 in the shared-content session, as shown in FIG. 6E.

In FIG. 6E, John's device 600 is sharing browser window 604-1 with Emily's device 601 in the shared-content session. John's device 600 displays browser window 604-1 with sharing indicator 632 indicating that the browser window is being shared in the shared-content session. John's device 600 also displays menu 603 having a preview of the content being shared with Emily's device. Specifically, John's device 600 displays preview 634, which is a representation of the browser window 604-1 that is being shared with Emily. When John's device 600 begins sharing content in the shared-content session, Emily's device 601 displays shared content window 640, which includes a representation of the content being shared in the shared-content session. In FIG. 6E, Emily's device 601 displays a representation 604-1*a* of John's shared browser window 604-1 in shared content window 640. The content displayed in shared content window 640 is a real-time representation of the shared content. For example, as John interacts with browser window 604-1, the interaction with the window is displayed at John's device 600 and is also displayed in representation 604-1*a* in shared content window 640 so that Emily can view John's interaction with the shared content.

Figure 6F:
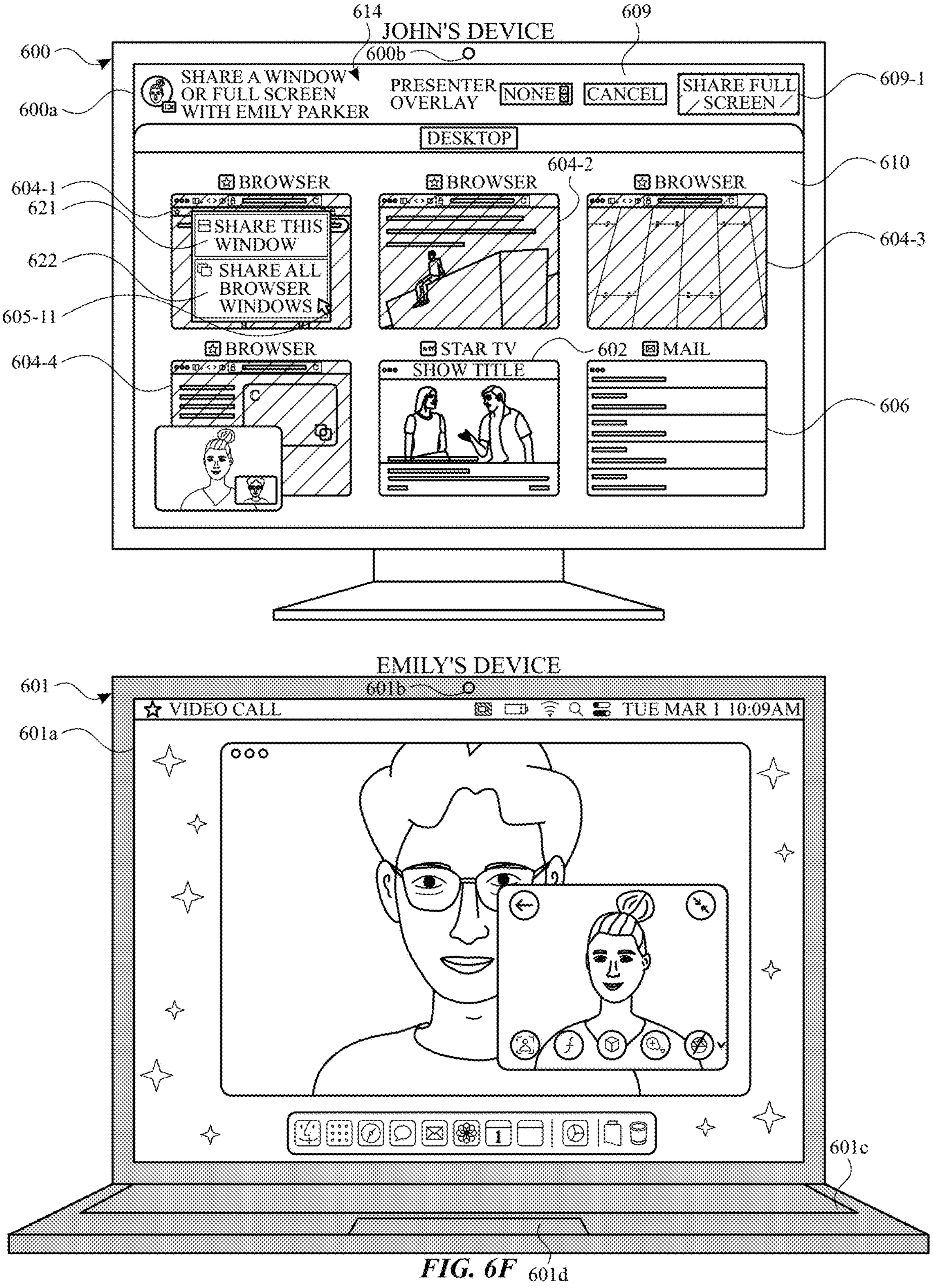
Figure 6G:
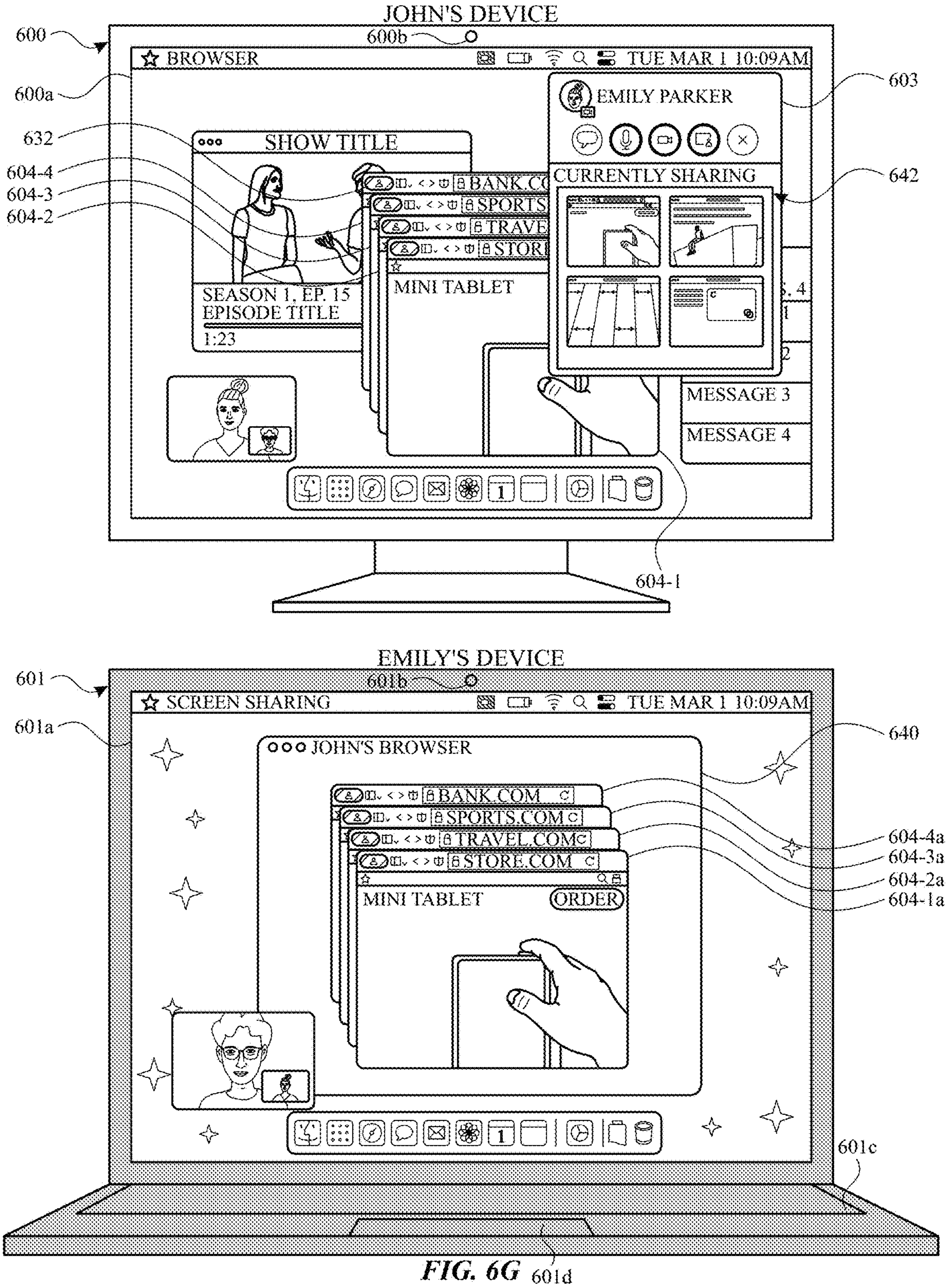

FIGS. 6F and 6G depict example user interfaces for an embodiment in which John's device 600 shares multiple application windows with Emily's device 601 in a shared-content session. As shown in FIG. 6F, John's cursor is positioned over browser multi-window element 622. Accordingly, John's device 600 highlights browser windows 604-1, 604-2, 604-3, and 604-4 to indicate that selection of multi-window element 622 will cause John's device 600 to share browser windows 604-1, 604-2, 604-3, and 604-4 in the shared-content session. In response to detecting input 605-11 selecting multi-window element 622, John's device 600 begins sharing browser windows 604-1, 604-2, 604-3, and 604-4 with Emily's device 601 in the shared-content session, as shown in FIG. 6G. In some embodiments, multi-window element 622 can be used to share a subset of application windows (e.g., two or more windows). For example, in response to detecting selection of multi-window element 622, John's device 600 prompts John to select a subset of the browser windows 604-1 to 604-4 for sharing.

In FIG. 6G, John's device 600 is sharing browser windows 604-1, 604-2, 604-3, and 604-4 with Emily's device 601 in the shared-content session. John's device 600 displays browser windows 604-1, 604-2, 604-3, and 604-4 with sharing indicators 632 indicating that each respective browser window is being shared in the shared-content session. John's device 600 also displays menu 603 with preview 642 indicating that browser windows 604-1, 604-2, 604-3, and 604-4 are being shared with Emily. In FIG. 6G, Emily's device 601 displays representations 604-1*a*, 604-2*a*, 604-3*a*, and 604-4*a* of John's shared browser windows 604-1, 604-2, 604-3, and 604-4 in shared content window 640. As John interacts with any of browser windows 604-1, 604-2, 604-3, and 604-4, the interactions with the windows are displayed at John's device 600 and in representations 604-1*a*, 604-2*a*, 604-3*a*, and 604-4*a* in shared content window 640 so that Emily can view John's interaction with the shared content.

Figure 6H:
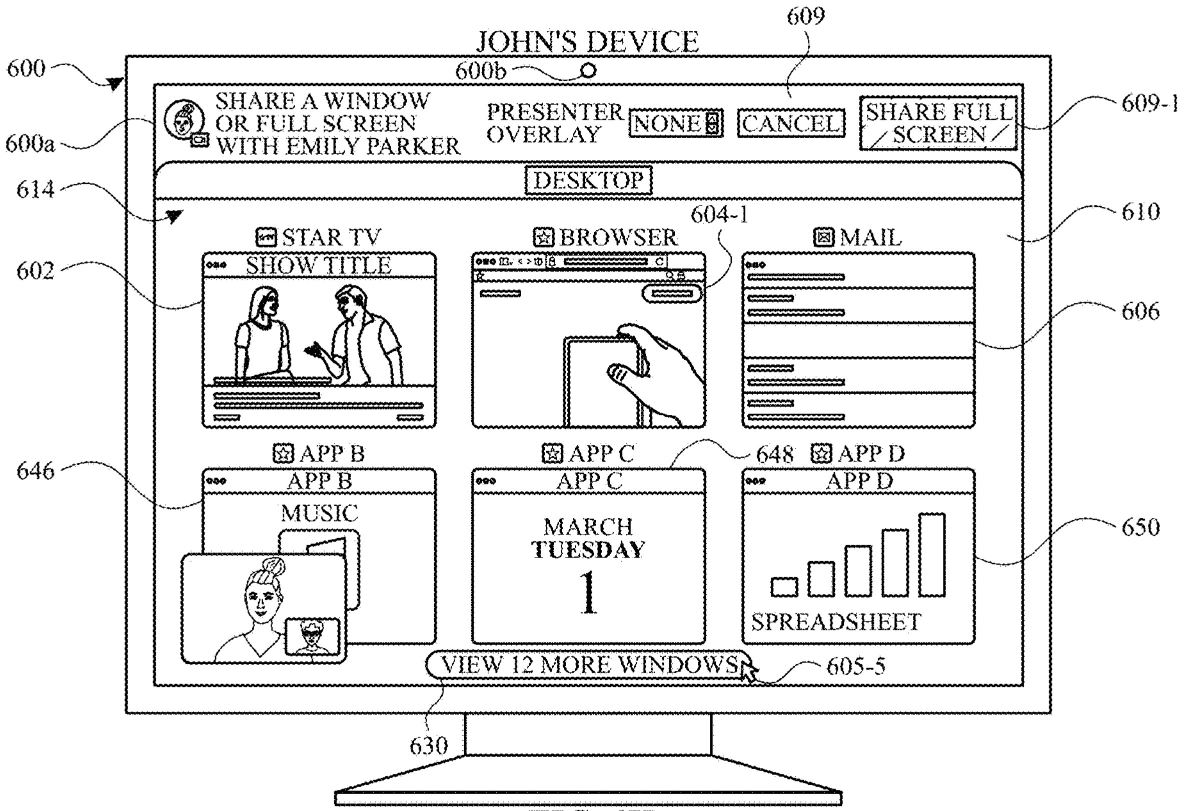
Figure 6I:
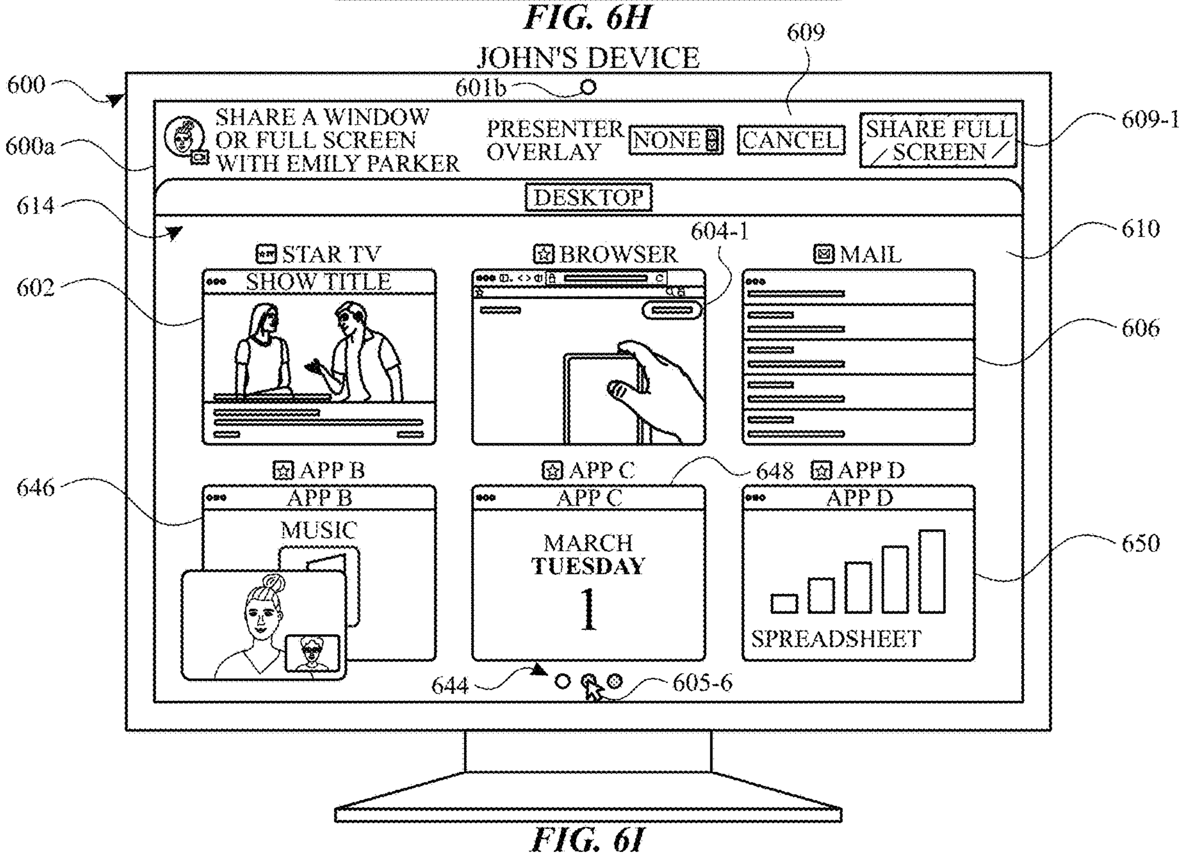
Figure 6J:
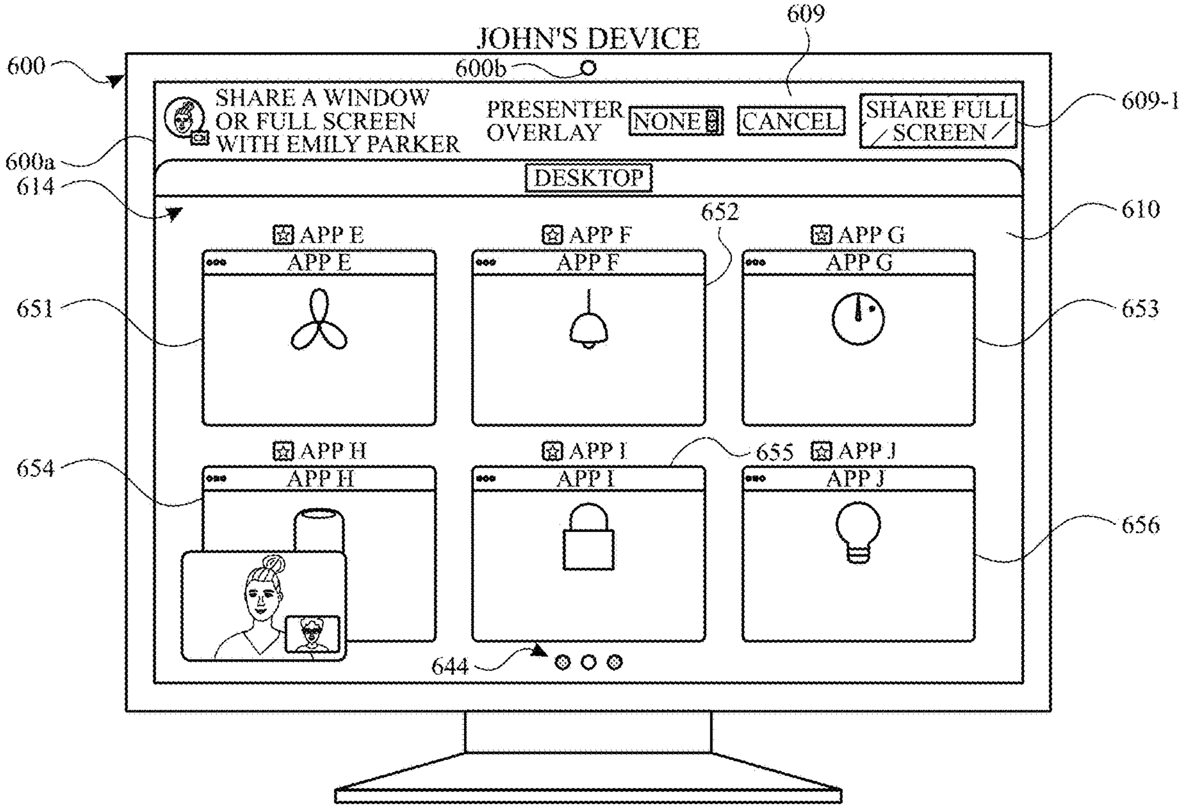

FIGS. 6H-6J depict example user interfaces for embodiments similar to those described above in which John's device 600 navigates open application windows that are available to be shared with Emily's device 601 (not shown) in a shared-content session. In FIGS. 6H-6J, John's device 600 displays screen content selection interface 614 while 18 application windows are open at John's device 600 and are available to be shared in the shared-content session. In the embodiment depicted in FIGS. 6H-6J, John's device 600 displays the matrix configuration with up to six application windows displayed at a time in screen content selection interface 614. John's device 600 can navigate to the other twelve application windows as described below. Although it is not depicted in FIGS. 6H-6J, the open application windows in these figures can be selected for sharing with Emily's device 601 in accordance with the embodiments described above.

In FIG. 6H, John's device displays application windows 602, 604-1, 606, 646, 648, and 650 in screen content selection interface 614. John's device 600 also displays view more element 630, which is selectable to enable navigation to the remaining twelve application windows that are open at John's device 600. In response to detecting input 605-5 selecting view more element 630, John's device 600 displays, in FIG. 6I, pagination dots 644, which are selectable to navigate to other subsets of the open applications at John's device. For example, in FIG. 6I, John's device 600 detects input 605-6 selecting the middle pagination dot and, in response, displays a second subset of application windows (e.g., windows 651 to 656), as shown in FIG. 6J. In some embodiments, selection of view more element 630 enables navigation to the other application windows in a different way such as, for example, enabling the scrolling of windows, rows of windows, columns of windows, or pages of windows. In some embodiments, view more element 630 is optionally displayed. In such embodiments, John's device 600 displays pagination dots 644 (or other elements for navigating the open application windows) without prior selection of view more element 630.

FIGS. 6K-6N depict example user interfaces for selecting content to be displayed at an external display device. FIG.

Figure 6K:
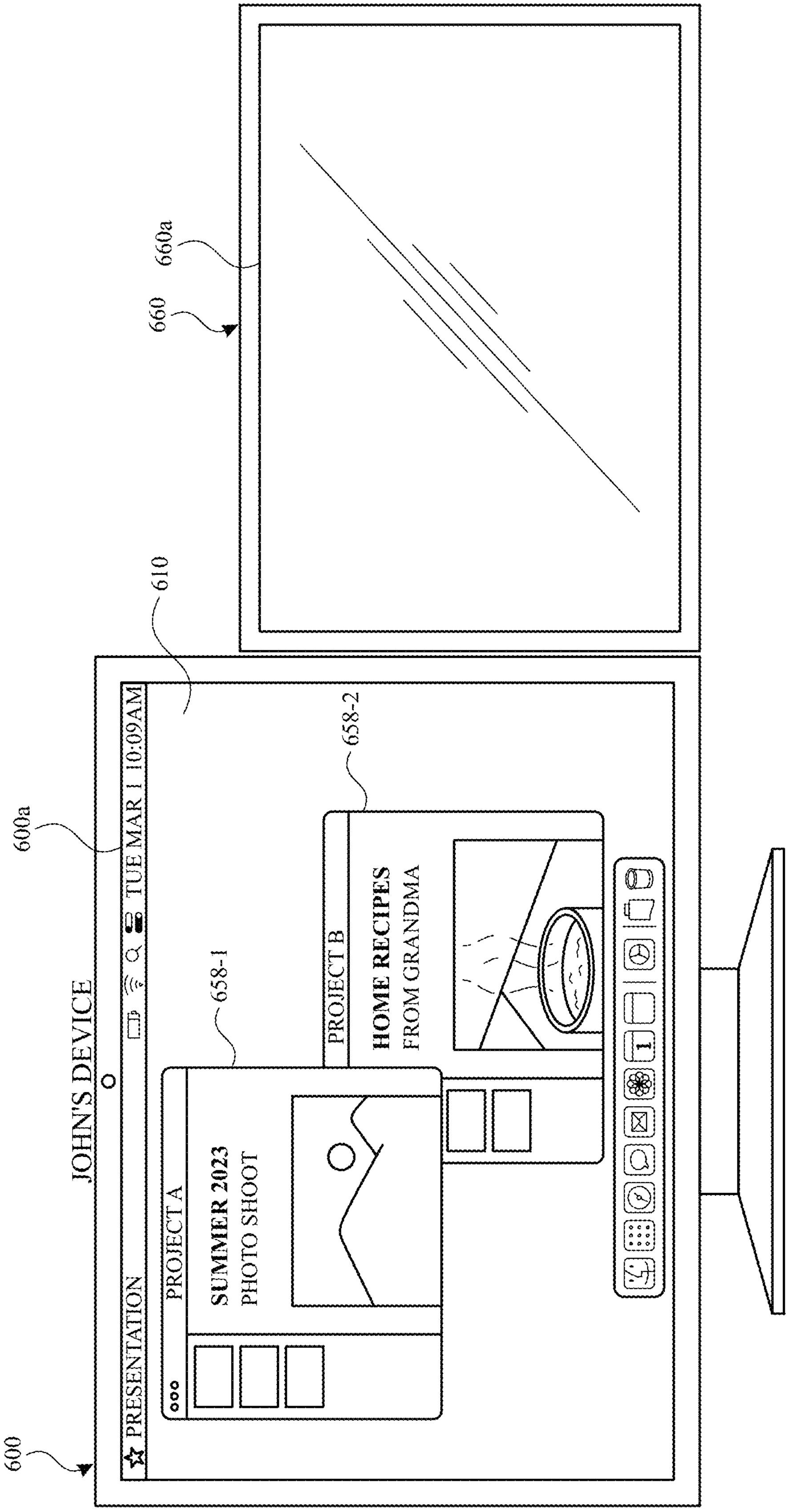

6K depicts John's device 600 next to external display 660, which includes a display component 660*a* for displaying content. John's device 600 is displaying, via display 600*a*, desktop 610 with presentation windows 658-1 and 658-2 for a presentation application operating at John's device 600. In FIG. 6K, John's device 600 is not connected to external display 660.

Figure 6L:
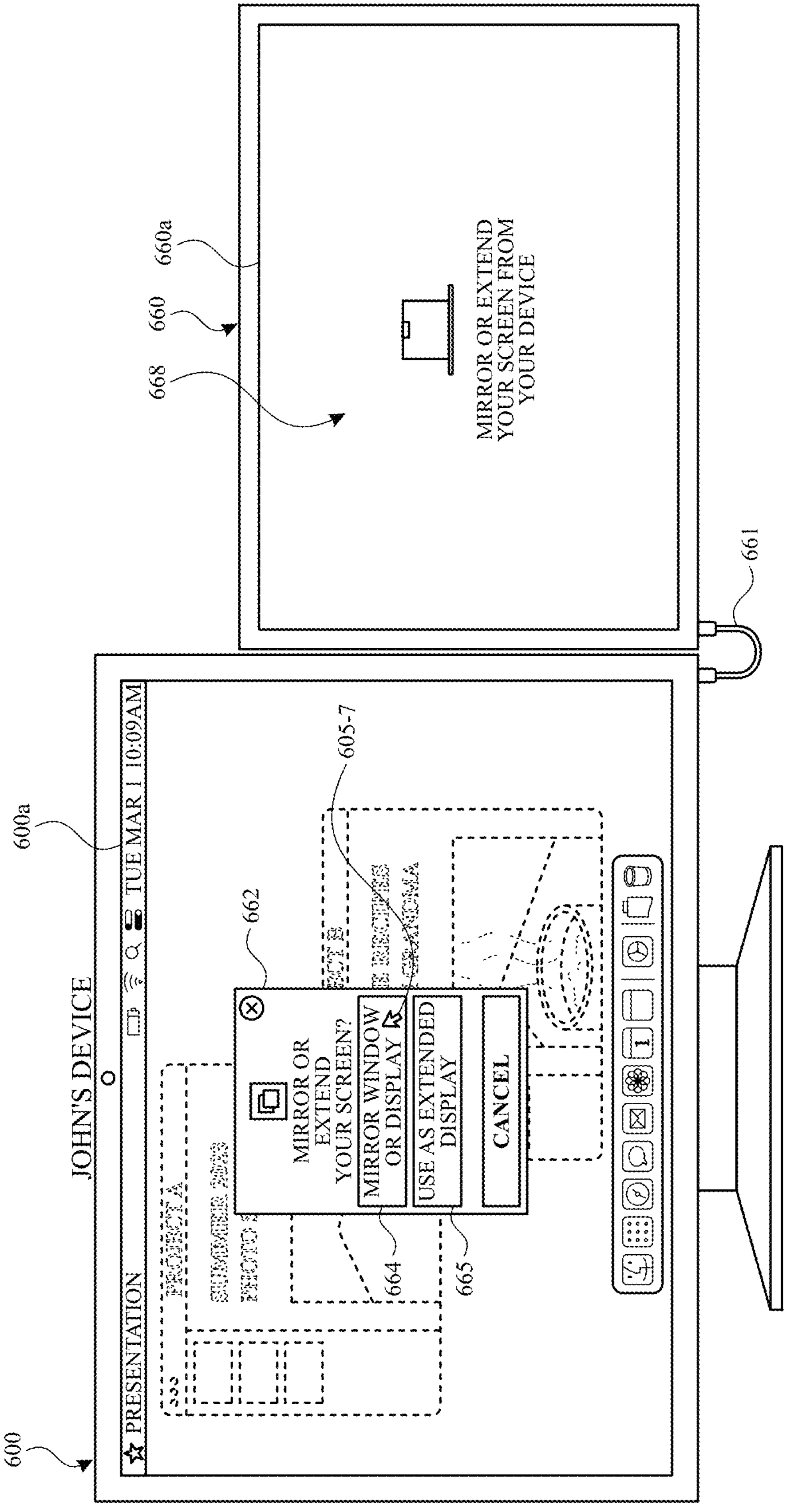

In FIG. 6L, John's device 600 is connected to external display 660 via wired connection 661. In some embodiments, the connection to external display 660 is a wireless connection. In response to detecting the connection to external display 660, John's device displays display menu 662, which includes mirror option 664 and extended display option 665. Display menu 662 prompts John to indicate (e.g., via selection of mirror option 664 or extended display option 665) whether he intends to mirror displayed content on external display 660 or to use external display 660 as an extended display component. External display 660 displays prompt 668 instructing John to mirror the displayed content of John's device to external display 660 (e.g., via selection of mirror option 664) or to extend the displayed desktop to external display 660 (e.g., via selection of extended display option 665). In response to detecting a selection of extended display option 665, John's device uses external display 660 as an extended display component (e.g., a second display monitor) with which John's desktop 610 and other displayed content can be displayed. In response to detecting a selection of mirror option 664, John's device begins a process for selecting content to be mirrored at external display 660 (e.g., displayed concurrently at both John's device 600 and at external display 660). In some embodiments, John's device 600 remembers a previous selection of the mirror option 664 or extended display option 665 for a respective device. In such embodiments, upon subsequent connection to the device, John's device 600 skips display of menu 662 and automatically applies the prior selection of mirror option 664 or extended display option 665 (e.g., performing the process for using the respective device as an extended display if the extended display option 665 was previously selected, or performing the process for selecting content to be mirrored at the device if mirror option 664 was previously selected).

Figure 6M:
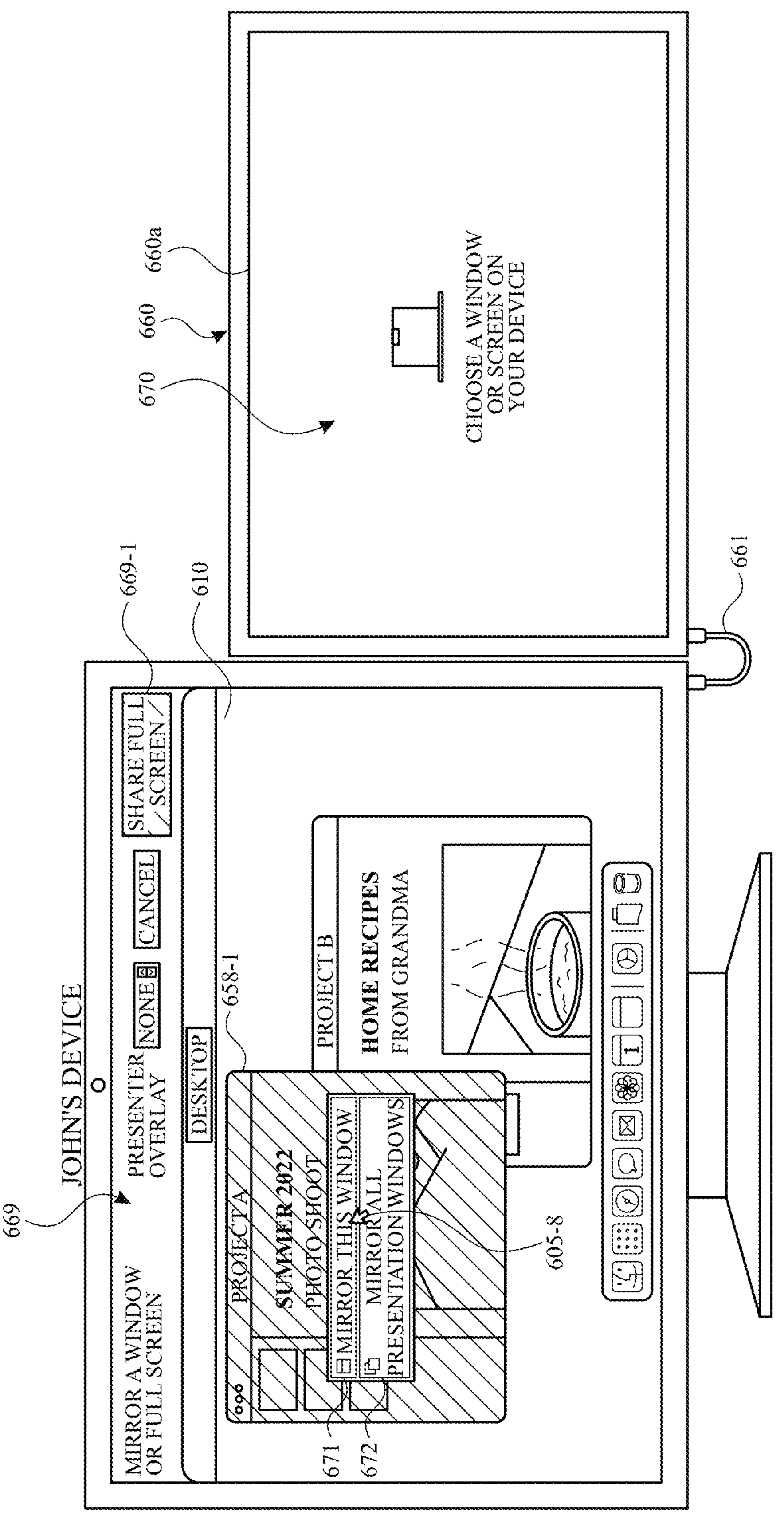

In response to detecting input 605-7 selecting mirror option 664, John's device 600 displays mirror content selection interface 669 for selecting content to be mirrored at external display 660, as shown in FIG. 6M. External display 660 displays prompt 670 instructing John to choose a window or screen for mirroring at external display 660. Mirror content selection interface 669 is similar to screen content selection interface 614, except that mirror content selection interface 669 is used to select content for mirroring at an external display, rather than for sharing with a participant of a shared-content session. Mirror content selection interface 669 shrinks desktop 610 and prompts John to select the full screen (e.g., desktop 610) or one or more windows for mirroring at external display 660. Mirror content selection interface 669 includes full-screen option 669-1 (e.g., similar to full-screen element 609-1), which is selectable to mirror desktop 610 (e.g., and content displayed on desktop 610) at external display 660, and single-window option 671 and multi-window option 672. Single-window option 671 is selectable to choose a single application window to be mirrored at external display 660 (e.g., similar to single-window element 621), whereas multi-window option 672 is selectable to choose multiple application windows to be mirrored at external display 660 (e.g., similar to multi-window element 622).

In FIG. 6M, John's cursor is positioned over presentation window 658-1 and John's device 600 displays single-window option 671 and multi-window option 672 displayed over presentation window 658-1. Presentation window 658-1 is highlighted to indicate that the window can be mirrored at external display 660. Multi-window option 672 can be selected to mirror presentation window 658-1 and presentation window 658-2 at external display 660. Single-window option 671 can be selected to mirror presentation window 658-1 at external display, as shown in FIG. 6N.

Figure 6N:
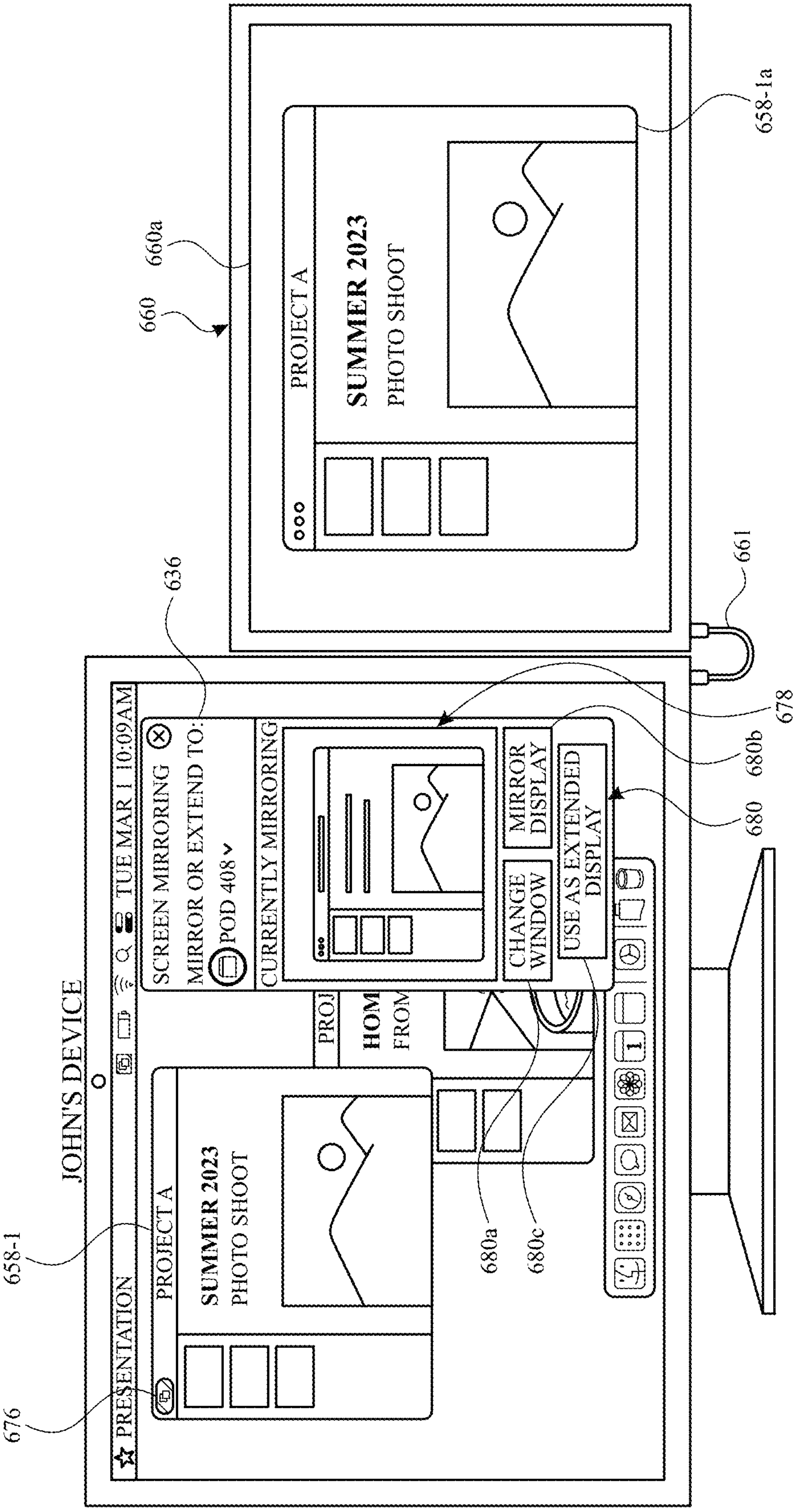

In response to detecting input 605-8 selecting single-window option 671 in FIG. 6M, John's device 600 mirrors presentation window 658-1 at external display 660, as shown in FIG. 6N. Specifically, external display 660 displays representation 658-1*a* of presentation window 658-1. John's device 600 displays mirroring indicator 676 to indicate that presentation window 658-1 is being mirrored at an external display. John's device 600 also displays menu 636, which includes information about the mirroring session. For example, menu 636 includes an identification of the external device (e.g., POD 408), a preview 678 of the mirrored content, and controls 680 for changing the content being displayed at external display 660. For example, control 680*a* can be selected to choose a different window (e.g., presentation window 658-2) for mirroring at external display 660. Mirror display control 680*b* can be selected to choose the entire screen (e.g., desktop 610) for mirrored display at external display 660 (e.g., similar to selecting full-screen option 669-1). Extended display control 680*c* can be selected to change the display mode such that external display 660 is used in the extended display mode (e.g., similar to selecting extended display option 665 in FIG. 6L).

FIGS. 6O-6T depict example user interfaces for displaying a menu while sharing screen content. The user interfaces depicted in FIGS. 6O and 6P correspond to embodiments in which John's device 600 is sharing an entire screen or desktop with Emily's device 601 in a shared-content session. The user interfaces depicted in FIGS. 6Q-6T correspond to embodiments in which John's device 600 is sharing an application window (e.g., not the entire screen or desktop) with Emily's device 601 in a shared-content session.

Figure 6O:
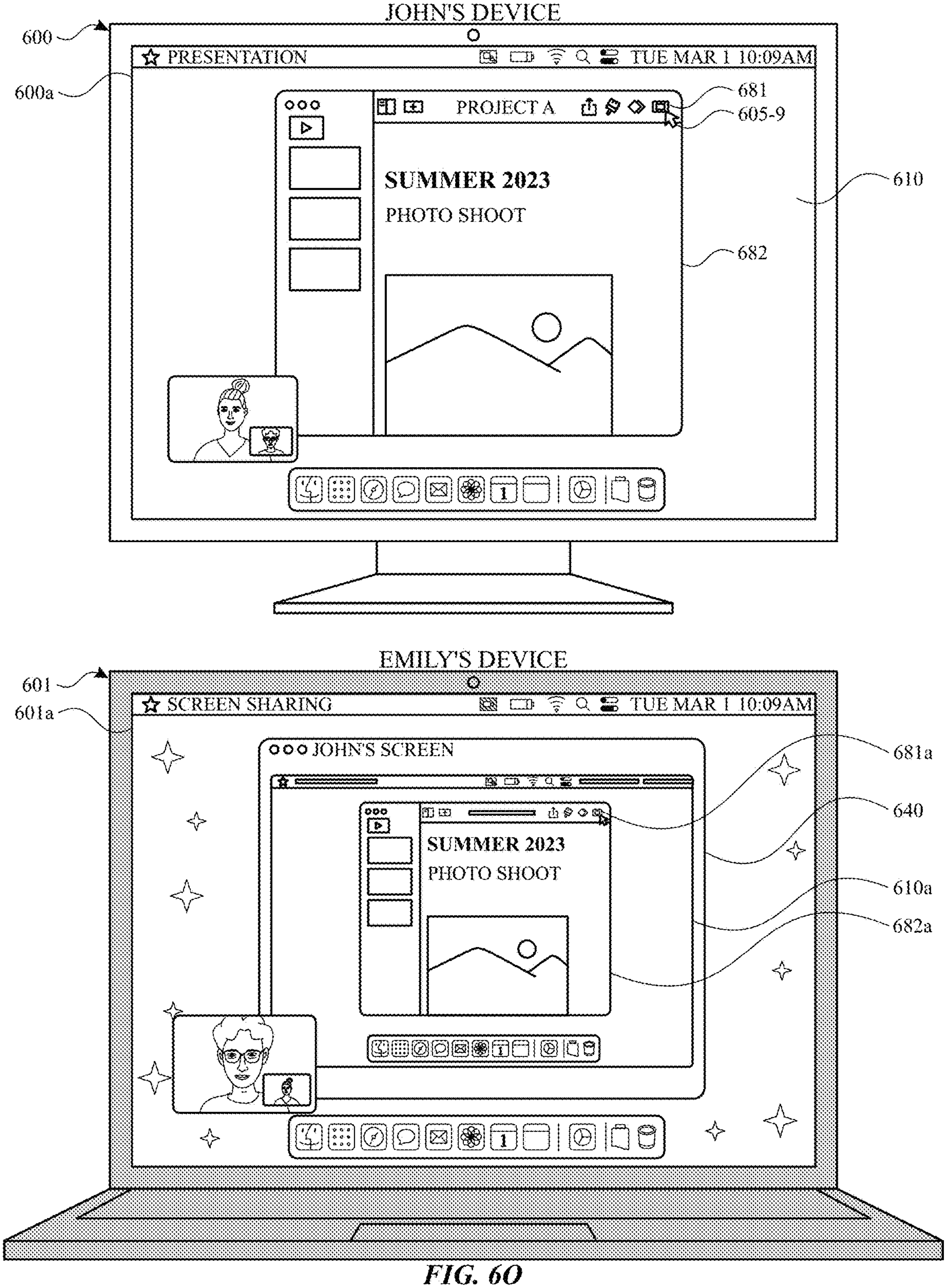

In FIG. 6O, John's device 600 is sharing desktop 610, including presentation window 682, with Emily in a shared-content session. John's device detects input 605-9 selecting menu element 681 in presentation window 682. Emily's device 601 displays shared content window 640, which includes representation 610*a* of John's shared desktop including representation 682*a* of the shared presentation window. Emily's device 601 also displays a representation of John's cursor selecting the menu element (shown as selection of representation 681*a* in shared content window 640).

Figure 6P:
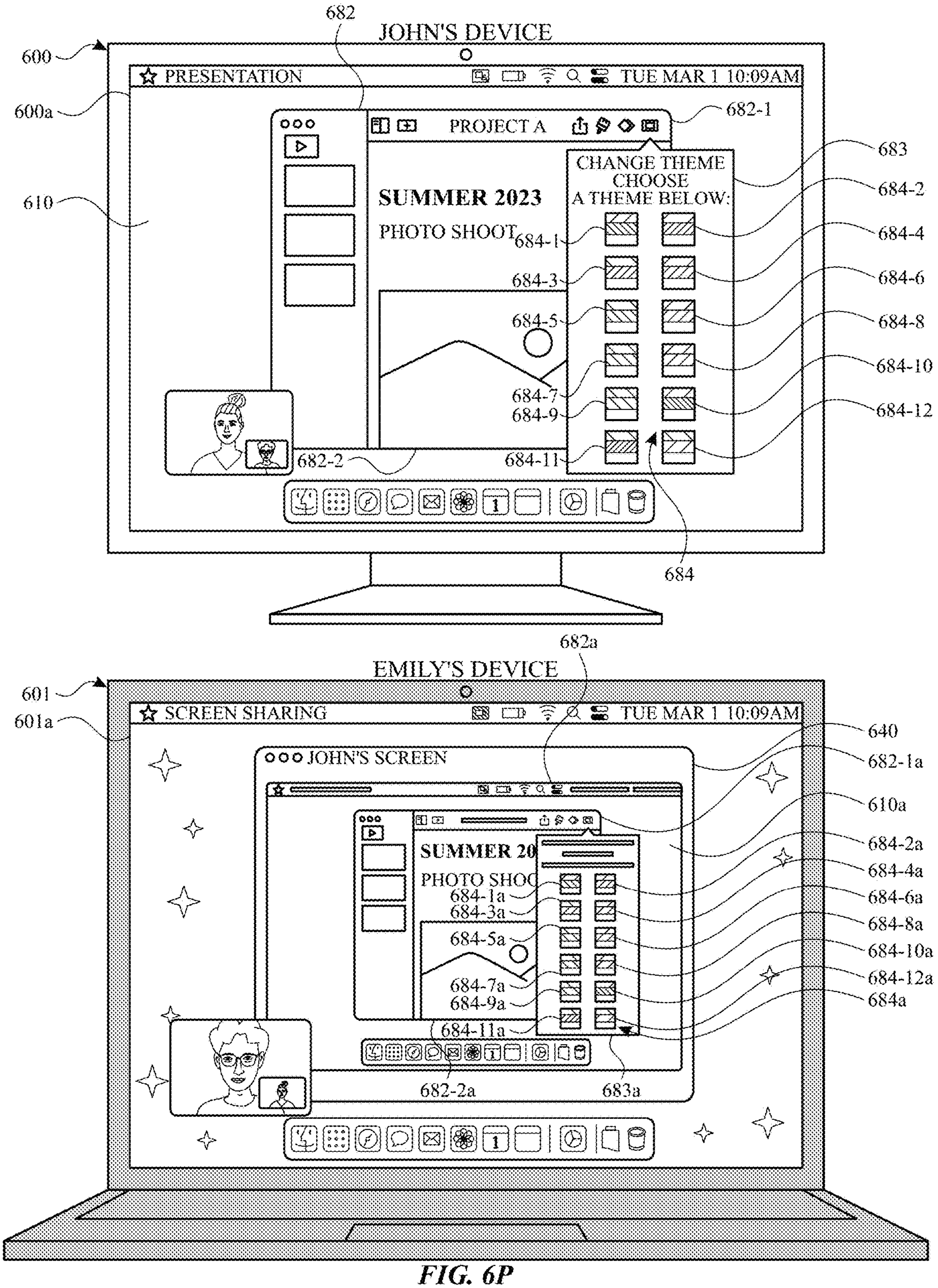

In response to detecting selection of menu element 681, John's device 600 displays menu 683, as shown in FIG. 6P. Menu 683 includes menu items 684, comprised of menu items 684-1 to 684-12 corresponding to different display themes for the presentation displayed in presentation window 682. John's device 600 displays menu 683 extending horizontally beyond right edge 682-1 of presentation window 682 and extending vertically below bottom edge 682-2 of presentation window 682.

In the embodiment depicted in FIG. 6P, John's device 600 is sharing desktop 610 with Emily's device 601. Accordingly, the display of menu 683 is represented at Emily's device 601 without modification to the displayed size or arrangement of the shared screen content displayed in shared content window 640 at Emily's device. For example, in FIG.

6P, Emily's device 601 displays, in shared content window 640, representation 610*a* of John's desktop including representation 682*a* of presentation window 682 and representation 683*a* of menu 683 having the same displayed arrangement as depicted at John's device 600. Specifically, representation 683*a* of the menu includes representations 684-1*a* to 684-12*a* of the menu items, and representation 683*a* of the menu extends horizontally beyond representation 682-1*a* of the right edge of the presentation window and extends vertically below representation 682-2*a* of the bottom edge of the presentation window. Because Emily's device 601 is displaying the shared desktop from John's device (e.g., representation 610*a*) within shared content window 640, the shared content is scaled within shared content window 640 such that Emily's device 601 is capable of introducing display of the shared menu (e.g., representation 683*a*) in a manner that is consistent with the display of menu 683 at John's device 600 (e.g., without having to further scale or adjust the representation of the shared content displayed at Emily's device 601).

Figure 6Q:
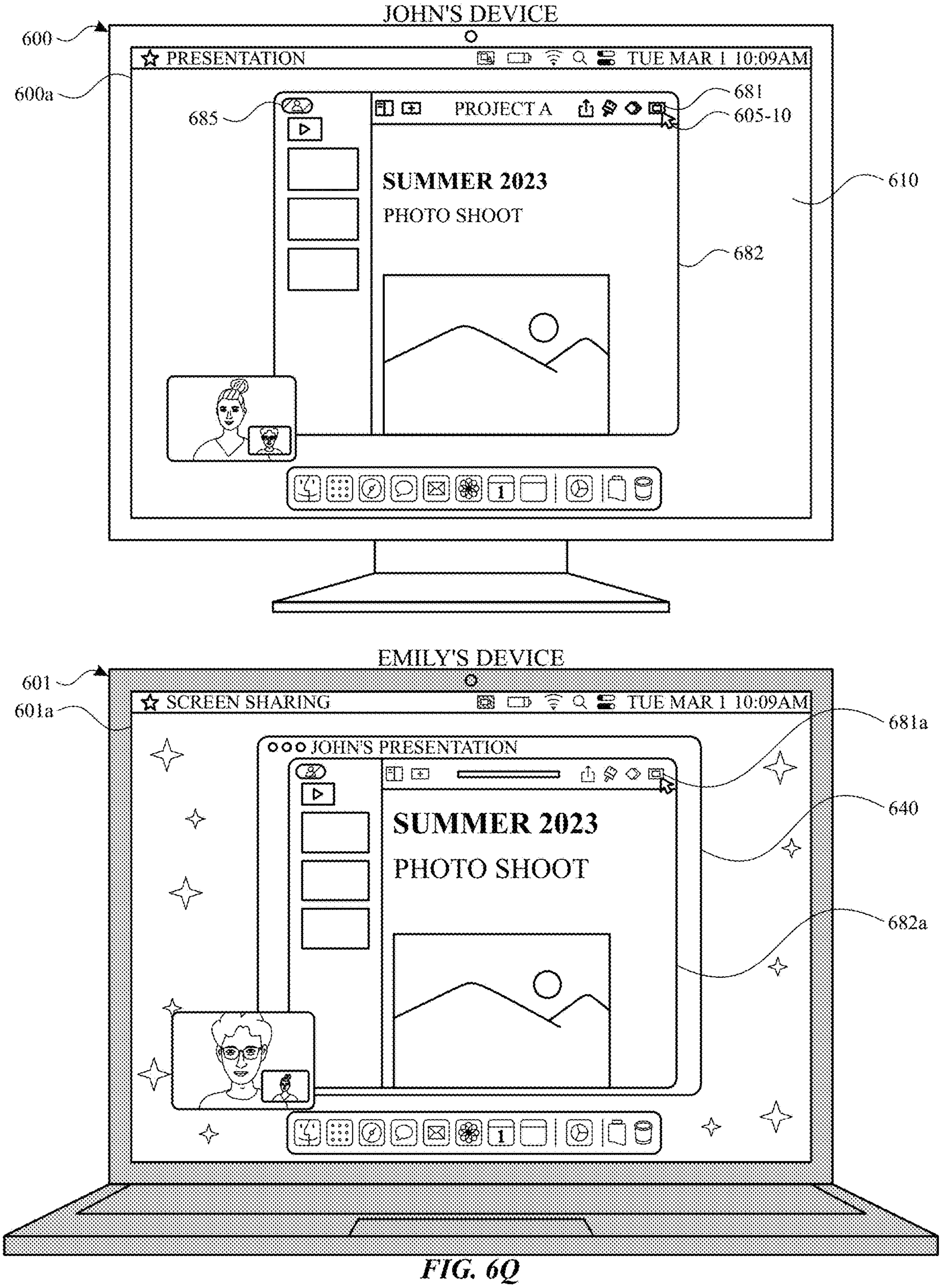
Figure 6R:
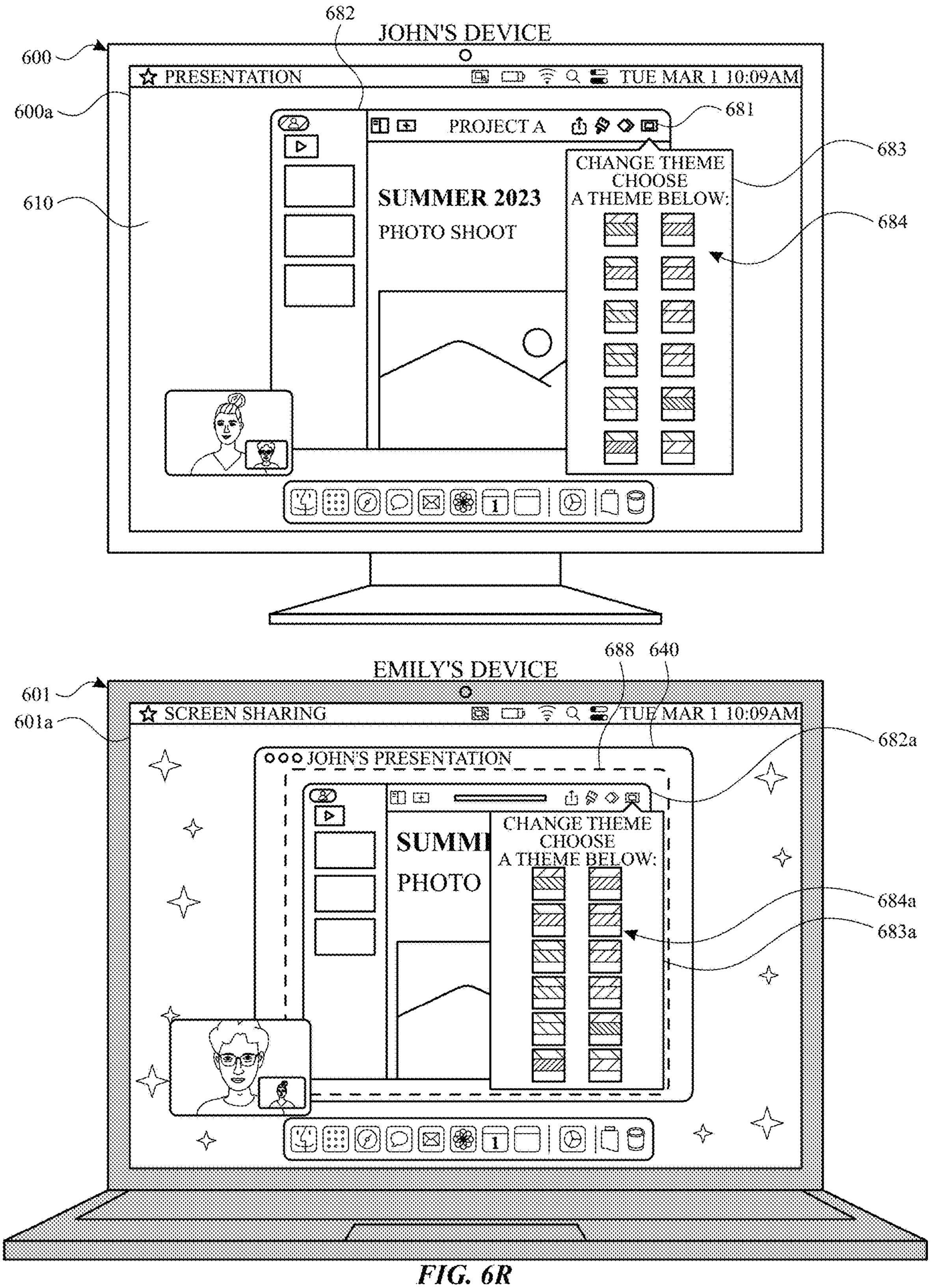
Figure 6S:
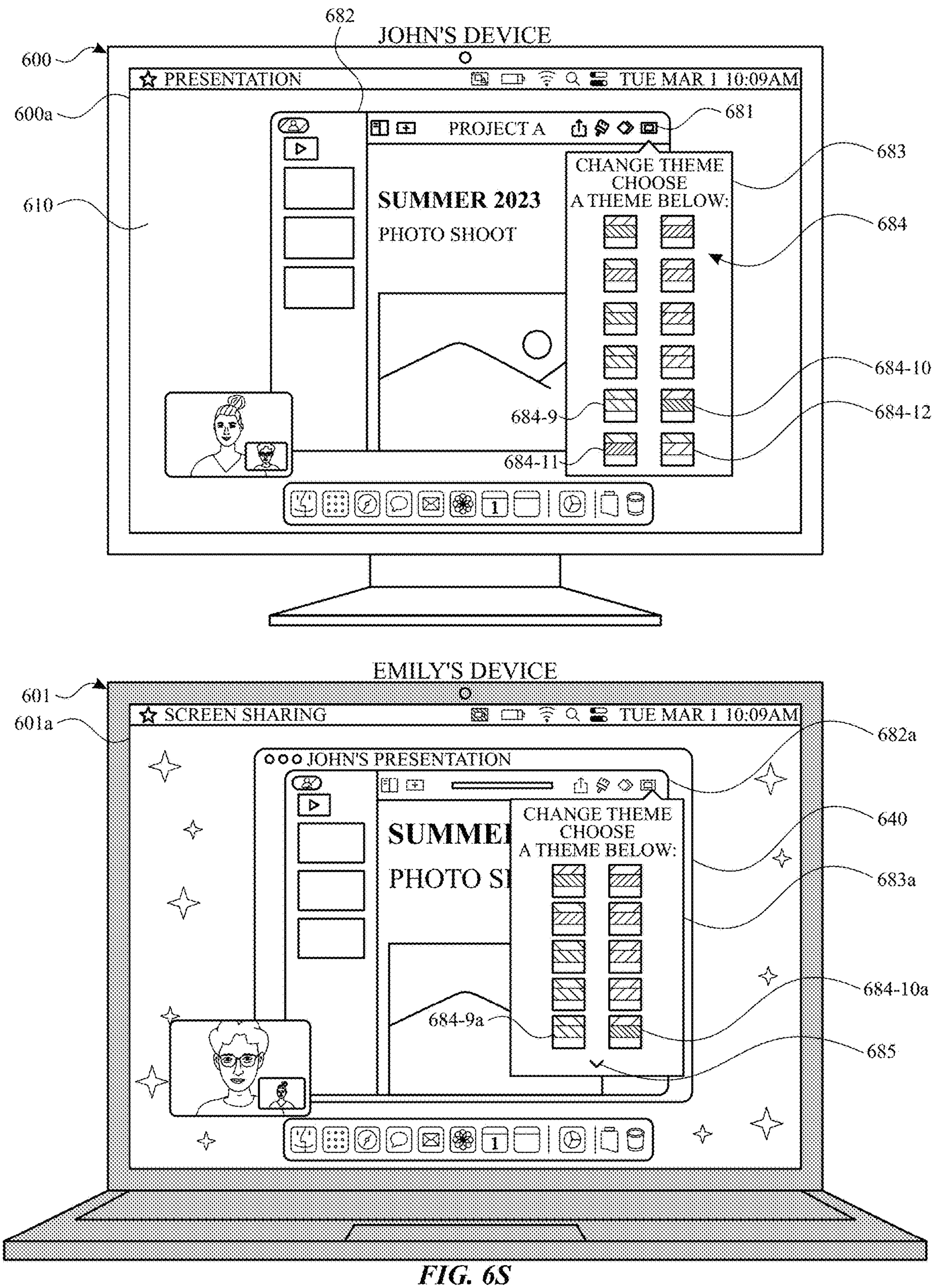
Figure 6T:
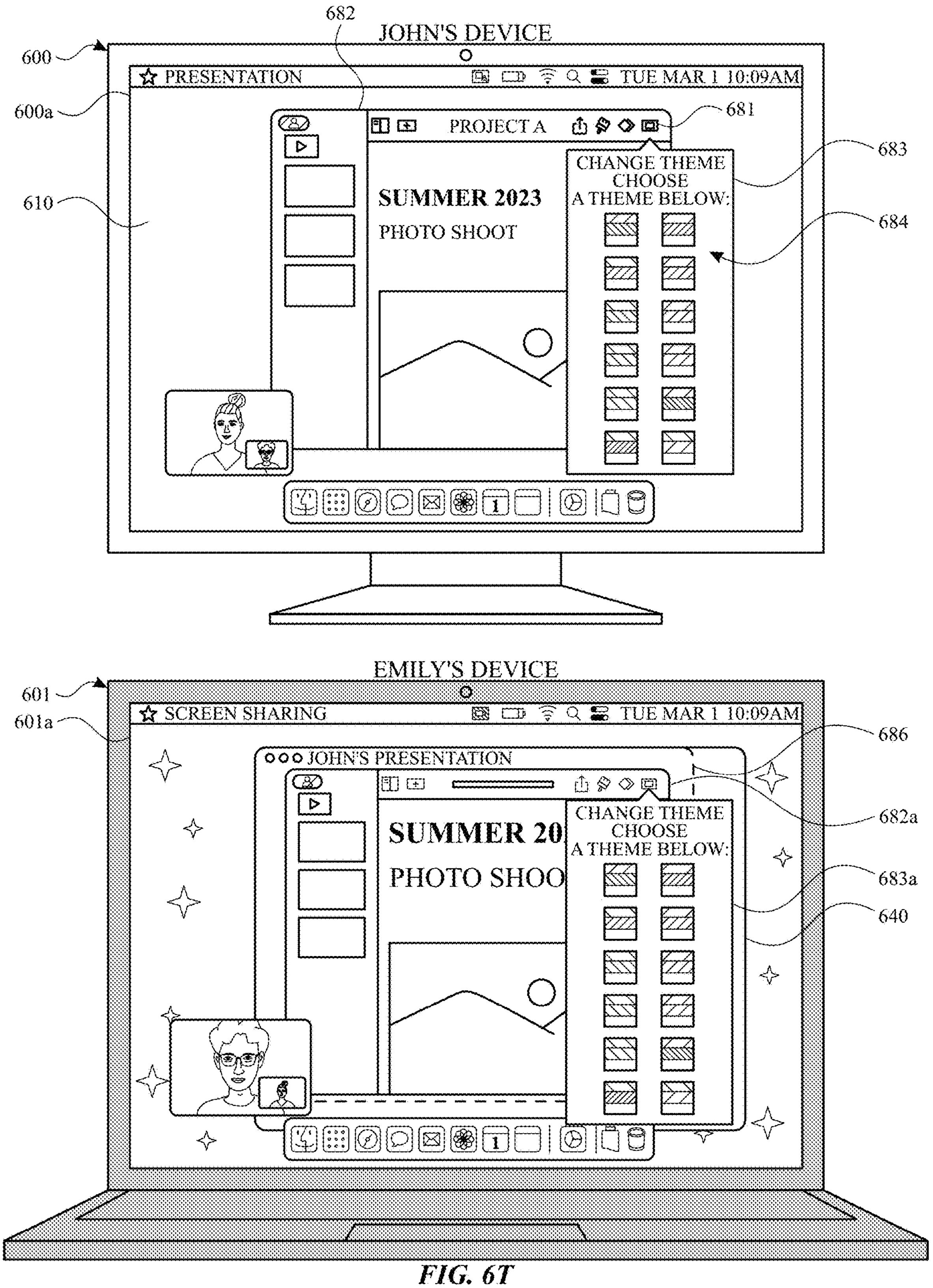

FIGS. 6Q-6T depict example user interfaces for embodiments in which John's device 600 is sharing presentation window 682 (e.g., not the entire screen or desktop 610) with Emily's device 601 in a shared-content session. In FIG. 6Q, John's device detects input 605-10 selecting menu element 681 in presentation window 682. Emily's device 601 displays shared content window 640, which includes representation 682*a* of the shared presentation window and a representation of John's cursor selecting the menu element (shown as selection of representation 681*a* in shared content window 640). In the embodiments depicted in FIGS. 6Q-6T, Emily's device 601 does not display a representation of John's entire desktop 610.

FIGS. 6R-6T depict user interfaces for different embodiments for introducing display of the menu at Emily's device 601 in response to the selection of menu element 681 in FIG. 6Q. In each of these embodiments, John's device 600 displays menu 683 in a manner similar to that described above with respect to FIG. 6P. Therefore, the display of menu 683 at John's device 600 is not repeated below. However, in the embodiments depicted in FIGS. 6R-6T, Emily's device 601 employs different techniques for displaying representation 683*a* of the menu as described below. The embodiments depicted in FIGS. 6R-6T depict different techniques for displaying the representation of the menu. In some embodiments, one or more of the different techniques can be combined, or some techniques omitted.

In FIG. 6R, Emily's device 601 scales down (e.g., shrinks) the displayed state of representation 682*a* of the shared presentation window and, in some embodiments, representation 683*a* of the menu and representations 684*a* of the menu items. Specifically, representation 682*a* is scaled such that the representation of the shared presentation menu and the representation 683*a* of the displayed menu (e.g., when displayed together) fit within the boundaries of shared content window 640 without modifying or adjusting the displayed arrangement or relative positioning of representation 682*a* of the shared presentation window and representation 683*a* of the menu (e.g., as based on the arrangement of these elements as displayed at John's device 600). As shown in FIG. 6R, dashed line 688 represents the displayed size of representation 682*a* of the shared presentation window before introducing display of the menu. In other words, dashed line 688 represents the boundaries of representation 682*a* as shown in FIG. 6Q, before it was scaled to allow for the display of representation 683*a* of the menu in shared content window 640. Dashed line 688 is not a displayed component at Emily's device 601 but is provided in FIG. 6R to provide a visual indication of the scaled appearance of representation 682*a* and representation 683*a*.

In FIG. 6S, Emily's device 601 truncates the representation 683*a* of the menu and shifts the displayed location of the representation of the menu to fit within the boundaries of shared content window 640. Specifically, Emily's device 601 displays representation 683*a* of the menu with representations 684-11*a* and 684-12*a* of menu items 684-11 and 684-12, respectively, omitted from the representation of the menu. Emily's device 601 also displays element 685 to indicate that the menu has been truncated and that some of the menu items have been omitted from the menu as displayed at John's device 600. In some embodiments, if Emily's device 601 has permission to control or interact with the shared content, Emily's device 601 can select element 685 to display the omitted menu items. In some embodiments, Emily's device moves the displayed location of representation 683*a* of the menu so that the representation of the menu fits within shared content window 640 without having to adjust the size of representation 682*a* of the shared presentation window and, in some embodiments, the representation of the menu. In some embodiments, Emily's device 601 performs one of the truncating or relocating operations for the menu, for example, if one of the truncating or relocating operations is not needed to fit the representation of the menu in shared content window 640. For example, Emily's device 601 can move the representation of the menu without truncating the representation of the menu (e.g., if the shared content window 640 is large enough to fit the non-truncated menu). Similarly, Emily's device 601 can truncate the representation of the menu without moving the representation of the menu. In some embodiments, Emily's device 601 performs the truncating and/or relocating operation based on a displayed location of the shared content window 640 at Emily's device. For example, if shared content window 640 is displayed in a corner of display 601*a* and displaying the representation of the menu (e.g., without truncating) would cause the menu to extend vertically beyond the shared content window 640 (and the shared content window cannot be extended vertically due to the placement of the shared content window on display 601*a*), then Emily's device 601 truncates and/or moves the representation of the menu so that it fits within shared content window 640.

In FIG. 6T, Emily's device 601 extends the boundaries of shared content window 640 to fit the displayed representation 682*a* of the shared presentation window with representation 683*a* of the menu. Specifically, in the embodiment depicted in FIG. 6T, Emily's device 601 extends the right and bottom edges of shared content window 640 so that the unadjusted or unmodified arrangement and relative positioning of the menu and shared presentation window fit within the boundaries of the shared content window 640. In FIG. 6T, dashed line 686 represents the original displayed size of shared content window 640 (e.g., identifying the right edge and bottom edge of shared content window 640 before the edges were extended). Dashed line 686 is not a displayed component at Emily's device 601 but is provided in FIG. 6T to provide a visual indication of the increased size of shared content window 640.

FIG. 7 is a flow diagram illustrating a method for selecting screen content for sharing using a computer system in accordance with some embodiments. Method 700 is performed at a computer system (e.g., 100, 300, 500, 600, and/or 601) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) one or more display generation components (e.g., 112, 340, 504, 600*a*, 601*a*, and/or 660) (e.g., a display controller, a touch-sensitive display system, a display screen, a monitor, a projector, a holographic display, a head-mounted display system, and/or other device or component that presents visual content to a user, for example on or in the display generation component itself or produced from the display generation component and visible elsewhere) and one or more input devices (e.g., 112, 350, 355, 508, 522, 600*a*, 600*b*, 601*a*, 601*b*, 601*c*, and/or 601*d*) (e.g., a touch-sensitive surface, a keyboard, mouse, trackpad, one or more optical sensors for detecting a gaze and/or gestures, one or more capacitive sensors for detecting hover inputs, a microphone, and/or accelerometer/gyroscope/inertial measurement units). Some operations in method 700 are, optionally, combined, the orders of some operations are, optionally, changed, and some operations are, optionally, omitted.

As described below, method 700 provides an intuitive way for selecting screen content for sharing. The method reduces the cognitive burden on a user for selecting screen content for sharing, thereby creating a more efficient human-machine interface. For battery-operated computing devices, enabling a user to select screen content for sharing faster and more efficiently conserves power and increases the time between battery charges.

At method 700, during a video communication session (e.g., a live video call with one or more participants) (e.g., while the video communication session is active on the computer system), the computer system (e.g., 600 and/or 601) receives (702), via the one or more input devices (e.g., 600*a*, 600*b*, 601*a*, 601*b*, 601*c*, and/or 601*d*), a request (e.g., 605-1) (e.g., one or more inputs such as touch input(s), audio input(s), gaze input(s), and/or gesture input(s)) (e.g., a set of one or more inputs that correspond to the request such as, in some embodiments, a selection of a screen sharing element) to enable screen sharing during the video communication session (e.g., a request to enable a mode in which the computer system (e.g., 600) transmits a live representation of content (e.g., 610, 602, 604-1, 604-2, 604-3, 604-4, and/or 606) displayed at the computer system (screen content) to one or more external computer systems (e.g., 601) participating in the video call). In some embodiments, the representation of the content is shared (e.g., transmitted) from the computer system (directly, or indirectly such as, for example, through a server) to the external computer system(s) for display at the external computer system(s). In some embodiments, the representation of the content is concurrently displayed at both the computer system and the external computer system(s) while the screen sharing is enabled (e.g., during a screen-sharing session).

In response to receiving the request (e.g., 605-1) to enable screen sharing during the video communication session, the computer system (e.g., 600 and/or 601) displays (704), via the one or more display generation components (e.g., 600*a*, 601*a*, and/or 660), a set of screen sharing elements (e.g., 609-1, 621, and/or 622) for sharing screen content (e.g., 610, 602, 604-1, 604-2, 604-3, 604-4, and/or 606) (e.g., a set of one or more selectable user interface elements, such as icon(s), button(s), option(s), affordance(s), and/or user-interactive graphical user interface object(s), that are selectable to enable the sharing of screen content with an external display (e.g., 660) and/or one or more external computer systems (e.g., 601) participating in the video communication session). As a part of displaying the set of screen sharing elements, the computer system displays (706) an expanded screen sharing element (e.g., 609-1) for sharing expanded (e.g., full-screen) content (e.g., 610) (e.g., a selectable user interface element such as an icon, a button, an option, an affordance, and/or a user-interactive graphical user interface object, that is selectable to enable the sharing of content that is displayed at a respective display or screen). In some embodiments, expanded content (e.g., full-screen content) includes a desktop user interface, application windows, wallpaper, a background, icons, options, and/or other content displayed at the computer system (e.g., content that is not limited solely to a single application and/or window). In some embodiments, the computer system detects a selection of the expanded screen sharing element and, in response, enables the sharing of expanded content for display at the external computer system. As a part of displaying the set of screen sharing elements, the computer system displays (708) a window sharing element (e.g., 621 and/or 622) for sharing one or more windows (e.g., 602, 604-1, 604-2, 604-3, 604-4, and/or 606) of a respective application operating at the computer system. In accordance with a determination that first criteria are met, the computer system displays (710) a single-window sharing element (e.g., 621) that is selectable to share a single application window of the respective application (e.g., 602, 604-1, 604-2, 604-3, 604-4, or 606) (e.g., without sharing other application windows for the respective application) and displaying a multi-window sharing element (e.g., 622) that is selectable to share multiple application windows (e.g., two or more of 604-1, 604-2, 604-3, and 604-4) of the respective application. Displaying the single-window sharing element that is selectable to share a single application window of the respective application and displaying the multi-window sharing element that is selectable to share multiple application windows for the respective application when the first criteria are met provides improved feedback about a state of the computer system (e.g., a state in which the first criteria are met and/or the computer system can share one or multiple windows of the respective application). In some embodiments, the first criteria include a criterion that is met when the respective application has multiple open application windows operating at the computer system. In some embodiments, the first criteria include a criterion that is met when a cursor is positioned over an application window (or a stack of application windows (e.g., 604)) that are displayed at the computer system (e.g., as depicted in FIG. 6C). In some embodiments, the computer system detects a selection (e.g., 605-4) of the single-window sharing element and, in response, enables the sharing of a single application window (e.g., 604-1) of the respective application for display at the external computer system (e.g., as depicted by display of shared window 604-1*a* in FIG. 6E). In some embodiments, the computer system detects a selection (e.g., 605-11) of the multi-window sharing element and, in response, enables the sharing of multiple application windows (e.g., 604-1, 604-2, 604-3, and 604-4) of the respective application for display at the external computer system (e.g., as depicted by display of shared windows 604-1*a*, 604-2*a*, 604-3*a*, and 604-4*a* in FIG. 6G).

In some embodiments, as a part of displaying the window sharing element for sharing one or more windows (e.g., 602, 604-1, 604-2, 604-3, 604-4, and/or 606) of a respective application operating at the computer system (e.g., 600 and/or 601), the computer system, in accordance with a determination that the first criteria are not met (e.g., the respective application has only one open application window (e.g., 602 or 606)), displays the single-window sharing element (e.g., 621) that is selectable to share a single application window of the respective application and forgoes displaying the multi-window sharing element (e.g., 622) that is selectable to share multiple application windows of the respective application (e.g., as depicted in FIG. 6B). Displaying the single-window sharing element and forgoing displaying the multi-window sharing element when the first criteria are not met provides improved feedback about a state of the computer system (e.g., a state in which the first criteria are not met and/or only a single open application window is selectable for sharing). In some embodiments, if the first criteria are not met, the computer system displays the single-window sharing element without the multi-window sharing element.

In some embodiments, the first criteria include a criterion that is met when the respective application has a plurality of open application windows (e.g., 604-1, 604-2, 604-3, and 604-4) (e.g., more than one application window is open at the computer system (e.g., 600 and/or 601)). In some embodiments, the first criteria include a criterion that is met when a cursor is positioned over an application window (e.g., 602, 604-1, 604-2, 604-3, 604-4, or 606) (or a stack of application windows (e.g., 604)) that are displayed at the computer system. In some embodiments, elements for sharing screen content include an option (e.g., 609-2) (e.g., dropdown menu) to select a presenter display format. In some embodiments, the computer system highlights the entire screen or desktop (e.g., 610) when a cursor is detected hovering or positioned over the expanded screen sharing element (e.g., 609-1). In some embodiments, the computer system highlights one or more application windows and displays the window sharing elements (e.g., 621 and/or 622) when a cursor is detected hovering over an application window.

In some embodiments, in response to receiving the request (e.g., 605-1) to enable screen sharing during the video communication session, the computer system (e.g., 600 and/or 601) displays a representation of one or more open application windows associated with the respective application. In accordance with a determination that the respective application is associated with a plurality of open application windows (e.g., 604-1, 604-2, 604-3, and 604-4), the computer system displays a representation of the plurality of open application windows in a first predetermined configuration (e.g., 604 as depicted in FIG. 6B) (e.g., a stacked, overlapping, and/or consolidated arrangement of the open application windows). Displaying the representation of the plurality of open application windows in the first predetermined configuration when the respective application is associated with a plurality of open application windows provides improved feedback about a state of the computer system (e.g., a state in which the respective application has multiple open application windows that can be shared). In some embodiments, the representation of the plurality of open application windows is displayed with a single-window sharing element (e.g., 621) that is selectable to share a single application window (e.g., a currently active and/or most recently active application window) of the respective application and a multi-window sharing element (e.g., 622) that is selectable to share a plurality (e.g., some or all) of the open application windows of the respective application during the video communication session.

In some embodiments, while displaying the representation of the plurality of open application windows (e.g., 604-1, 604-2, 604-3, and 604-4) in the first predetermined configuration (e.g., 604), the computer system (e.g., 600 and/or 601) detects, via the one or more input devices (e.g., 600*a*, 600*b*, 601*a*, 601*b*, 601*c*, and/or 601*d*), a selection (e.g., 605-3) (e.g., one or more inputs such as touch input(s), audio input(s), gaze input(s), and/or gesture input(s)) of the representation of the plurality of open application windows (e.g., a set of one or more inputs that includes a selection of the representation of the plurality of open application windows). In response to detecting the selection of the representation of the plurality of open application windows, the computer system displays, via the one or more display generation components (e.g., 600*a*, 601*a*, and/or 660), the representation of the plurality of open application windows in a second predetermined configuration (e.g., as depicted in FIG. 6D) that is different from the first predetermined configuration (e.g., an unstacked, non-overlapping, and/or unconsolidated arrangement of the open application windows). Displaying the representation of the plurality of open application windows in the second predetermined configuration in response to detecting the selection of the representation of the plurality of open application windows provides improved feedback by displaying content of the open application windows that can be selected for sharing. In some embodiments, in response to detecting a selection of the stacked application windows, the computer system expands the open application windows from the stacked configuration to an unstacked configuration such as a matrix or other separated arrangement of the open application windows.

In some embodiments, the computer system (e.g., 600 and/or 601) receives the request (e.g., 605-1) to enable screen sharing while screen content (e.g., 610, 602, 604-1, and/or 606) is displayed having a first size (e.g., an enlarged size) and a respective display state (e.g., an expanded display state and/or a full-screen display state) (e.g., as depicted in FIG. 6A). In some embodiments, in response to receiving the request to enable screen sharing during the video communication session, the computer system displays, via the one or more display generation components (e.g., 600*a*, 601*a*, and/or 660), the screen content transitioning from the first size (e.g., as depicted in FIG. 6A) to a second size that is smaller than the first size and having the respective display state (e.g., the computer system transitions the screen content to a reduced size and/or a smaller version while maintaining the expanded display state and/or full-screen display state) (e.g., as depicted in FIG. 6B). Displaying the screen content transitioning from the first size to the second size that is smaller than the first size while maintaining the respective display state provides feedback to a user of the computer system indicating that the screen content is selectable for being shared with participants of the video communication session. In some embodiments, the screen content has a full-screen or expanded display state while displayed having the first size and while displayed having the second size. For example, when the computer system displays the screen content in the full-screen or expanded display state and having the first displayed size, the first displayed size represents an amount of useable desktop space. When the computer system displays the screen content in the full-screen or expanded display state and having the second displayed size, the second displayed size represents a smaller amount of useable desktop space.

In some embodiments, in response to receiving the request (e.g., 605-1) to enable screen sharing during the video communication session, the computer system (e.g., 600 and/or 601) displays, via the one or more display generation components (e.g., 600*a*, 601*a*, and/or 660), representations of open application windows (e.g., 602, 604-1, 606, 646, 648, and/or 650) associated with applications operating at the computer system. In accordance with a determination that a number of applications operating at the computer system and having open application windows exceeds a threshold number (e.g., six applications, eight applications, or ten applications), the computer system displays the representations of open application windows having a predetermined arrangement (e.g., a matrix of open application windows) (e.g., as depicted in FIGS. 6D, 6F, and 6H) and displaying a view more element (e.g., 630 and/or 644) (e.g., a selectable user interface element such as an icon, a button, an option, an affordance, pagination dots, and/or a user-interactive graphical user interface object) that is selectable to display additional representations of open application windows (e.g., 651, 652, 653, 654, 655, and/or 656 as depicted in FIG. 6J) (in some embodiments, the computer system displays the additional representations of open application windows having the predetermined arrangement). Displaying the representations of open application windows having the predetermined arrangement and displaying the view more element that is selectable to display additional representations of open application windows when the number of applications operating at the computer system and having open application windows exceeds the threshold number provides additional control options for displaying additional representations of open application windows without cluttering the user interface with additional displayed controls and the additional displayed representations of open application windows. In some embodiments, if more than a threshold number of applications have windows that are open at the computer system, the computer system displays a matrix of application windows with the view more element (e.g., 630) that is selectable to view more application windows. In some embodiments, if representations of open application windows are associated with a same application, the representations are grouped into a stacked configuration (e.g., 604) for the application. In some embodiments, the stacked configuration is displayed as a unit in the matrix of open application windows. In some embodiments, in accordance with a determination that the number of applications operating at the computer system and having open application windows does not exceed the threshold number, the computer system displays the representations of open application windows having the predetermined arrangement without displaying the view more element (e.g., as depicted in FIG. 6B).

In some embodiments, while displaying a first subset of the representations of open application windows having the predetermined arrangement (e.g., 602, 604-1, 606, 646, 648, and 650 in FIG. 6H and/or FIG. 6I), the computer system (e.g., 600 and/or 601) detects, via the one or more input devices (e.g., 600*a*, 600*b*, 601*a*, 601*b*, 601*c*, and/or 601*d*), a selection (e.g., 605-5 and/or 605-6) of the view more element (e.g., 630 and/or 644). In response to detecting the selection of the view more element, the computer system displays, via the one or more display generation components (e.g., 600*a*, 601*a*, and/or 660), a second subset of the representations of open application windows (e.g., 651, 652, 653, 654, 655, and 656 as depicted in FIG. 6J) (e.g., having the predetermined arrangement). Displaying a second subset of the representations of open application windows in response to detecting the selection of the view more element provides additional control options for viewing additional representations of open application windows without cluttering the user interface with additional displayed controls. In some embodiments, the second subset of the representations of open application windows includes one or more representations of open application windows that are not included in the first subset of the representations of open application windows.

In some embodiments, prior to receiving the request (e.g., 605-1) to enable screen sharing during the video communication session (and, in some embodiments, prior to activation of the video communication session) (or, in some embodiments, while a video communication session is not activated at the computer system (e.g., before or after the video communication session is activated)), the computer system (e.g., 600 and/or 601) displays, via the one or more display generation components (e.g., 600*a*, 601*a*, and/or 660), a plurality of display mode elements (e.g., 664 and/or 665) that are selectable for enabling modes for displaying content at an external display (e.g., 660) (e.g., an external monitor or display screen), including: a mirroring element (e.g., 664) (e.g., a selectable user interface element such as an icon, a button, an option, an affordance, and/or a user-interactive graphical user interface object) that is selectable to enable a screen mirroring mode (e.g., a mode in which content that is being displayed at the computer system is concurrently displayed in real time at the external display); and an extended display element (e.g., 665) (e.g., a selectable user interface element (e.g., an icon, a button, an option, an affordance, and/or a user-interactive graphical user interface object)) that is selectable to enable an extended display mode (e.g., a mode in which the external display is used as an extension of the desktop of the computer system). In some embodiments, the computer system displays the plurality of display mode elements in response to detecting a wired connection (e.g., 661) to the external display (e.g., connecting an HDMI cable) or detecting a wireless connection to the external display (e.g., establishing a wireless connection). In some embodiments, the computer system detects a selection of the extended display element and, in response, enables the extended display mode. In some embodiments, the computer system detects a selection (e.g., 605-7 and/or 605-8) of the mirroring element and, in response, enables the screen mirroring mode. In some embodiments, the computer system receives, via the one or more input devices (e.g., 600*a*, 600*b*, 601*a*, 601*b*, 601*c*, and/or 601*d*), a selection input (e.g., 605-7). In response to receiving the selection input, and in accordance with a determination that the selection input includes a selection of the mirroring element (e.g., 664), the computer system displays, via the one or more display generation components (e.g., 600*a*, 601*a*, and/or 660), the set of screen sharing elements for sharing screen content (e.g., 669-1, 671, and/or 672) (e.g., the expanded screen sharing element and the window sharing element), wherein the expanded screen sharing element (e.g., 669-1) is selectable to display expanded content (e.g., 610, 658-1, and 658-2) (e.g., content that is not limited solely to a single application and/or window) at the external display (e.g., 660) (e.g., expanded or full-screen content displayed at the computer system is concurrently displayed at the external display), and wherein the window sharing element (e.g., 671 and/or 672) is selectable to select one or more application windows (e.g., 658-1 and/or 658-2) for display at the external display (e.g., 660) (e.g., one or more application windows are selected for concurrent display at the external display). Displaying the set of screen sharing elements when the selection input includes a selection of the mirroring element, wherein the expanded screen sharing element is selectable to display expanded content at the external display and wherein the window sharing element is selectable to select one or more application windows for display at the external display, provides additional control options for selecting content to mirror at the external display without cluttering the user interface with additional displayed controls.

In some embodiments, while the computer system (e.g., 600 and/or 601) displays the plurality of display mode elements (e.g., 664 and/or 665), the external display (e.g., 660) displays a prompt (e.g., 668) (e.g., while the computer system displays the mirroring element and the extended display element) to select one of the mirroring element or the extended display element that is displayed at the computer system. Displaying a prompt to select one of the mirroring element or the extended display element that is displayed at the computer system provides improved feedback about a state of the computer system and the external display. In some embodiments, the computer system causes the external display to display the prompt to select one of the mirroring element or the extended display element that is displayed at the computer system.

In some embodiments, after the computer system (e.g., 600 and/or 601) receives a selection (e.g., 605-7) of the mirroring element (e.g., 664), the external display (e.g., 660) displays (e.g., while the computer system displays the set of screen sharing elements) a prompt (e.g., 670) to select (e.g., at the computer system) an application window or expanded content for display at the external display. Displaying a prompt to select an application window or expanded content for display at the external display provides improved feedback about a state of the external display and the computer system. In some embodiments, the computer system causes the external display to display the prompt to select an application window or expanded content for display at the external display.

In some embodiments, the computer system (e.g., 600 and/or 601) displays, via the one or more display generation components (e.g., 600*a*, 601*a*, and/or 660), a status interface (e.g., 636) that includes an indication of a display mode (e.g., a mirroring mode or an extended display mode) that is enabled at the external display (e.g., 660) and a representation (e.g., 678) of content that is being displayed at the external display (e.g., a preview of the shared content such as mirrored content or content displayed on the external display while the external display is in the extended display mode). Displaying the status interface that includes an indication of the display mode that is enabled at the external display and a representation of content that is being displayed at the external display provides improved feedback about a state of the computer system and the external display. In some embodiments, the status interface is a menu. In some embodiments, the status interface includes an identification of the external display. In some embodiments, in accordance with a determination that a first display mode (e.g., a mirroring mode) is enabled, the computer system displays the indication of the display mode having a first appearance (e.g., an appearance that indicates the mirroring mode is enabled), and in accordance with a determination that a second display mode different from the first display mode (e.g., an extended display mode) is enabled, the computer system displays the indication of the display mode having a second appearance that is different from the first appearance (e.g., an appearance that indicates the extended display mode is enabled). In some embodiments, the computer system displays (e.g., in the status interface) one or more option elements (e.g., 680*a*, 680*b*, and/or 680*c*) that are selectable to switch between the screen mirroring mode and the extended display mode. Displaying the one or more option elements that are selectable to switch between the screen mirroring mode and the extended display mode reduces the number of inputs needed to switch between the display modes by providing a menu with controls for switching display modes. In some embodiments, the computer system detects a selection of a respective one of the option elements (e.g., 680) and, in response, initiates a process for switching between the screen mirroring mode and the extended display mode. For example, in some embodiments, the option elements include a control (e.g., 680*a*) for changing a window being mirrored at the external display, a control that is selectable to stop mirroring a window at the external display, a control (e.g., 680*a*) for adding a window for mirroring at the external display, a control (e.g., 680*a*) for adding a subset of windows (e.g., add all browser windows) for mirroring at the external display, a control (e.g., 680*b*) to mirror screen content at the external display, a control (e.g., 680*c*) for switching to the extended display mode, and/or a control for switching to the screen mirroring display mode.

In some embodiments, the computer system (e.g., 600 and/or 601) displays the plurality of display mode elements (e.g., 664 and/or 665) in response to detecting a first occurrence of an event (e.g., detection of a wireless connection to the external display or detection of a wired connection (e.g., 661) to the external display). In some embodiments, the computer system detects a subsequent occurrence of the event (e.g., a second occurrence of the event). In some embodiments, in response to detecting the subsequent occurrence of the event, the computer system performs (e.g., conditionally performs), the following steps. In accordance with a determination that the selection input included a selection (e.g., 605-7) of the mirroring element (e.g., 664) (e.g., the mirroring element was selected after detecting the first occurrence of the event), the computer system enables the screen mirroring mode without displaying the plurality of display mode elements (e.g., 664 and/or 665) for enabling modes for displaying content at the external display. In accordance with a determination that the selection input included a selection of the extended display element (e.g., 665) (e.g., the extended display element was selected after detecting the first occurrence of the event), the computer system enables the extended display mode without displaying the plurality of display mode elements (e.g., 664 and/or 665) for enabling modes for displaying content at the external display. Enabling the screen mirroring mode without displaying the plurality of display mode elements when the mirroring element was previously selected, and enabling the extended display mode without displaying the plurality of display mode elements when the extended display element was previously selected, reduces the number of inputs at the computer system by automatically reenabling a previously selected display mode without having to prompt the user to again select from the screen mirroring mode or extended display mode. In some embodiments, the computer system remembers a previous selection of the mirroring element (e.g., 664) or extended display element (e.g., 665) when prompted to share screen content (e.g., upon detecting a subsequent occurrence of the event). In some embodiments, if a user of the computer system previously selected the mirroring element (e.g., 664), the computer system displays the interface (e.g., 669) including elements for selecting the screen (e.g., 669-1) for mirroring at the external display (e.g., 660) or one or more windows (e.g., 671 and/or 672) for mirroring without displaying the mirroring element (e.g., 664) and the extended display element (e.g., 665). If the user previously selected the extended display element (e.g., 665), the computer system enables the extended display mode at the external display without displaying the mirroring element (e.g., 664) and the extended display element (e.g., 665). In some embodiments, the previous selection is remembered on a per-device basis. In some embodiments, if the user quits an application while mirroring a window of the application at the external display, the external display displays a prompt to select a window or entire screen for display (e.g., mirroring) at the external display.

In some embodiments, during the video communication session, the computer system (e.g., 600 and/or 601) displays, via the one or more display generation components (e.g., 600*a*, 601*a*, and/or 660), a background control element (e.g., 621-1) (e.g., a selectable user interface element such as an icon, a button, an option, an affordance, and/or a user-interactive graphical user interface object, that is selectable to initiate a process for enabling or disabling the display of a background (e.g., 624) for a video feed of a representation of a subject participating in the video communication session). In some embodiments, the computer system receives, via the one or more input devices (e.g., 600*a*, 600*b*, 601*a*, 601*b*, 601*c*, and/or 601*d*), a selection (e.g., 607-1) of the background control element. In some embodiments, in response to receiving the selection of the background control element, the computer system performs (e.g., conditionally performs) the following steps. In accordance with a determination that a background option (e.g., 620*a*) has been previously selected for the video communication session, the computer system changes a state of (e.g., toggling, enabling, or disabling) a background display mode for a representation of a video feed (e.g., 612) for the video communication session (e.g., enabling or disabling the display of a background (e.g., 624) for the video feed). In some embodiments, if a background option is currently enabled for the video feed (e.g., as depicted in FIG. 6C), selecting the background control element (e.g., via input 607-2) disables the background display mode for the video feed (e.g., as depicted in FIG. 6D). In some embodiments, if a background option is not enabled for the video feed (e.g., as depicted in FIG. 6A), selecting the background control element (e.g., via input 607-1) initiates a process for enabling display of a background for the video feed (e.g., enabling the background display mode) (e.g., as depicted in FIG. 6B). In some embodiments, the process for enabling display of the background for the video feed includes displaying a menu (e.g., 618) of background options (e.g., 620) that are selectable to choose a respective background for the video feed. In some embodiments, the process for enabling display of the background for the video feed includes enabling a default or previously selected background (e.g., 624) for the video feed without displaying the menu of background options. In accordance with a determination that a background option has not been previously selected for the video communication session (e.g., no background option has been previously selected for the video call), the computer system displays, via the one or more display generation components (e.g., 600*a*, 601*a*, and/or 660), a background option menu (e.g., 618) having a plurality of selectable background options (e.g., 620). Changing a state of the background display mode for the video feed when a background option has been previously selected for the video call and displaying a background option menu having a plurality of selectable background options when a background option has not been previously selected for the video call provides additional control options for enabling a previously selected background option without cluttering the UI with additional displayed controls when a background option has been previously selected for the call. In some embodiments, the computer system enables a default background option (e.g., 620*a*) for the video feed when displaying the background option menu. In some embodiments, the computer system displays the background option menu (e.g., 618) without enabling a background option for the video feed. In some embodiments, displaying the background control element (e.g., 612-1) includes: in accordance with a determination that a background option (e.g., 620*a*) has been previously selected for the video communication session, displaying the background control element having an appearance that includes a preview (e.g., 626) of the previously selected background option. Displaying the background control element having an appearance that includes a preview of a previously selected background option provides improved feedback by indicating an appearance of the previously selected background option and indicating that selection of the background control element will apply the previously selected background option to the background of the video feed. In some embodiments, if a background option has been previously selected, the computer system displays an additional control (e.g., 628) that is separate and distinct from the background control element (e.g., 812-1) and is selectable to display the background option menu (e.g., 618). In some embodiments, the computer system detects a selection of a background option from the background option menu and, in response, updates an appearance of the background control element (e.g., 612-1) to provide a preview of the selected background option. In some embodiments, the computer system applies a selected background to the video feed in response to detecting a selection of a background option (e.g., 620) from the background option menu (e.g., 618).

In some embodiments, while displaying, via the one or more display generation components (e.g., 600*a*, 601*a*, and/or 660), a representation (e.g., 610*a* and/or 682*a*) of first screen content (e.g., 610 and/or 682) (e.g., a shared window only or a shared desktop that includes the shared window) that is being shared from an external computer system (e.g., 600 in FIGS. 6O-6T), the computer system (e.g., 601) receives data corresponding to a request (e.g., 605-9 or 605-10) to display a representation (e.g., 683*a*) of a menu (e.g., 683) of the first screen content that is displayed at the external computer system (e.g., the data indicates that the external computer system has been instructed to display a menu that is included in the screen content being shared with the computer system). In response to receiving the data corresponding to a request to display a representation of the menu of the first screen content that is displayed at the external computer system, the computer system displays the representation (e.g., 610*a* and/or 682*a*) of the first screen content with the representation (e.g., 683*a*) of the menu (e.g., updating display of the representation of the first screen content to include the representation of the menu). In accordance with a determination that the first screen content is (e.g., is limited to) a shared window (e.g., 682) of the external computer system (e.g., a shared window without a desktop of the external computer system), the computer system displays the representation (e.g., 682*a* and/or 683*a*) of the first screen content in a first manner (e.g., a first displayed arrangement and/or appearance) (e.g., as depicted in FIGS. 6R, 6S, and/or 6T). In some embodiments, when the computer system displays the representation (e.g., 682*a*) of the first screen content in the first manner, the computer system does not move the location or size of the representation (e.g., 682*a*) of the first screen content when displaying the representation (e.g., 683*a*) of the menu (e.g., as depicted in FIG. 6S and/or FIG. 6T). In some embodiments, when the computer system displays the representation of the first screen content in the first manner, the computer system moves the location and/or size of the representation of the first screen content when displaying the representation of the menu (e.g., as depicted in FIG. 6R). In accordance with a determination that the first screen content is a shared desktop (e.g., 610) of the external computer system (e.g., a shared desktop (e.g., 610) of the external computer system that includes the shared window (e.g., 682)), the computer system displays the representation (e.g., 682*a* and/or 683*a*) of the first screen content in a second manner that is different from the first manner (e.g., a second displayed arrangement and/or appearance that is different from the first displayed arrangement and/or appearance) (e.g., as depicted in FIG. 6P). Displaying the representation of the first screen content in the first manner or the second manner depending on whether the first screen content is a shared window or a shared desktop of the external computer system performs an operation for arranging the display of the representation of the first screen content to include the representation of the menu when a set of conditions has been met without requiring further user input. In some embodiments, when the computer system displays the representation (e.g., 610*a*, 682*a*, and 683*a*) of the first screen content in the second manner, the computer system does not move the location or size of the representation of the first screen content when displaying the representation of the menu. In some embodiments, the external computer system displays the first screen content (e.g., 610, 682, and/or 683) in the second manner (e.g., when the first screen content is a shared window of the external computer system and when the first screen content is a shared desktop of the external computer system). In some embodiments, when the computer system displays the representation of the first screen content in the second manner, the computer system displays the representation of the first screen content with the representation of the menu having the same appearance and arrangement as the first screen content and the menu displayed at the external computer system.

In some embodiments, displaying the representation (e.g., 682*a* and 683*a*) of the first screen content in the first manner includes one or more of: reducing a displayed size of the first screen content (e.g., scaling down the displayed representation of the shared window and menu so that the shared window and menu fit within a display window of the computer system) (e.g., as depicted in FIG. 6R); displaying the representation (e.g., 683*a*) of the menu having a position relative to the representation (e.g., 682*a*) of the shared window (e.g., as depicted in FIG. 6S) that is different from a position of the menu (e.g., 683) relative to the shared window (e.g., 682) as displayed at the external computer system (e.g., as depicted in FIG. 6S) (e.g., moving the displayed location of the representation of the menu, so that the representation of the menu fits within a display window of the computer system); displaying the representation (e.g., 683*a*) of the menu having a truncated state (e.g., as depicted in FIG. 6S) relative to a state of the menu (e.g., 683) at the external computer system (e.g., as depicted in FIG. 6S) (e.g., items in the menu are omitted from the representation of the menu so that the representation of the menu fits within a display window of the computer system); or increasing a size of a display window (e.g., 640) (e.g., extending the display window vertically and/or horizontally) of the computer system (e.g., a window that includes the first screen content being shared from the external computer system) to include the representation (e.g., 682*a* and 683*a*) of the first screen content with the representation of the menu (e.g., as depicted in FIG. 6T). In some embodiments, displaying the representation of the menu having the truncated state includes displaying the representation (e.g., 683*a*) of the menu with a graphical element (e.g., 685) that is selectable to display menu items (e.g., 684-11*a* and 684-12*a*) that were omitted from the menu in the truncated state (e.g., menu items (e.g., 684-11 and 684-12) that are included in the menu at the external computer system). In some embodiments, the computer system displays the representation of the menu having the truncated state (e.g., instead of increasing the size of the display window of the computer system) based on a determination of whether the display window can be increased in size to accommodate the display of the menu in the non-truncated state. For example, if the display window (e.g., 640) is displayed at a location of the computer system display (e.g., 601*a*) that does not permit extending the display window to include the representation of the menu (e.g., the display window is positioned in a top right corner of the display of the computer system such that the display does not include enough space to extend the display window and the non-truncated state of the menu would extend above the shared window), the computer system truncates the representation of the menu instead of extending the display window.

Note that details of the processes described above with respect to method 700 (e.g., FIG. 7) are also applicable in an analogous manner to the methods described below. For example, methods 900, 1100, and/or 1300 optionally includes one or more of the characteristics of the various methods described above with reference to method 700. For example, one or more aspects of the user interfaces for selecting screen content for sharing can be used in connection with the embodiments described in one or more of these methods. For brevity, these details are not repeated below.

FIGS. 8A-8M illustrate exemplary user interfaces for requesting a computer system to share screen content, in accordance with some embodiments. The user interfaces in these figures are used to illustrate the processes described below, including the processes in FIG. 9.

FIGS. 8A-8M illustrate exemplary systems or devices for participating in screen-sharing sessions, in accordance with some embodiments. Specifically, these systems or devices include John's device 800 and Emily's device 801, which are shown concurrently in some figures to illustrate concurrent states of the respective devices, including the user interfaces and inputs at the respective devices. In the embodiments provided herein, John's device can be described as performing a set of functions (e.g., functions associated with the screen-sharing session or other functions described herein), and Emily's device can be described as performing a different set of functions (e.g., a different set of functions associated with the screen-sharing session or other functions described herein). These descriptions are not intended to limit the functions performed by the respective devices, but rather, are provided to illustrate various aspects of the embodiments described herein. Thus, unless specified otherwise, the functions that are described as being performed using John's device are similarly capable of being performed using Emily's device. Likewise, the functions that are described as being performed by Emily's device are similarly capable of being performed by John's device, unless specified otherwise.

Figure 8A:
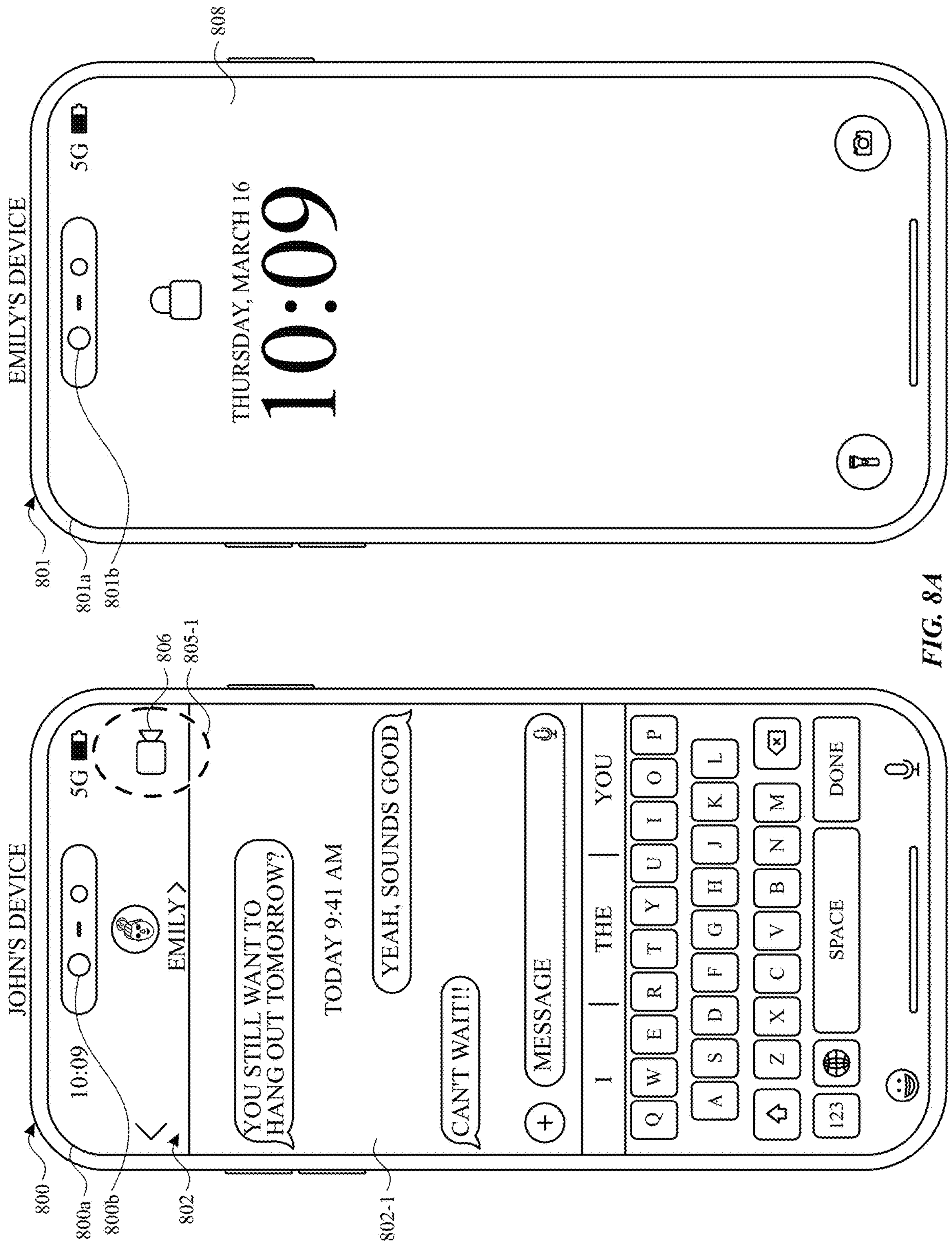
FIGS. 8A-8M illustrate exemplary user interfaces for requesting a computer system to share screen content, in accordance with some embodiments.

FIG. 8A depicts John's device 800 and Emily's device 801. John's device 800 is a computer system that, in some embodiments, is comprised of touch-sensitive display 800*a*, camera 800*b*, and other hardware such as processors, memory, and other components for operating John's device

800. In the embodiment depicted in FIG. 8A, John's device 800 is a smartphone; however, John's device can be a different type of computer system such as a desktop computer, tablet computer, smartwatch, laptop computer, or a head-mounted device. In some embodiments, John's device 800 includes one or more elements of devices 100, 300, 500, and/or 600. Emily's device 801 is a computer system that, in some embodiments, is comprised of touch-sensitive display 801*a*, camera 801*b*, and other hardware such as processors, memory, and other components for operating Emily's device 801. In the embodiment depicted in FIG. 8A, Emily's device 801 is a smartphone; however, Emily's device can be a different type of computer system such as a laptop computer, tablet computer, smartwatch, desktop computer, or a head-mounted device. In some embodiments, Emily's device 801 includes one or more elements of devices 100, 300, 500, and/or 601.

In FIG. 8A, John's device 800 displays, via display 800*a*, interface 802, which is a messages interface that includes a message conversation region 802-1 showing a message conversation with Emily. The messages interface includes other elements such as a message compose region, keyboard, recipient information, and communications element 806, which is selectable to display different options for communicating with Emily. Emily's device 801 displays, via display 801*a*, interface 808, which is a lock screen interface. The lock screen interface indicates that Emily's device is in a locked state. In FIG. 8A, John's device 800 and Emily's device 801 are not in communication with each other via a shared-content session or other live communication session such as a phone call or video call.

Figure 8B:
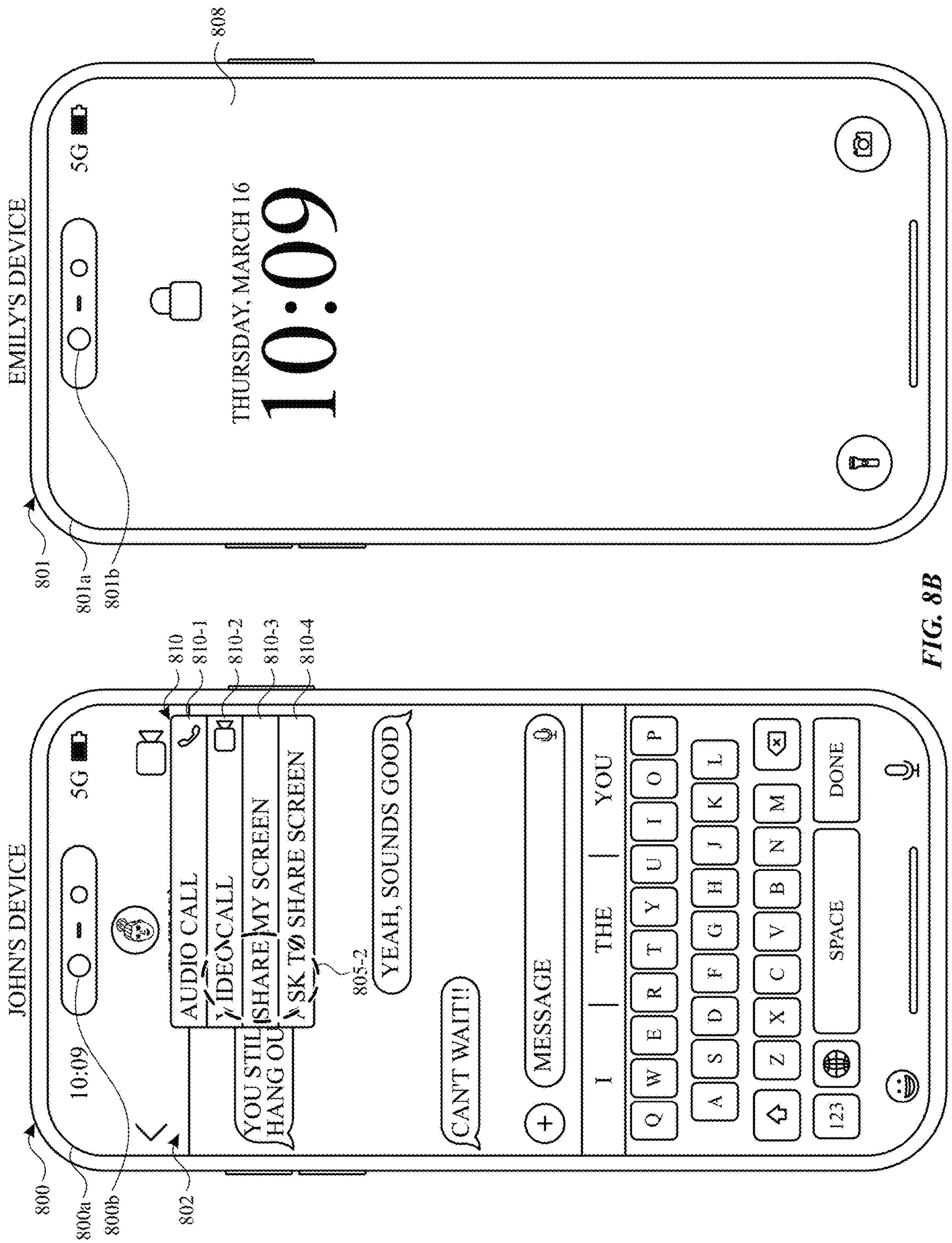

In FIG. 8A, John's device 800 detects input 805-1 selecting communications element 806 and, in response, displays communication options menu 810, as depicted in FIG. 8B. Communication options menu 810 includes different options for contacting Emily. Audio call option 810-1 can be selected to initiate an audio call with Emily's device 801. Video call option 810-2 can be selected to initiate a video call with Emily's device 801. Option 810-3 is a "share my screen" option that can be selected to initiate a process for sharing screen content of John's device 800 with Emily's device 801. Option 810-4 is an "ask to share screen" option that can be selected to initiate a process for requesting Emily's device 801 to share its screen content with John's device 800. In some embodiments, option 810-3 and option 810-4 can be accessed from a contact card for Emily (e.g., a user interface that includes contact information for Emily). In some embodiments, option 810-3 and option 810-4 can be accessed from a share sheet interface that is displayed in response to a request to share respective content with other users.

FIGS. 8B-8F depict example user interfaces for embodiments in which John's device 800 initiates the sharing of screen content with Emily's device 801. In FIG. 8B, John's device 800 detects input 805-2 selecting option 810-3. In response to input 805-2, John's device initiates a live communication session with Emily's device 801. In the embodiment depicted in FIG. 8C, John's device 800 initiates an audio call with Emily's device 801. In some embodiments, the live communication session can be a video call. In some embodiments, if a call is already established with Emily's device 801 when option 810-3 is selected, Emily's device 801 is immediately prompted to view shared screen content from John's device in a manner similar to that described below with respect to FIG. 8D.

Figure 8C:
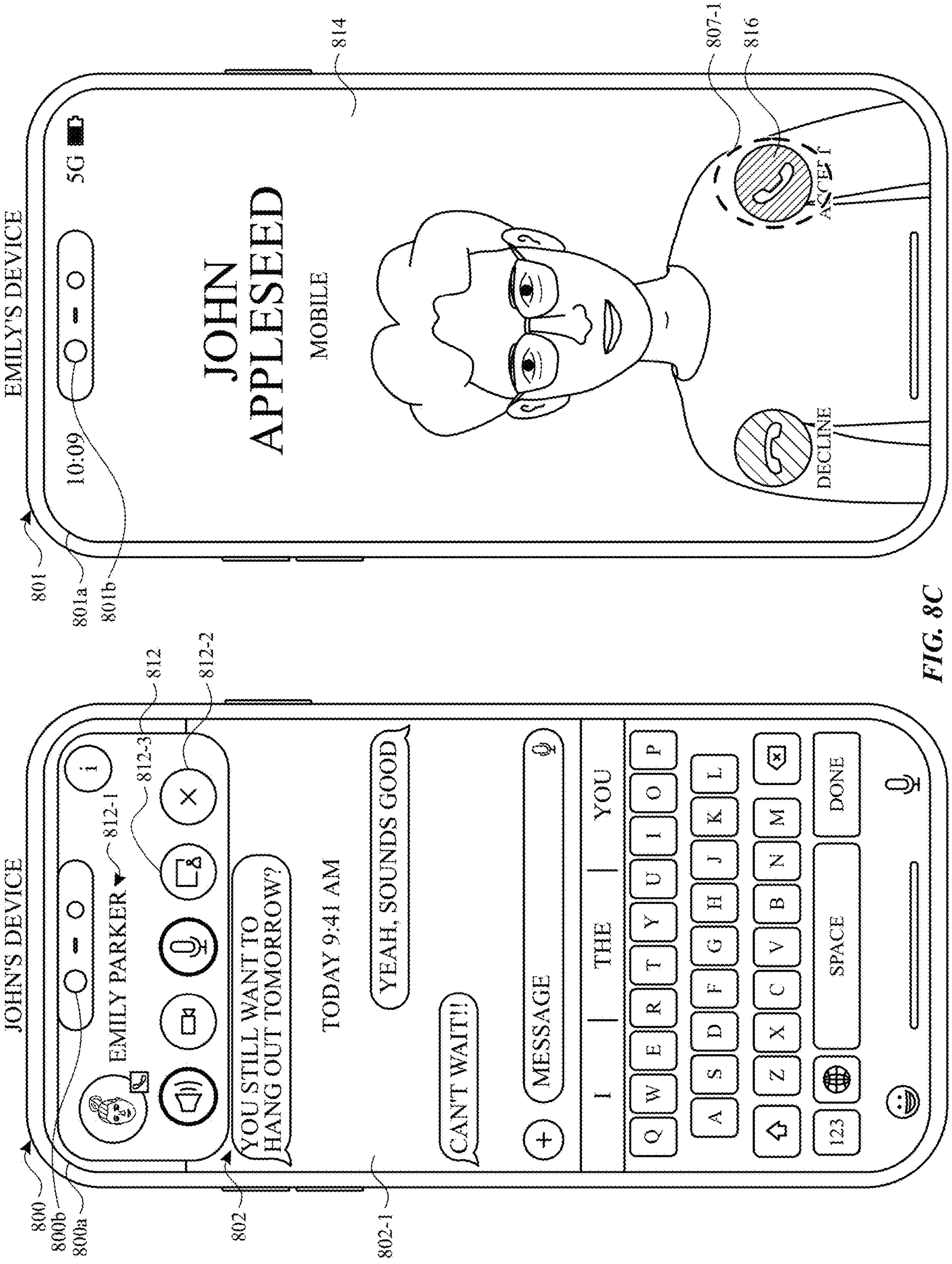

As shown in FIG. 8C, Emily's device 801 displays incoming call interface 814 indicating that John is calling her. Incoming call interface 814 includes a decline option and accept option 816. As shown in FIG. 8C, Emily accepts the incoming call by selecting accept option 816 via input 807-1. In response to detecting input 807-1, Emily's device 801 accepts the incoming call from John's device 800, and the call is established between the two devices. While the call is being made, John's device 800 displays control region 812, which provides controls for a communication session that is active (e.g., or being established) at John's device 800. John's device 800 dynamically updates the appearance of control region 812 based on the status of John's device and/or the communication session. In FIG. 8C, John's device 800 displays control region 812 with status region 812-1, end control 812-2, and share control 812-3, as well as other controls for the communication session such as controls for muting/unmuting an audio feed, enabling/disabling a camera feed, and muting/unmuting a microphone. Status region 812-1 includes text and/or graphics that are updated dynamically to indicate status information related to the communication session. For example, in FIG. 8C, status region 812-1 indicates that a call is being established (e.g., pending) with Emily. End control 812-2 can be selected to end the communication session and share control 812-3 can be selected to initiate or terminate the sharing of respective content during the communication session. In some embodiments, option 810-3 and/or option 810-4 is displayed in response to selecting share control 812-3. In some embodiments, when content is being shared in the communication session, the communication session is referred to as a shared-content session.

Figure 8D:
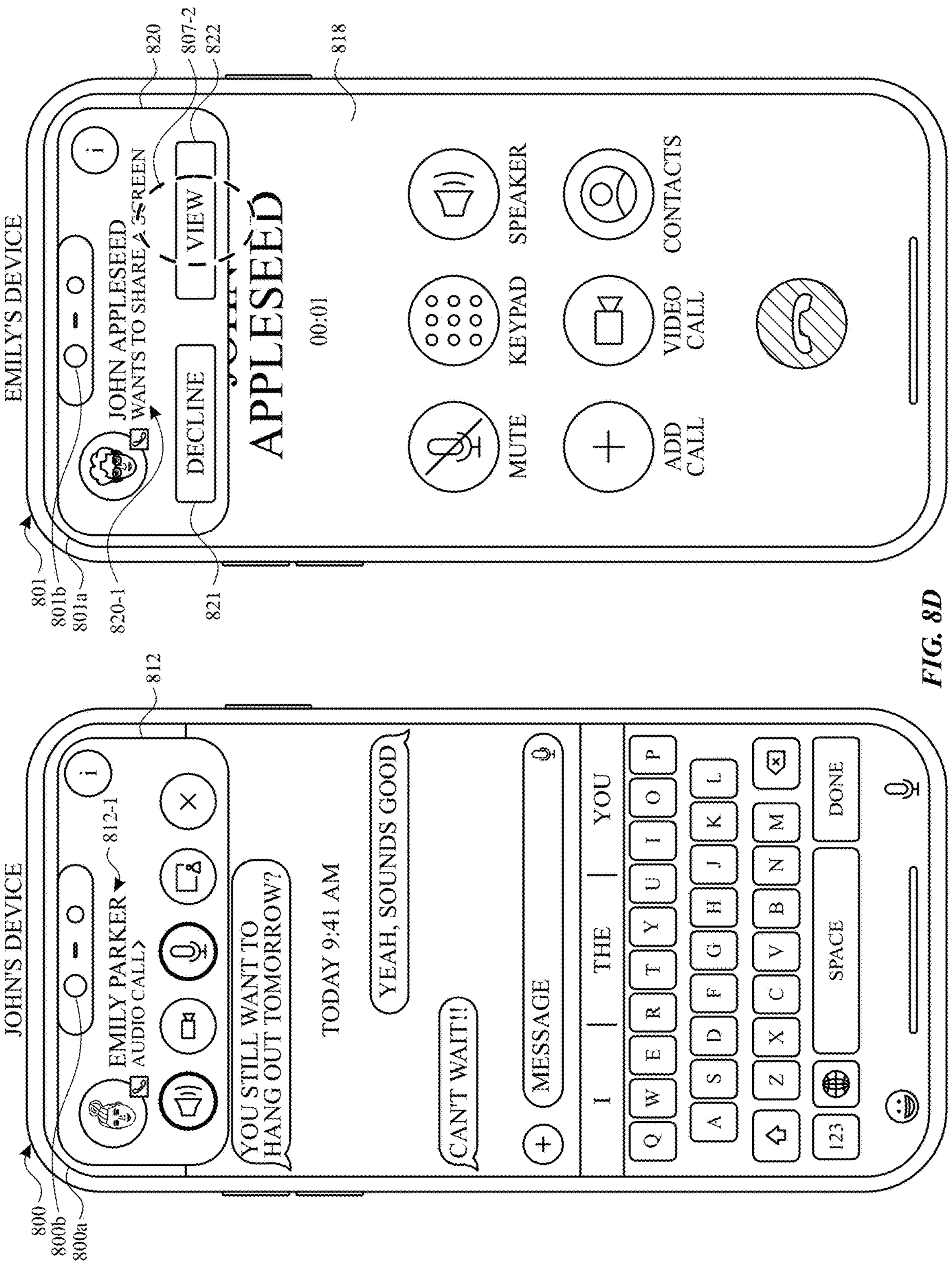

In FIG. 8D, the audio call is established (e.g., connected) between John's device 800 and Emily's device 801 (e.g., as indicated by status region 812-1 on John's device 800 and the display of call interface 818 at Emily's device 801). Although the call is connected between John's device 800 and Emily's device 801, John's device is not yet sharing screen content with Emily's device. Emily's device 801 displays control region 820 (e.g., similar to control region 812), which provides controls for a communication session that is active (e.g., or being established) at Emily's device 801. Emily's device 801 dynamically updates the appearance of control region 820 based on the status of Emily's device and/or the communication session. As depicted in FIG. 8D, in response to receiving the request from John's device 800 to view John's screen content, Emily's device 801 displays control region 820 with status region 820-1, decline option 821, and view option 822. Status region 820-1 includes text and/or graphics that are updated dynamically to indicate status information related to the communication session. For example, in FIG. 8D, status region 820-1 indicates that John wants to share screen content from John's device 800. Decline option 821 can be selected to decline the request to view John's screen content and view option 822 can be selected to accept the request. In FIG. 8D, Emily's device 801 detects input 807-2 selecting view option 822.

Figure 8E:
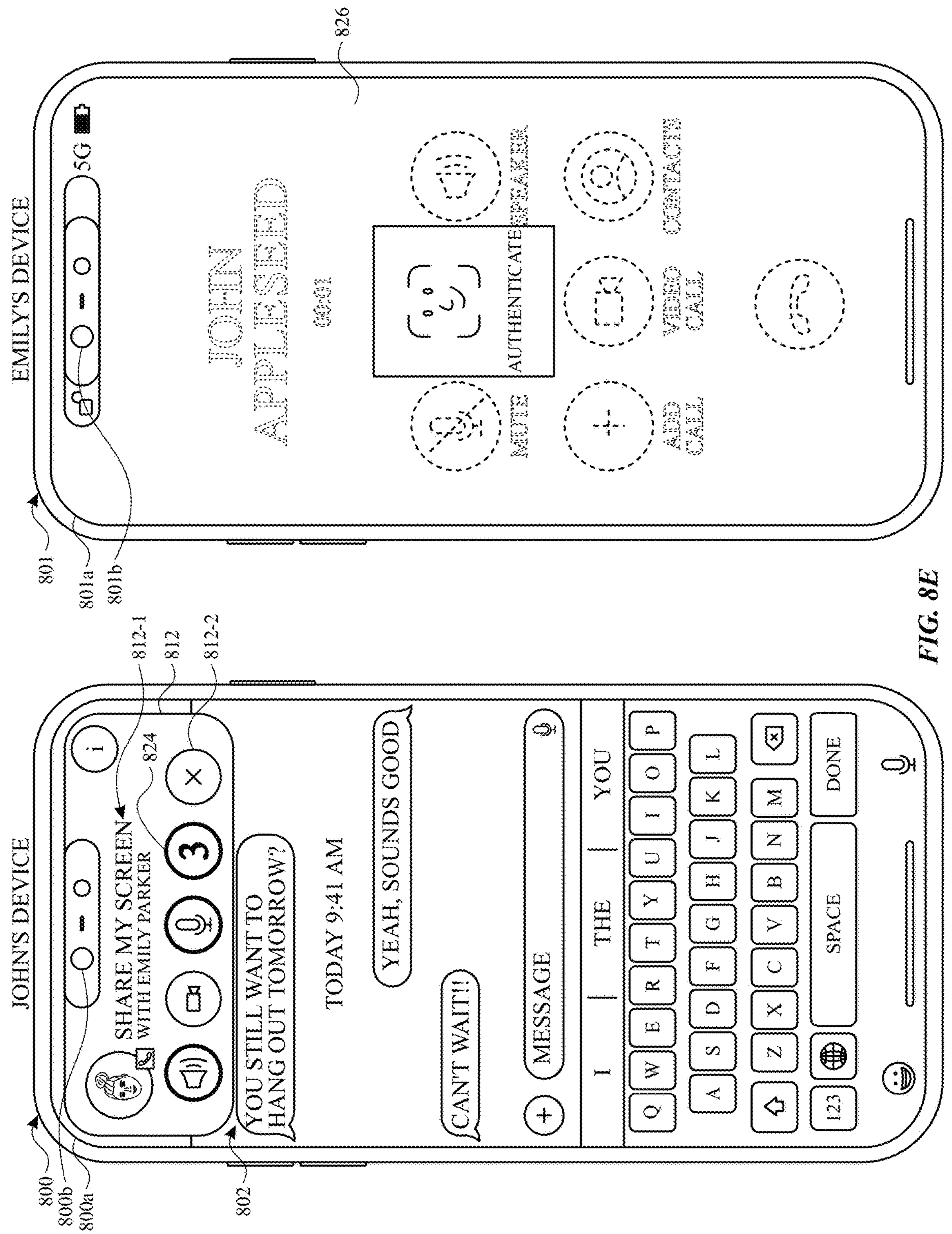

FIG. 8E depicts John's device 800 and Emily's device 801 after Emily's device detects input 807-2 selecting view option 822. Because Emily's device 801 was in a locked state when the selection of view option 822 was detected, Emily's device 801 performs an authentication operation to authenticate the user of Emily's device 801, as indicated by the display of authentication interface 826 in FIG. 8E. Because Emily's device 801 accepted the request to view John's shared screen content, John's device 800 begins the process of sharing screen content with Emily's device 801. In some embodiments, John's device 800 begins the process of sharing screen content after the user of Emily's device 801 is successfully authenticated. As shown in FIG. 8E, John's device 800 updates control region 812 to indicate that John will be sharing his screen with Emily, as indicated by status region 812-1 and countdown timer 824. When the countdown timer expires, John's device 800 will automatically begin sharing the screen content with Emily's device 801. In some embodiments, John can cancel the screen sharing process before sharing the screen content, for example, by selecting end control 812-2.

Figure 8F:
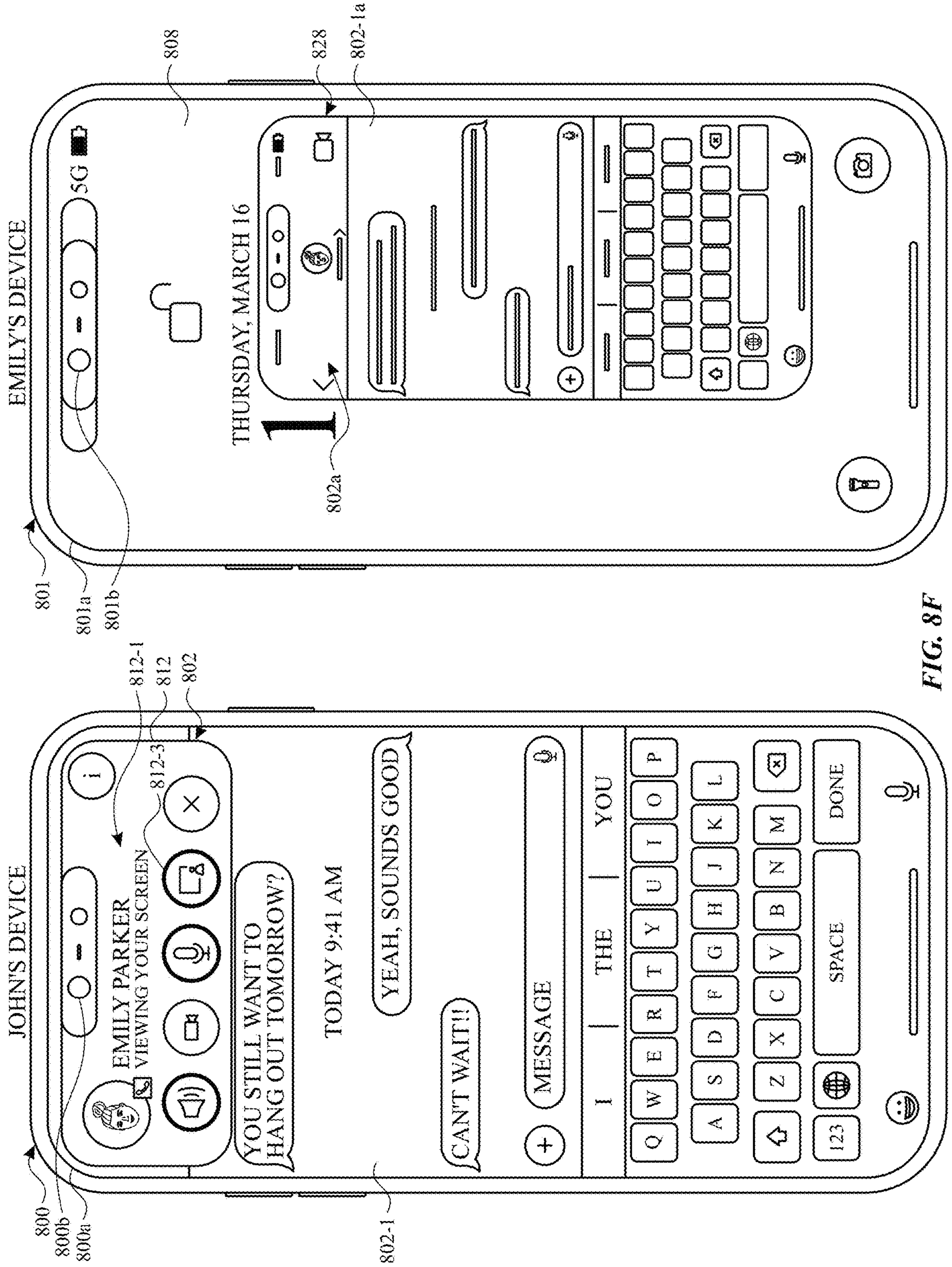

At the end of the countdown, John's device 800 begins sharing screen content, as depicted in FIG. 8F. Specifically, John's device 800 is sharing interface 802 with Emily's device 801 in a shared-content session. John's device 800 updates control region 812 to indicate that Emily is viewing John's shared screen. In some embodiments, selecting share control 812-3 ends the sharing of screen content while keeping the live communication (e.g., audio call) active with Emily's device 801. In some embodiments, selecting end control 812-2 causes John's device 800 to terminate the live communication session (e.g., including the shared-content session) with Emily's device 801. Emily's device 801 displays window 828 overlaid on interface 808. Window 828 includes a representation of screen content that is being shared with Emily's device 801. As shown in FIG. 8F, Emily's device 801 displays, in window 828, representation 802*a* of John's messaging interface 802, including content displayed in interface 802 such as representation 802-1*a* of message conversation region 802-1.

Figure 8G:
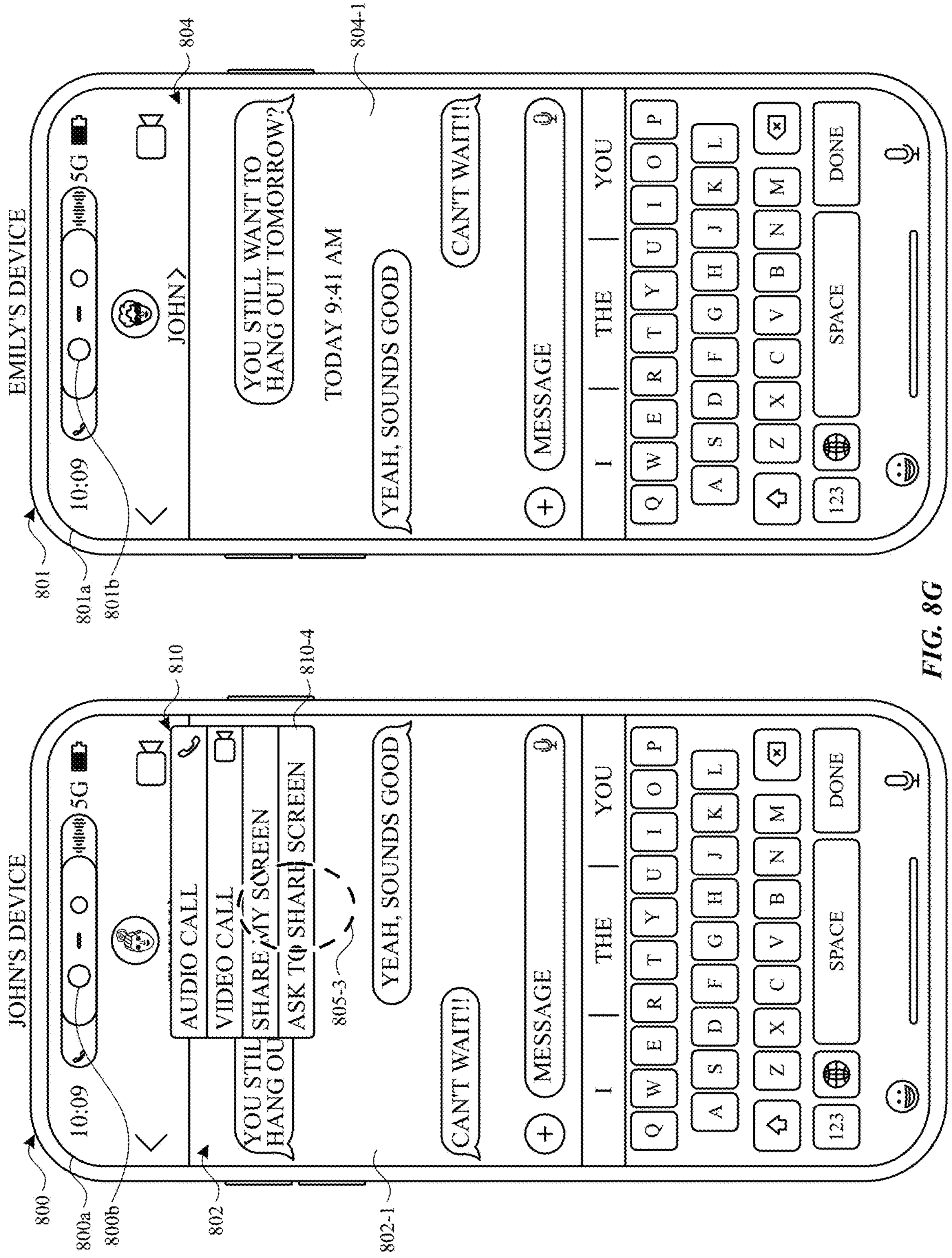
Figure 8H:
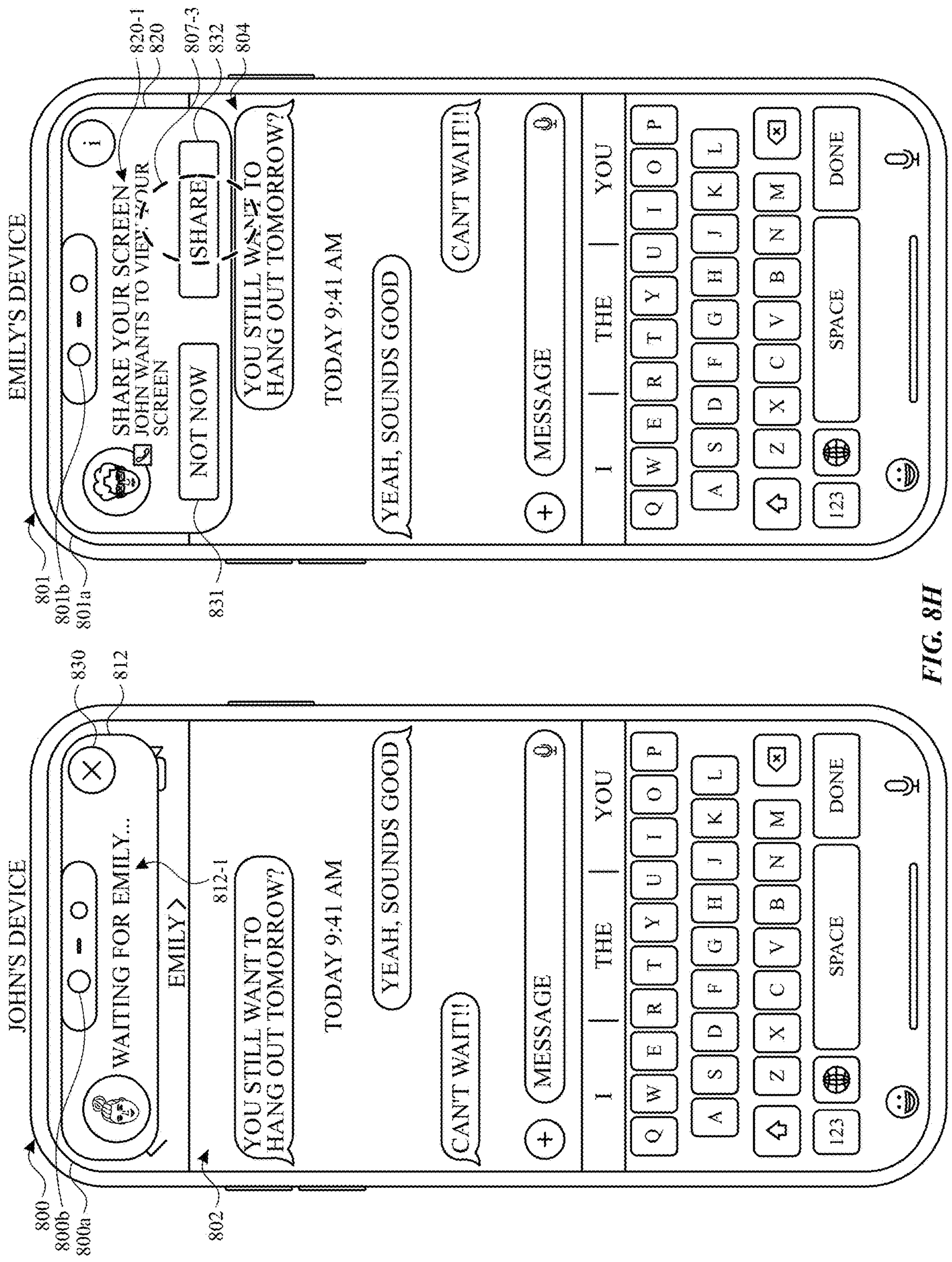
Figure 8I:
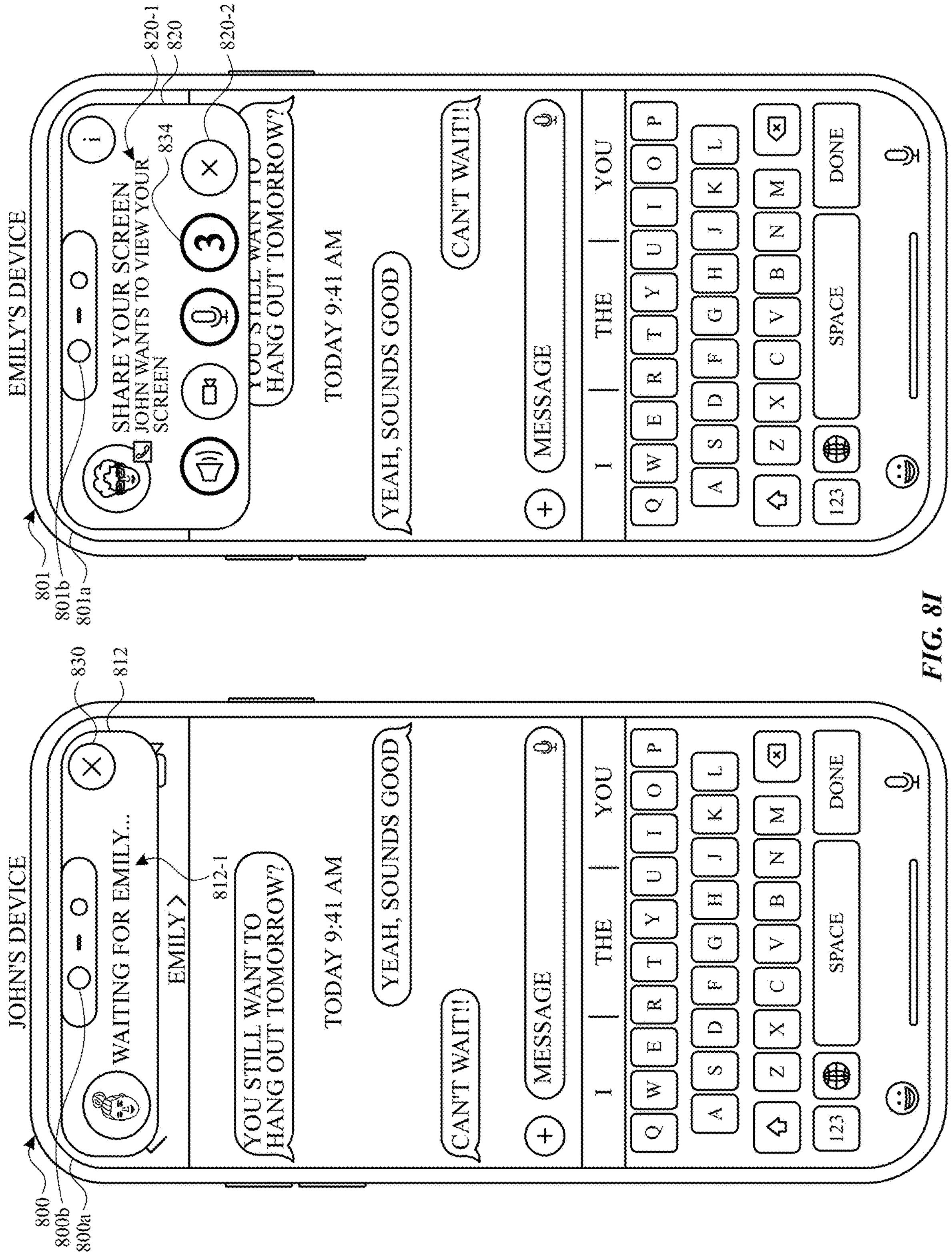
Figure 8J:
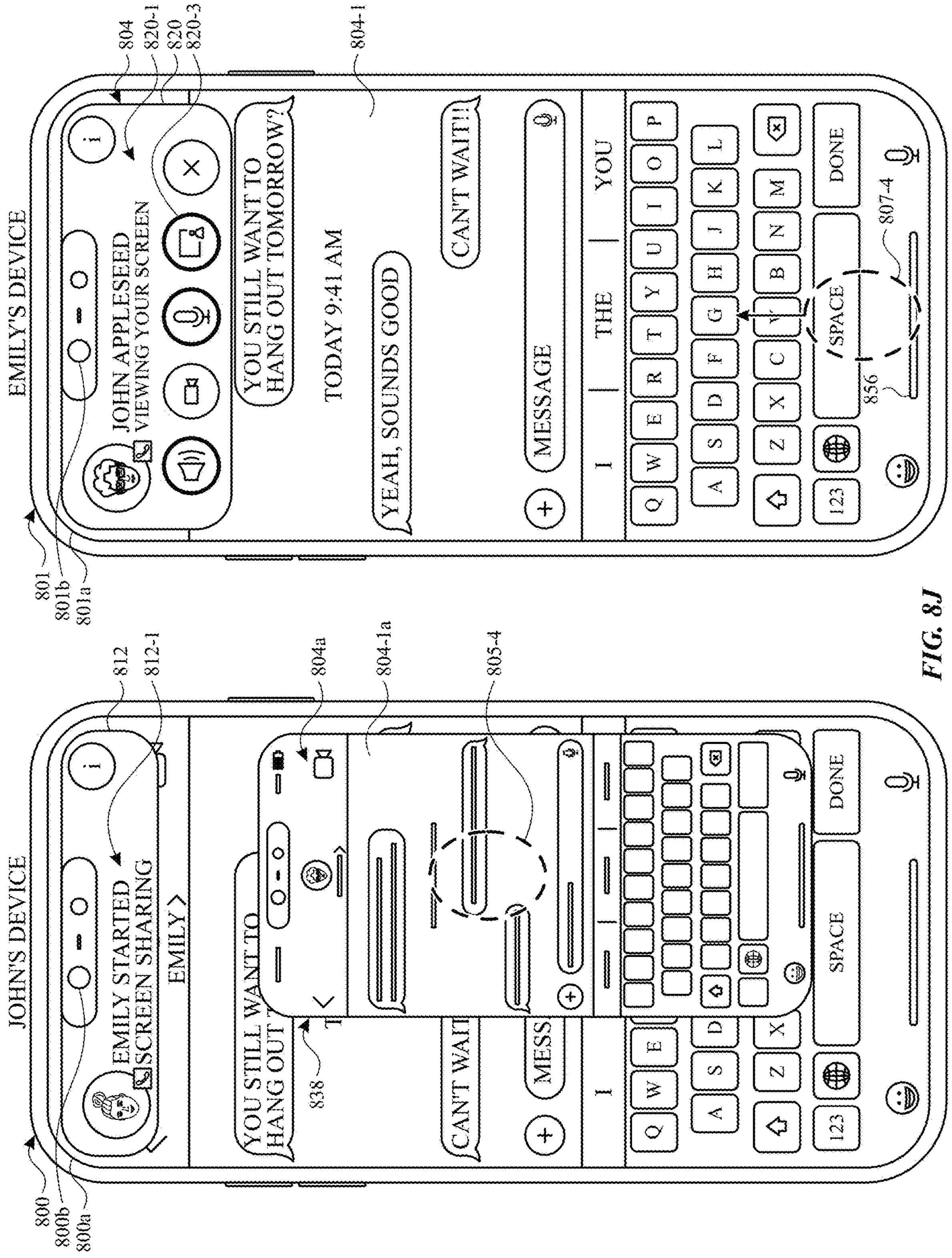
Figure 8K:
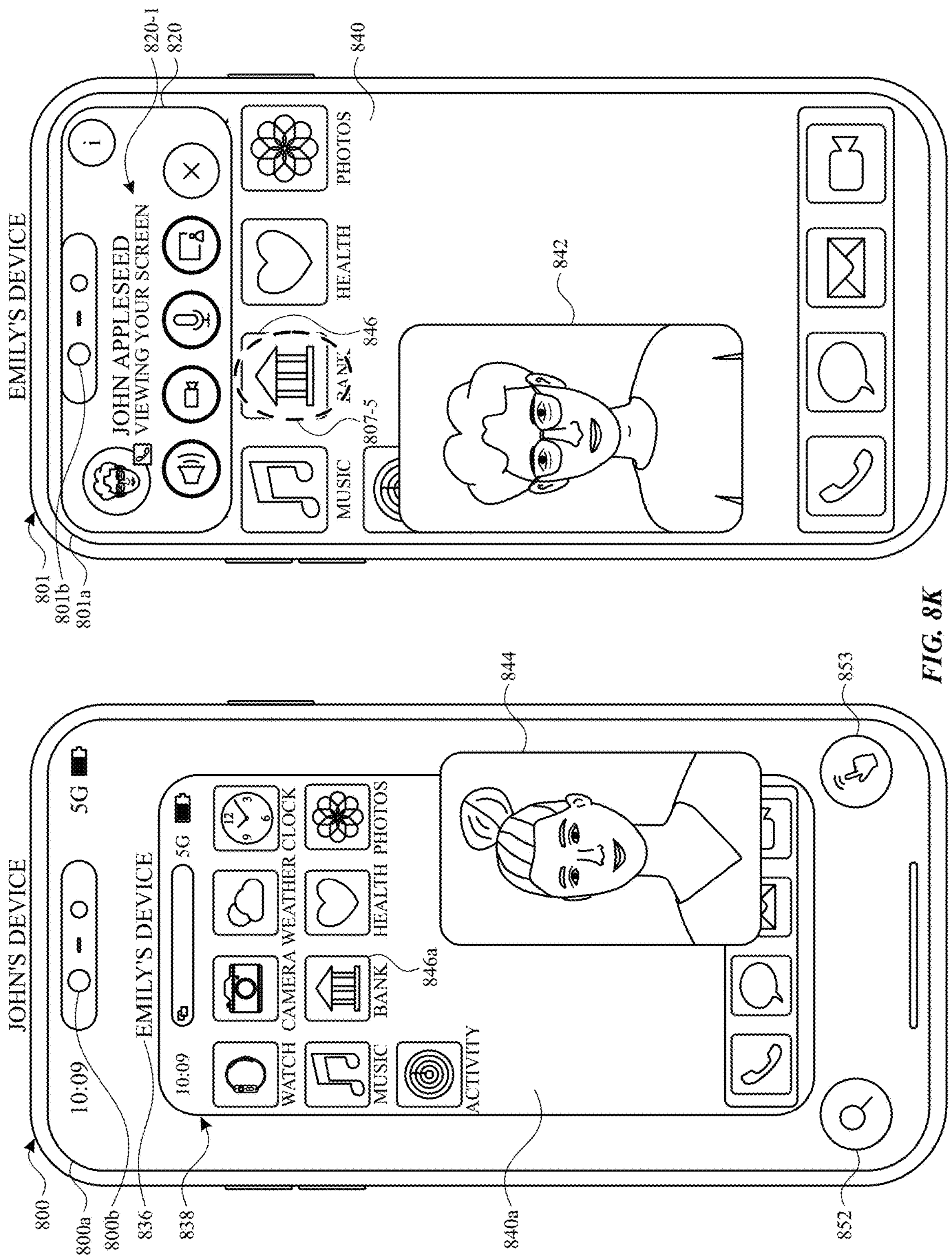

FIGS. 8G-8M depict example user interfaces for embodiments in which John's device 800 requests Emily's device 801 to share the screen content of Emily's device 801 with John's device 800. In FIG. 8G, an audio call is connected between John's device 800 and Emily's device 801. John's device 800 displays interface 802 and communication options menu 810, similar to as shown in FIG. 8B. Emily's device 801 displays interface 804, which is a messages interface similar to interface 802. Interface 804 includes message conversation region 804-1 showing a message conversation with John. The messages interface includes other elements such as a message compose region, keyboard, recipient information, and a communications element (e.g., similar to communications element 806) that is selectable to display different options for communicating with John (e.g., similar to communication options menu 810). In some embodiments, a video call is connected between John's device 800 and Emily's device 801. In such embodiments, the user interfaces depicted herein can include video feeds of the respective devices (e.g., as depicted in FIG. 8K).

In FIG. 8G, John's device 800 detects input 805-3 selecting option 810-4. In response to input 805-3, John's device requests Emily's device 801 to share screen content with John's device 800. If a call is not already established with Emily's device 801, John's device 800 initiates a call with Emily's device 801 in a manner similar to that described above in response to input 805-2 selecting option 810-3. As shown in FIG. 8H, John's device 800 displays control region 812 with status region 812-1 indicating that John's device is waiting for Emily to approve the request to share her screen. Control region 812 includes end option 830, which can be selected to cancel the request for Emily to share her screen. Emily's device 801 displays control region 820 with status region 820-1 indicating that John wants Emily to share her screen with him. In FIG. 8H, control region 820 is prompting Emily to share her screen content with John's device 800. Control region 820 includes decline option 831 and share option 832. Decline option 831 can be selected to decline John's request for Emily to share her screen and share option 832 can be selected to accept John's request for Emily to share her screen. In the embodiment depicted in FIG. 8H, Emily's device 801 detects input 807-3 selecting share option 832 and, in response, begins the process for sharing screen content from Emily's device 801 as shown in FIG. 8I. In some embodiments, if a call is not already established with John's device 800, Emily's device 801 displays an incoming call interface with an option to accept the call, similar to that described above, before displaying decline option 831 and share option 832.

Before Emily's device 801 begins sharing the screen content, Emily's device 801 updates control region 820 to include countdown timer 834 (e.g., similar to countdown timer 824) and controls for the communication session with John's device 800. Emily can cancel the process for sharing her screen with John by selecting end control 820-2 (e.g., similar to end control 812-2). When the countdown timer expires, Emily's device 801 automatically begins sharing screen content with John's device 800, as shown in FIG. 8J.

In FIG. 8J, Emily's device 801 is sharing screen content with John's device 800. John's device 800 displays window 838 overlaid on interface 802. Window 838 includes a representation of screen content that is being shared with John's device 800. As shown in FIG. 8J, John's device 800 displays, in window 838, representation 804*a* of Emily's messaging interface 804, including content displayed in interface 804 such as representation 804-1*a* of message conversation region 804-1. John's device 800 also updates control region 812 to indicate that Emily has started sharing her screen. Emily's device 801 updates control region 820 to indicate that Emily is sharing her screen with John's device 800. In some embodiments, selecting share control 820-3 ends the sharing of screen content while keeping the live communication (e.g., audio call) active with John's device 800. In some embodiments, selecting end control 820-2 causes Emily's device 801 to terminate the live communication session (e.g., including the shared-content session) with John's device 800. In FIG. 8J, John's device 800 detects input 805-4 selecting window 838. In some embodiments, selecting window 838 causes the window to be displayed in a different display mode (e.g., a larger displayed state as shown in FIG. 8K). Emily's device 801 detects input 807-4, which is an input located at element 856 and including a gesture for causing Emily's device to display a home screen interface (e.g., shown in FIG. 8K).

Figure 8L:
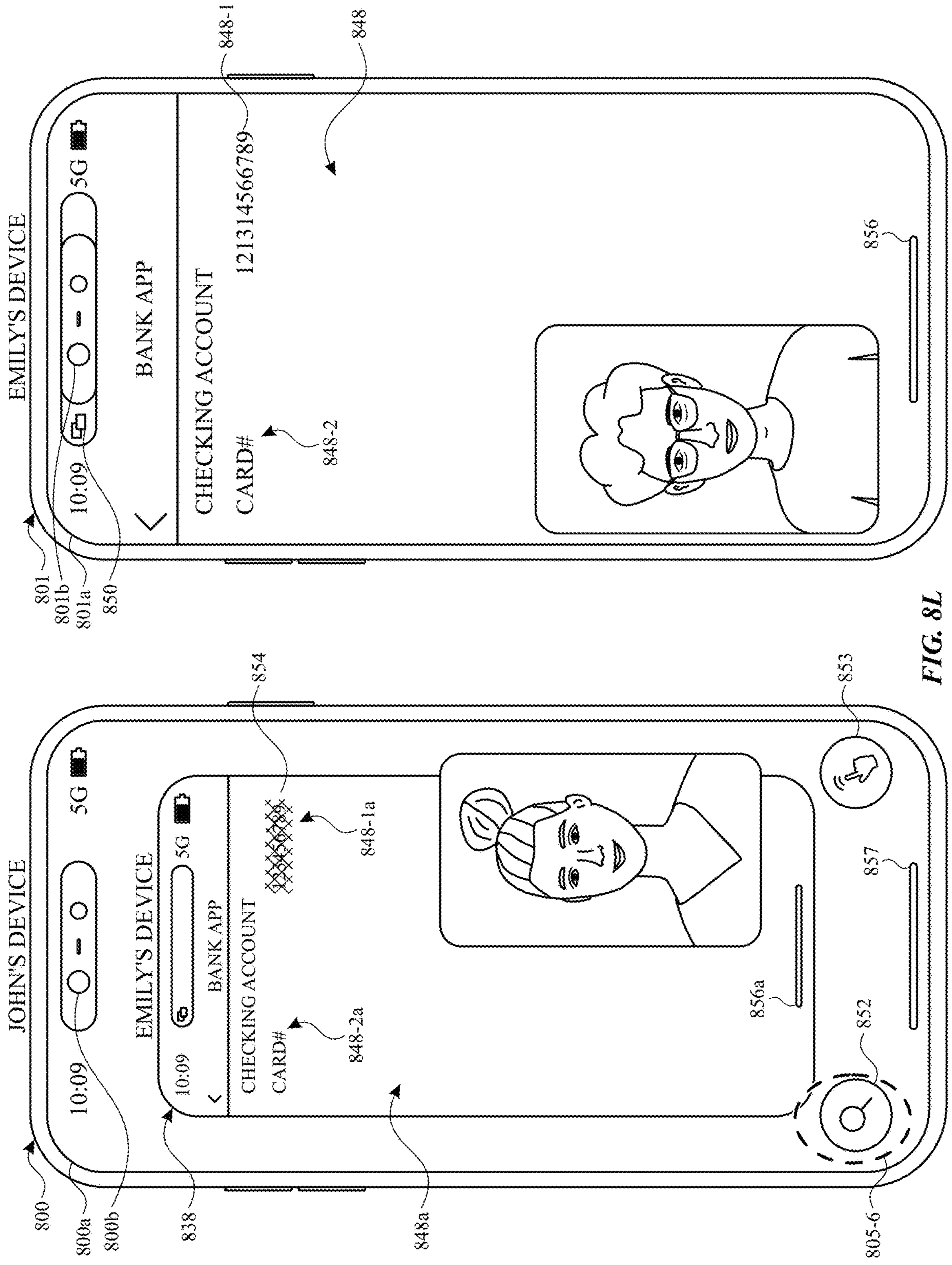

Referring now to FIG. 8K, a video feed has been established between John's device 800 and Emily's device 801 (e.g., in response to a selection of a video control from control region 812 or control region 820). Accordingly, John's device 800 displays video feed 844, which is a representation of the video feed from Emily's device 801. Similarly, Emily's device 801 displays video feed 842, which is a representation of the video feed from John's device 800. In FIG. 8K, Emily's device 801 displays home screen interface 840 (e.g., in response to detecting input 807-4), which includes various application icons, including icon 846 corresponding to a banking application at Emily's device 801. John's device 800 displays (e.g., in response to input 805-4) window 838 in an expanded display state. When window 838 is displayed in the expanded display state, John's device displays additional information and controls related to the screen sharing. For example, John's device displays zoom control 852, screen control element 853, and status text 836. Zoom control 852 can be selected to adjust a zoom level of John's view of the shared content. Screen control element 853 can be selected to request control of the screen content at Emily's device 801 (e.g., described in greater detail with respect to the embodiments in FIGS. 10A-10T and 11). Status text 836 provides information about the shared screen content. For example, in FIG. 8K, status text 836 indicates that window 838 represents screen content from Emily's device 801. Because Emily navigated from messages interface 804 to home screen interface 840, the screen content displayed at John's device 800 is updated accordingly. Therefore, John's device 800 displays window 838 with representation 840*a* of Emily's home screen interface 840. Representation 840*a* also includes representation 846*a* of the banking application icon 846 that is displayed at Emily's device 801. In FIG. 8K, Emily's device 801 detects input 807-5 selecting banking application icon 846 and, in response, displays bank account interface 848, as shown in FIG. 8L. Because Emily's device 801 is sharing screen content with John's device 800, John's device 800 updates window 838 to show representation 848*a* of the bank account interface 848 shared by Emily's device 801.

In some embodiments, a device can hide or obscure sensitive information that is included with shared screen content. For example, in FIG. 8L, Emily's device 801 is sharing bank account interface 848 with John's device 800. Bank account interface 848 includes non-sensitive account information such as text 848-2 and sensitive account information such as card number 848-1. Emily's device 801 displays bank account interface 848 with card number 848-1 and text 848-2 having an unobscured appearance at Emily's device. However, John's device 800 displays representation 848*a* of the bank account interface with the sensitive information hidden or visually obstructed so that the sensitive information is not shared with John. As shown in FIG. 8L, John's device 800 displays representation 848-2*a* of the non-sensitive account information having an unobstructed appearance and displays representation 848-1*a* of the sensitive account information (e.g., card number 848-1) having a visually obstructed appearance as indicated by hatching 854. In some embodiments, the sensitive account information can be blurred, redacted, or otherwise hidden so that the viewer of the shared screen content cannot view Emily's sensitive information. In the embodiment depicted in FIG. 8L, the sensitive information includes the account number, however the sensitive information can include other information such as account balances, vendor identification information, transaction amounts, or the like.

In some embodiments, control region 812 and control region 820 can be hidden from the displayed user interface. For example, the control regions are not displayed on John's device 800 or Emily's device 801 in FIG. 8L. In some embodiments, when the control region is hidden, other graphical indicators can be provided to indicate that the user is sharing screen content. For example, in FIG. 8L, Emily's device displays glyph 850 to indicate to the user of Emily's device 801 that the device is sharing screen content. In some embodiments, the control regions are hidden after a predetermined amount of time. For example, in FIG. 8L, Emily's device 801 automatically hides control region 820 after a predetermined amount of time after opening the banking application. In some embodiments, the control regions remain displayed for the embodiments depicted in FIGS. 8L and 8M.

In some embodiments, the shared screen content is displayed having a smaller size than the size of the user interface of the device that is displaying the shared content. For example, in FIG. 8L, John's device 800 displays window 838 having a smaller size than display 800*a*. By displaying the expanded window 838 having this slightly smaller size, John's device 800 provides a visual distinction between element 857 (e.g., similar to element 856) at John's device and the representation of Emily's element 856 that is displayed in window 838 as representation 856*a*. The visual distinction provides feedback to the user of John's device 800 to indicate which element corresponds to Emily's device 801 and which element corresponds to John's device 800. Displaying window 838 having the slightly smaller size also enables John's device 800 to display additional controls and information (e.g., text 836 and controls 852 and 853) related to screen sharing without obstructing the display of the shared content in window 838.

Figure 8M:
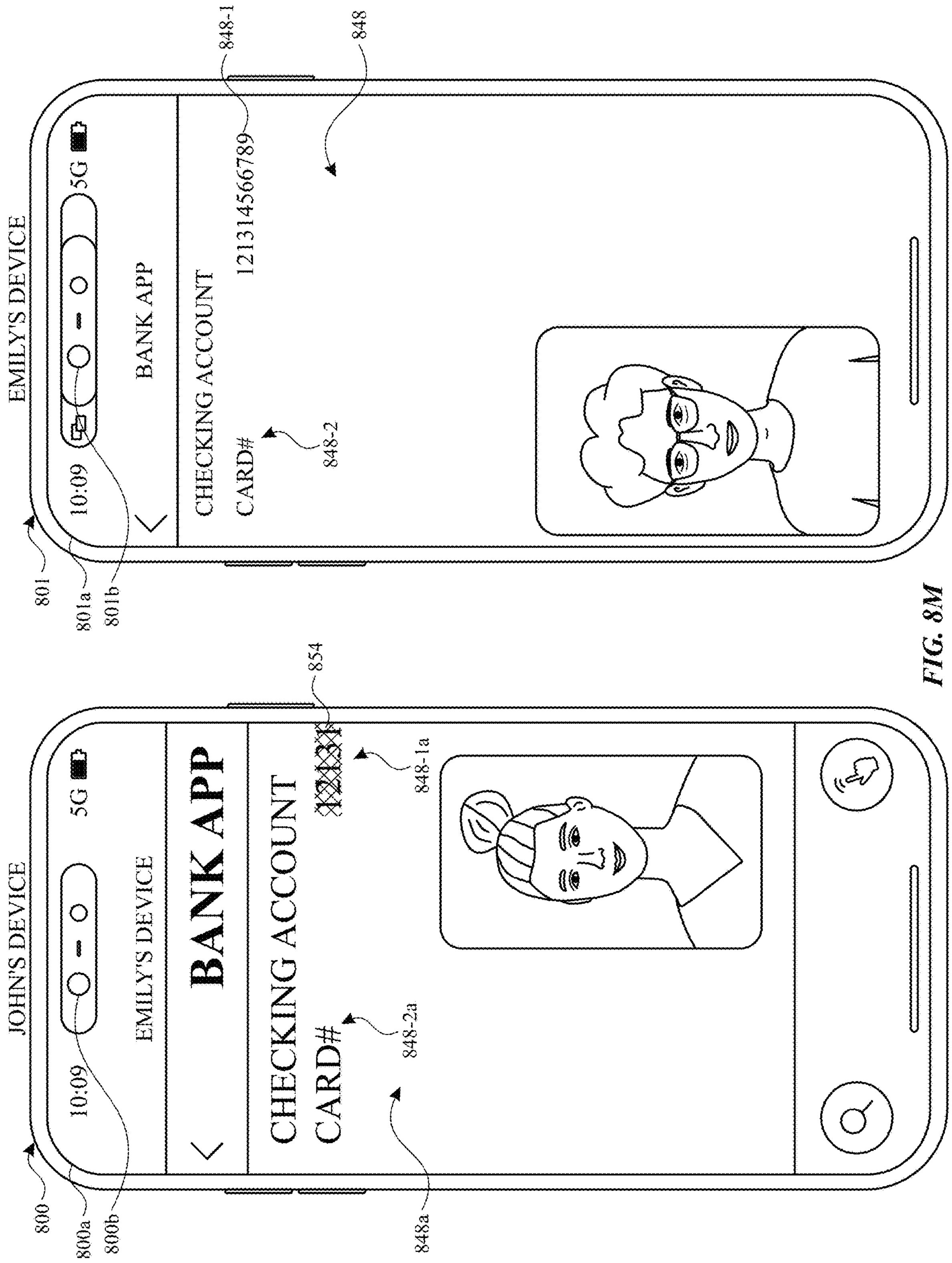

In some embodiments, a view of the shared screen content can be zoomed in or out. For example, in FIG. 8M, John's device 800 displays a zoomed view of the shared screen content in response to detecting input 805-6 selecting zoom control 852 in FIG. 8L. As shown in FIG. 8M, representation 848*a* of the banking application interface is enlarged to provide a larger view of the shared content. In some embodiments, the zoomed content is displayed in window 838. In some embodiments, the zoomed content is displayed without window 838 as shown in FIG. 8M. In some embodiments, zoom control 852 can be selected again to zoom back out (e.g., to return to the view depicted in FIG. 8L). In some embodiments, the shared content can be zoomed in or out in response to gestures such as pinch or de-pinch gestures on display 800*a*.

FIG. 9 is a flow diagram illustrating a method for requesting a computer system to share screen content using a computer system in accordance with some embodiments. Method 900 is performed at a computer system (e.g., 100, 300, 500, 600, 601, 800, and/or 801) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) one or more display generation components (e.g., 112, 340, 504, 600*a*, 601*a*, 660, 800*a*, and/or 801*a*) (e.g., a display controller, a touch-sensitive display system, a display screen, a monitor, a projector, a holographic display, a head-mounted display system, and/or other device or component that presents visual content to a user, for example on or in the display generation component itself or produced from the display generation component and visible elsewhere) and one or more input devices (e.g., 112, 350, 355, 508, 522, 600*a*, 600*b*, 601*a*, 601*b*, 601*c*, 601*d*, 800*a*, 800*b*, 801*a*, and/or 801*b*) (e.g., a touch-sensitive surface, a keyboard, mouse, trackpad, one or more optical sensors for detecting a gaze and/or gestures, one or more capacitive sensors for detecting hover inputs, a microphone, and/or accelerometer/gyroscope/inertial measurement units). Some operations in method 900 are, optionally, combined, the orders of some operations are, optionally, changed, and some operations are, optionally, omitted.

As described below, method 900 provides an intuitive way for requesting a computer system to share screen content. The method reduces the cognitive burden on a user for requesting a computer system to share screen content, thereby creating a more efficient human-machine interface. For battery-operated computing devices, enabling a user to request a computer system to share screen content faster and more efficiently conserves power and increases the time between battery charges.

At method 900, the computer system (e.g., 800 and/or 801) displays (902), via the one or more display generation components (e.g., 800*a* and/or 801*a*), a set of one or more sharing elements (e.g., 810-3 and/or 810-4) (e.g., an "ask to share screen" element and/or a "share my screen" element) (e.g., a set of one or more selectable user interface elements such as icon(s), button(s), option(s), affordance(s), and/or user-interactive graphical user interface object(s) that are selectable to enable the sharing of content with one or more external computer systems) for sharing content (e.g., screen content and/or media content) between the computer system (e.g., 800 or 801) and an external computer system (e.g., 801 or 800) (in some embodiments, a plurality of external computer systems). The set of one or more sharing elements for sharing content includes a sharing request element (e.g., 810-4) (e.g., an option that is selectable to prompt the external computer system to share respective content from the external computer system) (e.g., an "ask to share screen" element). In some embodiments, the one or more of sharing elements for sharing content between the computer system and an external computer system are displayed while the computer system is in a communication session (e.g., a messaging session and/or a shared-content session) with the external computer system and, in some embodiments, additional external computer systems. In some embodiments, a shared-content session is a real-time communication session during which participants of the shared-content session are able to concurrently output respective content. In some embodiments, the respective content is screen content from the computer system (e.g., content displayed on the display of the computer system) that is transmitted to the external computer system(s) so that participants of the shared-content session are concurrently outputting the shared screen content from the computer system. In some embodiments, the respective content is screen content from an external computer system (e.g., content displayed on the display of the external computer system) that is transmitted to the computer system (and other participating external computer systems) so that participants of the shared-content session are concurrently outputting the shared screen content from the external computer system. In some embodiments, the respective content is synchronized media content that is output at the computer system and the external computer system(s). In some embodiments, the computer system and the external computer system(s) each separately access the respective content (e.g., a video, a movie, a TV show, or a song) from a remote server and are synchronized in their respective output of the respective content such that the content is output concurrently (e.g., via an application local to the respective computer system) at each computer system while each computer system separately accesses the respective content from the remote server(s). In some embodiments, the computer system and external computer system(s) separately access the respective content (e.g., synchronized content) in response to a selection that is received at the computer system or at the external computer system for requesting output of the respective content. In some embodiments, real-time communication features such as live video and/or audio feeds are capable of being enabled or disabled for respective participants of a shared-content session.

The computer system (e.g., 800 and/or 801) receives (904), via the one or more input devices (e.g., 800*a* and/or 801*a*), a set of one or more inputs (e.g., 805-2) (e.g., one or more inputs such as touch input(s), audio input(s), gaze input(s), and/or gesture input(s)). In response (906) to receiving the set of one or more inputs, in accordance with a determination that the set of one or more inputs includes a selection (e.g., 805-2) of the sharing request element (e.g., 810-4), the computer system (e.g., 800) initiates (908) a process for requesting the external computer system (e.g., 801) to share screen content (e.g., a live representation of content displayed at the external computer system) (e.g., the computer system prompts the external computer system to share screen content with the computer system) in a shared-content session with the computer system (and, in some embodiments, with one or more additional external computer systems). Initiating a process for requesting the external computer system to share screen content in a shared-content session with the computer system in accordance with a determination that the set of one or more inputs includes a selection of the sharing request element reduces the number of inputs needed to enable the sharing of screen content between the external computer system and the computer system in a shared-content session. In some embodiments, the shared-content session, when active, enables the computer system to output respective content while the respective content is being output by one or more external computer systems. In some embodiments, initiating the process for requesting the external computer system to share screen content includes transmitting data that causes the external computer system to display a prompt (e.g., 820-1 in FIG. 8D) for a user of the external computer system to share screen content. In some embodiments, initiating the process for requesting the external computer system to share screen content in a shared-content session with the computer system includes establishing a shared-content session between the computer system and the external computer system.

In some embodiments, prior to determining that the external computer system (e.g., 801) has accepted the request to share screen content, the computer system (e.g., 800) displays, via the one or more display generation components (e.g., 800*a*), a cancel element (e.g., 812-2 and/or 830) (e.g., a selectable user interface element such as an icon, a button, an option, an affordance, and/or a user-interactive graphical user interface object). In some embodiments, the cancel element is selectable to cause the computer system to cancel the request for the external computer system to share screen content in a shared-content session with the computer system. Displaying the cancel element prior to determining that the external computer system has accepted the request to share screen content provides improved feedback by indicating that the external computer system has not yet accepted the request and that the user of the computer system has the option to cancel the request for the external computer system to share screen content with the computer system. In some embodiments, the computer system detects a selection of the cancel element and, in response, cancels the request for the external computer system to share screen content in a shared-content session with the computer system. In some embodiments, in response to detecting a selection of the cancel element, the computer system cancels a process for establishing a shared-content session with the external computer system.

In some embodiments, the computer system (e.g., 800) displays a user interface (e.g., 802) having a first size (e.g., a full-screen and/or expanded size) when the external computer system (e.g., 801) is not sharing screen content with the computer system. In some embodiments, while the external computer system is sharing screen content (e.g., 804, 840, and/or 848) with the computer system in the shared-content session (e.g., as depicted in FIG. 8J), the computer system displays, via the one or more display generation components (e.g., 800*a*), a representation (e.g., 838 and/or 804*a*) of the shared screen content from the external computer system having a second size (e.g., a size that is not expanded or full-screen such as, for example, a picture-in-picture window) that is smaller than the first size. Displaying the representation of the shared screen content from the external computer system having the second size that is smaller than the first size provides improved feedback by distinguishing elements of the shared screen content from elements of the computer system user interface, thereby avoiding user confusion of the elements. In some embodiments, the computer system displays the shared screen content from the external computer system having a smaller size than the screen content of the computer system.

In some embodiments, while the external computer system (e.g., 801) is sharing screen content (e.g., 848) that includes a first type of content (e.g., 848-1) (e.g., sensitive content such as private information and/or account numbers) and a second type of content (e.g., 848-2) (e.g., non-sensitive content), the computer system (e.g., 800) displays a representation of the screen content (e.g., 848*a*), wherein the representation of screen content includes a visual effect (e.g., 854) (e.g., a mask, blur, or other obscuring visual effect) that visually obscures the first type of content (e.g., 848-1*a*) (e.g., a representation of the first type of content) without visually obscuring the second type of content (e.g., 848-2*a*) (a representation of the second type of content). Displaying the representation of the screen content including the visual effect that visually obscures the first type of content without visually obscuring the second type of content enhances security and user privacy by preventing disclosure of sensitive information. In some embodiments, in accordance with a determination that the shared screen content includes sensitive content, the computer system displays the shared screen content with the sensitive content visually obscured without visually obscuring other screen content that is being shared. In some embodiments, the external computer system (e.g., 801) obscures the sensitive content prior to transmitting the screen content to the computer system. In some embodiments, the computer system (e.g., 800) obscures the sensitive content when the screen content is received from the external computer system. In some embodiments, while displaying the shared screen content of the external computer system, the computer system displays controls (e.g., 852) to zoom in and/or out a view of the shared screen content. In some embodiments, the computer system zooms in and/or out a view of the shared screen content in response to a gesture. For example, in response to detecting a pinch gesture, the computer system zooms out the view of the shared screen content, and in response to detecting a de-pinch gesture, the computer system zooms in the view of the shared screen content.

In some embodiments, while the external computer system (e.g., 801) is sharing screen content (e.g., 804, 840, and/or 848) with the computer system (e.g., 800) in the shared-content session, the computer system displays, via the one or more display generation components (e.g., 800*a*), a control access element (e.g., 853) (e.g., a selectable user interface element such as an icon, a button, an option, an affordance, and/or a user-interactive graphical user interface object). In some embodiments, the control access element is optionally displayed depending on a particular use case. For example, if the computer system has a smaller display screen (e.g., 800*a*) than the screen (e.g., 801*a*) of the external computer system, the computer system does not display the control access element. In this way, a device with a smaller display screen does not control operation of a device with a larger display screen. In some embodiments, the computer system receives, via the one or more input devices (e.g., 800*a*), a selection of the control access element; and in response to receiving the selection of the control access element, requests access (e.g., to be granted by the external computer system) to control (e.g., using the one or more input devices of the computer system) operation of content displayed at the external computer system (e.g., the computer system requests permission to control content that is displayed at the external computer system) (e.g., as described in greater detail with respect to FIGS. 10A-10O and the techniques described with respect to FIG. 11). Requesting access to control operation of content displayed at the external computer system in response to detecting selection of the control access element provides additional control options for requesting access to control the screen content that is being shared by the external computer system without cluttering the user interface with additional displayed controls. In some embodiments, while displaying the shared screen content of a remote participant (e.g., the external computer system), the computer system displays an option to request control of the remote participant's device. In some embodiments, the external computer system is prompted to grant or deny the request for the computer system to control operation of the screen content of the external computer system. If the external computer system grants the request, the computer system is given permission to control operation of the screen content of the external computer system. The option for requesting control of the remote participant's device and various related embodiments and user interfaces are described in greater detail with respect to FIGS. 10A-10O and FIG. 11.

In some embodiments, initiating the process for requesting the external computer (e.g., 801) to share screen content (e.g., 804, 840, and/or 848) in a shared-content session with the computer system (e.g., 800) includes causing the external computer system to display an accept element (e.g., 832) (e.g., a selectable user interface element, such as an icon, a button, an option, an affordance, and/or a user-interactive graphical user interface object, that is selectable to accept the request to share screen content with the computer system) that is selectable (e.g., via input 807-3) to initiate the sharing of screen content (e.g., from the external computer system) with the computer system in a shared-content session. Causing the external computer system to display an accept element that is selectable to initiate the sharing of screen content with the computer system in a shared-content session reduces the number of inputs that are needed to initiate sharing of screen content in a shared-content session between the computer system and the external computer system. In some embodiments, the external computer system (e.g., 801) displays a prompt (e.g., 820, 820-1, 831, and/or 832 in FIG. 8H) with an option (e.g., 832) to accept the request to share screen content in a shared-content session with the computer system. In some embodiments, the prompt also includes an option (e.g., 831) to decline the request to share screen content in a shared-content session with the computer system. In some embodiments, in response to detecting a selection of the accept element (e.g., 832), the external computer system displays a countdown (e.g., 834) until the external computer system shares the screen content (e.g., the screen content is shared at the end of the countdown).

In some embodiments, the computer system (e.g., 800) displays, via the one or more display generation components (e.g., 800*a*), a messaging interface (e.g., 802) that includes: a messages conversation (e.g., 802-1) between a participant associated with the computer system and a participant associated with the external computer system (e.g., 801); and a selectable communications element (e.g., 806) (e.g., a selectable user interface element, such as an icon, a button, an option, an affordance, and/or a user-interactive graphical user interface object, that is associated with participants of the messages conversation). In some embodiments, the messaging interface includes indications of participants of the messages conversation (e.g., recipients of a text message, SMS message, MMS message, and/or RCS message), content of messages sent between participants, and/or a message compose user interface for composing and/or sending a new message to participants of the messages conversation. In some embodiments, the computer system receives, via the one or more input devices (e.g., 800*a*), a selection (e.g., 805-1) of the selectable communications element (e.g., 806). In some embodiments, displaying, via the one or more display generation components (e.g., 800*a*), the set of one or more sharing elements (e.g., 810, 810-3, and/or 810-4) (e.g., the "ask to share screen" element and/or "share my screen" element) is performed in response to receiving the selection of the selectable communications element. Displaying the set of one or more sharing elements in response to receiving the selection of the selectable communications option reduces the number of inputs needed to initiate the sharing of content between the participants of the messages conversation. In some embodiments, the sharing request element (e.g., 810-4) (and/or a "share my screen" or screen sharing element 810-3) can be displayed without regard as to whether a shared-content session is established with the external computer system. For example, if no shared-content session has been established with the external computer system, in response to detecting the selection of the sharing request element, the computer system initiates a shared-content session with the external computer system. In some embodiments, if the sharing request option is selected, a remote participant of the messages conversation is prompted to share their screen, and the shared screen content from the remote participant is displayed (e.g., at the computer system) if the remote participant approves the request. In some embodiments, the "ask to share screen" and "share my screen" elements are accessed from a contact card for a contact (e.g., a user interface that includes contact information for a respective contact). In some embodiments, in response to detecting selection of the sharing request element (e.g., the "ask to share screen" element), the computer system initiates a shared-content session with a remote participant of the messages conversation. For example, in some embodiments, in response to receiving an input (e.g., 805-3) (e.g., the set of one or more inputs) that includes a selection of the sharing request element (e.g., 810-4), the computer system (e.g., 800) initiates a shared-content session with the participant associated with the external computer system (e.g., 801) (e.g., starting a shared-content session with an external computer system associated with a participant of the messages conversation). Initiating a shared-content session with the participant associated with the external computer system in response to receiving an input that includes a selection of the sharing request element reduces the number of inputs that are needed to initiate sharing of screen content by initiating the shared-content session that is used to facilitate the screen sharing without requiring the user to separately initiate the shared-content session and request the external computer system to share screen content.

In some embodiments, the set of one or more sharing elements (e.g., 810) (e.g., an "ask to share screen" element and/or a "share my screen" element) for sharing content between the computer system (e.g., 800) and the external computer system (e.g., 801) includes a screen sharing element (e.g., 810-3) (e.g., a "share my screen" element) (e.g., a selectable user interface element such as an icon, a button, an option, an affordance, and/or a user-interactive graphical user interface object). In some embodiments, in response to detecting a selection (e.g., 805-2) of the screen sharing element, the computer system initiates (e.g., automatically and/or without additional user input) a process for sharing screen content (e.g., 802) from the computer system with the external computer system (e.g., after a shared-content session is established with the external computer system). Initiating a process for sharing screen content from the computer system with the external computer system in response to detecting a selection of the screen sharing element provides additional control options for sharing screen content without cluttering the user interface with additional displayed controls. In some embodiments, initiating the process for sharing screen content from the computer system includes initiating a shared-content session with the external computer system. In some embodiments, the computer system automatically begins sharing the screen content with the external computer system after the shared-content session is established with the external computer system. In some embodiments, the computer system displays a countdown (e.g., 824) before the screen sharing begins.

In some embodiments, prior to sharing content between the computer system (e.g., 800) and the external computer system (e.g., 801) (e.g., prior to sharing screen content from the computer system with the external computer system or prior to displaying screen content shared from the external computer system), an authentication of a user of the external computer system is performed (e.g., 826) (e.g., authenticating a passcode and/or biometric information associated with the user of the external computer system). In accordance with a determination that the user of the external computer system was successfully authenticated, the sharing of content is enabled between the computer system and the external computer system. Performing authentication of a user of the external computer system prior to enabling the sharing of content between the computer system and the external computer system improves privacy by ensuring that an authorized user is permitted to view screen content shared between the computer system and the external computer system. In some embodiments, the authentication process is performed in accordance with a determination that the external computer system (e.g., 801) was in a lock state (e.g., as depicted in FIG. 8A or FIG. 8B) when the computer system (e.g., 800) initiated the process for requesting the external computer system to share screen content. In some embodiments, in a locked state the external computer system is powered on and operational but is prevented from performing a predefined set of operations in response to user input. In some embodiments, in a locked state the external computer system requires and/or prompts a user for authentication information, such as a passcode and/or biometric information, in order to provide access to one or more functions (e.g., the predefined set of operations) of the external computer system. In some embodiments, in accordance with a determination that the request for the external computer system to share screen content was initiated while the external computer system was in an unlocked state, or in accordance with a determination that the user has been authenticated prior to receiving the request, the external computer system displays a prompt to share screen content with the computer system without again authenticating the user.

Note that details of the processes described above with respect to method 900 (e.g., FIG. 9) are also applicable in an analogous manner to the methods described above and below. For example, methods 700, 1100, and/or 1300 optionally include one or more of the characteristics of the various methods described above with reference to method 900. For example, one or more aspects of the user interfaces for requesting a computer system to share screen content can be used in connection with the embodiments described in one or more of these methods. For brevity, these details are not repeated below.

FIGS. 10A-10T illustrate exemplary user interfaces for granting a request to share control of screen content, in accordance with some embodiments. The user interfaces in these figures are used to illustrate the processes described below, including the processes in FIG. 11.

FIGS. 10A-10T illustrate exemplary systems or devices for participating in screen-sharing sessions, in accordance with some embodiments. Specifically, these systems or devices include John's devices 1000 and 1050 and Emily's devices 1001 and 1051, which are shown concurrently in some figures to illustrate concurrent states of the respective devices, including the user interfaces and inputs at the respective devices. In the embodiments provided herein, John's device can be described as performing a set of functions (e.g., functions associated with the screen-sharing session or other functions described herein), and Emily's device can be described as performing a different set of functions (e.g., a different set of functions associated with the screen-sharing session or other functions described herein). These descriptions are not intended to limit the functions performed by the respective devices, but rather, are provided to illustrate various aspects of the embodiments described herein. Thus, unless specified otherwise, the functions that are described as being performed using John's device are similarly capable of being performed using Emily's device. Likewise, the functions that are described as being performed by Emily's device are similarly capable of being performed by John's device, unless specified otherwise.

FIG. 10A depicts John's device 1000 and Emily's device 1001. John's device 1000 is a computer system that, in some embodiments, is comprised of touch-sensitive display 1000*a*, camera 1000*b*, and other hardware such as processors, memory, and other components for operating John's device 1000. In the embodiment depicted in FIG. 10A, John's device 1000 is a smartphone; however, John's device can be a different type of computer system such as a desktop computer, tablet computer, smartwatch, laptop computer, or a head-mounted device. In some embodiments, John's device 1000 includes one or more elements of devices 100, 300, 500, 600, and/or 800. Emily's device 1001 is a computer system that, in some embodiments, is comprised of touch-sensitive display 1001*a*, camera 1001*b*, and other hardware such as processors, memory, and other components for operating Emily's device 1001. In the embodiment depicted in FIG. 10A, Emily's device 1001 is a smartphone; however, Emily's device can be a different type of computer system such as a laptop computer, tablet computer, smartwatch, desktop computer, or a head-mounted device. In some embodiments, Emily's device 1001 includes one or more elements of devices 100, 300, 500, 601, and/or 801.

FIGS. 10A-10D depict example user interfaces for an embodiment in which John's device 1000 requests access to control the screen content of Emily's device 1001. In FIG. 10A, Emily's device 1001 is sharing screen content during a video call with John's device 1000. Emily's device 1001 is displaying interface 1006, which is being shared with John's device 1000. Interface 1006 is a home screen interface for Emily's device 1001. Emily's device 1001 also displays control region 1020 (e.g., similar to control region 820), including status region 1020-1 (e.g., similar to status region 820-1) and controls for the communication session with John's device 1000. John's device 1000 is displaying interface 1002 which includes window 1004 for displaying a representation of the screen content being shared in the shared-content session with Emily's device 1001. John's device 1000 displays, in window 1004, representation 1006*a* of Emily's home screen interface 1006. John's device also displays status text 1021 indicating that the content in window 1004 represents screen content from Emily's device. In some embodiments, John's device 1000 dynamically updates status text 1021 based on the status of the shared-content session. John's device 1000 also displays a zoom control and control element 1008, which is selectable to request access to control the screen content that is being shared with John's device 1000. In some embodiments, John's device does not display control element 1008 (e.g., John's device cannot control the screen of Emily's device) if the display of John's device (e.g., display 1000*a*) is smaller than the display of Emily's device (e.g., display 1001*a*).

In FIG. 10A, John's device 1000 detects input 1005-1 selecting control element 1008. In response, John's device 1000 requests permission from Emily's device 1001 to control the screen content at Emily's device. In FIG. 10B, John's device 1000 displays control region 1012 (e.g., similar to control region 812) including status region 1012-1 (e.g., similar to status region 812-1) indicating that John's device has requested remote control of Emily's device and that Emily has not yet approved the request. Control region 1012 includes cancel element 1010, which is selectable to cancel the request to control the screen content of Emily's device 1001. When Emily's device 1001 receives the request from John's device 1000, Emily's device updates control region 1020 to indicate that John is requesting permission to control the screen content being shared from Emily's device 1001. Control region 1020 is updated to include decline option 1013, which is selectable to decline the request from John's device, and allow option 1014, which is selectable to approve the request from John's device. In FIG. 10B, Emily's device 1001 detects input 1007-1 selecting allow option 1014 and, in response, approves the request from John's device 1000 to grant permission to John's device to control the screen content at Emily's device.

Figure 10C:
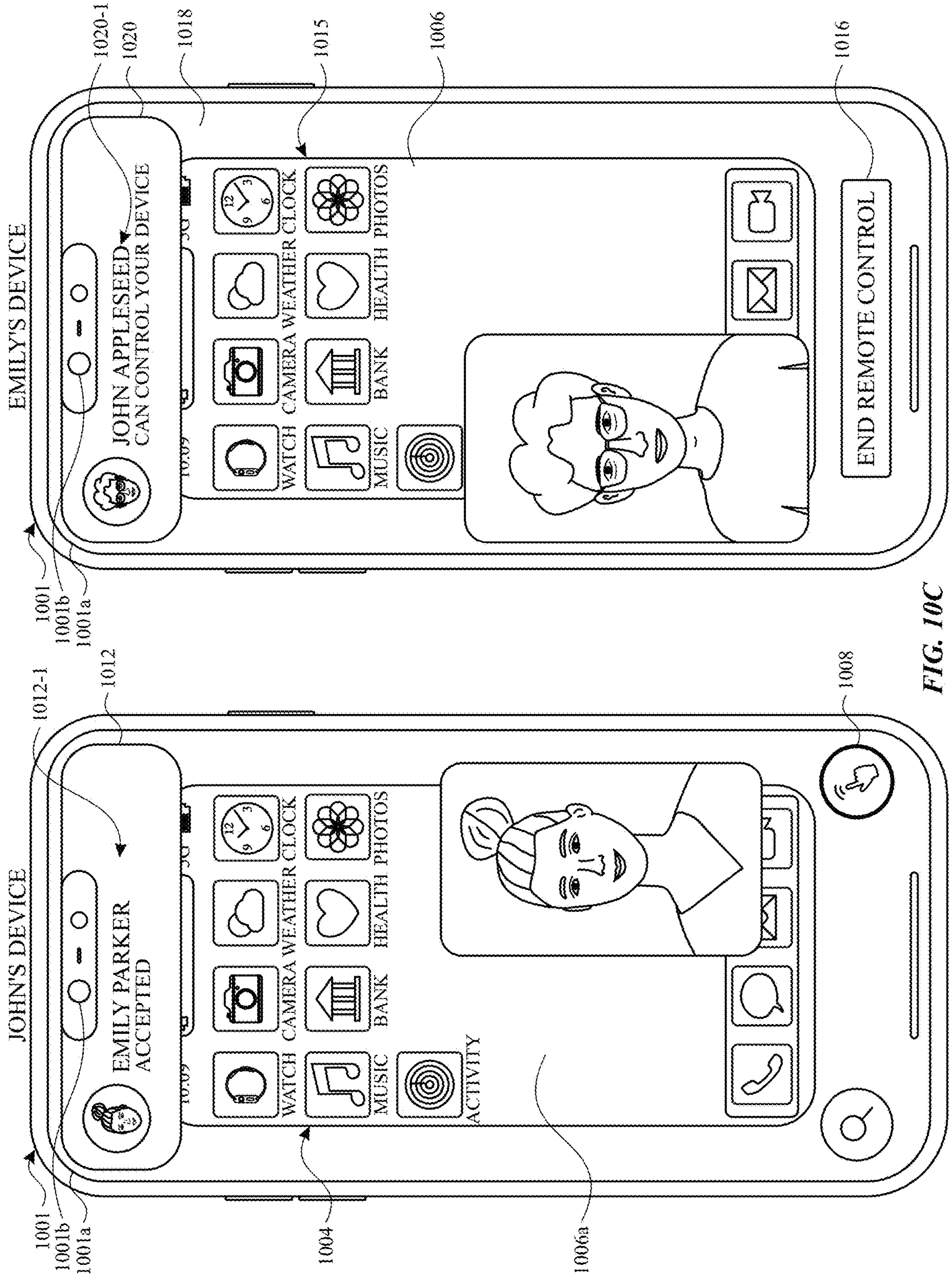

In FIG. 10C, John's device 1000 updates control region 1012 to indicate that Emily accepted or approved John's request to control the screen content at Emily's device 1001. John's device 1000 also displays a bolded border around control element 1008 to indicate John's device 1000 has permission to control the screen content at Emily's device 1001. After Emily's device 1001 grants permission for John's device 1000 to control the screen content at Emily's device, Emily's device displays user interface 1018, as shown in FIG. 10C. In the embodiment depicted in FIG. 10C, Emily's device 1001 updates control region 1020 and shrinks interface 1006 to be displayed within window 1015 to indicate John's device 1000 has permission to control Emily's device. Emily's device 1001 also displays end control element 1016, which is selectable to terminate the remote control of Emily's device by John's device 1000.

Figure 10D:
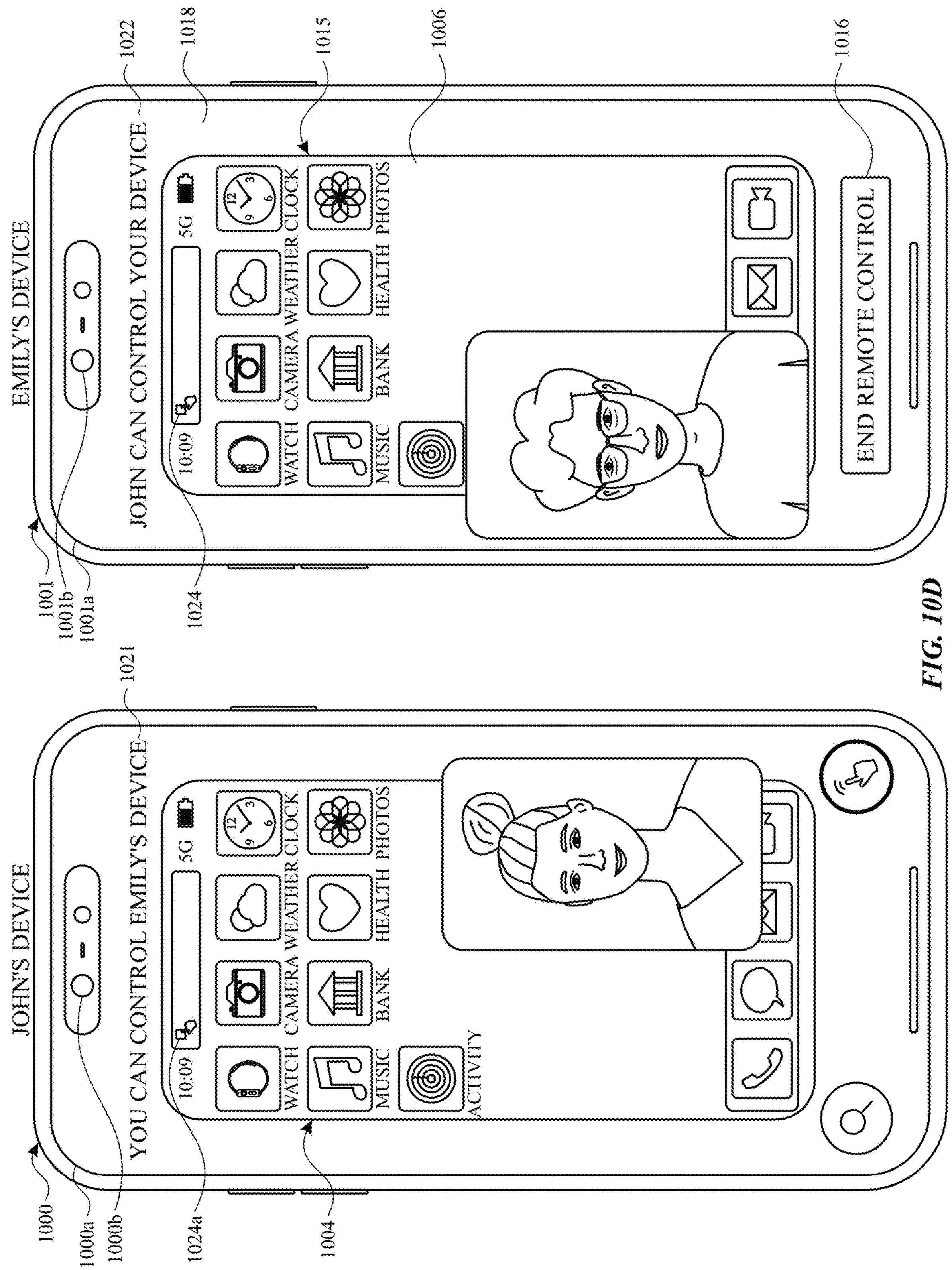

As shown in FIG. 10D, Emily's device 1001 displays glyph 1024 to indicate John's device 1000 has permission to control the screen content at Emily's device 1001. Emily's device 1001 also displays status text 1022 indicating that John has permission to control Emily's device. In some embodiments, Emily's device 1001 dynamically updates status text 1022 based on the status of the shared-content session. John's device 1000 updates status text 1021 to indicate John can control Emily's device. Window 1004 also includes representation 1024*a* of the glyph displayed at Emily's device.

Figure 10E:
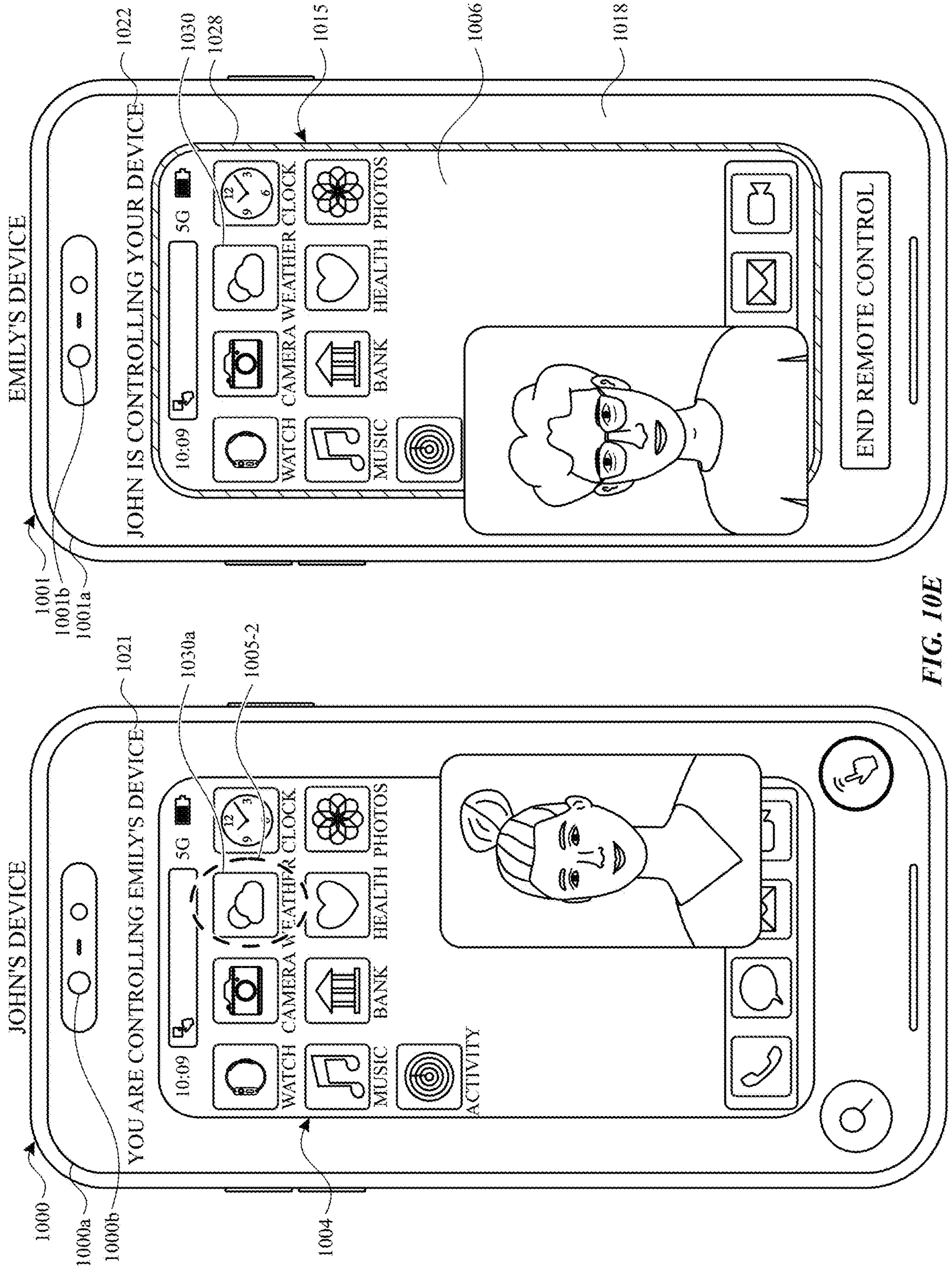
Figure 10F:
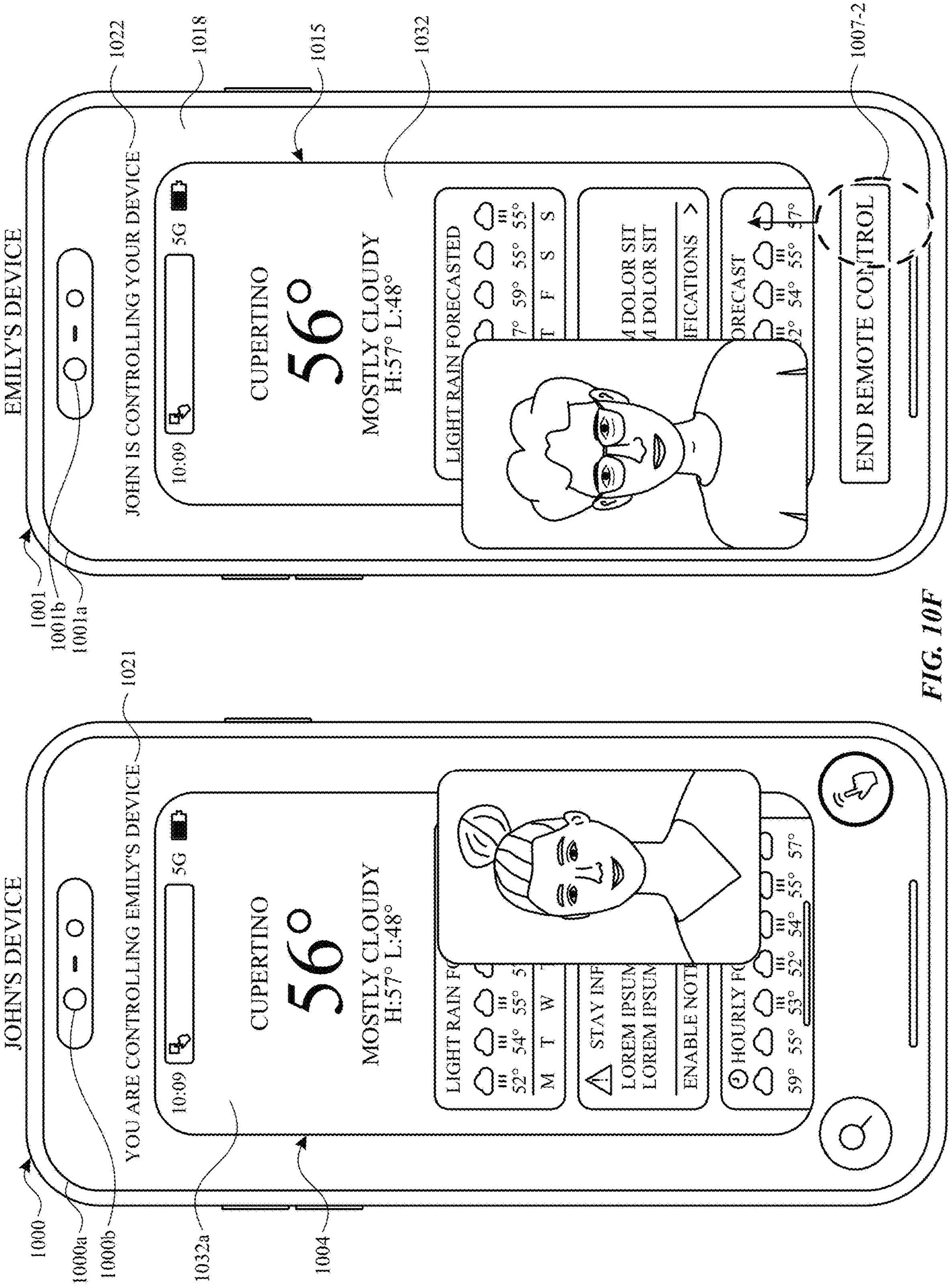

FIGS. 10E-10O depict example user interfaces for embodiments in which John's device 1000 has permission to control the screen content at Emily's device 1001. In FIG. 10E, John's device 1000 detects input 1005-2 selecting representation 1030*a* of the weather application icon 1030 that is displayed at Emily's device 1001, which causes Emily's device 1001 to open the weather application, as shown in FIG. 10F. When John's device 1000 is controlling Emily's screen (e.g., via inputs directed to the representation of the shared screen content), John's device updates status text 1021 to indicate that John is controlling Emily's device 1001, as shown in FIG. 10E. When John's device 1000 is controlling Emily's screen, Emily's device 1001 displays ring 1028 around the perimeter of window 1015 and updates status text 1022 to indicate that John is controlling Emily's device, as shown in FIG. 10E. In some embodiments ring 1028 is a temporary visual effect that is displayed at Emily's device to indicate when an input received at John's device 1000 is controlling operation of Emily's device 1001.

In FIG. 10F, Emily's device 1001 opens the weather application in response to the input received at John's device 1000 (e.g., input 1005-2) selecting the weather application icon. Accordingly, Emily's device 1001 displays weather interface 1032 in window 1015, and John's device 1000 displays representation 1032*a* of the weather interface in window 1004.

In some embodiments, Emily's screen content is controlled by only one device at a time (e.g., Emily's device 1001 or John's device 1000). In some embodiments, when Emily's device 1001 is sharing screen content with John's device 1000, input received at Emily's device is assigned a greater priority than inputs made at John's device to control Emily's device. In this way, the user of a device maintains the right to control their own device, even when another device is assigned permission to control the screen content. For example, in FIGS. 10F and 10G, when Emily begins interacting with her device, the permissions of John's device 1000 are paused while Emily controls her device. In FIG. 10F, Emily's device 1001 detects input 1007-2, which is a command to display home screen interface 1006 at Emily's device. In response to detecting input 1007-2, Emily's device 1001 responds to the input and temporarily pauses the control rights assigned to John's device 1000. Specifically, Emily's device 1001 displays home screen interface 1006 and updates status text 1022 to indicate that Emily is controlling her own device.

Figure 10G:
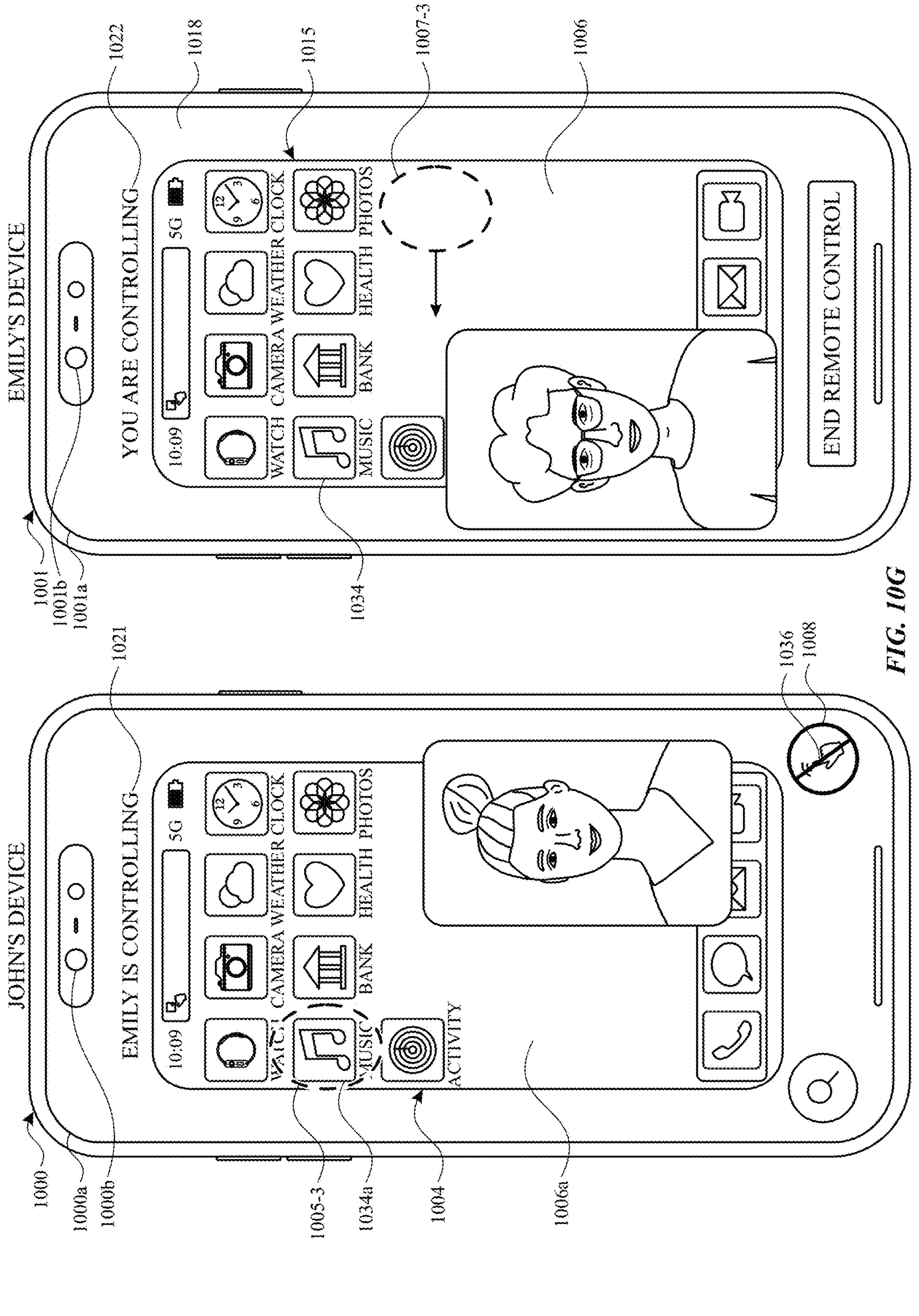
Figure 10H:
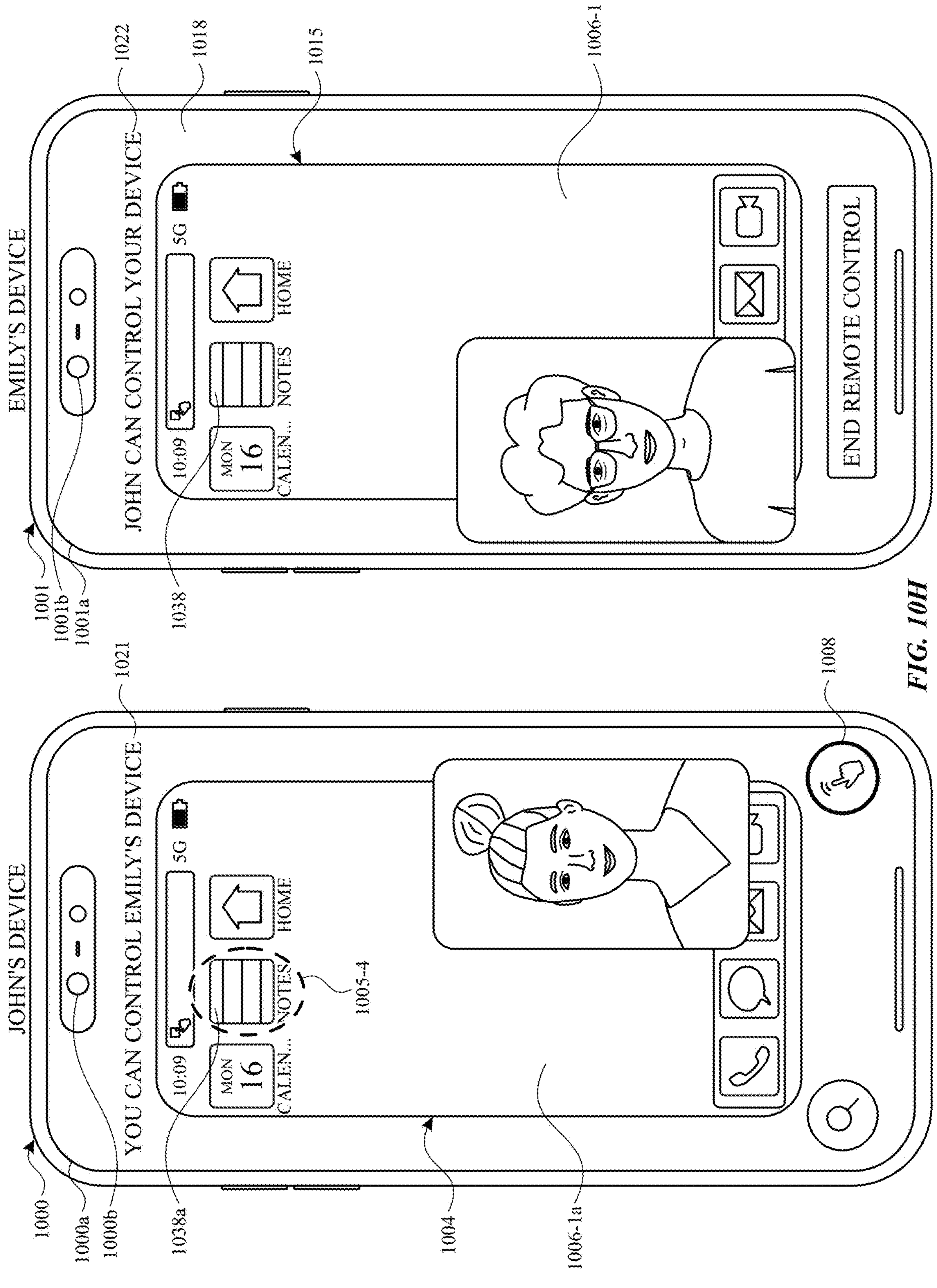

In some embodiments, when the control permissions are paused for John's device 1000, John's device continues to display the shared screen content, including the changes caused by Emily's control of her device. For example, in FIG. 10G, John's device 1000 displays representation 1006*a* of Emily's home screen interface in window 1004. John's device 1000 also updates status text 1021 to indicate that Emily is controlling her device and displays graphical element 1036 on control element 1008 to indicate that John's device currently cannot control Emily's device 1001. In some embodiments, John's device 1000 displays a notification indicating that John cannot control Emily's device because Emily is controlling the device. Because the control permissions of John's device 1000 are temporarily paused, inputs received at John's device for controlling Emily's device 1001 are ignored for the duration of the paused control permission. For example, in FIG. 10G, John's device 1000 detects input 1005-3 selecting representation 1034*a* of the music icon 1034 that is displayed at Emily's device 1001. However, instead of causing the music application to be opened at Emily's device, input 1005-3 is ignored, and Emily's device continues to be controlled by Emily. Emily's device 1001 continues to respond to inputs received by Emily, including input 1007-3, which is an input to cause Emily's device to scroll to a different page of home screen interface 1006. As shown in FIG. 10H, Emily's device 1001 displays home screen page 1006-1 in response to input 1007-3.

Figure 10I:
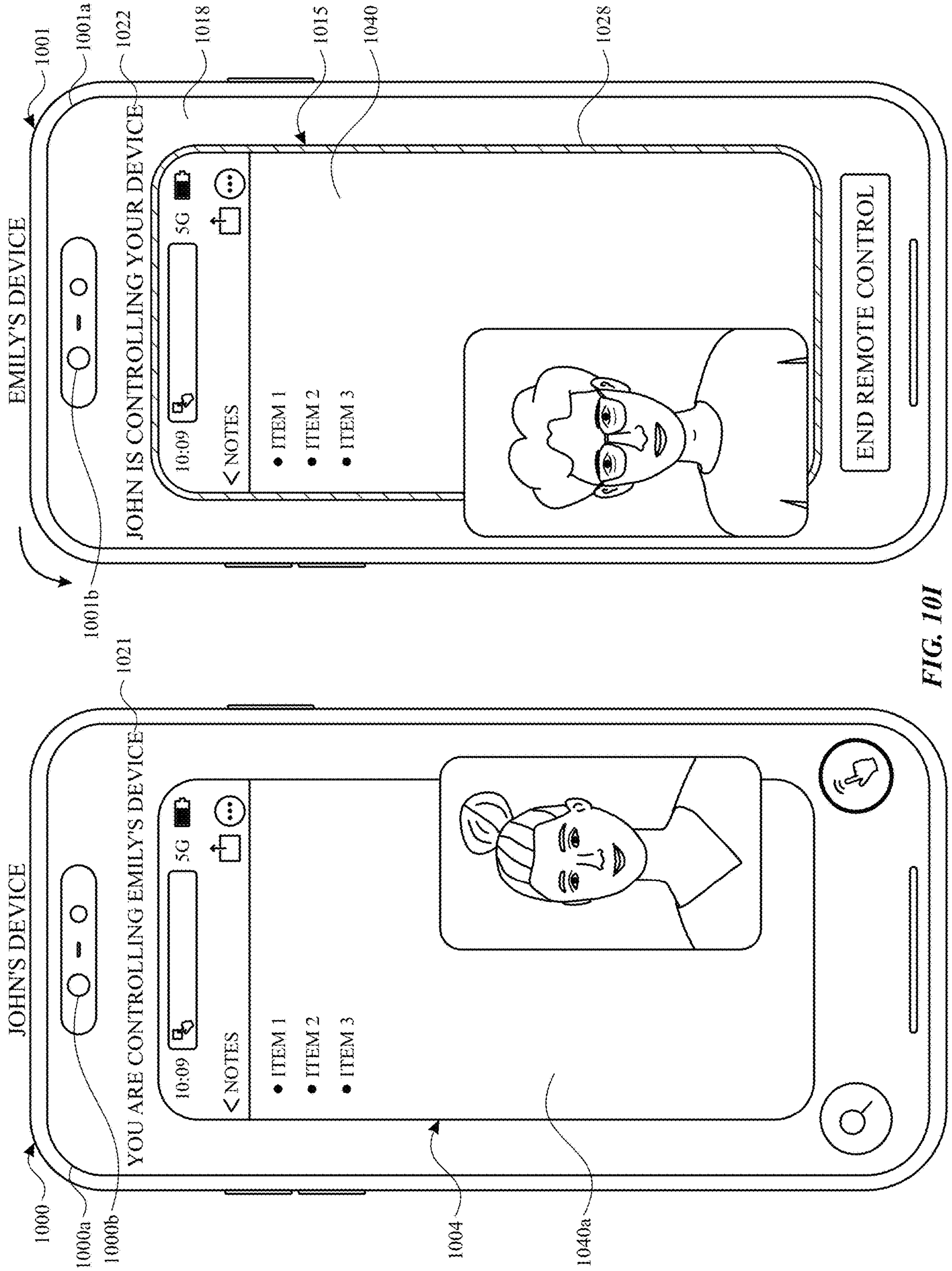

In some embodiments, the permissions of John's device 1000 are paused for a predetermined period of time such as two or three seconds. In some embodiments, the duration of the pause continues while Emily's device 1001 continues to receive input from Emily. In some embodiments, the permissions are resumed after the predetermined amount of time has elapsed since the most recent input was detected at Emily's device 1001. For example, in FIG. 10H, the pause on John's control permission has expired and John's device 1000 is again permitted to control the screen content of Emily's device 1001. The resumed control is indicated by the removal of graphical element 1036 and the display of updated status text 1021 and 1022 indicating that John can control Emily's device. Accordingly, in response to receiving input 1005-4 selecting representation 1038*a* of a notes application icon 1038 displayed at Emily's device 1001, John's device 1000 causes Emily's device to open the notes application. As shown in FIG. 10I, Emily's device 1001 displays notes interface 1040 and ring 1028 and updates status text 1022 to indicate that John's device 1000 is controlling Emily's device. John's device 1000 displays representation 1040*a* of the notes interface in window 1004 and updates status text 1021 to indicate that John's device is controlling Emily's device 1001.

Figure 10J:
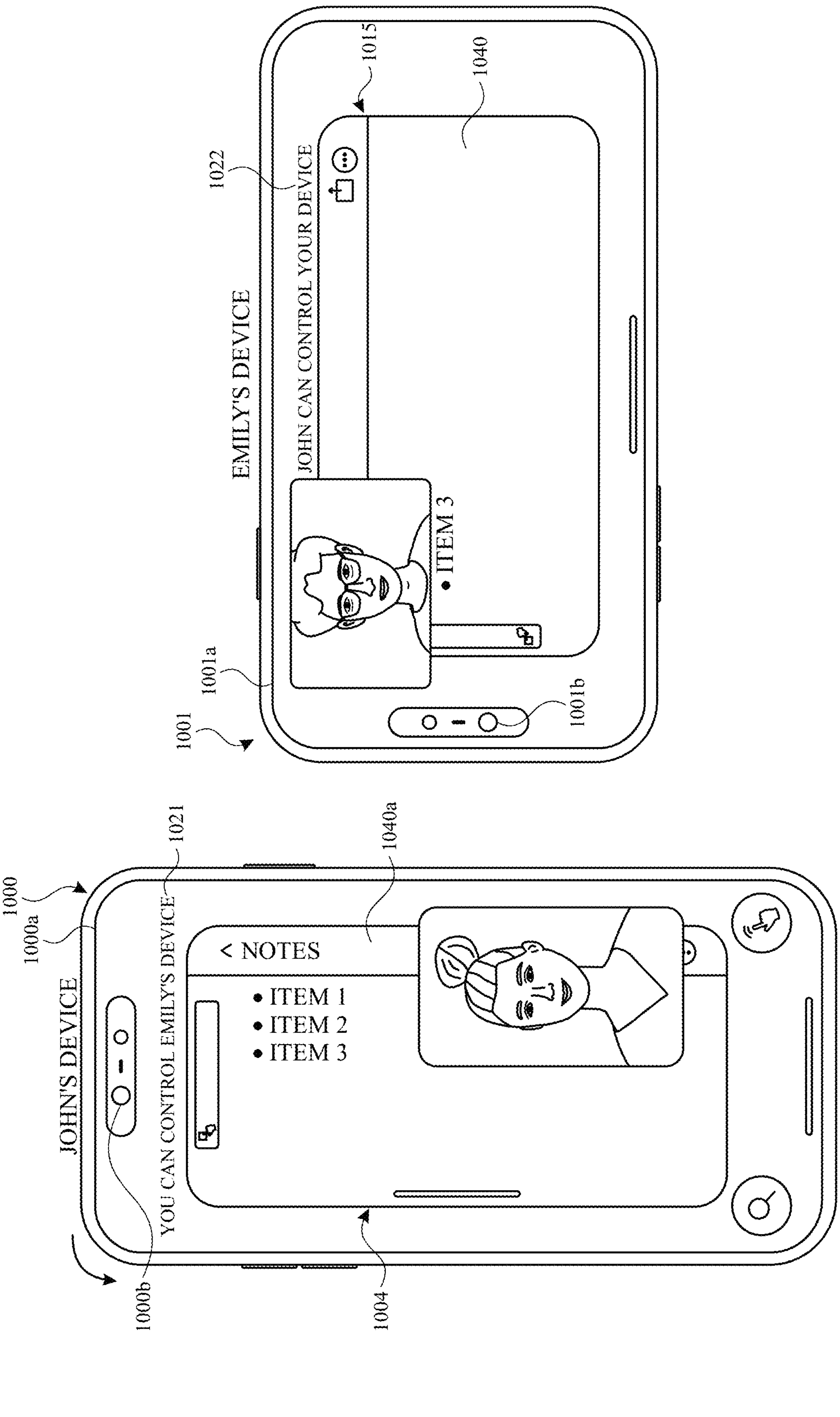
Figure 10K:
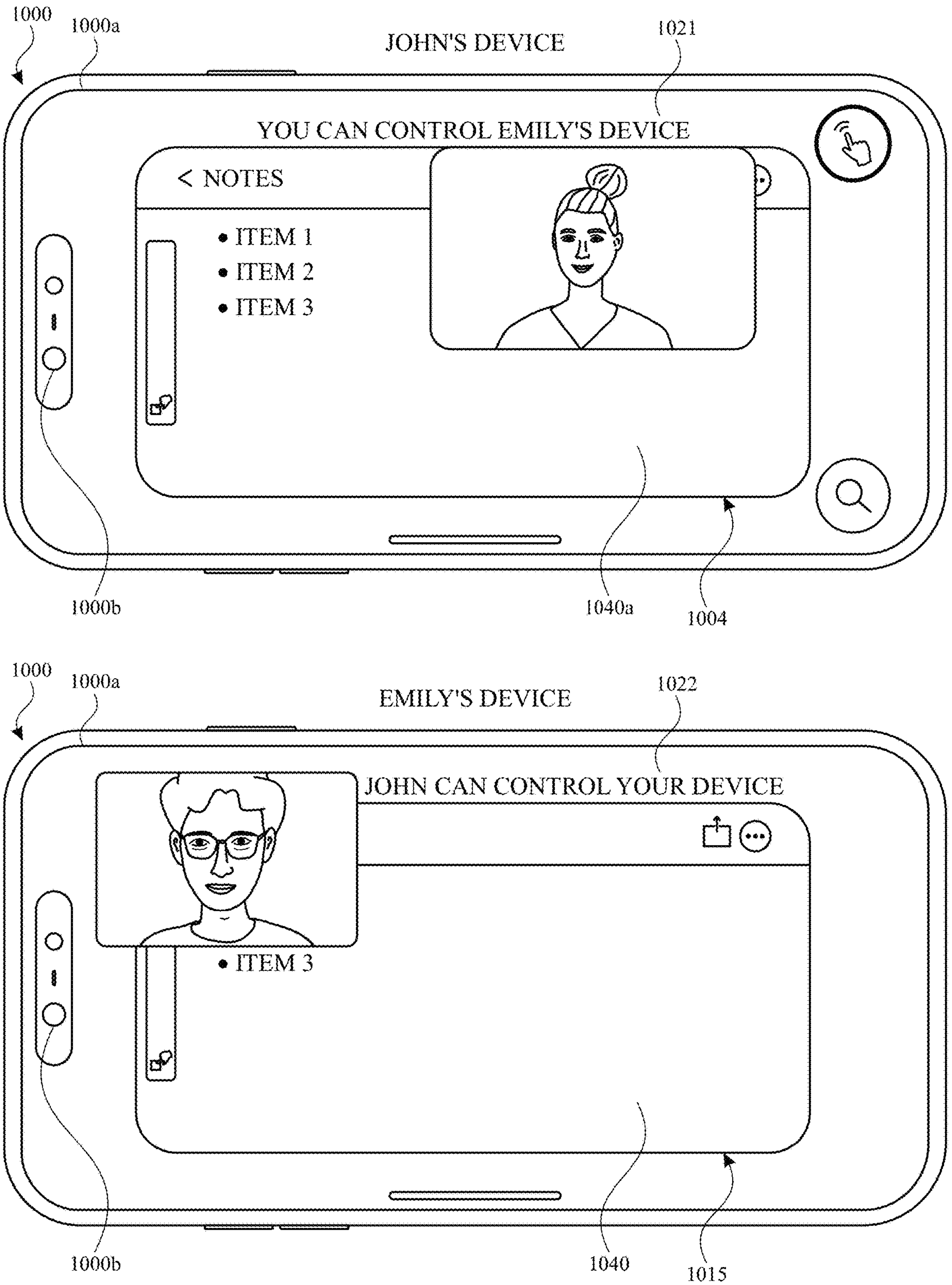
Figure 10L:
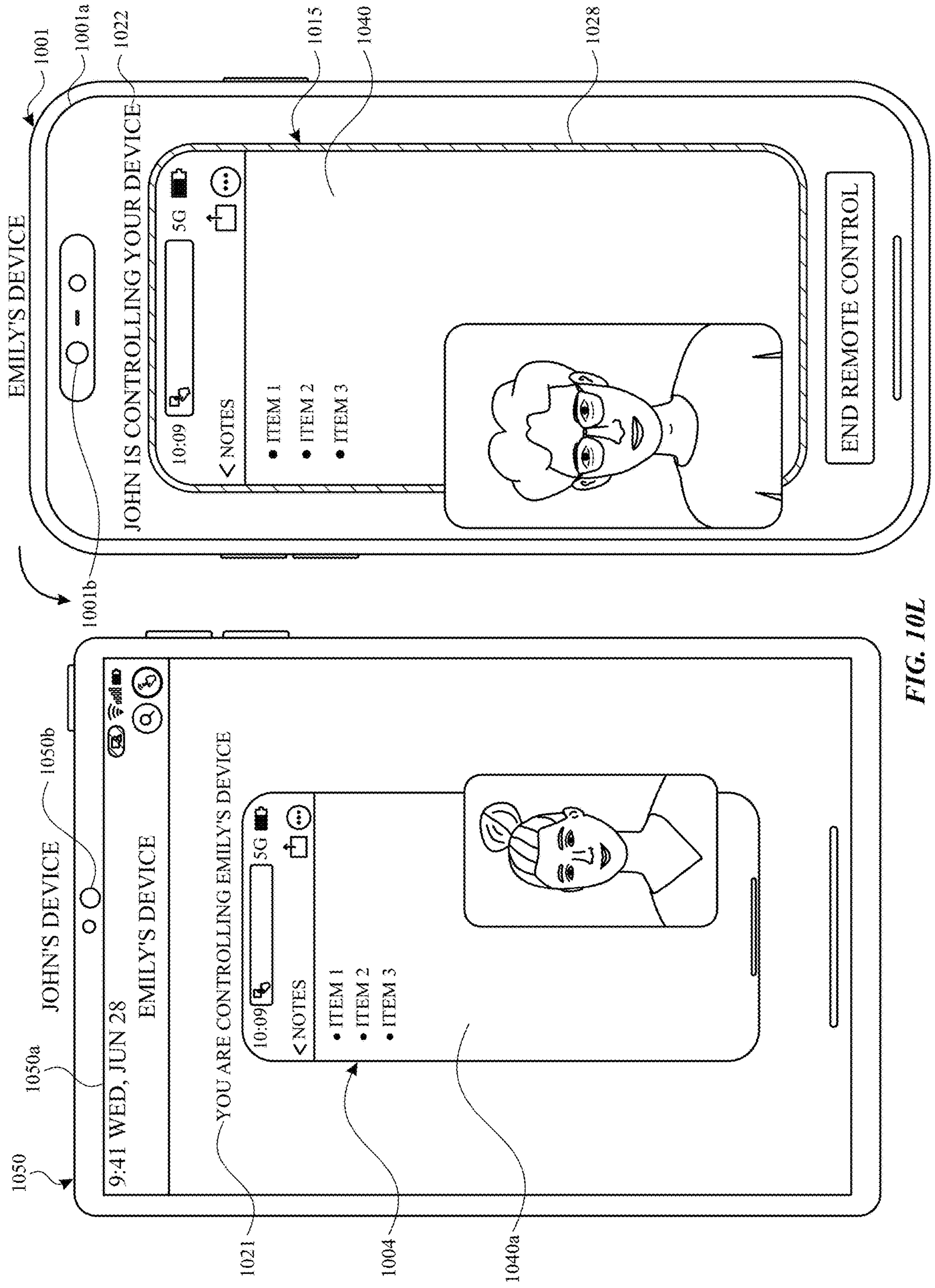
Figure 10M:
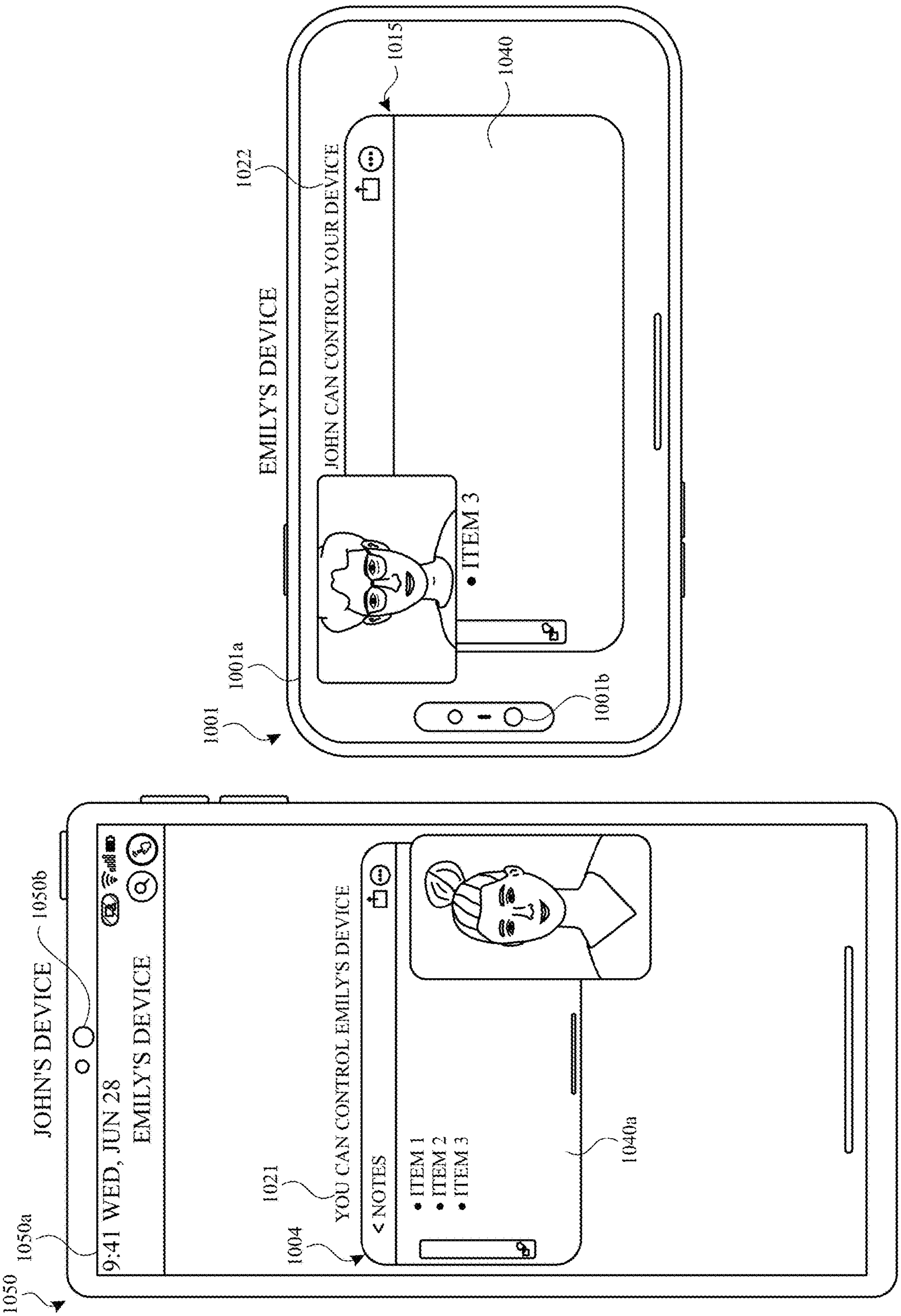

FIGS. 10I-10M illustrate example user interfaces for various embodiments in which Emily's device is rotated and the rotated screen content is displayed at devices having different sized display screens. FIGS. 10I-10K depict an embodiment in which both John's device and Emily's device have a display screen of a same size. FIGS. 10L-10M depict an embodiment in which John's device has a larger display screen than Emily's device.

In FIG. 10I, Emily's device 1001 and John's device 1000 are depicted having a portrait orientation. Display 1001*a* of Emily's device 1001 is a same size as display 1000*a* of John's device 1000. In FIG. 10J, Emily's device 1001 is shown rotated to a landscape orientation. Emily's device 1001 displays the content within window 1015 (e.g., notes interface 1040) having the rotated orientation (e.g., landscape orientation). Because the screen content was rotated at Emily's device 1001, John's device 1000 also displays the shared screen content in the rotated orientation within window 1004. Specifically, representation 1040*a* is displayed having the same landscape orientation as displayed at Emily's device 1001, even though John's device 1000 still has the portrait orientation. Thus, in order for John to properly view the shared screen content, John rotates his device as shown in FIG. 10K.

FIGS. 10L and 10M depict an embodiment in which John's device 1000 is replaced by John's device 1050, which is a tablet computer having display 1050*a* and camera 1050*b*. John's tablet is similar to John's device 1000 except that display 1050*a* is larger than display 1000*a*. In FIG. 10L, Emily's device 1001 and John's device 1050 are depicted having a portrait orientation. Display 1050*a* of John's device 1050 is larger than display 1001*a* of Emily's device 1001. In FIG. 10M, Emily's device 1001 is shown rotated to a landscape orientation. Emily's device 1001 displays the content within window 1015 (e.g., notes interface 1040) having the rotated orientation (e.g., landscape orientation). Because the screen content was rotated at Emily's device 1001, John's device 1050 also displays the shared screen content in the rotated orientation within window 1004. Specifically, representation 1040*a* is displayed having the same landscape orientation as displayed at Emily's device 1001, even though John's device 1050 still has the portrait orientation. Because display 1050*a* of John's device 1050 is larger than display 1001*a* of Emily's device 1001, John's device 1050 accommodates the rotated display of the shared screen content so that John can properly view the shared screen content without having to rotate John's device 1050. For example, John's device 1050 adjusts (e.g., rotates and, in some embodiments, resizes) window 1004 so that the shared screen content (e.g., representation 1040*a*) fits within window 1004 and is shown having the landscape orientation while John's device 1050 stays in the portrait orientation, as shown in FIG. 10M.

Figure 10N:
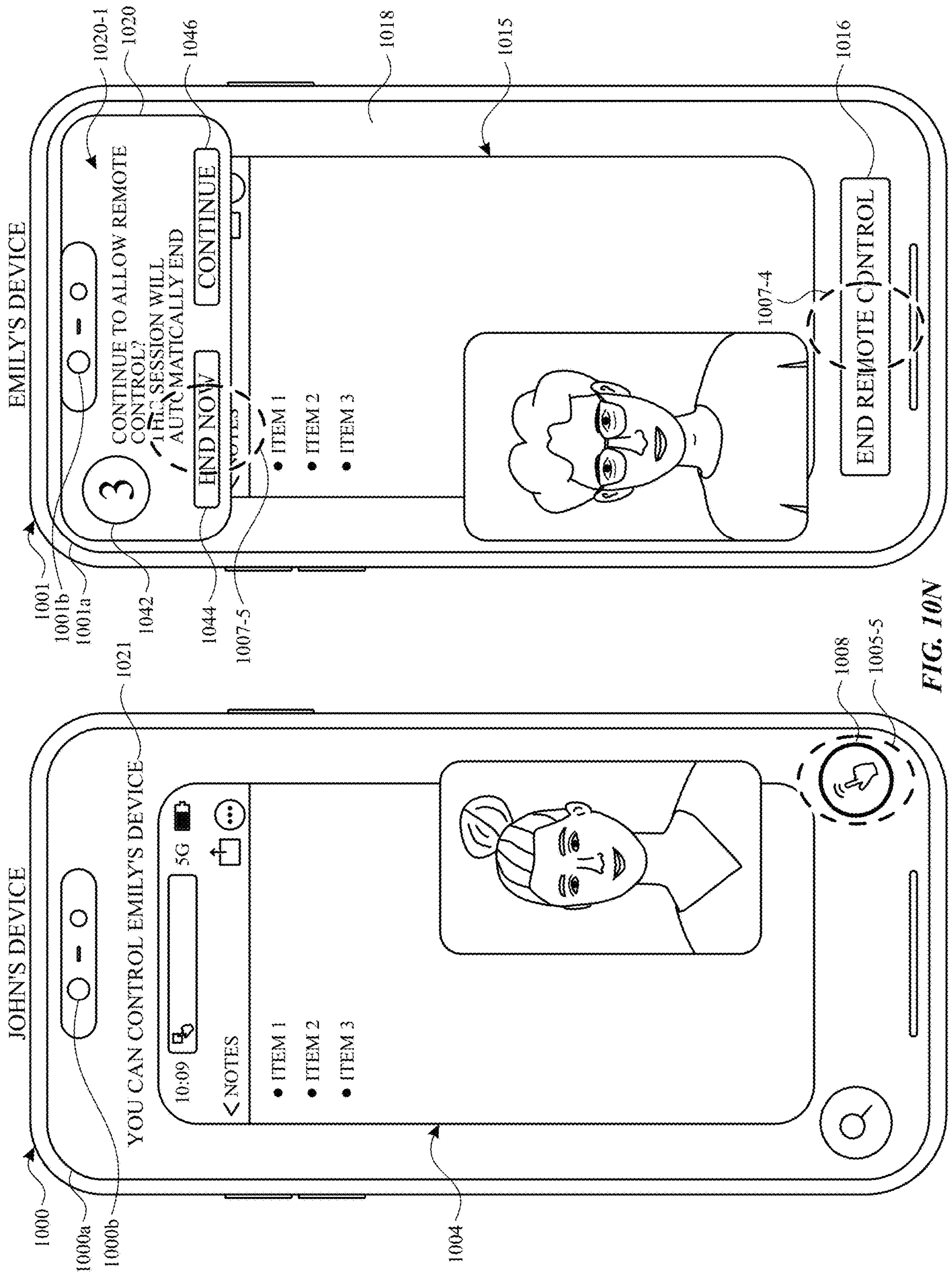
Figure 10O:
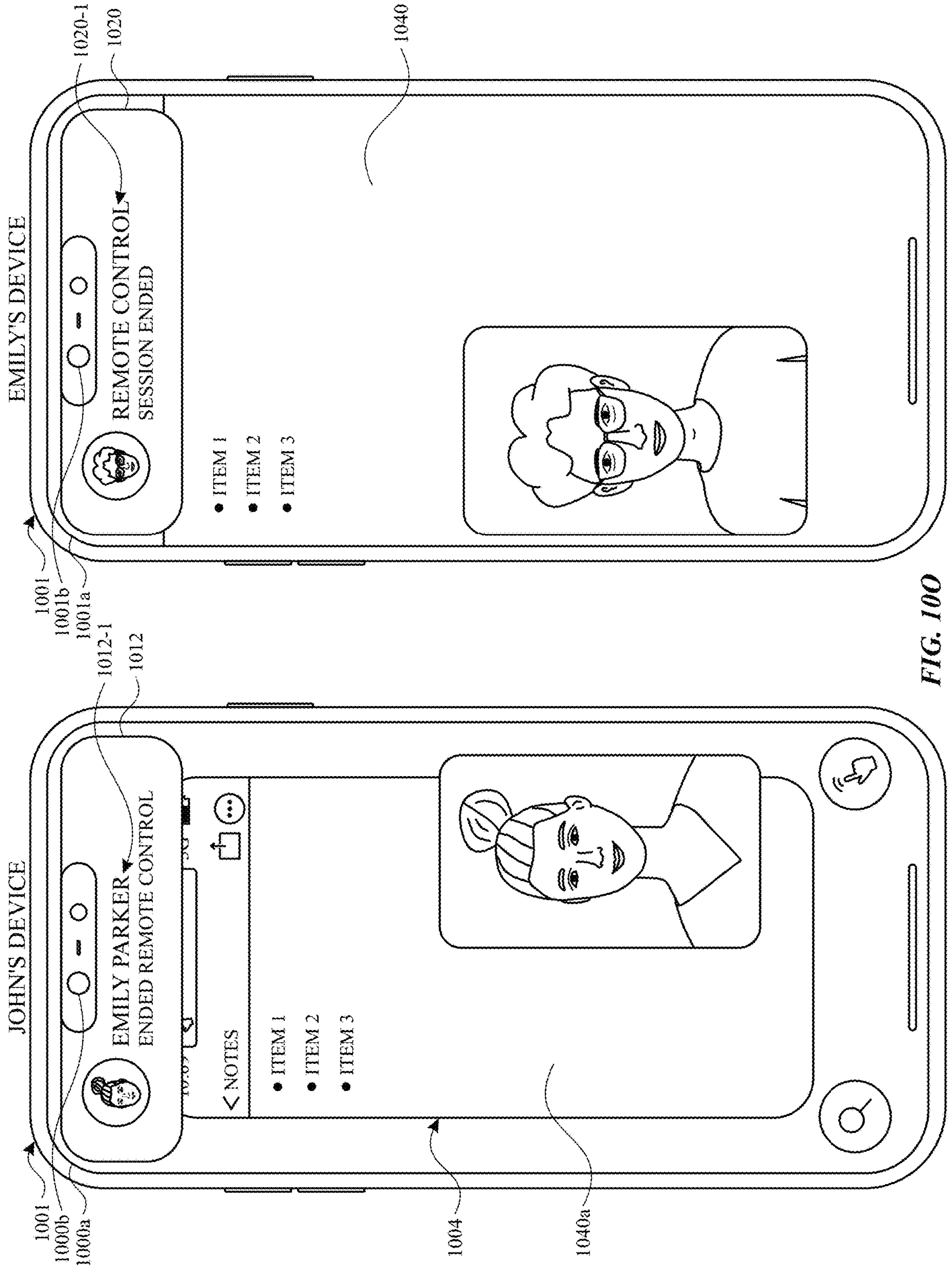

FIGS. 10N and 10O depict example user interfaces for embodiments in which the screen control permissions for John's device 1000 are ended. In FIG. 10N, Emily's device 1001 prompts Emily to end the remote control permissions for John's device 1000 in response to determining that no input has been detected at either device for at least a threshold amount of time. Emily's device 1001 updates control region 1020 to include countdown timer 1042, end now element 1044, and continue element 1046. Status region 1020-1 is updated to ask Emily if she wants to continue to allow the remote control of her device and to indicate that the remote control permissions will automatically terminate (e.g., at the expiration of countdown timer 1042) if no action is taken at Emily's device 1001. Alternatively, Emily can continue with the remote control session by selecting continue element 1046, or can terminate the remote control session immediately by selecting end now element 1044 or end control element 1016. Conversely, John's device 1000 can terminate the remote control of Emily's device by selecting control element 1008.

In FIG. 10O, the permission for John's device 1000 to remotely control the screen content of Emily's device 1000 is terminated. For example, John's device 1000 terminates the remote control session in response to detecting input 1005-5 in FIG. 10N selecting control element 1008. Alternatively, Emily's device 1001 terminates the remote control session in response to detecting the expiration of countdown timer 1042, input 1007-5 selecting end now element 1044, or input 1007-4 selecting end control element 1016. As shown in FIG. 10O, John's device 1000 updates control region 1012 to indicate that Emily ended the remote control session. Emily's device 1001 updates control region 1020 to indicate that the remote control session with John's device has ended.

FIGS. 10P-10T depict example user interfaces for an embodiment in which Emily's device is sharing a presentation with John's device. In the embodiment depicted in FIGS. 10P-10T, Emily's device 1051 is a laptop computer having display 1051*a*, one or more cameras 1051*b*, keyboard 1051*c*, trackpad 1051*d*, and other hardware such as processors, memory, and other components for operating Emily's device. In the embodiment depicted in FIGS. 10P-10T, Emily's device 1051 is a laptop; however, Emily's device can be a different type of computer system such as a desktop computer, tablet computer, smartwatch, smartphone, or a head-mounted device. In some embodiments, Emily's device 1051 includes one or more elements of devices 120, 300, 500, 601, 801, and/or 1001.

Figure 10P:
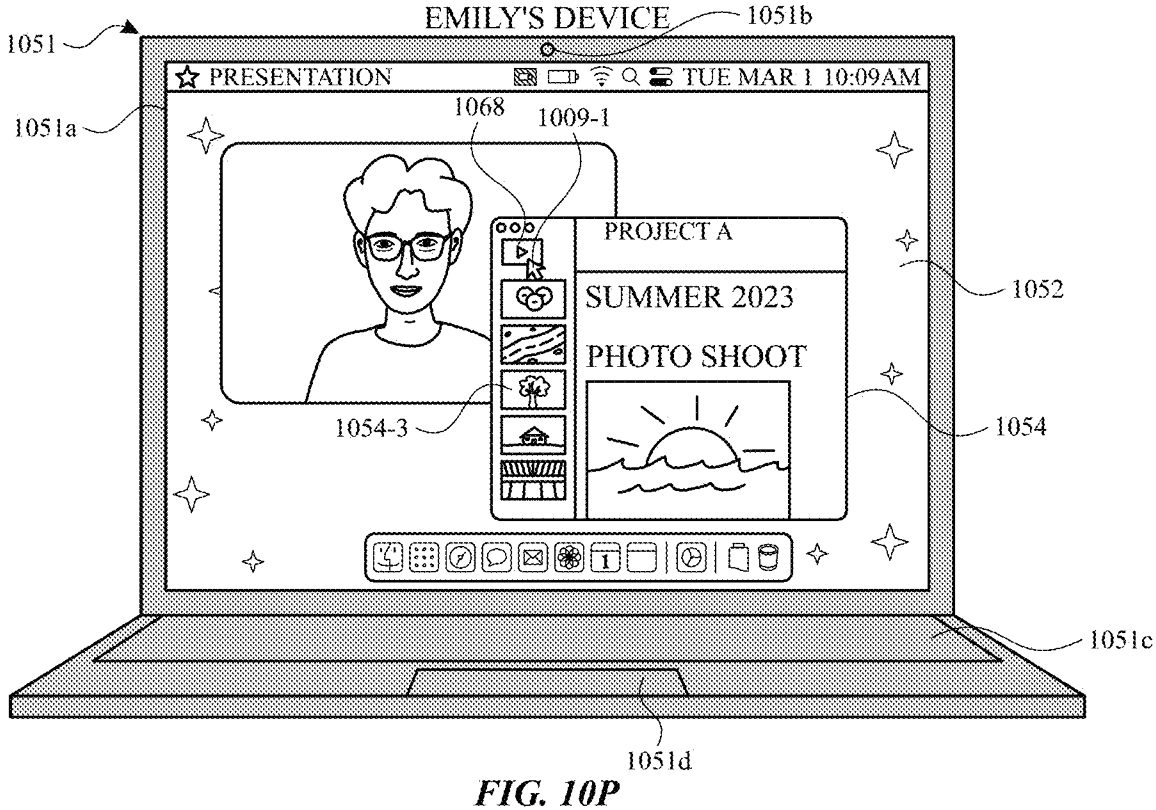

In FIG. 10P, Emily's device 1051 is in a video communication session with John's device and displays, via display 1051*a*, desktop 1052, which includes presentation application window 1054 and a video feed of John's device. Presentation application window includes various presentation slides, including presentation slide 1054-3, and play button 1068 for starting the presentation. In FIG. 10P, Emily's device 1051 detects input 1009-1 (e.g., an input using trackpad 1051*d*) selecting play button 1068. In response to detecting input 1009-1, Emily's device 1051 displays prompt 1056 in FIG. 10Q, which asks Emily if she intends to share playback of the presentation with John's device or if she intends to start the presentation for just herself (e.g., at Emily's device 1051 without sharing playback of the presentation with John's device). Prompt 1056 includes option 1056-1, which is selectable to start playback of the presentation and to share playback of the presentation with John's device (e.g., via a shared-content session), and option 1056-2, which is selectable to start playback of the presentation without sharing playback of the presentation with John's device. In some embodiments, Emily's device 1051 displays prompt 1056 because Emily's device is in a video communication session. In some embodiments, if Emily's device is not in a video communication session, Emily's device starts playback of the presentation without sharing playback of the presentation and, in some embodiments, without displaying prompt 1056.

Figure 10Q:
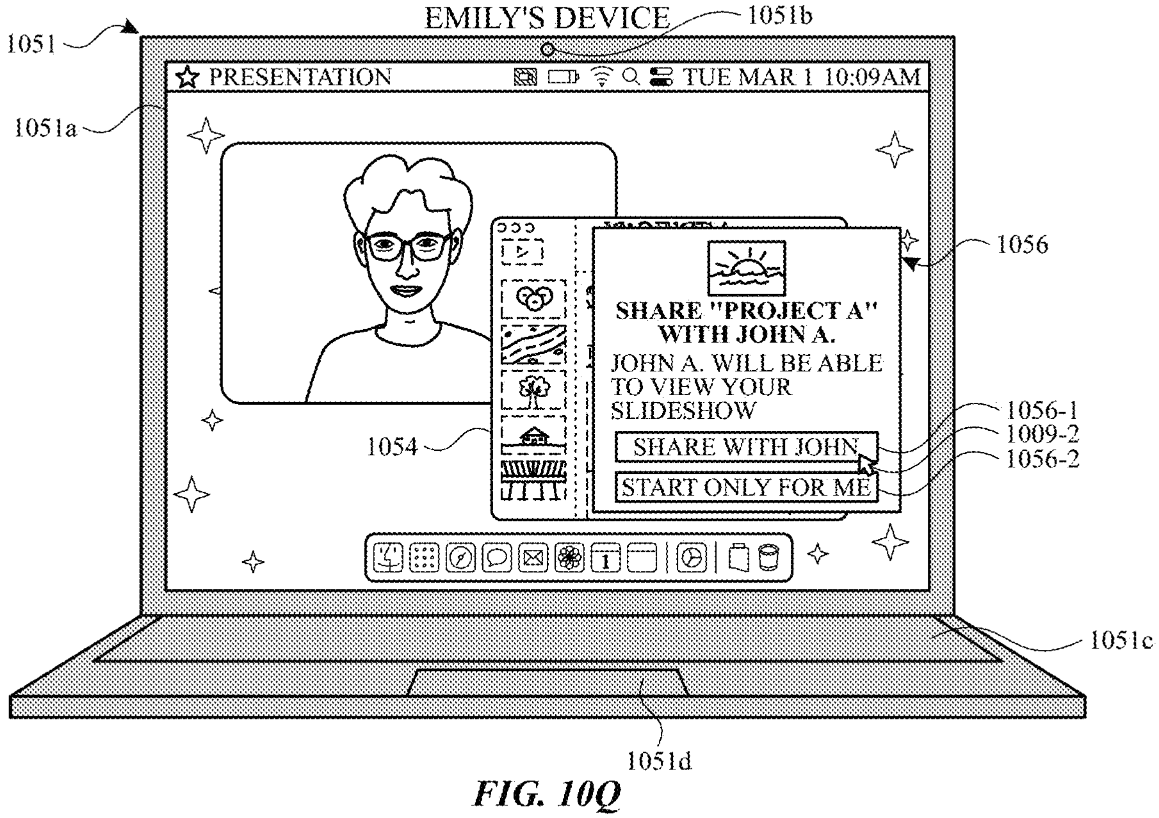
Figure 10R:
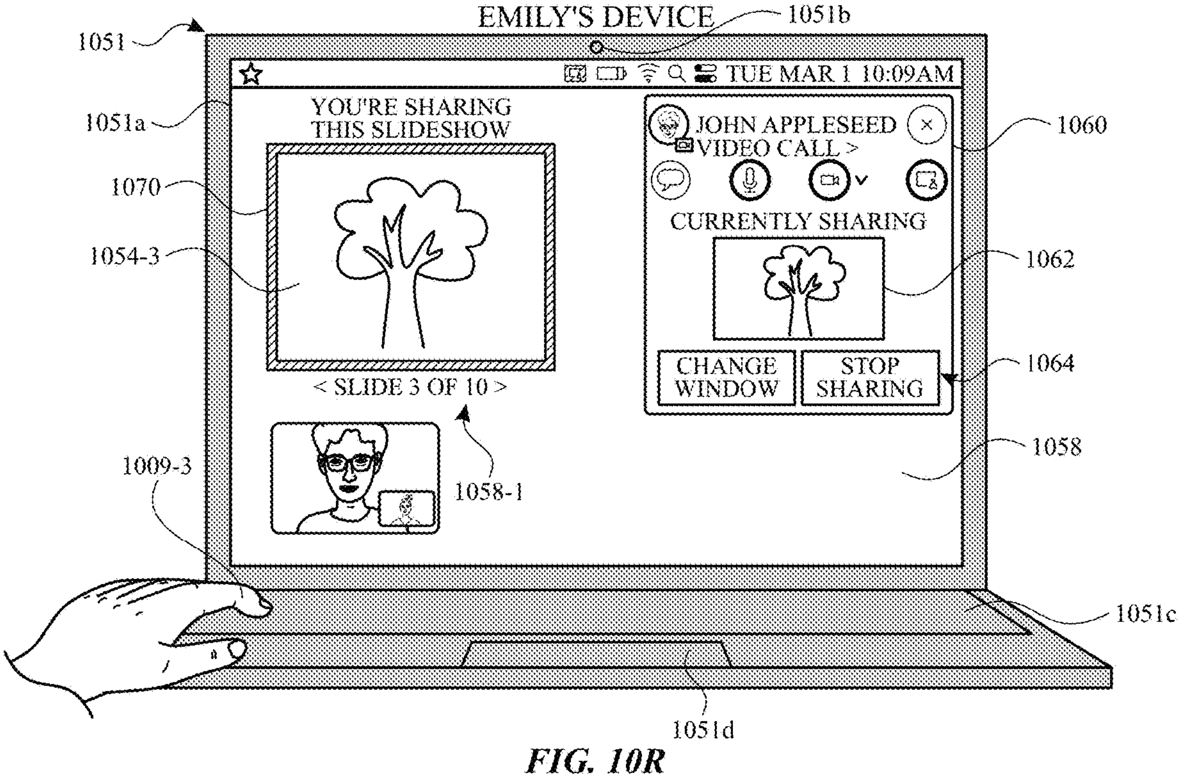

In FIG. 10Q, Emily's device 1051 detects input 1009-2 selecting option 1056-1 and, in response to input 1009-2, begins playback of the presentation and starts sharing playback of the presentation with John's device. As depicted in FIG. 10R, Emily's device 1051 displays presentation interface 1058 including presentation information 1058-1 and a representation of the shared presentation content (e.g., slide 1054-3 in FIG. 10R). Emily's device 1051 also displays indicator 1070 which is a graphical element that indicates (e.g., highlights) content of the presentation that is being shared with John's device (e.g., in the shared-content session). Emily's device 1051 also displays menu 1060 which indicates a video call is active with John's device and includes preview 1062 providing a view of the presentation content that is being shared with John's device in a shared-content session. As shown in FIG. 10R, presentation slide 1054-3 is currently being shared with John's device as indicated by the display of presentation slide 1054-3 in presentation interface 1058, the display of indicator 1070 around presentation slide 1054-3, and the display of preview 1062 in menu 1060. Presentation interface 1058 also includes text indicating that the slide show presentation is being shared. In some embodiments, presentation interface 1058 includes content that is not shared as part of the presentation. For example, text 1058-1 indicates presentation information is not shared. Other content that is not shared can include presenter notes, menu options, and other aspects of the presentation application that are not selected for presentation.

Figure 10S:
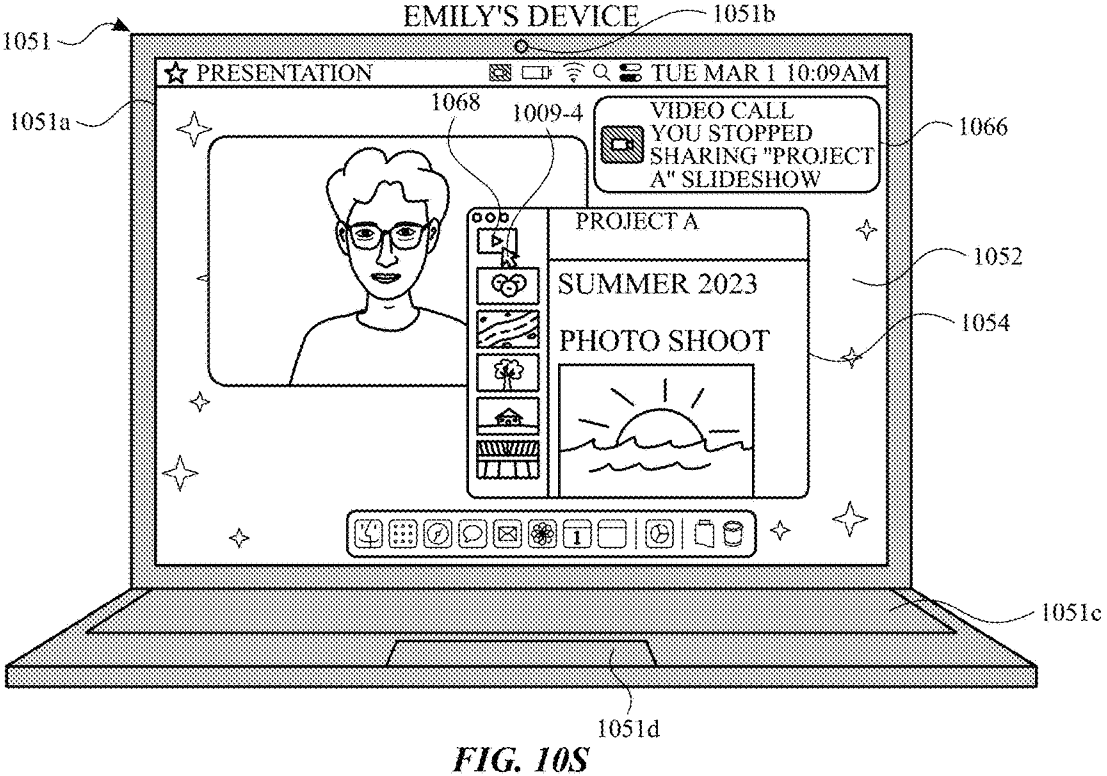

In some embodiments, menu 1060 includes controls 1064 for the presentation. For example, controls 1064 can include an element that is selectable to stop sharing the presentation and, in some embodiments, an element that is selectable to choose different content for being shared as part of a shared-content session. In FIG. 10R, Emily's device 1051 detects input 1009-3, which is a request to end playback of the presentation. In some embodiments, input 1009-3 is a selection of a key of the keyboard such as, for example, the "esc" key or an "end" key. In response to detecting input 1009-3, Emily's device 1051 stops playback of the presentation while continuing the video call with John's device. As shown in FIG. 10S, Emily's device 1051 stops displaying presentation interface 1058 and returns to the display of desktop 1052. Emily's device 1051 displays notification 1066 indicating that Emily stopped sharing the presentation. In some embodiments, in response to detecting a user exiting the presentation application, Emily's device 1051 stops sharing playback of the application and exits (e.g., closes) the application.

In some embodiments, after stopping playback of the presentation and receiving a subsequent request to continue playback of the presentation, Emily's device 1051 continues playback and sharing the presentation playback (e.g., without displaying prompt 1056), resuming, in some embodiments, where the user left off when stopping playback of the presentation. For example, in FIG. 10S, Emily's device 1051 detects input 1009-4 selecting play button 1068. In response to input 1009-4, Emily's device 1051 resumes the playback and sharing of the presentation, as shown in FIG. 10T. In FIG. 10T, Emily's device 1051 continues the presentation by again displaying presentation interface 1058 and sharing presentation slide 1054-3, which is the slide that was being shared with John's device when input 1009-3 was detected. Emily's device 1051 displays notification 1072 indicating that Emily has resumed sharing playback of the presentation in the shared-content session. In some embodiments, Emily's device 1051 resumes playback of the presentation from the beginning of the presentation. In some embodiments, Emily's device 1051 resumes playback of the presentation from a currently selected slide.

FIG. 11 is a flow diagram illustrating a method for granting a request to share control of screen content using a computer system in accordance with some embodiments. Method 1100 is performed at a computer system (e.g., 100, 300, 500, 600, 601, 800, 801, 1000, 1001, 1050, and/or 1051) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) one or more display generation components (e.g., 112, 340, 504, 600*a*, 601*a*, 660, 800*a*, 801*a*, 1000*a*, 1001*a*, 1050*a*, and/or 1051*a*) (e.g., a display controller, a touch-sensitive display system, a display screen, a monitor, a projector, a holographic display, a head-mounted display system, and/or other device or component that presents visual content to a user, for example on or in the display generation component itself or produced from the display generation component and visible elsewhere) and one or more input devices (e.g., 112, 350, 355, 508, 522, 600*a*, 600*b*, 601*a*, 601*b*, 601*c*, 601*d*, 800*a*, 800*b*, 801*a*, 801*b*, 1000*a*, 1000*b*, 1001*a*, 1001*b*, 1050*a*, 1050*b*, 1051*a*, 1051*b*, 1051*c*, and/or 1051*d*) (e.g., a touch-sensitive surface, a keyboard, mouse, trackpad, one or more optical sensors for detecting a gaze and/or gestures, one or more capacitive sensors for detecting hover inputs, a microphone, and/or accelerometer/gyroscope/inertial measurement units). Some operations in method 1100 are, optionally, combined, the orders of some operations are, optionally, changed, and some operations are, optionally, omitted.

As described below, method 1100 provides an intuitive way for granting a request to share control of screen content. The method reduces the cognitive burden on a user for granting a request to share control of screen content, thereby creating a more efficient human-machine interface. For battery-operated computing devices, enabling a user to grant a request to share control of screen content faster and more efficiently conserves power and increases the time between battery charges.

At method 1100, while sharing screen content (e.g., 1006) with an external computer system (e.g., 1000) (e.g., the computer system is transmitting screen content to an external computer system that does not have control of the screen content at the computer system), the computer system (e.g., 1001) receives (1102) first data indicating a request (e.g., via input 1005-1) from the external computer system to control the screen content at the computer system (e.g., the computer system receives data indicating that the external computer system has requested access to control the screen content at the computer system). The computer system receives (1104), via the one or more input devices (e.g., 1101*a*), an input (e.g., 1007-1) (e.g., a touch input, an audio input, a gaze input, and/or a gesture input). In response (1106) to receiving the input, the computer system performs (e.g., conditionally performs) the following steps. In accordance with a determination (1108) that the input corresponds to an approval of the request from the external computer system to control the screen content at the computer system (e.g., the input includes a selection of an "accept," "allow," or "okay" option (e.g., 1014) that is displayed at the computer system), the computer system transitions (1110) to a first mode in which the computer system permits the external computer system to control the screen content at the computer system (e.g., as depicted in FIG. 10C) (e.g., the computer system initiates a process for granting temporary control of the screen content to the external computer system); and displays (1112), via the one or more display generation components (e.g., 1001*a*), a visual effect (e.g., 1015, 1016, 1020, 1020-1, and/or 1028) (e.g., shrinking the screen content displayed at the computer system, displaying a notification, displaying a highlight effect, and/or displaying some other visual effect that is associated with the screen content) associated with the screen content. Displaying the visual effect associated with the screen content provides improved feedback by indicating that the computer system has transitioned to the first mode in which the computer system permits the external computer system to control the screen content at the computer system. In some embodiments, when the computer system is in the first mode, both the computer system (e.g., 1001) and the external computer system (e.g., 1000) are permitted to control the screen content (e.g., 1006) at the computer system. In some embodiments, while in the first mode, the computer system pauses permission of the external computer system to control the screen content while the computer system is controlling the screen content (e.g., as depicted in FIG. 10G). In some embodiments, in accordance with a determination that the input does not correspond to an approval of the request from the external computer system to control the screen content at the computer system (e.g., the input includes a selection of a "decline," "don't allow," or "not now" option (e.g., 1013) that is displayed at the computer system or otherwise does not approve the request), the computer system forgoes transitioning the computer system to the first mode and forgoes displaying the visual effect associated with the screen content (and, in some embodiments, continues to share the screen content with the external computer system).

In some embodiments, as a part of displaying the visual effect associated with the screen content, the computer system (e.g., 1001) displays the screen content resizing from a first displayed size (e.g., 1006 in FIG. 10B) to a second displayed size (e.g., 1006 in FIG. 10C) that is smaller than the first displayed size (e.g., the computer system shrinks the displayed size of the screen content). Displaying the screen content resizing from the first displayed size to the second displayed size that is smaller than the first displayed size provides improved feedback by indicating that control of the screen content is shared with the external computer system. In some embodiments, the visual effect includes displaying a banner or notification (e.g., 1020 and/or 1020-1) to indicate that the external computer system has been granted permission to control the screen content at the computer system.

In some embodiments, in response to receiving the first data indicating the request from the external computer system (e.g., 1000) to control the screen content at the computer system (e.g., 1001), the computer system displays, via the one or more display generation components (e.g., 1001*a*), a notification (e.g., 1020) (e.g., a graphical object, banner, text, and/or menu) that includes an approve element (e.g., 1014) (e.g., a selectable user interface element such as an icon, a button, an option, an affordance, and/or a user-interactive graphical user interface object such as, for example, an "accept" option, an "allow" option, or an "okay" option) that is selectable (e.g., via input 1007-1) to approve the request from the external computer system to control the screen content at the computer system. Displaying the notification that includes the approve element that is selectable to approve the request in response to receiving the data indicating the request from the computer system reduces the number of inputs needed to grant permission to the external computer system to control the screen content by automatically displaying the element that is selectable to approve the request without requiring additional user input. In some embodiments, in response to detecting selection (e.g., 1007-1) of the approve element, the computer system approves the request from the external computer system to control the screen content at the computer system, transitions to the first mode, and displays the visual effect associated with the screen content. In some embodiments, the notification includes a decline element (e.g., 1013) that is selectable to decline the request from the external computer system to control the screen content at the computer system. In some embodiments, the computer system displays (e.g., after approving the request) an "end" element (e.g., 1016) that is selectable to terminate the external computer system's control of the screen content. In some embodiments, in response to detecting a selection (e.g., 1007-4) of the "end" element, the computer system transitions out of the first mode to a mode in which the computer system is no longer permitted to control the screen content at the computer system (e.g., as depicted in FIG. 10O).

In some embodiments, the first data corresponds to a first selection (e.g., 1005-1) of a control element (e.g., 1008) (e.g., a remote control option) that is displayed at the external computer system (e.g., 1000) (e.g., the first data is transmitted to the computer system (e.g., 1001) in response to a selection of the control element that is detected at the external computer system when the external computer system does not have permission to control the screen content at the computer system). In some embodiments, while the computer system is in the first mode (e.g., the external computer system is permitted to control the screen content at the computer system), the computer system receives second data indicating a request from the external computer system to terminate control of the screen content at the computer system (e.g., the computer system receives data indicating that the external computer system has requested to terminate its access to control the screen content at the computer system), wherein the second data corresponds to a second selection (e.g., 1005-5) of the control element (e.g., 1008) that is displayed at the external computer system (e.g., the second data is transmitted to the computer system in response to a selection of the control element that is detected at the external computer system when the external computer system has permission to control the screen content at the computer system). In response to receiving the second data, the computer system terminates permission of the external computer system to control the screen content at the computer system (e.g., as depicted in FIG. 10O) (e.g., transitioning from the first mode to a mode in which the external computer system is not permitted to control the screen content at the computer system). By displaying a control element that is selectable a first time to request control of the screen content and selectable a second time to terminate control of the screen content, the external computer system provides additional control options without cluttering the user interface with additional displayed controls. In some embodiments, the external computer system displays a control element (e.g., 1008) that is selectable (e.g., when the external computer system does not have permission to control the screen content at the computer system) to request control of the screen content, and is selectable (e.g., when the external computer system has permission to control the screen content at the computer system) to terminate control of the screen content. In some embodiments, the external computer system does not display or otherwise provide the control element if the external computer system has a display component (e.g., 1000*a*) with a display area that is smaller than a display area of a display generation component (e.g., 1001*a*) of the computer system.

In some embodiments, while the computer system (e.g., 1001) is in the first mode (e.g., the external computer system is permitted to control the screen content at the computer system), the computer system displays, via the one or more display generation components (e.g., 1001*a*), status information (e.g., 1020-1 and/or 1022) that indicates (e.g., text and/or graphical element(s) that specifies which computer system has control of the screen content) a control state of the screen content (e.g., 1006, 1032, and/or 1040) (e.g., indicating that the screen content is currently controlled by the computer system or the external computer system). In some embodiments, the computer system detects a change in the control state of the screen content (e.g., control of the screen content has changed from being controlled by the computer system to being controlled by the external computer system, or vise-versa). In some embodiments, in response to detecting the change in the control state of the screen content, the computer system updates display of the status information (e.g., 1022 in FIG. 10E or 1022 in FIG. 10G) to indicate the change in the control state of the screen content (e.g., indicating that control of the screen content has changed from being controlled by the computer system to being controlled by the external computer system, or vise-versa). Displaying status information that indicates a control state of the screen content and updating display of the status information in response to detecting a change in the control state of the screen content, provides improved feedback by indicating which computer system currently has control of the screen content. In some embodiments, the external computer system displays status information that updates to indicate a change in control state of the screen content of the computer system.

In some embodiments, while the computer system (e.g., 1001) is in the first mode, the computer system receives a first request for controlling the screen content (e.g., an input from the computer system or from the external computer system). In response to receiving the first request for controlling the screen content, the computer system performs (e.g., conditionally performs) the following steps. In accordance with a determination that the screen content is currently controlled by the external computer system (and, in some embodiments, in accordance with a determination that the first request is received from the external computer system), an operation associated with the first request is executed (e.g., opening an application, displaying respective content, closing an application, inserting text, operating an application, and/or performing another operation for controlling the screen content at the computer system) while the screen content is not controlled by the computer system (e.g., while the external computer system is controlling the screen content, the computer system is not controlling the screen content) (e.g., opening the weather application associated with weather application icon 1030 in response to input 1005-2 in FIG. 10E). In some embodiments, the first request is associated with an input at the external computer system for controlling the screen content at the computer system. In response to receiving the first request, the computer system executes an operation based on the input received at the external computer system. For example, if the input received at the external computer system has a first characteristic (e.g., the input corresponds to a command for opening a respective application at the computer system), the computer system executes a first operation (e.g., opening the respective application). If the input received at the external computer system has a different characteristic (e.g., the input corresponds to a command for closing a respective application at the computer system), the computer system executes a different operation (or executes the first operation in a different manner) (e.g., closing the respective application). In accordance with a determination that the screen content is currently controlled by the computer system (e.g., as depicted in FIG. 10G) (and, in some embodiments, in accordance with a determination that the first input is received from the computer system), the computer system executes the operation associated with the first request (e.g., opening an application, displaying respective content, closing an application, inserting text, operating an application, and/or performing another operation for controlling the screen content at the computer system) while the screen content is not controlled by the external computer system (e.g., while the computer system is controlling the screen content, the external computer system is not controlling the screen content) (e.g., navigating to a second page 1006-1 of home screen interface 1006 in response to input 1007-3). In some embodiments, the first request is associated with an input (e.g., 1007-2 and/or 1007-3) received at the computer system for controlling the screen content. In response to receiving the first request, the computer system executes an operation based on the input received at the computer system. For example, if the input received at the computer system has a third characteristic (e.g., the input corresponds to a command displaying respective content at the computer system), the computer system executes a third operation (e.g., displaying the respective content). If the input received at the external computer system has a different characteristic (e.g., the input corresponds to a command for providing a text input in a message compose field), the computer system executes a different operation (or executes the third operation in a different manner) (e.g., providing the text input in the message compose field). In some embodiments, the computer system permits the screen content to be controlled by only one computer system at a given time (e.g., the computer system or the external computer system, but not both concurrently).

In some embodiments, while the computer system (e.g., 1001) is in the first mode, the computer system receives a second request for controlling the screen content. In response to receiving the second request for controlling the screen content, the computer system performs (e.g., conditionally performs) the following steps. In accordance with a determination that the second request is associated with an input (e.g., 1007-2 and/or 1007-3) received at the one or more input devices (e.g., 1001*a*) of the computer system (e.g., the second request includes an input that is received at the computer system and not the external computer system), the computer system executes an operation associated with the second request (e.g., opening an application, displaying respective content, closing an application, inserting text, operating an application, and/or performing another operation for controlling the screen content at the computer system based on the input associated with the second request) and pauses (e.g., temporarily suspending) permission for the external computer system (e.g., 1000) to control the screen content for a predetermined amount of time (e.g., 2 seconds, 2.5 seconds, or 3 seconds) (e.g., as depicted in FIG. 10G). In some embodiments, while the permission for the external computer system to control the screen content is paused, the computer system ignores inputs (e.g., 1005-3) received from the external computer system (e.g., 1000). In some embodiments, after the predetermined amount of time has elapsed, the computer system resumes the external computer system's permission to control the screen content. In some embodiments, in response to receiving the second request for controlling the screen content, in accordance with a determination that the second request is associated with an input (e.g., 1005-4) received at the external computer system (e.g., 1000), the computer system executes an operation associated with the second request without pausing permission for the external computer system to control the screen content for a predetermined amount of time. In some embodiments, when the external computer system has permission to control the screen content of the computer system, the permission is paused when an input (e.g., 1007-2 and/or 1007-3) is received at the computer system (e.g., the user of the computer system controls the screen content). In some embodiments, the external computer system displays a notification (e.g., 1021 in FIG. 10G and/or 1036) indicating that the external computer system cannot control the screen content at the computer system because the computer system is being controlled by the user of the computer system. In some embodiments, the computer system and/or the external computer system displays a visual effect (e.g., 1036) (e.g., a dimming effect or an appearance of frozen glass) to indicate permission is paused for the external computer system.

In some embodiments, while the computer system (e.g., 1001) is in the first mode and is executing a first operation for controlling the screen content (e.g., displaying weather interface 1032, displaying home screen interface 1006, and/or navigating to page 1006-1 of home screen interface 1006) (e.g., opening an application, displaying respective content, closing an application, inserting text, operating an application, and/or performing another operation for controlling the screen content at the computer system), the computer system receives a third request for controlling the screen content (e.g., an input from the computer system or from the external computer system). In response to receiving the third request for controlling the screen content, the computer system performs (e.g., conditionally performs) the following steps. In accordance with a determination that the screen content (e.g., 1032 in FIG. 10F) is being controlled by the external computer system (e.g., 1000) (e.g., the first operation is being performed as a result of the external computer system controlling the screen content) and the third request is associated with an input (e.g., 1007-2) received at the one or more input devices (e.g., 1001*a*) of the computer system (e.g., the third request includes an input that is received at the computer system), the computer system ceases executing the first operation (e.g., ceases displaying weather interface 1032 per the request of input 1005-2 at John's device 1000) and executes a second operation associated with the third request (e.g., displaying home screen interface 1006 in response to input 1007-2) (e.g., if an input is received at the computer system while the external computer system is controlling the screen content, the computer system interrupts the operation being executed as a result of the external computer system controlling the screen content and executes an operation associated with the input received at the computer system). In accordance with a determination that the screen content (e.g., 1006 in FIG. 10G) is being controlled by the computer system (e.g., the first operation is being performed as a result of the computer system controlling the screen content) and the third request is associated with an input (e.g., 1005-3) received from the external computer system, the computer system continues to execute the first operation (e.g., displaying home screen interface 1006 and/or navigating to page 1006-1 of home screen interface 1006) and forgoing executing the second operation associated with the third request (e.g., ignoring input 1005-3 by not opening the music application associated with application icon 1034) (e.g., if an input is received at the external computer system while the computer system is controlling the screen content, the computer system ignores the input from the external computer system and continues to execute the operation associated with the input at the computer system). In some embodiments, a user of the computer system retains priority to control the screen content of the computer system even while the external computer system has permission to control the screen content.

In some embodiments, in accordance with a determination that the computer system (e.g., 1001) is in the first mode and the screen content (e.g., 1006 or 1040) is being controlled by the external computer system (e.g., 1000) (e.g., the external computer system is actively controlling the screen content and/or is assigned control of the screen content), the computer system displays, via the one or more display generation components (e.g., 1001*a*), a visual indicator (e.g., 1028) that is visually associated with the screen content (e.g., a highlighting, border, ring, and/or other visual indicator that surrounds or is otherwise visually associated with at least a portion of screen content that is being controlled by the external computer system) (e.g., the computer system indicates that the external computer system is controlling the screen content at the computer system). In some embodiments, the visual indicator is optionally displayed at the external computer system. In some embodiments, in accordance with a determination that the computer system is in the first mode and the screen content is not being controlled by the external computer system (e.g., the computer system is controlling the screen content and/or the external computer system is not actively controlling the screen content), the computer system forgoes displaying the visual indicator. Displaying the visual indicator that is visually associated with the screen content when the computer system is in the first mode and the screen content is being controlled by the external computer system and forgoing displaying the visual indicator when the screen content is not being controlled by the external computer system provides improved feedback by indicating when the external computer system is controlling the screen content at the computer system.

In some embodiments, while the computer system (e.g., 1001) is displaying the screen content (e.g., 1040) of the computer system in a first orientation (e.g., as depicted in FIG. 10I), the computer system detects a change in orientation of the computer system (e.g., a change from a portrait orientation to a landscape orientation, or vise-versa) (e.g., as depicted in FIG. 10J). In response to detecting the change in orientation of the computer system, the computer system displays the screen content (e.g., 1040) of the computer system in a second orientation that is different from the first orientation (e.g., as depicted in FIGS. 10J, 10K, and/or 10M) (e.g., changing an orientation of the screen content of the computer system, such as changing from a portrait orientation to a landscape orientation, or vise-versa). In some embodiments, in accordance with a determination that first criteria are met (e.g., the external computer system (e.g., 1000) has a display component (e.g., 1000*a*) having a display area that is a same size as a display area of a display generation component (e.g., 1001*a*) of the computer system), the external computer system (e.g., 1000) rotates a displayed representation (e.g., 1040*a*) of the screen content (e.g., rotates the orientation of the displayed representation of the screen content) without adjusting (e.g., rotating and/or resizing) a region (e.g., 1004) where the representation of the screen content is displayed. In some embodiments, in accordance with a determination that second criteria are met (e.g., the external computer system (e.g., 1050) has a display component (e.g., 1050*a*) having a display area that is larger than a display area of a display generation component (e.g., 1001*a*) of the computer system (e.g., 1001)), the external computer system (e.g., 1050) rotates the displayed representation (e.g., 1040*a*) of the screen content and adjusts the region (e.g., 1004) where the representation of the screen content is displayed (e.g., the external computer system rotates the representation of the screen content and resizes and/or rotates the region in which the representation of the shared screen content is displayed). Rotating the displayed representation of the screen content and selectively adjusting the region where the representation of the screen content is displayed based on whether the first or second criteria are met and in response to detecting a change in orientation of the screen content at the computer system performs an operation when a set of conditions has been met without requiring further user input.

In some embodiments, while the computer system (e.g., 1001) is in the first mode, in accordance with a determination that respective activity (e.g., inputs at the computer system and/or external computer system for controlling the screen content) has not been detected for at least a threshold amount of time (e.g., 5 seconds, 7 seconds, 10 seconds, 15 seconds, 20 seconds, or 30 seconds), the computer system displays, via the one or more display generation components (e.g., 1001*a*), a notification (e.g., 1020 in FIG. 10N) (e.g., a graphical object, banner, text, and/or menu) that includes a prompt (e.g., 1020-1, 1042, 1044, and/or 1046 in FIG. 10N) to terminate permission for the external computer system (e.g., 1000) to control the screen content at the computer system. Displaying a notification that includes a prompt to terminate the permission for the external computer system to control the screen content at the computer system when respective activity has not been detected for at least a threshold amount of time provides additional control options when they become relevant without cluttering the user interface with additional displayed controls for the duration of the period in which the computer system is in the first mode. In some embodiments, the prompt includes at least one of a countdown timer (e.g., 1042) and an end element (e.g., 1044 and/or 1016) (e.g., a selectable user interface element such as an icon, a button, an option, an affordance, and/or a user-interactive graphical user interface object) that is selectable to initiate a process for terminating (e.g., immediately) permission for the external computer system to control the screen content at the computer system. Displaying a prompt that includes at least one of a countdown timer and an end element that is selectable to initiate a process for terminating permission for the external computer system to control the screen content at the computer system provides improved feedback indicating that the user can immediately terminate the external computer system's control of the screen content or that such permission will automatically terminate at the end of the countdown. In some embodiments, in response to detecting selection of the end element (e.g., 1046 and/or 1016), the computer system terminates the permission for the external computer system to control the screen content at the computer system. In some embodiments, in response to detecting expiration of the countdown timer (e.g., 1042), the computer system terminates (e.g., automatically and/or without further user input) the permission for the external computer system to control the screen content at the computer system.

In some embodiments, while the computer system (e.g., 1051 and/or 1001) is not sharing screen content (e.g., 1054 and/or 1054-3) with the external computer system (e.g., 1000) (e.g., prior to sharing the screen content), the computer system receives, via the one or more input devices (e.g., 1051*c*, 1051*d*, and/or 1001*a*), a request (e.g., 1009-1 and/or 1009-2) to initiate playback of respective content (e.g., 1054 and/or 1054-3) (e.g., screen content, presentation slides, photos, and/or notes associated with an application operating at the computer system). In response to receiving the request to initiate playback of the respective content, the computer system initiates playback of the respective content. In accordance with a determination that a live communication session (e.g., a video call) is active at the computer system (e.g., the live communication session is established with one or more external computer systems), the computer system initiates playback of the respective content (e.g., at the computer system) and shares playback of the respective content with one or more participants of the live communication session (e.g., sharing playback of the respective content with one or more external computer systems participating in the live communication session with the computer system). In accordance with a determination that a live communication is not active at the computer system, the computer system initiates playback of the respective content (e.g., at the computer system) without sharing playback of the respective content with one or more participants of a live communication session. Initiating playback of the respective content with or without sharing playback of the respective content with one or more participants of a live communication session based on whether a live communication session is active at the computer system performs an operation (e.g., sharing playback of the respective content) when a set of conditions has been met without requiring further user input. In some embodiments, while the computer system is sharing playback of the respective content, the computer system displays a presenter view (e.g., 1058) of an application that is associated with the respective content and includes a representation (e.g., 1054-3 in FIG. 10R) of the respective content that is being shared and a representation of non-shared content (e.g., 1058-1) (e.g., presenter notes, photo data, or other content that is displayed in the presenter view but not shared with the participants of the live communication session). In some embodiments, the computer system displays the respective content that is being shared having a visual indication (e.g., 1070, 1060, 1062, and/or 1064) that the content is being shared (e.g., highlighting the shared content).

In some embodiments, in accordance with a determination that a live communication session is active at the computer system (e.g., 1051), and prior to initiating playback of the respective content (e.g., 1054 and/or 1054-3) and sharing playback of the respective content with one or more participants of the live communication session, the computer system displays, via the one or more display generation components (e.g., 1051*a*), a sharing notification (e.g., 1056) (e.g., a graphical object, banner, text, and/or menu) that includes: a first playback element (e.g., 1056-2) (e.g., a selectable user interface element such as an icon, a button, an option, an affordance, and/or a user-interactive graphical user interface object such as a "start only for me" option) that is selectable to initiate playback of the respective content without sharing playback of the respective content with the one or more participants of the live communication session; and a second playback element (e.g., 1056-1) (e.g., a selectable user interface element such as an icon, a button, an option, an affordance, and/or a user-interactive graphical user interface object such as a "share with others" option) that is selectable to initiate playback of the respective content and sharing playback of the respective content with the one or more participants of the live communication session. Displaying a sharing notification that includes the first playback element that is selectable to initiate playback of the respective content without sharing playback and the second playback element that is selectable to initiate playback of the respective content with sharing playback of the respective content provides additional control options without cluttering the user interface with additional displayed controls. In some embodiments, the computer system detects selection of the first playback element and, in response, initiates playback of the respective content without sharing playback of the respective content with the one or more participants of the live communication session. In some embodiments, the computer system detects selection (e.g., 1009-2) of the second playback element and, in response, initiates playback of the respective content and sharing playback of the respective content with the one or more participants of the live communication session. In some embodiments, display of the sharing notification can be disabled from a menu for a shared-content session or a menu for the live communication session. In some embodiments, the computer system reenables the sharing notification when the application is subsequently opened (e.g., after closing the application).

In some embodiments, while sharing playback of the respective content (e.g., 1054-3) with one or more participants of the live communication session, the computer system (e.g., 1051) receives, via the one or more input devices (e.g., 1051*c* and/or 1051*d*), a request (e.g., 1009-3) to terminate playback of the respective content. In response to receiving the request to terminate playback of the respective content, the computer system terminates playback of the respective content while continuing to display a user interface (e.g., 1054) for an application associated with the respective content (e.g., an application for playing the respective content). In some embodiments, the computer system displays a notification (e.g., 1066) that the respective content has stopped being shared. In some embodiments, the computer system receives, via the one or more input devices, a second request (e.g., 1009-4) to initiate playback of the respective content (e.g., a request to resume playback or start playback of the respective content). In some embodiments, in response to receiving the second request to initiate playback of the respective content, the computer system initiates playback of the respective content (e.g., resuming or restarting playback of the respective content) and shares playback of the respective content (e.g., automatically and/or without further user input) with the one or more participants of the live communication session (e.g., without displaying the sharing notification) (e.g., as depicted in FIG. 10T). Initiating playback of the respective content and sharing playback of the respective content with the one or more participants of the live communication session in response to receiving a second request to initiate playback of the respective content performs an operation when a set of conditions has been met (e.g., receiving a subsequent request to initiate playback of the respective content) without requiring further user input. In some embodiments, while sharing playback, the computer system receives a request to exit the application and, in response, stops sharing the playback of the respective content and, in some embodiments, exits (e.g., closes and/or terminates) the application associated with the respective content.

Note that details of the processes described above with respect to method 1100 (e.g., FIG. 11) are also applicable in an analogous manner to the methods described above and below. For example, methods 700, 900, and/or 1300 optionally includes one or more of the characteristics of the various methods described above with reference to method 1100. For example, one or more aspects of the user interfaces for granting a request to share control of screen content can be used in connection with the embodiments described in one or more of these methods. For brevity, these details are not repeated below.

FIGS. 12A-12F illustrate exemplary user interfaces for displaying representations of an input, in accordance with some embodiments. The user interfaces in these figures are used to illustrate the processes described below, including the processes in FIG. 13.

FIGS. 12A-12F illustrate exemplary systems or devices for participating in screen-sharing sessions, in accordance with some embodiments. Specifically, these systems or devices include John's device 1200 and Emily's device 1201, which are shown concurrently in some figures to illustrate concurrent states of the respective devices, including the user interfaces and inputs at the respective devices. In the embodiments provided herein, John's device can be described as performing a set of functions (e.g., functions associated with the screen-sharing session or other functions described herein), and Emily's device can be described as performing a different set of functions (e.g., a different set of functions associated with the screen-sharing session or other functions described herein). These descriptions are not intended to limit the functions performed by the respective devices, but rather, are provided to illustrate various aspects of the embodiments described herein. Thus, unless specified otherwise, the functions that are described as being performed using John's device are similarly capable of being performed using Emily's device. Likewise, the functions that are described as being performed by Emily's device are similarly capable of being performed by John's device, unless specified otherwise.

Figure 12A:
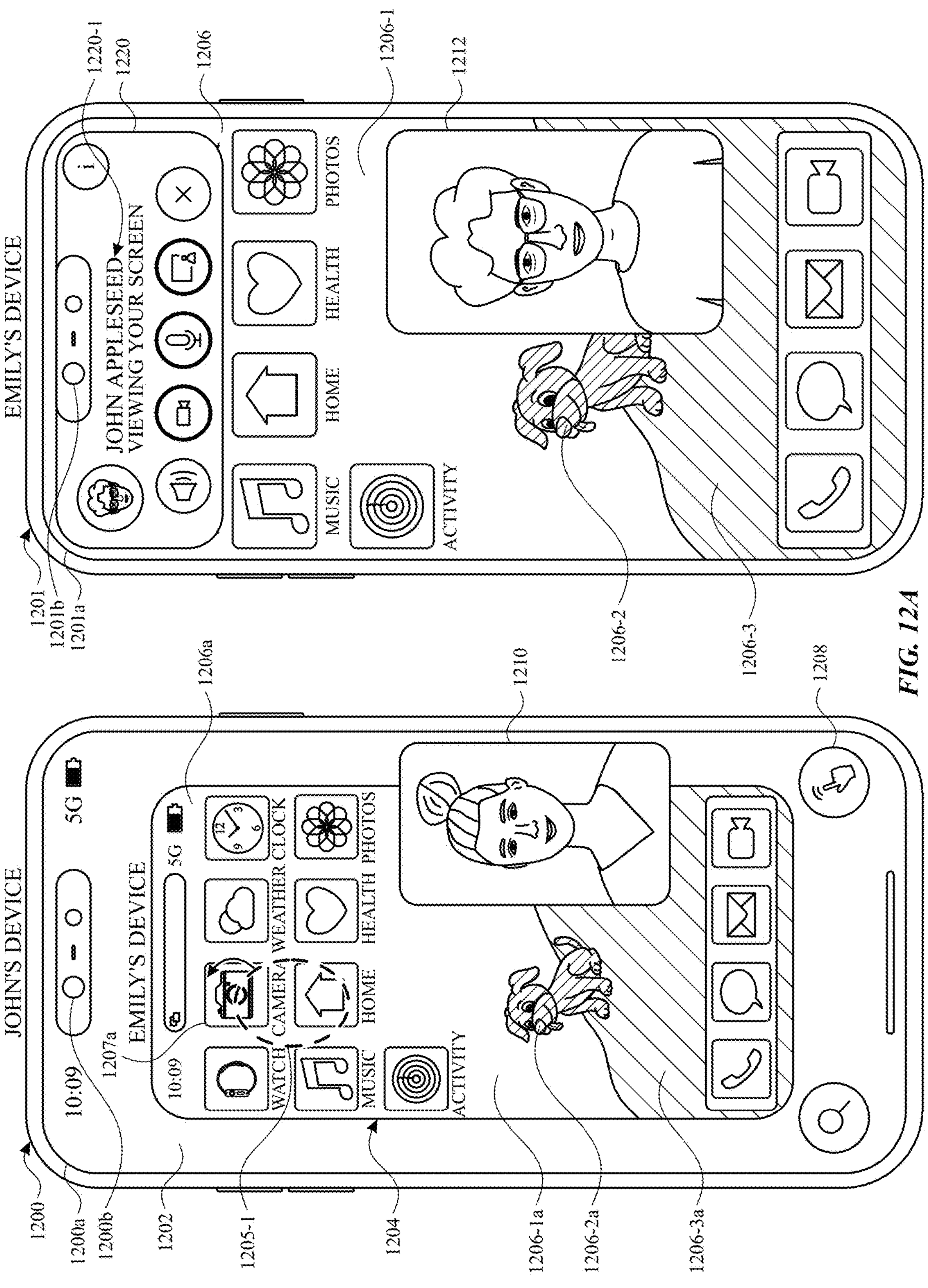
FIGS. 12A-12F illustrate exemplary user interfaces for displaying representations of an input, in accordance with some embodiments.
Figure 13:
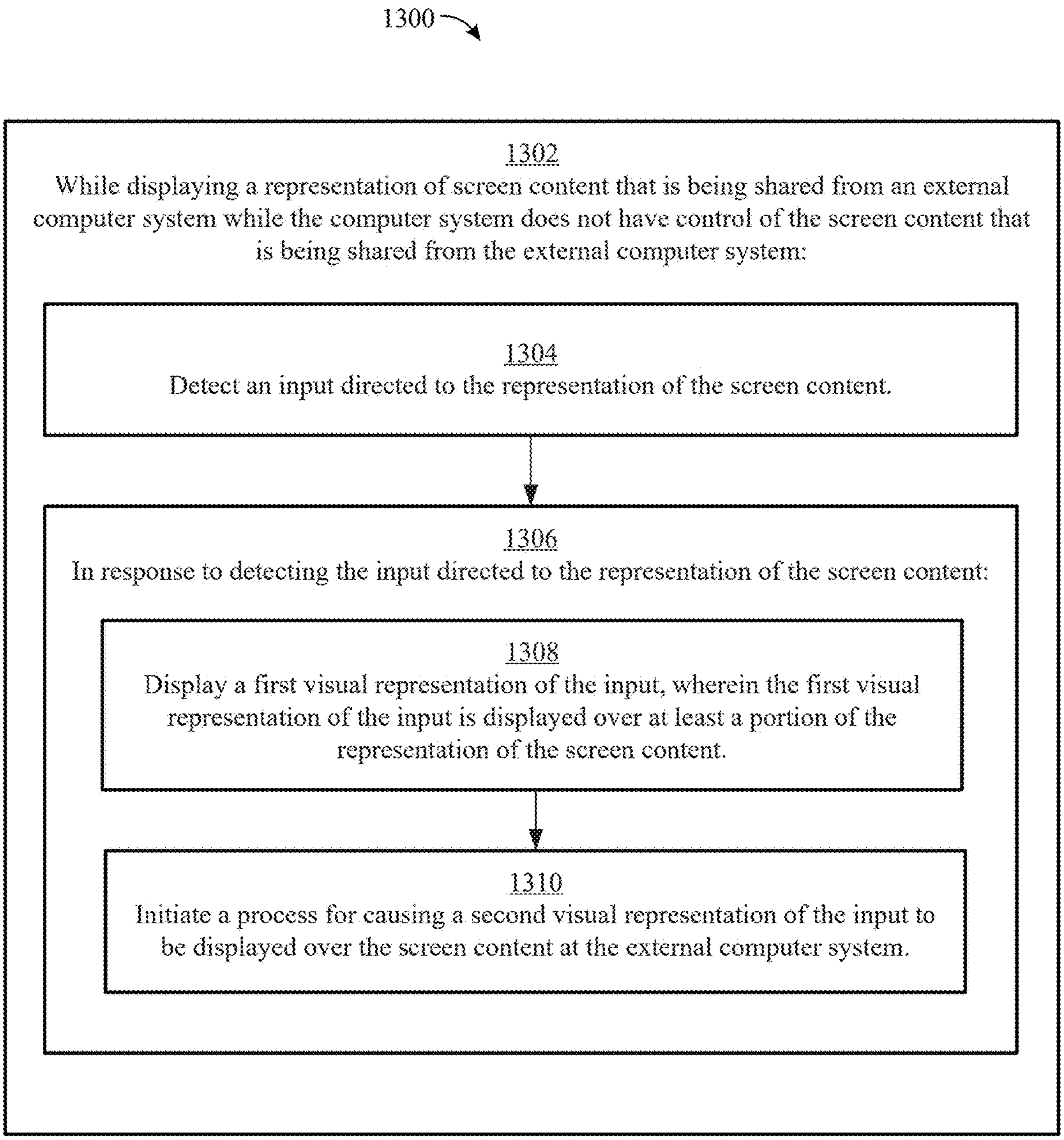
FIG. 13 is a flow diagram illustrating a method for displaying representations of an input, in accordance with some embodiments.

FIG. 12A. depicts John's device 1200 and Emily's device 1201. John's device 1200 is a computer system that, in some embodiments, is comprised of touch-sensitive display 1200*a*, camera 1200*b*, and other hardware such as processors, memory, and other components for operating John's device 1200. In the embodiment depicted in FIG. 12A, John's device 1200 is a smartphone; however, John's device can be a different type of computer system such as a desktop computer, tablet computer, smartwatch, laptop computer, or a head-mounted device. In some embodiments, John's device 1200 includes one or more elements of devices 120, 300, 500, 600, 800, and/or 1000. Emily's device 1201 is a computer system that, in some embodiments, is comprised of touch-sensitive display 1201*a*, camera 1201*b*, and other hardware such as processors, memory, and other components for operating Emily's device 1201. In the embodiment depicted in FIG. 12A, Emily's device 1201 is a smartphone; however, Emily's device can be a different type of computer system such as a laptop computer, tablet computer, smartwatch, desktop computer, or a head-mounted device. In some embodiments, Emily's device 1201 includes one or more elements of devices 120, 300, 500, 601, 801, and/or 1001.

FIGS. 12A-12F depict example user interfaces for embodiments in which John's device 1200 provides an input on shared screen content and a representation of the input is displayed at both John's device 1200 and Emily's device 1201. In FIG. 12A, Emily's device 1201 is sharing screen content during a video call with John's device 1200. Emily's device 1201 is displaying interface 1206, which is being shared with John's device 1200. Interface 1206 is a home screen interface for Emily's device 1201. Interface 1206 includes a wallpaper having different portions, with the different portions having different colors. For example, background portion 1206-1 is a first color, dog portion 1206-2 is a second color, and ground portion 1206-3 is a third color. Emily's device 1201 also displays control region 1220 (e.g., similar to control regions 820 and 1020), including status region 1220-1 (e.g., similar to status regions 820-1 and 1020-1) and controls for the communication session with John's device 1200. Emily's device 1201 also displays video feed window 1212, which is a representation of the video feed from John's device 1200.

John's device 1200 is displaying interface 1202 which includes window 1204 for displaying a representation of the screen content being shared from Emily's device 1201 in the shared-content session. John's device 1200 displays, in window 1204, representation 1206*a* of Emily's home screen interface 1206, including a representation of the wallpaper and the corresponding colors for each respective portion. For example, John's device 1200 displays representation 1206-1*a* of background portion 1206-1, representation 1206-2*a* of dog portion 1206-2, and representation 1206-3*a* of ground portion 1206-3. The representations of the wallpaper include the respective colors (e.g., first color, second color, and third color) of the wallpaper portions displayed on Emily's device 1201. John's device 1200 also displays status text indicating that the content in window 1204 represents screen content from Emily's device, and a zoom control and control element 1208 (e.g., similar to control element 1008). John's device 1200 also displays video feed window 1210, which is a representation of the video feed from Emily's device 1201.

In the embodiments depicted in FIGS. 12A-12F, a feature is enabled for the respective devices that permits a representation of an input to be displayed at the devices when control of the shared content is not being shared (e.g., John's device 1200 is not permitted to control the screen content of Emily's device 1201). Specifically, in the embodiments depicted in FIGS. 12A-12F, while Emily's device 1201 is sharing screen content with John's device 1200 (e.g., and John's device does not have permission to control the screen content at Emily's device 1201) both John's device 1200 and Emily's device 1201 display a representation of an input detected on the shared screen content displayed at John's device 1200. In some embodiments, the feature enabling the display of a representation of an input can be disabled in a settings menu of the respective devices.

In some embodiments, John's device 1200 and Emily's device 1201 display a visual representation of an input (e.g., an input detected on a representation of the shared screen content) having different appearances based on whether the input is stationary (e.g., a tap input) or includes movement (e.g., a drag gesture or a drawing gesture). For the sake of simplicity, an input that includes movement is referred to below as a drawing gesture, whereas a stationary input is referred to as a tap input. An example of a drawing gesture and the corresponding visual representations of the drawing gesture are described below with reference to FIGS. 12A-12C. An example of a tap input and the corresponding visual representations of the tap input are described below with reference to FIGS. 12C-12F. In some embodiments, an input can transition from a tap input to a drawing gesture. An example of such an input and corresponding visual representations of the input are described below with reference to FIGS. 12E and 12F.

Figure 12B:
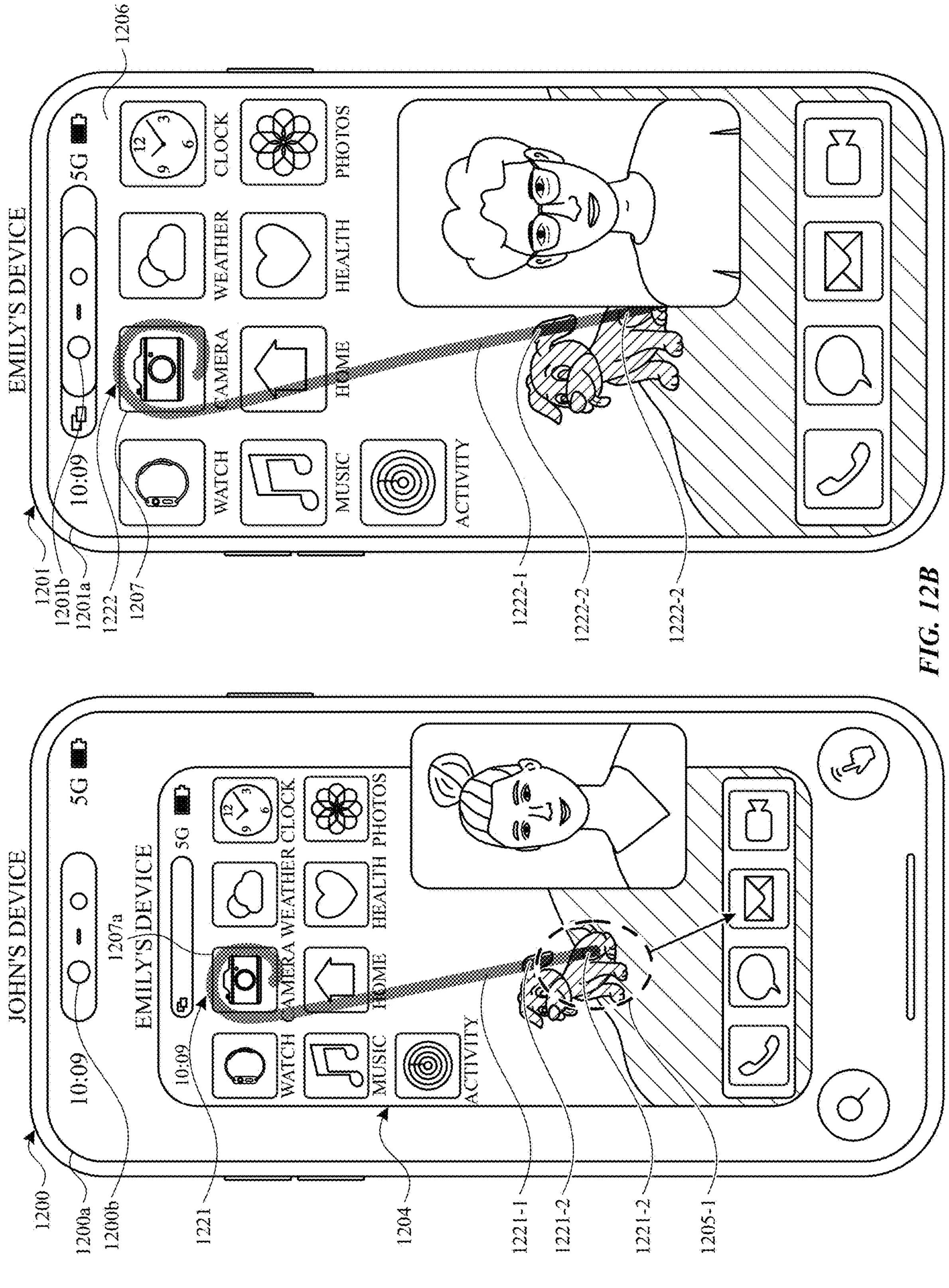
Figure 12C:
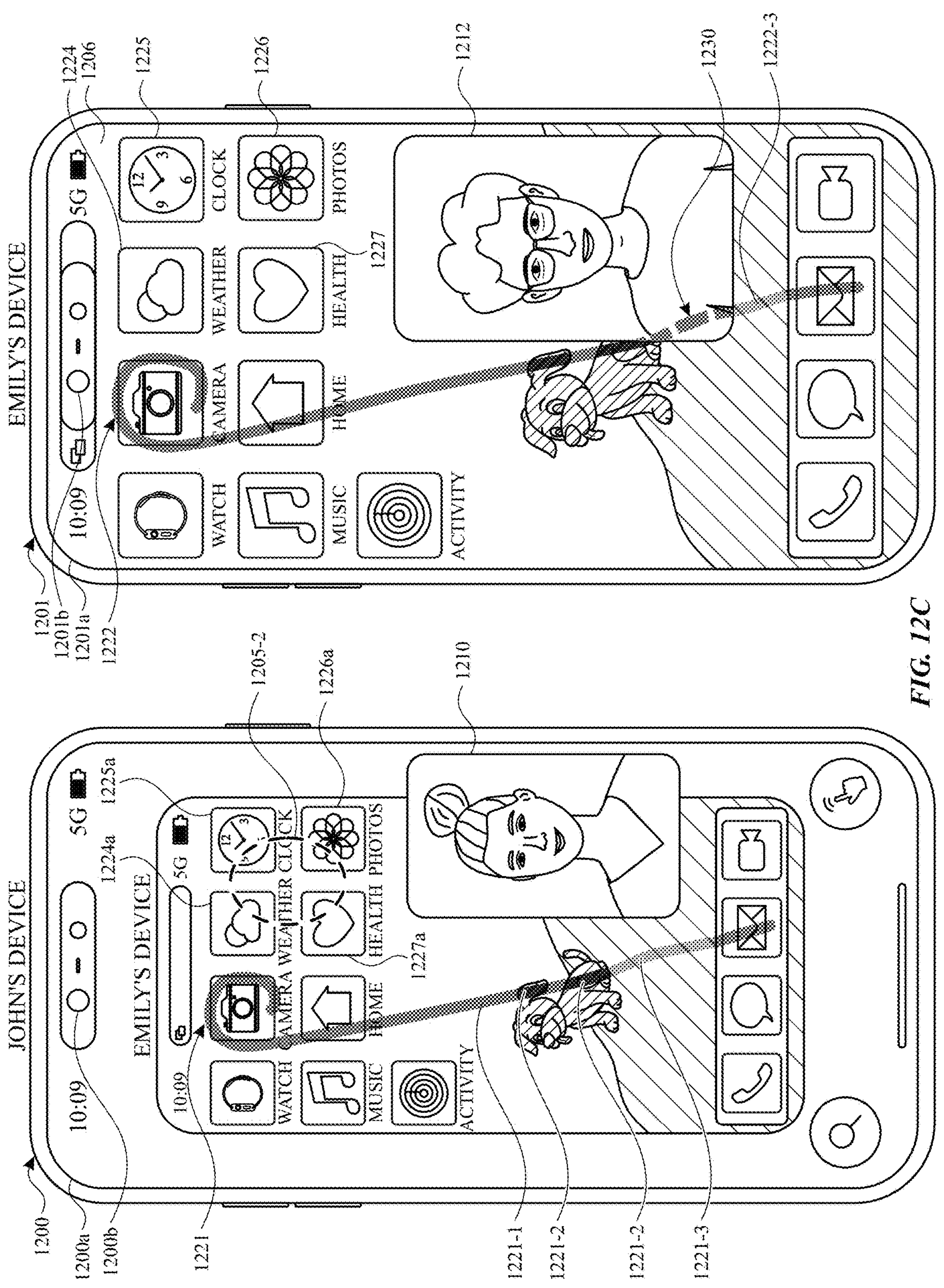

In FIGS. 12A and 12B, John's device 1200 detects input 1205-1, which is a drawing gesture detected on display 1200*a*. Input 1205-1 includes a first portion (e.g., a touch on display 1200*a*) followed by a second portion (e.g., a movement of the input along the surface of display 1200*a*). FIG. 12A depicts the first portion of the input as a touch located near representation 1207*a* of the camera icon 1207 displayed at Emily's device (e.g., as shown in FIG. 12B). FIG. 12B depicts the second portion of the input as movement of input 1205-1, as the touch contact is maintained and moved along the surface of display 1200*a* (e.g., thereby performing the drawing gesture). In some embodiments, as John's device 1200 detects the drawing gesture of input 1205-1, John's device 1200 displays, via display 1200*a*, a first visual representation 1221 of the input. The first visual representation 1221 of the input follows the movement pattern of the drawing gesture, thereby providing, on John's display 1200*a*, a real-time visual rendering of the drawing gesture being made on the shared screen content, as shown in FIGS. 12B and 12C. In some embodiments, John's device 1200 transmits data to Emily's device 1201 that communicates information about the input 1205-1 detected at John's device. Thus, as John's device 1200 detects the drawing gesture of input 1205-1 and communicates the data to Emily's device 1201, Emily's device 1201 displays, via display 1201*a*, a second visual representation 1222 of the input that follows the movement pattern of the drawing gesture being detected at John's device 1200. Accordingly, the second visual representation 1222 of the input provides a real-time visual rendering of the drawing gesture, which is displayed (e.g., on Emily's display 1201*a*) over the screen content at Emily's device 1201, as shown in FIGS. 12B and 12C.

The visual representations of the input provide feedback indicating, inter alia, the location and movement of input(s) (e.g., input 1205-1 and/or 1205-2) on the representation of the shared content (e.g., 1206*a*) displayed at John's device 1200. In some embodiments, the feedback can be useful as a visual aid for enhancing communication between the users of the respective devices. For example, in the embodiments depicted in FIGS. 12A-12C, while Emily shares her screen with John, John can be explaining to Emily (e.g., via the video and audio channels of the video call) that photos captured using the camera application can be shared using the email application. As part of the explanation, John provides a drawing gesture (e.g., using input 1205-1) that circles the camera application icon (e.g., 1207) on Emily's display and moves towards the email application icon, as indicated by the visual representations 1221 and 1222.

In some embodiments, the visual representations of the input are displayed with sets of visual characteristics. For example, in some embodiments, the visual representations (e.g., 1221 and/or 1222) are displayed in an animated manner such that it appears that John is drawing on the shared screen content with his finger (e.g., or stylus, cursor, or other input device). In some embodiments, the visual representations 1221 and/or 1222 are temporarily displayed. For example, in FIGS. 12C-12E, visual representations 1221 and 1222 of the input are shown fading away as indicated by the full, darkened appearance of the first visual representation 1221 and second visual representation 1222 in FIG. 12C, followed by the thinned line appearance and lighter shading of the lines shown in FIG. 12D, followed by the absence of the lines in FIG. 12E.

In some embodiments, the first visual representation 1221 and second visual representation 1222 have one or more colors that are determined based on the color(s) of the portions of the shared screen content over which they are rendered. For example, as shown in FIGS. 12B and 12C, first visual representation 1221 has a first color 1221-1, second color 1221-2, and third color 1221-3. The colors of portions of the first visual representation 1221 are determined based on the color(s) of the representations of the portions of the shared screen content of interface 1206 over which the portions of the visual representation of the input are displayed. For example, color 1221-1 is determined based on the color of background portion representation 1206-1*a*, color 1221-2 is determined based on the color of dog portion representation 1206-2*a*, and color 1221-3 is determined based on the color of ground portion representation 1206-3*a*. Similarly, second visual representation 1222 of the input has a first color 1222-1, second color 1222-2, and third color 1222-3. The colors of portions of the second visual representation 1222 are determined based on the color(s) of the portions of the shared screen content of interface 1206 over which the portions of the visual representation of the input are displayed. For example, color 1222-1 is determined based on the color of background portion 1206-1, color 1222-2 is determined based on the color of dog portion 1206-2, and color 1222-3 is determined based on the color of ground portion 1206-3. In some embodiments, the colors of the visual representations of the input are selected to be an inversion of the color of the portion of the background over which they are displayed. In this way, the visual representation of the input is easily visible over the shared screen content, even if the shared screen content has a variety of colors and color patterns.

In some embodiments, a visual representation of an input can be displayed with a different line pattern such as, for example, a dashed line, to indicate when the input is directed to content that is behind an object displayed on the screen. For example, the drawing gesture of input 1205-1 moves over the representation 1206-3*a* of ground portion 1206-3 as shown in FIG. 12C. Accordingly, John's device 1200 displays first visual representation 1221 as a solid line over representation 1206-3*a* of the ground portion. Emily's device 1201 displays the second visual representation 1222 of the drawing gesture having a corresponding pattern and displayed location relative to the shared screen content of home screen interface 1206. However, because Emily's device is displaying video feed 1212 over interface 1206, and input 1205-1 moves along a location of background portion 1206-3 that is obscured by video feed 1212, Emily's device 1201 displays the portion of second visual representation 1222 that is overlaid by video feed 1212 with dashed line style 1230, as shown in FIG. 12C. In the embodiment depicted in FIG. 12C, Emily's device displays the dashed line style. However, in some embodiments, John's device 1200 can display first visual representation 1221 with a dashed line style. For example, if the drawing gesture of input 1205-1 moved to a location of the representation 1206*a* of the shared screen content that is overlaid by video feed 1210, John's device 1200 can display the portion of first visual representation 1221 that is overlaid by the video feed 1210 with a dashed line style, similar to dashed line style 1230.

Figure 12D:
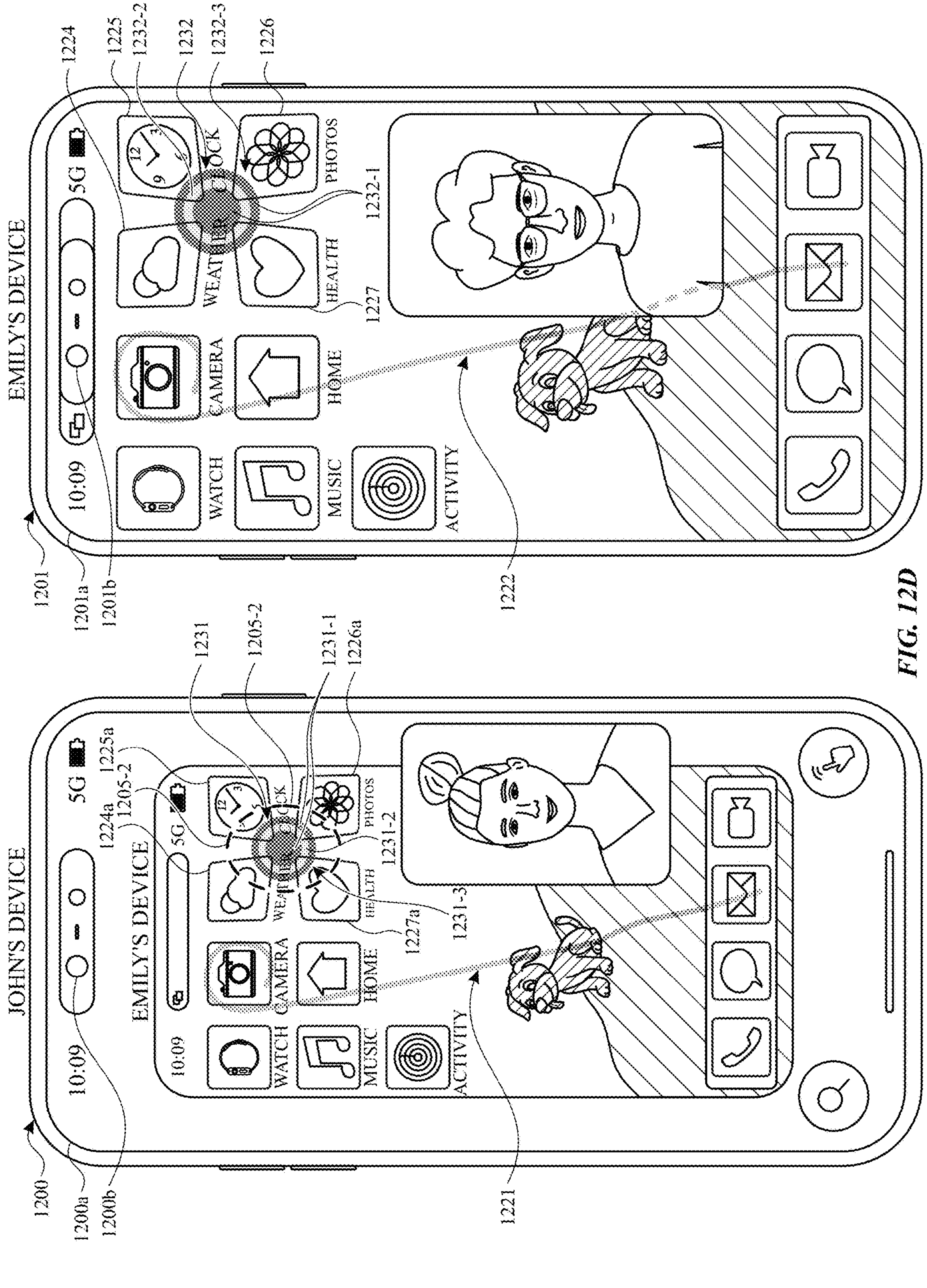
Figure 12E:
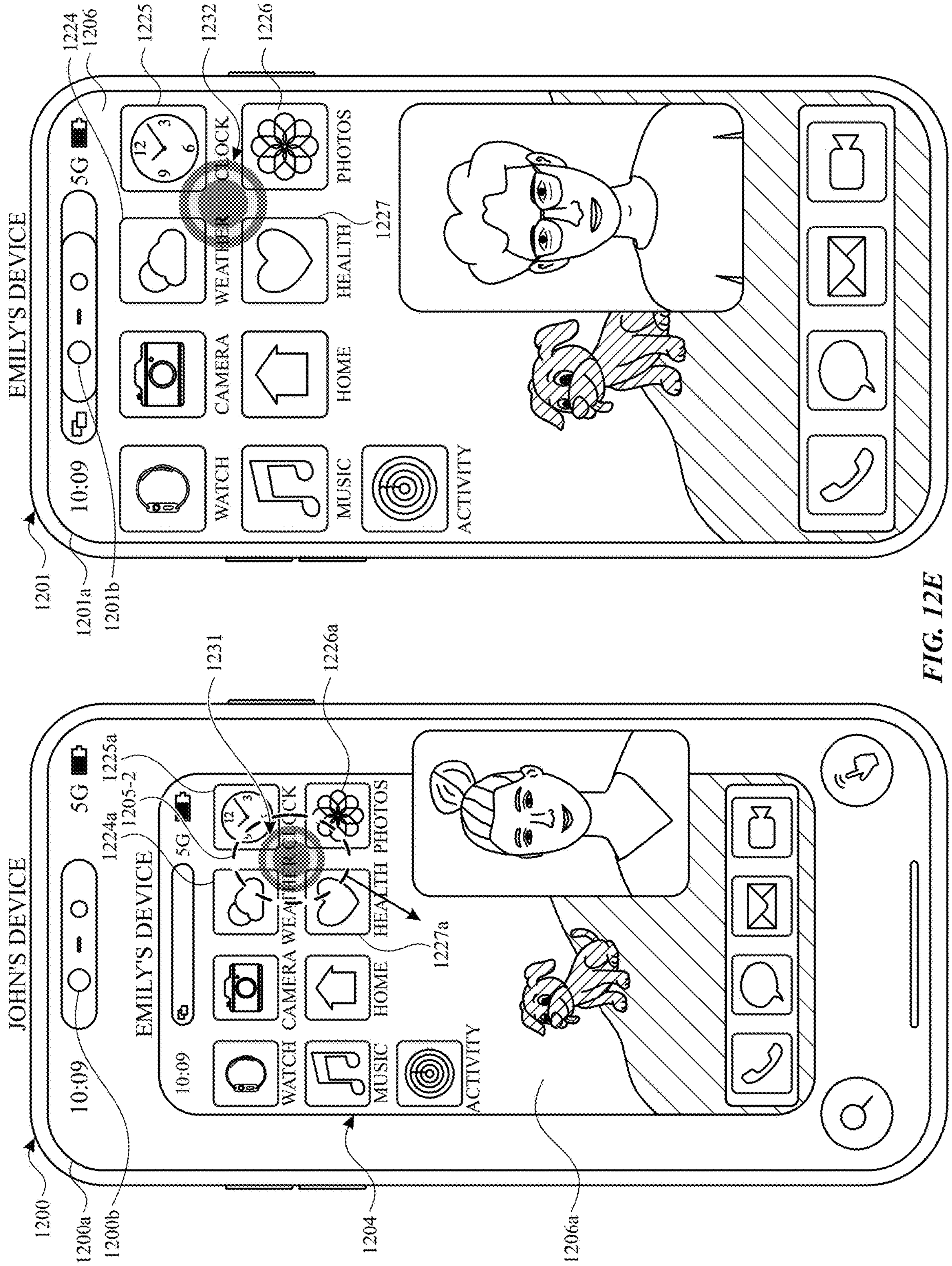

As previously mentioned, an example of a tap input and the corresponding visual representations of the tap input are described with reference to FIGS. 12C-12F. In FIG. 12C, John's device 1200 detects input 1205-2, which is a touch input detected near a displayed location of representations 1224*a*, 1225*a*, 1226*a*, and 1227*a* of application icons 1224, 1225, 1226, and 1227, respectively. In response to detecting input 1205-2, John's device 1200 and Emily's device 1201 both display a visual representation of the tap input at a corresponding location on the shared screen content. Specifically, John's device 1200 displays visual representation 1231, which includes a glowing effect 1231-1, ring effect 1231-2, and distortion effect 1231-3. Distortion effect 1231-3 is an animated effect whereby John's device 1200 temporarily distorts the appearance of representations 1224*a*-1227*a* of application icons 1224-1227 as displayed on John's device 1200 in FIG. 12D. Glowing effect 1231-1 and ring effect 1231-2 provide a visual effect that is continuously displayed for the duration of input 1205-2 (e.g., for as long as the input is maintained and stationary on display 1200*a*), as depicted in FIGS. 12D and 12E. In some embodiments, John's device 1200 transmits data to Emily's device 1201 that communicates information about the input 1205-2 detected at John's device. Thus, as John's device 1200 detects the tap input (e.g., input 1205-2) and communicates the data to Emily's device 1201, Emily's device 1201 displays, via display 1201*a*, visual representation 1232, which includes glowing effect 1232-1, ring effect 1232-2, and distortion effect 1232-3. Distortion effect 1232-3 is an animated effect whereby Emily's device 1201 temporarily distorts the appearance of application icons 1224-1227 as displayed on Emily's device 1201 in FIG. 12D. In some embodiments, the distortion effect includes a pincushion distortion, barrel distortion, and/or mustache distortion. In some embodiments, the distortion effect includes a ripple effect. Glowing effect 1232-1 and ring effect 1232-2 provide a visual effect that is continuously displayed for the duration of input 1205-2 (e.g., for as long as the input is maintained and stationary on display 1200*a*), as depicted in FIGS. 12D and 12E. In some embodiments, when John's device 1200 detects termination of input 1205-2 (e.g., without further movement of the input), John's device 1200 ceases to display visual representation 1231 and Emily's device 1201 ceases to display visual representation 1232.

Figure 12F:
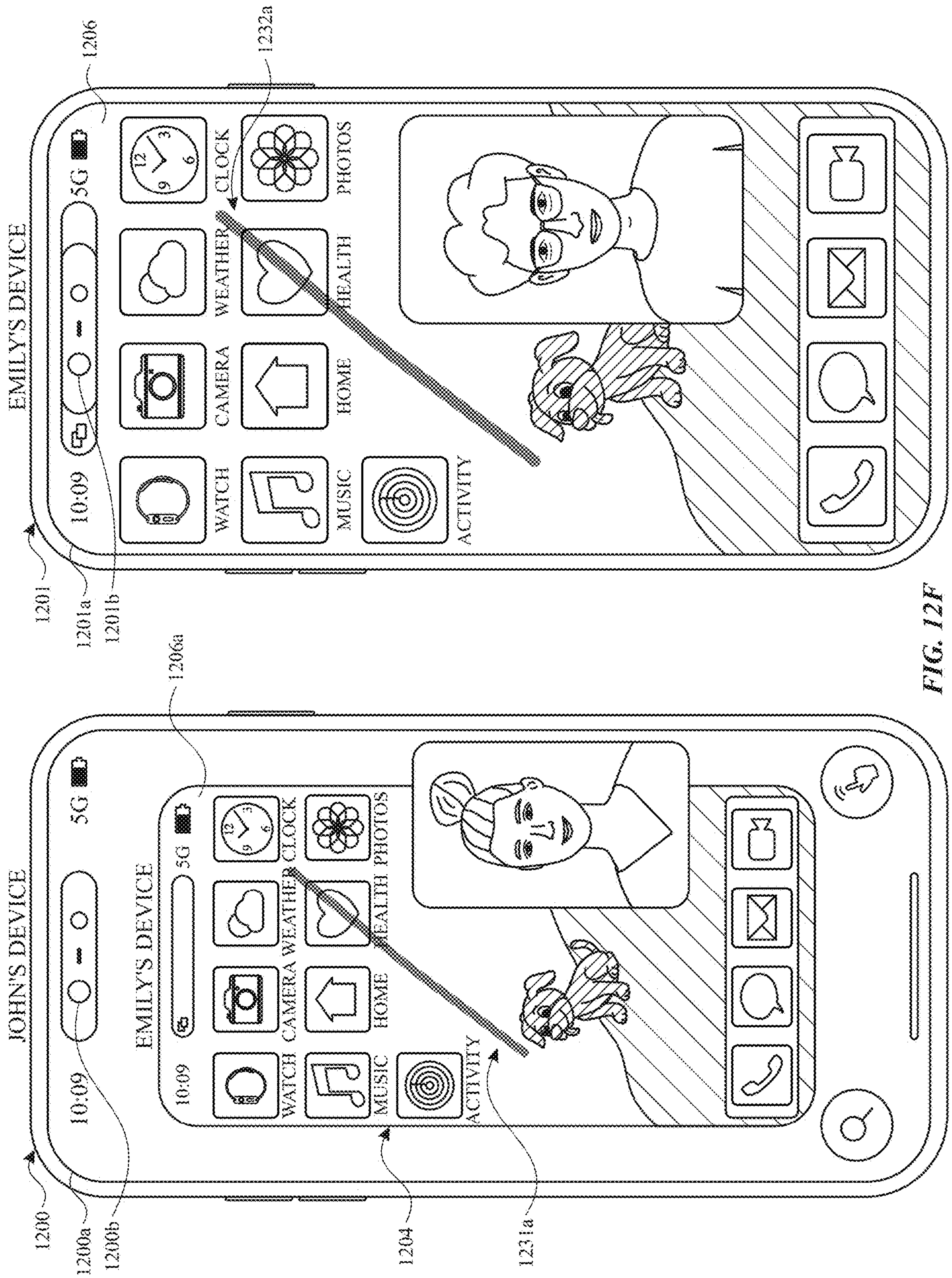

In some embodiments, if a tap input transitions to a drawing gesture (e.g., after the tap input is detected, the input then moves along display 1200*a*), the visual representations of the input are updated to have an appearance of a drawing gesture. For example, in FIG. 12E, after John's device 1200 and Emily's device 1201 have displayed visual representations 1231 and 1232, respectively, in response to input 1205-2 on John's device 1200, input 1205-2 is detected moving across display 1200*a* along the displayed representation of the shared screen content. In response to detecting the movement of input 1205-2, John's device 1200 displays a transition of visual representation 1231 from the appearance in FIG. 12E to changed appearance 1231*a* as shown in FIG. 12F. Similarly, in response to detecting the movement of input 1205-2, Emily's device 1201 displays a transition of visual representation 1232 from the appearance in FIG. 12E to changed appearance 1232*a* as shown in FIG. 12F. In some embodiments, the changed appearances 1231*a* and 1232*a* of visual representations 1231 and 1232, respectively, include display characteristics of a representation of a drawing gesture, similar to first visual representation 1221 and second visual representation 1222. Accordingly, the visual representations of input 1205-2, as depicted in FIG. 12F, can include any of the display characteristics of first and second visual representations 1221 and 1222 described above.

FIG. 13 is a flow diagram illustrating a method for displaying representations of an input using a computer system in accordance with some embodiments. Method 1300 is performed at a computer system (e.g., 100, 300, 500, 600, 601, 800, 801, 1000, 1001, 1050, 1051, 1200, and/or 1201) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) one or more display generation components (e.g., 112, 340, 504, 600*a*, 601*a*, 660, 800*a*, 801*a*, 1000*a*, 1001*a*, 1050*a*, 1051*a*, 1200*a*, and/or 1201*a*) (e.g., a display controller, a touch-sensitive display system, a display screen, a monitor, a projector, a holographic display, a head-mounted display system, and/or other device or component that presents visual content to a user, for example on or in the display generation component itself or produced from the display generation component and visible elsewhere) and one or more input devices (e.g., 112, 350, 355, 508, 522, 600*a*, 600*b*, 601*a*, 601*b*, 601*c*, 601*d*, 800*a*, 800*b*, 801*a*, 801*b*, 1000*a*, 1000*b*, 1001*a*, 1001*b*, 1050*a*, 1050*b*, 1051*a*, 1051*b*, 1051*c*, 1051*d*, 1200*a*, 1200*b*, 1201*a*, and/or 1201*b*) (e.g., a touch-sensitive surface, a keyboard, mouse, trackpad, one or more optical sensors for detecting a gaze and/or gestures, one or more capacitive sensors for detecting hover inputs, a microphone, and/or accelerometer/gyroscope/inertial measurement units). Some operations in method 1300 are, optionally, combined, the orders of some operations are, optionally, changed, and some operations are, optionally, omitted.

As described below, method 1300 provides an intuitive way for displaying representations of an input. The method reduces the cognitive burden on a user for displaying representations of an input, thereby creating a more efficient human-machine interface. For battery-operated computing devices, enabling a user to display representations of an input faster and more efficiently conserves power and increases the time between battery charges.

The steps of method 1300 are performed at the computer system (e.g., 1200 and/or 1201) while displaying (1302), via the one or more display generation components (e.g., 1200*a*), a representation (e.g., 1206*a*) of screen content (e.g., 1206) (e.g., a displayed view of screen content such as a user interface, home screen, or other content that is displayed at a display screen of the external computer system) that is being shared from an external computer system (e.g., 1201) (e.g., the external computer system is sharing its screen content with the computer system) while the computer system (e.g., 1200) does not have control of the screen content that is being shared from the external computer system (e.g., the external computer system has not granted the computer system permission to control content displayed at the external computer system).

The computer system (e.g., 1200) detects (1304), via the one or more input devices (e.g., 1200*a*), an input (e.g., 1205-1 and/or 1205-2) (e.g., a touch input, a mouse input, a gaze input, and/or a gesture input) directed to the representation (e.g., 1206*a*) of the screen content (e.g., an input that includes a gesture and/or identifies a portion of the screen content). In response (1306) to detecting the input directed to the representation of the screen content (e.g., while the computer system does not have control over the screen content that is being shared by the external computer system), the computer system performs the following steps. The computer system displays (1308), via the one or more display generation components (e.g., 1200*a*), a first visual representation (e.g., 1221 and/or 1231) of the input (e.g., a visual display of a line, shape, color, highlight, and/or other visual indicator that has an appearance that is determined by one or more aspects of the input (e.g., a location, duration, direction of movement, and/or velocity of movement of the input)), wherein the first visual representation of the input is displayed (e.g., at the computer system) over at least a portion of the representation (e.g., 1206*a*) of the screen content. In some embodiments, the computer system displays the first visual representation of the input persistently for a predetermined amount of time. In some embodiments, the computer system ceases to display the first visual representation of the input after a predetermined amount of time. The computer system initiates (1310) a process for causing a second visual representation (e.g., 1222 and/or 1232) of the input to be displayed over the screen content (e.g., 1206) at the external computer system (e.g., 1201) (e.g., transmitting data to cause the second visual representation of the input to be displayed at the external computer system). Displaying the first visual representation of the input over at least a portion of the representation of the screen content and initiating a process for causing a second visual representation of the input to be displayed over the screen content at the external computer system provides improved feedback by indicating an input and, in some embodiments, a gesture that is being made by the recipient of screen share content without requiring the sharing device (e.g., the external computer system) to grant control of the shared content to the recipient device. In some embodiments, the external computer system (e.g., 1201) displays the second visual representation of the input persistently for a predetermined amount of time. In some embodiments, the external computer system ceases to display the second visual representation of the input after a predetermined amount of time. In some embodiments, the second visual representation of the input has a same appearance as the first visual representation of the input. In some embodiments, the second visual representation of the input has a different appearance than the first visual representation of the input. For example, the second visual representation of the input has a same shape or pattern as the first visual representation of the input, but has a different color, line style, line thickness, size, and/or other visual characteristic. In some embodiments, the visual appearance of the second visual representation of the input is determined by the external computer system. In some embodiments, the input (e.g., 1205-1) directed to the representation (e.g., 1206*a*) of the screen content includes a drawing gesture that includes movement of the input relative to the displayed representation of the screen content. In some embodiments, the input includes a first portion that includes contact with the one or more input devices and/or a display generation component (e.g., 1200*a*) and a second portion that includes movement of the input relative to the displayed representation of the screen content. In some embodiments, the drawing gesture identifies respective content in the screen content (e.g., an application icon (e.g., 1207*a* and/or 1207) and/or other displayed content).

In some embodiments, as a part of displaying the first visual representation (e.g., 1221 and/or 1231) of the input, the computer system (e.g., 1200) displays the first visual representation of the input for a predetermined amount of time. In some embodiments, after displaying the first visual representation of the input for the predetermined amount of time, the computer system ceases display of the first visual representation of the input. Displaying the first visual representation of the input for the predetermined amount of time and then ceasing display of the first visual representation of the input provides improved feedback by providing an indication of the input detected at the computer system and reduces the number of inputs processed by the computer system by automatically ceasing display of the representation of the input without requiring additional user input. In some embodiments, the computer system temporarily displays the first visual representation of the input. In some embodiments, the external computer system temporarily displays the second visual representation of the input. In some embodiments, causing the second visual representation (e.g., 1222 and/or 1232) of the input to be displayed at over the screen content (e.g., 1206) at the external computer system (e.g., 1201) includes causing the second visual representation of the input to be displayed at the external computer system for a predetermined amount of time, and after displaying the second visual representation of the input for the predetermined amount of time, causing the external computer system to cease displaying the second visual representation of the input. In some embodiments, ceasing display of the first visual representation of the input includes displaying an animated effect in which the first visual representation of the input fades away (e.g., from a relatively higher opacity value (e.g., fully opaque) to a relatively lower opacity value (e.g., fully transparent)) over a period of time (e.g., 1 second, 1.5 seconds, or 2 seconds) (e.g., as depicted by 1221 and 1222 in FIGS. 12C and 12D). Displaying the animated effect in which the first visual representation of the input fades away over a period of time provides improved feedback indicating the input at the computer system has not been detected for at least a period of time. In some embodiments, the computer system displays the first visual representation of the input for a predetermined amount of time (e.g., 2 second, 2.5 seconds, or 3 seconds) before beginning to fade away. In some embodiments, the external computer system displays the second visual representation of the input fading away in a similar manner as the first visual representation of the input.

In some embodiments, displaying the first visual representation (e.g., 1221) of the input includes displaying the first visual representation of the input having a set of one or more colors (e.g., 1221-1, 1221-2, and/or 1221-3) that are determined based on one or more visual properties (e.g., color, luminance, and/or hue) of the portion (e.g., 1206-1*a*, 1206-2*a*, and/or 1206-3*a*) of the representation (e.g., 1206*a*) of the screen content (e.g., the first visual representation of the input has a different color that is visible over the portion of the representation of the screen content that is displayed behind the visual representation of the input). Displaying the first visual representation of the input having a set of one or more colors that are determined based on one or more visual properties of the portion of the representation of the screen content provides improved feedback by ensuring that the visual representation of the input is visible to a user regardless of the visual properties of the background content that is displayed behind the visual representation of the input. In some embodiments, in accordance with a determination that the portion (e.g., 1206-1*a*) of the representation of the screen content has a first visual property, the computer system (e.g., 1200) displays the first visual representation (e.g., 1221) of the input having a first set of one or more colors (e.g., 1221-1), and in accordance with a determination that the portion (e.g., 1206-2*a*) of the representation of the screen content has a second visual property different from the first visual property, the computer system displays the first visual representation of the input having a second set of one or more colors (e.g., 1221-2) that is different from the first set of one or more colors. In some embodiments, the computer system determines the color(s) of the visual representation of the input based on visual properties (e.g., color, luminance, and/or hue) of the representation of the screen content that is displayed by the computer system. For example, the color(s) of the visual representation of the input are an inversion of the screen content color(s) over which the visual representation of the input are displayed. In some embodiments, the external computer system determines the color(s) of the second visual representation of the input based on visual properties (e.g., color, luminance, and/or hue) of the screen content that is displayed by the external computer system.

In some embodiments, as a part of displaying the first visual representation (e.g., 1221) of the input, the computer system (e.g., 1200) displays a first portion (e.g., 1221-1) of the first visual representation of the input over a first portion (e.g., 1206-1*a*) of the representation of the screen content, wherein the first portion of the first visual representation of the input includes a first color and the first portion of the representation of the screen content includes a second color that is different from the first color (e.g., the first color of the visual representation of the input is an inversion of the color, hue, and/or luminance of the first portion of the representation of the screen content). In some embodiments, the computer system displays a second portion (e.g., 1221-2) of the first visual representation of the input over a second portion (e.g., 1206-2*a*) of the representation of the screen content. In accordance with a determination that the second portion of the representation of the screen content has a third color (e.g., a color that is different from the second color), the computer system displays the second portion of the first visual representation of the input having a fourth color that is different from the first color (e.g., a color that is different from the first color of the first portion of the first visual representation of the input and, in some embodiments, is an inversion of the third color of the second portion of the representation of the screen content). In accordance with a determination that the second portion of the representation of the screen content has a fifth color that is different from the third color (e.g., a color that is different from the second color and the third color), the computer system displays the second portion of the first visual representation of the input having a sixth color that is different from the fourth color (e.g., a color that is different from the first and fourth colors of the first portion of the first visual representation of the input and, in some embodiments, is an inversion of the fifth color of the second portion of the representation of the screen content). Displaying the second portion of the first visual representation of the input having the fourth color or the sixth color based on whether the second portion of the representation of the screen content has the third color or the fifth color provides improved feedback by ensuring that the first visual representation of the input is visible to a user regardless of the color of the background content that is displayed behind the visual representation of the input. In some embodiments, the computer system displays the first visual representation of the input changing colors based on a change in colors of the portion of the representation of the screen content that is displayed behind the first visual representation of the input at the computer system. In some embodiments, the external computer system displays the second visual representation of the input changing colors based on a change in colors of a portion of the screen content that is displayed behind the second visual representation of the input at the external computer system (e.g., 1201).

In some embodiments, as a part of displaying the first visual representation (e.g., 1221) of the input, the computer system (e.g., 1200) animates the representation of the input over time (e.g., the computer system displays an animated display of the first visual representation of the input that corresponds to movement of the input) (e.g., as depicted in FIGS. 12B-12C and in FIGS. 12D-12E). Animating the representation of the input over time provides improved feedback by indicating that the first visual representation of the input is based on characteristics of the input such as movement of the input over the representation of the screen content.

In some embodiments, as a part of displaying the first visual representation (e.g., 1221) of the input over at least the portion of the representation (e.g., 1206*a*) of the screen content, the computer system (e.g., 1200) performs (e.g., conditionally performs) the following steps. In accordance with a determination that the portion of the representation of the screen content is positioned behind an object (e.g., 1210) (e.g., displayed content such as a representation of a video feed, a banner, a notification, and/or other displayed element that overlays the portion of the representation of the screen content) (e.g., the object is displayed over the portion of the representation of the screen content), the computer system displays the first visual representation of the input (e.g., 1221 and/or 1231) having a first visual characteristic (e.g., a line style such as a dashed or dotted line) (e.g., similar to the line dashing 1230 shown in FIG. 12C). In accordance with a determination that the portion of the representation of the screen content is not positioned behind the object (e.g., the portion of the representation of the screen content is not obscured or visually obstructed by another displayed object), the computer system displays the first visual representation of the input having a second visual characteristic that is different from the first visual characteristic (e.g., a different line style such as a solid line). Displaying the first visual representation of the input having the first or second visual characteristic based on whether the portion of the representation of the screen content is positioned behind an object provides improved feedback by indicating that the input is directed to content that is behind a displayed object. In some embodiments, if the input is directed to a portion of the representation of screen content that is located behind an object that overlays the representation of the screen content, the computer system displays the first visual representation of the input having a dashed line to indicate the input gesture is directed to content that is positioned behind the object. In some embodiments, if the second visual representation of the input (e.g., 1222 and/or 1232) is directed to screen content that is located behind an object (e.g., 1212) displayed at the external computer system (e.g., 1201), the external computer system displays the second visual representation of the input having a dashed line (e.g., 1230) to indicate the input gesture is directed to screen content that is positioned behind the object.

In some embodiments, as a part of displaying the first visual representation (e.g., 1231) of the input, the computer system (e.g., 1200) performs (e.g., conditionally performs) the following steps. In accordance with a determination that the input includes a first type of input (e.g., a tap input, a tap-and-hold input without a drag gesture, a tap-and-hold input without a drag gesture performed within a threshold amount of time, and/or an input that satisfies a first set of input criteria that is based on one or more characteristics of the input), the computer system displays the first visual representation of the input having a first set of one or more visual effects (e.g., 1231-1, 1231-2, and/or 1231-3) (e.g., a distortion effect (e.g., 1231-3 as depicted in FIG. 12D), a glow effect (e.g., 1231-1), and/or a ring effect (e.g., 1231-2)). Displaying the first visual representation of the input having the first set of one or more visual effects based on whether the input includes a first type of input provides improved feedback about the type of input that is detected at the computer system. In some embodiments, in accordance with a determination that the input includes the first type of input, the computer system causes the second visual representation (e.g., 1232) of the input to be displayed having the second set of one or more visual effects (e.g., 1232-1, 1232-2, and/or 1232-3 as depicted in FIG. 12D). In some embodiments, if the input is a tap input, the computer system displays the visual representation of the input having a different visual effect than if the input is not a tap input (e.g., a swipe gesture or a drag gesture). In some embodiments, displaying the first visual representation of the input includes: in accordance with a determination that the input includes a second type of input different from the first type of input (e.g., a touch input with a drag or swipe gesture performed within a threshold amount of time after the touch input is detected), displaying the first visual representation of the input having a second set of one or more visual effects different from the first set of one or more visual effects (e.g., a highlight effect, a color inversion effect, and/or a fading effect) (and, in some embodiments, causing the second visual representation of the input to be displayed having the first set of one or more visual effects). In some embodiments, the second type of input includes a first portion of an input followed by a second portion of the input, wherein the second portion of the input is detected within a threshold amount of time after the first portion of the input. For example, the first portion of the input is a touch input and the second portion of the input is a drag or swipe gesture of the touch input, wherein the drag or swipe gesture begins within the threshold amount of time (e.g., 0.25 second, 0.5 seconds, or 0.75 seconds after the touch input is detected).

In some embodiments, as a part of displaying the first visual representation (e.g., 1231) of the input having the first set of one or more visual effects (e.g., 1231-1, 1231-2, and/or 1231-3), the computer system (e.g., 1200) performs (e.g., conditionally performs) the following steps. While the input (e.g., 1205-2) is detected at the computer system (e.g., the input is maintained and/or continues to be detected), the computer system continues to display the first visual representation (e.g., 1231) of the input having at least one visual effect from the first set of one or more visual effects (e.g., continuing to maintain display of the glow effect and/or ring effect) (and, in some embodiments, ceasing to display another visual effect from the first set of one or more visual effects such as, for example, the distortion effect). In response to detecting that the input is terminated (e.g., the input is no longer detected or has ended), the computer system ceases display of the first visual representation of the input. Continuing to display the first visual representation of the input having at least one visual effect from the first set of one or more visual effects while the input is detected at the computer system and ceasing display of the first visual representation of the input when the input is terminated provides improved feedback about a state of the computer system (e.g., a state in which the input continues to be detected or is terminated). In some embodiments, the visual representation of a tap input lasts for a duration of the tap input (e.g., for a duration in which the tap input is stationary). In some embodiments, the visual representation of the tap input includes a first visual effect that is temporarily displayed upon first detection of the tap input (e.g., the distortion effect is temporarily displayed upon first detection of the tap input), and at least a second visual effect (e.g., the glow effect and/or the ring effect) that remains displayed for the duration of the tap input.

In some embodiments, while the input (e.g., 1205-2) (e.g., a tap input or a tap-and-hold input) is detected at the computer system (e.g., 1200) and the first visual representation (e.g., 1231) of the input is displayed having a first appearance (e.g., as depicted in FIG. 12E) that includes the first set of one or more visual effects (e.g., 1231-1, 1231-2, and/or 1231-3) (e.g., the first visual representation of the input has the first set of one or more visual effects while the input is stationary), the computer system detects, via the one or more input devices (e.g., 1200*a*), movement of the input. In response to detecting the movement of the input, the computer system displays, via the one or more display generation components (e.g., 1200*a*), the first visual representation of the input having (e.g., transitioning to) a second appearance (e.g., 1231*a* as depicted in FIG. 12F) that is different from the first appearance, wherein the second appearance includes a second set of one or more visual effects that is different from the first set of one or more visual effects (e.g., the first visual representation of the input transitions to include the second set of one or more visual effects when the input moves). Displaying the first visual representation of the input having the second appearance in response to detecting movement of the input provides improved feedback indicating that the input has transitioned from a stationary input to a gesture with movement. In some embodiments, while the input is maintained and stationary, the visual representation of the input continues to include one or more visual effects from the first set of one or more visual effects. When the computer system detects movement of the input, the computer system transitions the visual representation of the input to include the second set of one or more visual effects without the first set of one or more visual effects (e.g., as the visual representation of the input moves based on the movement of the input). In some embodiments, the external computer system (e.g., 1201) updates the appearance of the second visual representation (e.g., 1232) of the input in a similar manner (e.g., transitioning from a first appearance (e.g., shown in FIG. 12E) to the second appearance (e.g., 1232*a*) in response to detecting the movement of the input (e.g., 1205-2)).

Note that details of the processes described above with respect to method 1300 (e.g., FIG. 13) are also applicable in an analogous manner to the methods described above. For example, methods 700, 900, and/or 1100 optionally includes one or more of the characteristics of the various methods described above with reference to method 1300. For example, one or more aspects of the user interfaces for displaying representations of an input can be used in connection with the embodiments described in one or more of these methods. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the sharing of screen content. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of screen content sharing, the present technology can be configured to allow users to select to "opt in" or "opt out" of participation in the collection of personal information data during registration for screen sharing or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A computer system configured to communicate with one or more display generation components and one or more input devices, comprising:

one or more processors; and memory storing one or more programs configured to be executed by the one or more processors, the one or more programs including instructions for:

while displaying, via the one or more display generation components, a representation of screen content that is being shared from an external computer system while the computer system does not have control of the screen content that is being shared from the external computer system:

detecting, via the one or more input devices, an input directed to the representation of the screen content, wherein the input directed to the representation of the screen content includes a drawing gesture that includes movement of the input along a path from a first location relative to the displayed representation of the screen content to a second location relative to the displayed representation of the screen content; and in response to detecting the input directed to the representation of the screen content:

displaying, via the one or more display generation components, a first visual representation of the input, wherein the first visual representation of the input is displayed over at least a portion of the representation of the screen content corresponding to the path of the input, including:

in accordance with a determination that a first portion of the path of the input overlaps a representation of the screen content that is not positioned behind an object, displaying the first visual representation of the input having a first line style for a first portion of the visual representation of the input corresponding to the first portion of the path of the input;

in accordance with a determination that a second portion of the path of the input overlaps a representation of the screen content that is positioned behind an object, displaying the first visual representation of the input having a second line style that is different from the first line style for a second portion of the visual representation of the input corresponding to the second portion of the path of the input;

in accordance with a determination that the path of the input transitions from overlapping a representation of the screen content that is not positioned behind an object to overlapping a representation of the screen content that is positioned behind an object, displaying the first visual representation of the input transitioning from having the first line style to having the second line style; and in accordance with a determination that the path of the input transitions from overlapping a representation of the screen content that is positioned behind an object to overlapping a representation of the screen content that is not positioned behind an object, displaying the first visual representation of the input transitioning from having the second line style to having the first line style; and initiating a process for causing a second visual representation of the input to be displayed over the screen content at the external computer system.

2. The computer system of claim 1, wherein displaying the first visual representation of the input includes:

displaying the first visual representation of the input for a predetermined amount of time; and after displaying the first visual representation of the input for the predetermined amount of time, ceasing display of the first visual representation of the input.

3. The computer system of claim 2, wherein ceasing display of the first visual representation of the input includes displaying an animated effect in which the first visual representation of the input fades away over a period of time.

4. The computer system of claim 1, wherein displaying the first visual representation of the input includes displaying the first visual representation of the input having a set of one or more colors that are determined based on one or more visual properties of the portion of the representation of the screen content.

5. The computer system of claim 1, wherein displaying the first visual representation of the input includes:

displaying a first respective portion of the first visual representation of the input over a first respective portion of the representation of the screen content, wherein the first respective portion of the first visual representation of the input includes a first color and the first respective portion of the representation of the screen content includes a second color that is different from the first color; and displaying a second respective portion of the first visual representation of the input over a second respective portion of the representation of the screen content, including:

in accordance with a determination that the second respective portion of the representation of the screen content has a third color, displaying the second respective portion of the first visual representation of the input having a fourth color that is different from the first color; and in accordance with a determination that the second respective portion of the representation of the screen content has a fifth color that is different from the third color, displaying the second respective portion of the first visual representation of the input having a sixth color that is different from the fourth color.

6. The computer system of claim 1, wherein displaying the first visual representation of the input includes animating the representation of the input over time.

7. The computer system of claim 1, wherein displaying the first visual representation of the input includes:

in accordance with a determination that the input includes a first type of input, displaying the first visual representation of the input having a first set of one or more visual effects.

8. The computer system of claim 7, wherein displaying the first visual representation of the input having the first set of one or more visual effects includes:

while the input is detected at the computer system, continuing to display the first visual representation of the input having at least one visual effect from the first set of one or more visual effects; and in response to detecting that the input is terminated, ceasing display of the first visual representation of the input.

9. The computer system of claim 7, the one or more programs further including instructions for:

while the input is detected at the computer system and the first visual representation of the input is displayed having a first appearance that includes the first set of one or more visual effects, detecting, via the one or more input devices, movement of the input; and in response to detecting the movement of the input, displaying, via the one or more display generation components, the first visual representation of the input having a second appearance that is different from the first appearance, wherein the second appearance includes a second set of one or more visual effects that is different from the first set of one or more visual effects.

10. A non-transitory computer-readable storage medium storing one or more programs configured to be executed by one or more processors of a computer system that is in communication with one or more display generation components and one or more input devices, the one or more programs including instructions for:

while displaying, via the one or more display generation components, a representation of screen content that is being shared from an external computer system while the computer system does not have control of the screen content that is being shared from the external computer system:

detecting, via the one or more input devices, an input directed to the representation of the screen content, wherein the input directed to the representation of the screen content includes a drawing gesture that includes movement of the input along a path from a first location relative to the displayed representation of the screen content to a second location relative to the displayed representation of the screen content; and in response to detecting the input directed to the representation of the screen content:

displaying, via the one or more display generation components, a first visual representation of the input, wherein the first visual representation of the input is displayed over at least a portion of the representation of the screen content corresponding to the path of the input, including:

in accordance with a determination that a first portion of the path of the input overlaps a representation of the screen content that is not positioned behind an object, displaying the first visual representation of the input having a first line style for a first portion of the visual representation of the input corresponding to the first portion of the path of the input;

in accordance with a determination that a second portion of the path of the input overlaps a representation of the screen content that is positioned behind an object, displaying the first visual representation of the input having a second line style that is different from the first line style for a second portion of the visual representation of the input corresponding to the second portion of the path of the input;

in accordance with a determination that the path of the input transitions from overlapping a representation of the screen content that is not positioned behind an object to overlapping a representation of the screen content that is positioned behind an object, displaying the first visual representation of the input transitioning from having the first line style to having the second line style; and in accordance with a determination that the path of the input transitions from overlapping a representation of the screen content that is positioned behind an object to overlapping a representation of the screen content that is not positioned behind an object, displaying the first visual representation of the input transitioning from having the second line style to having the first line style; and initiating a process for causing a second visual representation of the input to be displayed over the screen content at the external computer system.

11. A method, comprising:

at a computer system that is in communication with one or more display generation components and one or more input devices:

while displaying, via the one or more display generation components, a representation of screen content that is being shared from an external computer system while the computer system does not have control of the screen content that is being shared from the external computer system:

detecting, via the one or more input devices, an input directed to the representation of the screen content, wherein the input directed to the representation of the screen content includes a drawing gesture that includes movement of the input along a path from a first location relative to the displayed representation of the screen content to a second location relative to the displayed representation of the screen content; and in response to detecting the input directed to the representation of the screen content:

displaying, via the one or more display generation components, a first visual representation of the input, wherein the first visual representation of the input is displayed over at least a portion of the representation of the screen content corresponding to the path of the input, including:

in accordance with a determination that a first portion of the path of the input overlaps a representation of the screen content that is not positioned behind an object, displaying the first visual representation of the input having a first line style for a first portion of the visual representation of the input corresponding to the first portion of the path of the input;

in accordance with a determination that a second portion of the path of the input overlaps a representation of the screen content that is positioned behind an object, displaying the first visual representation of the input having a second line style that is different from the first line style for a second portion of the visual representation of the input corresponding to the second portion of the path of the input;

in accordance with a determination that the path of the input transitions from overlapping a representation of the screen content that is not positioned behind an object to overlapping a representation of the screen content that is positioned behind an object, displaying the first visual representation of the input transitioning from having the first line style to having the second line style; and in accordance with a determination that the path of the input transitions from overlapping a representation of the screen content that is positioned behind an object to overlapping a representation of the screen content that is not positioned behind an object, displaying the first visual representation of the input transitioning from having the second line style to having the first line style; and initiating a process for causing a second visual representation of the input to be displayed over the screen content at the external computer system.

* * * * *